(12) United States Patent
Peters et al.

(10) Patent No.: US 9,815,694 B2
(45) Date of Patent: Nov. 14, 2017

(54) CATALYTIC AMMONIA SYNTHESIS BY TRANSITION METAL MOLECULAR COMPLEXES

(71) Applicant: CALIFORNIA INSTITUTE OF TECHNOLOGY, Pasadena, CA (US)

(72) Inventors: Jonas C. Peters, Pasadena, CA (US); John S. Anderson, Evanston, IL (US); Sidney E. Creutz, Pasadena, CA (US); Jonathan D. Rittle, Los Angeles, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 202 days.

(21) Appl. No.: 14/515,716

(22) Filed: Oct. 16, 2014

(65) Prior Publication Data
US 2015/0104371 A1    Apr. 16, 2015

Related U.S. Application Data

(60) Provisional application No. 61/891,550, filed on Oct. 16, 2013.

(51) Int. Cl.
| | | |
|---|---|---|
| C01C 1/02 | (2006.01) | |
| C01B 21/16 | (2006.01) | |
| B01J 31/16 | (2006.01) | |
| B01J 31/18 | (2006.01) | |
| B01J 31/24 | (2006.01) | |

(52) U.S. Cl.
CPC .......... *C01B 21/16* (2013.01); *B01J 31/1608* (2013.01); *B01J 31/189* (2013.01); *B01J 31/2409* (2013.01); *C01C 1/026* (2013.01); *B01J 2231/62* (2013.01); *B01J 2531/0236* (2013.01); *B01J 2531/0247* (2013.01); *B01J 2531/842* (2013.01); *B01J 2531/845* (2013.01); *B01J 2540/50* (2013.01); *Y02P 20/52* (2015.11)

(58) Field of Classification Search
None
See application file for complete search history.

(56) References Cited

PUBLICATIONS

Leslie D. Field, "An iron step towards N2 fixation", Nature Chemistry, vol. 2 (Jul. 2010), 520-521.*
Richardson A. Henderson, "Mechanistic Studies on Iron Phosphine Complexes, Part 2. Protonation and Sustitution Reactions of Dinitrogen Complexes", J. Chem. Soc. Dalton Trans. (1988), 515-520.*
Justin L. Crossland et al, "Coordination of a Complete Series of N2 Reduction Intermediates (N2H2, N2H4, and NH3) to an Iron Phosphine Scaffold" Inorg. Chem. (2012), 51, 439-445.*
Justin L. Crossland et al, "Intermediates in the reduction of N2 to NH3: synthesis of iron n2 hydrazido(1-) and diazene complexes", Dalton Trans. (2009), 4420-4422.*

(Continued)

*Primary Examiner* — Wayne Langel
(74) *Attorney, Agent, or Firm* — Lathrop Gage LLP

(57) ABSTRACT

This invention relates to molecular catalysts and chemical reactions utilizing the same, and particularly to catalysts and catalytic methods for reduction of molecular nitrogen. The molecular catalytic platform provided herein is capable of the facile reduction of molecular nitrogen under useful conditions such as room temperature or less and atmospheric pressure or less.

27 Claims, 55 Drawing Sheets

(56) References Cited

PUBLICATIONS

John D. Gilbertson et al, "Reduction of N2 to Ammonia and Hydrazine Utilizing H2 as the Reductant", J. Am. mChem. Soc. (2005), 127, 10184-10185.*

Chantal G. Balesdent et al, "Characterization of an Intermediate in the Ammonia-Forming Reaction of Fe(DMeOPrPE)2N2 with Acid (DMeOPrPE = 1,2-[bis(dimethoxypropyl)phosphino]ethane)" Inorg. Cem. (2013), 52,14178-14187.*

Adhikari et al. (2008) "A Dinuclear Ni(I) System Having a Diradical $Ni_2N_2$ Diamond Core Resting State: Synthetic, Structural, Spectroscopic Elucidation, and Reductive Bond Splitting Reactions," J. Inorg. Chem. 47:10479-10490.

Ahmed et al. (Apr. 2011) "Frontiers in catalytic nitrile hydration: Nitrile and cyanohydrin hydration catalyzed by homogeneous organometallic complexes," Coord. Chem. Rev. 255:949-974.

Amgoune et al. (Nov. 19, 2010) "σ-Acceptor, Z-type ligands for transition metals," Chem. Comm. 47:859-871.

Anderson et al. (Dec. 21, 2012) "Conversion of $Fe-NH_2$ to $Fe-N_2$ with release of $NH_3$," J. Am. Chem. Soc. 135:534-537.

Anderson et al. "Catalytic conversion of nitrogen to ammonia by an iron model complex," (Sep. 5, 2013) Nature. 501:84-87.

Andres et al. (2002) "Planar Three-Coordinate High-Spin FeII Complexes with Large Orbital Angular Momentum: Mössbauer, Electron Paramagnetic Resonance, and Electronic Structure Studies," J. Am. Chem. Soc. 124:3012-3025.

Ankudinov et al. (1998) "Real-space multiple-scattering calculation and interpretation of x-ray-absorption near-edge structure," Physical Review B. 58:7565-7576.

Arashiba et al. (Dec. 5, 2010) "A molybdenum complex bearing PNP-type pincer ligands leads to the catalytic reduction of dinitrogen into ammonia," Nature. Chem. 3:120-125.

Back et al. (Jan. 31, 2013) "$^{31}P$ NMR Chemical Shifts of Carbene—Phosphinidene Adducts as an Indicator of the π-Accepting Properties of Carbenes," Angew. Chem. Int. Ed. 52:2939-2943.

Bart et al. (2004) "Preparation and Molecular and Electronic Structures of Iron(0) Dinitrogen and Silane Complexes and Their Application to Catalytic Hydrogenation and Hydrosilation," J. Am. Chem. Soc. 126:13794-13807.

Bazhenova et al. (1995) "Nitrogen fixation in solution," Coord. Chem. Rev. 144:69-145.

Beale (1954) "Proximity effects in the interpretation of the basic strengths of primary aromatic amines," J. Chem. Soc. pp. 4494-4499.

Bebbington et al. (2007) "Photoisomerizable Heterodienes Derived from a Phosphine Borane," Angew. Chem. Int. Ed. 46:3333-3336.

Bell et al. (1970) "Stoichiometric reduction of molecular nitrogen by iron complexes," J. Am. Chem. Soc. 92:4464-4465.

Betley et al. (2003) "Dinitrogen Chemistry from Trigonally Coordinated Iron and Cobalt Platforms," J. Am. Chem. Soc. 125:10782-10783.

Betley et al. (2004) "A Tetrahedrally Coordinated $L_3Fe—N_x$ Platform that Accommodates Terminal Nitride ($Fe^{IV}$: N) and Dinitrogen ($Fe^I—N_2—Fe^I$) Ligands," J. Am. Chem. Soc. 2004, 126, 6252-6254.

Bézier et al. (Jan. 4, 2013) "N-Heterocyclic Carbene Ligands and Iron: An Effective Association for Catalysis," Adv. Synth. Catal. 355:19-33.

Bickelhaupt et al. (1976) "Synthesis and application of precursors of hetero-anthracenes : 2-halo- and 2,2'-dihalodiphenylmethanes and methine substituted derivatives," Tetrahedron. 32:1921-1930.

Bielawski et al. (2007) "High-yielding one-pot synthesis of diaryliodonium triflates from arenes and iodine or aryl iodides," Chem. Commun. pp. 2521-2523.

Bill (Apr. 2011) "Manual 1.4.1.: julX Simulation of Magnetic Susceptibility Data," Max-Planck Institut for Bioinorganic Chemistry. https://web.archive.org/web/20110106122504/http://ewww.mpi-muelheim.mpg.de/bac/logins/bill/julX_en.php. [Last Accessed Dec. 17, 2014].

Bontemps et al. (2006) "Rhodium(I) Complexes of a PBP Ambiphilic Ligand: Evidence for a Metal→Borane Interaction," Angew. Chem. Int. Ed. 45:1611-1614.

Bontemps et al. (2007) "Quasi-Thermoneutral P → B Interactions within Di- and Tri-Phosphine Boranes," Inorg. Chem. 46:5149-5151.

Bontemps et al. (2008) "Metallaboratranes Derived from a Triphosphanyl- Borane: Intrinsic $C_3$ Symmetry Supported by a Z-Type Ligand," Angew. Chem. Int. Ed. 47:1481-1484.

Borodko et al. (1971) "Reduction of Nitrogen to Hydrazine in a Bunuclear Complex of Iron," J. Chem. Soc. D. pp. 1185-1186.

Bowman et al. (2010) "Synthesis and Molecular and Electronic Structures of Reduced Bis(imino)pyridine Cobalt Dinitrogen Complexes: Ligand versus Metal Reduction," J. Am. Chem. Soc. 132:1676-1684.

Brady et al. (1995) "Amidobis(pentamethylcyclopentadienyl)titanium(III)," Acta Cryst. C51:558-560.

Braunschweig et al. (2010) "Electron-Precise Coordination Modes of Boron-Centered Ligands," Chem. Rev. 110:3924-3957.

Brookhart et al. (1992) "$[(3,5-(CF_3)_2C_6H_3)_4B]^-[H(OEt_2)_2]^+$: A convenient reagent for generation and stabilization of cationic, highly electrophilic organometallic complexes," Organometallics. 11:3920-3922.

Brown et al. (2003) "A Low-Spin $d^5$ Iron Imide: Nitrene Capture by Low-Coordinate Iron(I) Provides the 4-Coordinate Fe(III) Complex $[PhB(CH_2PPh_2)_3]Fe$: N-p-tolyl," J. Am. Chem. Soc. 125:322-323.

Brown et al. (2004) "Hydrogenolysis of $[PhBP_3]Fe$: N-p-tolyl: Probing the Reactivity of an Iron Imide with $H_2$," J. Am. Chem. Soc. 126:4538-4539.

Brown et al. (2005) "Ground-State Singlet $L_3Fe-(\mu-N)-FeL_3$ and $L_3Fe(NR)$ Complexes Featuring Pseudotetrahedral Fe(II) Centers," J. Am. Chem. Soc. 127:1913-1923.

Burgess (1990) "The iron-molybdenum cofactor of nitrogenase," Chem. Rev. 90:1377-1406.

Burgess et al. (1996) "Mechanism of molybdenum nitrogenase," Chem. Rev. 96:2983-3011.

Cámpora et al. (2004) "Synthesis and Reactivity of a Mononuclear Parent Amido Nickel Complex. Structures of $Ni[C_6H_3-2,6-(CH_2PiPr_2)_2](NH_2)$ and $Ni[C_6H_3-2,6-(CH_2PiPr_2)_2](OMe)$," Organometallics. 23:5653-5655.

Chatt et al. (1974) "Diazene-N-(di-imide) and hydrazido-(2-)N-(aminoimido) complexes: the addition of acids to dinitrogen complexes," J. Chem. Soc. Dalton Trans. pp. 2074-2082.

Chatt et al. (1975) "The reduction of mono-coordinated molecular nitrogen to ammonia in a protic environment," Nature. 253:39-40.

Chatt et al. (1977) "Conversion of dinitrogen in its molybdenum and tungsten complexes into ammonia and possible relevance to the nitrogenase reaction," J. Chem. Soc. Dalton Trans. pp. 1852-1860.

Chatt et al. (1978) "Recent advances in chemistry of nitrogen-fixation," Chem. Rev. 78:589-625.

Chavez et al. (2000) "Selective oxidants for organometallic compounds containing a stabilising anion of highly reactive cations: $(3,5(CF_3)_2C_6H_3)_4B^-)Cp_2Fe^+$ and $(3,5(CF_3)_2C_6H_3)_4B^-)Cp^*_2Fe^+$," J. Organomet. Chem. 601:126-132.

Chen et al. (2008) "Nitrogenase Model Complexes $[Cp*Fe(\mu-SR^1)_2(\mu-\eta^2-R^2N=NH)FeCp^*]$ ($R^1$ = Me, Et; $R^2$ = Me, Ph; Cp* = $\eta^5$-$C_5Me_5$): Synthesis, Structure, and Catalytic N—N Bond Cleavage of Hydrazines on Diiron Centers," J. Am. Chem. Soc. 130:15250-15251.

Cherry et al. (2005) "Portability of the RNNMo(3+) core: Application to the synthesis of dinitrogen-derived trialkoxymolybdenum organodiazenido complexes," Can. J. Chem. 83:302-307.

Chirik (2007) "Dinitrogen functionalization with bis(cyclopentadienyl) complexes of zirconium and hafnium," Dalton Trans. pp. 16-25.

Chomitz (2007) "Transition metal dinitrogen complexes supported by a versatile monoanionic $[N_2P_2]$ ligand," Chem Commun. pp. 4797-4799.

Chomitz et al. (2009) "Synthesis and characterization of manganese and iron complexes supported by multidentate $[N_2P_2]$ ligands," J. Chem. Soc. Dalton Trans. pp. 1714-1720.

(56) References Cited

OTHER PUBLICATIONS

Chrystiuk et al. (1987) "A single transition-state in the transfer of the methoxycarbonyl group between isoquinoline and substituted pyridines in aqueous solution," *J. Am. Chem. Soc.* 109:3040-3046.

Ciclosi et al. (2006) "A $C_3$-Symmetric Palladium Catalyst with a Phosphorus-Based Tripodal Ligand," *Angew. Chem. Int. Ed.* 45:6741-6744.

Clentsmith et al. (1999) "Reductive Cleavage of Dinitrogen by a Vanadium Diamidoamine Complex: the Molecular Structures of $[V(Me_3SiN\{CH_2CH_2NSiMe_3\}_2)(\mu\text{-}N)]_2$ and $K[V(Me_3SiN\{CH_2CH_2NSiMe_3\}_2)(\mu\text{-}N)]_2$," *J. Am. Chem. Soc.* 121:10444-10445.

Cotton et al. (1961) "Magnetic Investigations of Spin-free Cobaltous Complexes. $VI._1$ Complexes Containing Phosphines and the Position of Phosphines in the Spectrochemical Series," *J. Am. Chem. Soc.* 83:1780-1785.

Cowley et al. (2009) "Catalytic nitrene transfer from an imidoiron(III) complex to form carbodiimides and isocyanates," *Chem. Commun.* pp. 1760-1762.

Creutz et al. (Dec. 18, 2013) "Catalytic Reduction of $N_2$ to $NH_3$ by an $Fe-N_2$ Complex Featuring a C-Atom Anchor," *J. Am. Chem. Soc.* 136:1105-1115.

Crossland et al. (2010) "Iron-dinitrogen coordination chemistry: Dinitrogen activation and reactivity," *Coord. Chem. Rev.* 254:1883-1894.

Crossley et al. (2004) "Di- and Zerovalent Platinaboratranes: The First Pentacoordinate $d^{10}$ Platinum(0) Complex," *Organometallics.* 23:5656-5658.

Crossley et al. (2008) "Retention of Pt $\to$B Bonding in Oxidative Addition Reactions of the Platinaboratrane $[Pt(PPh_3)\{B(mt)_3\}](Pt\to B)^{10}$ (mt = Methimazolyl)," *Organometallics.* 27:312-315.

Crossley et al. (2008) "Unlocking the metallaboratrane cage: reversible B—H activation in platinaboratranes," *J. Chem. Soc. Dalton Trans.* pp. 201-203.

Crossley et al. (2010) "Metallaboratranes: Bis- and Tris(methimazolyl)borane Complexes of Group 9 Metal Carbonyls and Thiocarbonyls," *Organometallics.* 29:326-336.

Danopoulos et al. (2005) "Molecular $N_2$ complexes of iron stabilised by N-heterocyclic 'pincer' dicarbene ligands," *Chem. Commun.* pp. 784-786.

Darensbourg et al. (2000) "The bio-organometallic chemistry of active site iron in hydrogenases," *Coord. Chem. Rev.* 206-207:533-561.

Di Vaira et al. (1976) "Synthesis and structural characterization of some nitrosyl complexes of iron, cobalt, and nickel with poly(tertiary phosphines and arsines)," *Inorg. Chem.* 15:1555-1561.

Ding et al. (2009) "Three-Coordinate and Four-Coordinate Cobalt Hydride Complexes That React with Dinitrogen," *J. Am. Chem. Soc.* 131:10804-10805.

Dos Santos et al. (2005) "Substrate Interactions with the Nitrogenase Active Site," *Acc. Chem. Res.* 38:208-214.

Duchateau et al. (1991) "Side-on versus end-on coordination of dinitrogen to titanium(II) and mixed-valence titanium(I)/titanium(II) amido complexes," *J. Am. Chem. Soc.* 113:8986-8988.

Dugan et al. (Aug. 1, 2013) "Cobalt-Magnesium and Iron-Magnesium Complexes with Weakened Dinitrogen Bridges," *Eur. J. Inorg. Chem.* 3891-3897.

Eady (1996) "Structure-function relationships of alternative nitrogenases," *Chem. Rev.* 96:3013-3030.

Einsle et al. (2002) "Nitrogenase MoFe-Protein at 1.16 Å Resolution: A Central Ligand in the FeMo-Cofactor," *Science.* 297:1696-1700.

Evans (1959) "400. The determination of the paramagnetic susceptibility of substances in solution by nuclear magnetic resonance," *J. Chem. Soc.* pp. 2003-2005.

Field et al. (2008) "Base-Mediated Conversion of Hydrazine to Diazene and Dinitrogen at an Iron Center," *Inorg. Chem.* 48:5-7.

Field et al. (2008) "The first side-on bound metal complex of diazene, HN=NH," *Chem. Commun.* pp. 1680-1682.

Field et al. (2009) "Iron(0) and Ruthenium(0) Complexes of Dinitrogen," *Inorg. Chem.* 48:2246-2253.

Figueroa et al. (2006) "Reactivity of the Metal$\to$$BX_3$ Dative σ-Bond: 1,2-Addition Reactions of the Fe$\to$$BX_3$ Moiety of the Ferraboratrane Complex $[\kappa^4\text{-}B(mim^{But})_3]Fe(CO)_2$," *Inorg. Chem.* 45:7056-7058.

Fong et al. (May 6, 2013) "Heterolytic $H_2$ cleavage and catalytic hydrogenation by an iron metallaboratrane," *Organometallics.* 32:3053-3062.

Fontaine et al. (2008) "Coordination Chemistry of Neutral $(L_n)$-Z Amphoteric and Ambiphilic Ligands," *Eur. J. Inorg. Chem.* pp. 5439-5454.

Fox et al. (2003) "Synthesis of a First-Row Transition Metal Parent Amido Complex and Carbon Monoxide Insertion into the Amide N—H Bond," *J. Am. Chem. Soc.* 125:8984-8985.

Fryzuk et al. (1990) "Reduction of dinitrogen by a zirconium phosphine complex to form a side-on-bridging N2 ligand. Crystal structure of $\{[Pri2PCH2SiMe2)2N]ZrCl\}2(\mu\text{-}\eta2\text{:}\eta2\text{-}N2)$," *J. Am. Chem. Soc.* 112:8185-8186.

Fryzuk et al. (1997) "Transformation of coordinated dinitrogen by reaction with dihydrogen and primary silanes," *Science.* 275:1445-1447.

Fryzuk et al. (2000) "The Continuing Story of Dinitrogen Activation," *Coord. Chem. Rev.* 200:379-409.

Gambarotta et al. (2004) "Multimetallic cooperative activation of $N_2$," *Angew. Chem. Int. Ed.* 43:5298-5308.

George et al. (2001) "EXAFSPAK," http://ssrl.slac.stanford.edu/exafspak.html. [Last Accessed Dec. 18, 2014].

George et al. (1995) "Reduction of Dinitrogen to Ammonia and Hydrazine in Iron(0) and Molybdenum(0) Complexes Containing the $N(CH_2CH_2PPh_2)_3$ Ligand. Crystal Structures of $[FeH(L)(N(CH_2CH_2PPh_2)_3)][BPh_4]$ (L = $N_{2, Co}$)," *J. Inorg. Chem.* 34:1295-1298.

Gilbertson et al. (2005) "Reduction of $N_2$ to Ammonia and Hydrazine Utilizing $H_2$ as the Reductant," *J. Am. Chem. Soc.* 127:10184-10185.

Gilbert-Wilson et al. (Feb. 26, 2013) "Low Oxidation State Iron(0), Iron(I), and Ruthenium(0) Dinitrogen Complexes with a Very Bulky Neutral Phosphine Ligand," *Inorg. Chem.* 52:3043-3053.

Gloaguen et al. (2009) "Small molecule mimics of hydrogenases: Hydrides and redox," *Chem. Soc. Rev.* 38:100-108.

Green (1995) "A new approach to the formal classification of covalent compounds of the elements," *J. Organomet. Chem.* 500:127-148.

Hall et al. (1996) "Reduction of dinitrogen bound at an iron(0) centre," *J. Chem. Soc. Dalton. Trans.* pp. 3539-3541.

Hanna et al. (2009) "Dinitrogen Complexes of Bis(cyclopentadienyl) Titanium Derivatives: Structural Diversity Arising from Substituent Manipulation," *Organometallics.* 28:4079-4088.

Harman et al. (2007) "$N_2O$ Activation and Oxidation Reactivity from a Non-Heme Iron Pyrrole Platform," *J. Am. Chem. Soc.* 129:15128-15129.

Harman et al. (2010) "Slow Magnetic Relaxation in a Family of Trigonal Pyramidal Iron(II) Pyrrolide Complexes," *J. Am. Chem. Soc.* 132:18115-18126.

Harman et al. (Dec. 9, 2013) "A $d^{10}$ Ni—($H_2$) Adduct as an Intermediate in H—H Oxidative Addition across a Ni—B Bond," *Angew. Chem. Int. Ed.* 53:1081-1086.

Hazari (2010) "Homogeneous iron complexes for the conversion of dinitrogen into ammonia and hydrazine," *Chem. Soc. Rev.* 39:4044-4056.

Hebden et al. (Dec. 12, 2011) "Cleavage of dinitrogen to yield a (t-BuPOCOP)molybdenum(IV) nitride," *Chem. Commun.* 48:1851-1853.

Hendrich et al. (2006) "On the feasibility of N2 fixation via a single-site $Fe^I/Fe^{IV}$ cycle: Spectroscopic studies of $Fe^I(N_2)Fe^I$, $Fe^{IV}\equiv N$, and related species," *Proc. Natl. Acad. Sci. U.S.A.* 103:17107-17112.

Hidai et al. (1980) "Reactions of Ligating Dinitrogen with Alcohols or Metal Hydrides," *Chem. Lett.* pp. 645-646.

Hidai et al. (1995) "Recent Advances in the Chemistry of Dinitrogen Complexes," *Chem. Rev.* 95:1115-1133.

(56) References Cited

OTHER PUBLICATIONS

Hidai et al. (2005) "Research inspired by the chemistry of nitrogenase: Novel metal complexes and their reactivity toward dinitrogen, nitriles, and alkynes," *Can. J. Chem.* 83:358-374.

Hill (2006) "An Unambiguous Electron-Counting Notation for Metallaboratranes," *Organometallics.* 25:4741-4743.

Hill et al. (1999) "The Sting of the Scorpion: A Metallaboratrane," *Angew. Chem. Int. Ed.* 38:2759-2761.

Hills et al. (1993) "Bis[1,2-bis(dimethylphosphino)ethane]dihydrogenhydridoiron(II) tetraphenylborate as a model for the function of nitrogenases," *J. Chem. Soc. Dalton Trans.* 25:3041-3049.

Hoffman et al. (2009) "Climbing nitrogenase: toward a mechanism of enzymatic nitrogen fixation," *Acc. Chem. Res.* 42:609-619.

Hoffmann et al. (1969) "Balance of steric and conjugative effects in phenyl-substituted cations, radicals, and anions," *J. Phys. Chem.* 73:1789-1800.

Holland (2010) "Metal-dioxygen and metal-dinitrogen complexes: where are the electrons?" *J. Chem. Soc. Dalton Trans.* 39:5415-5425.

Howard et al. (2006) "How many metals does it take to fix N2? A mechanistic overview of biological nitrogen fixation," *Proc. Natl. Acad. Sci. U.S.A.* 103:17088-17093.

Hu et al. (2008) "In Situ "Click" Assembly of Small Molecule Matrix Metalloprotease Inhibitors Containing Zinc-Chelating Groups," *Org. Lett.* 10:5529-5531.

Ingleson et al. (2008) "Influence of the d-Electron Count on CO Binding by Three-Coordinate [(tBu$_2$PCH$_2$SiMe$_2$)$_2$N]Fe,—Co, and -Ni," *Inorg. Chem.* 47:407-409.

Ingleson et al. (Feb. 2, 2012) "N-Heterocyclic carbene chemistry of iron: Fundamentals and applications," *Chem. Commun.* 48:3579-3589.

Jia et al. (Oct. 9, 2013) "Mechanistic aspects of dinitrogen cleavage and hydrogenation to produce ammonia in catalysis and organometallic chemistry: relevance of metal hydride bonds and dihydrogen," *Chem. Soc. Rev.* 43:547-564.

Job et al. (1979) "Iron(0) oxidation by iodine in tetrahydrofuran: A facile synthesis of anhydrous iron(II) iodide," *Inorg. Nucl. Chem. Lett.* 15:81-83.

Kabsch (1993) "Automatic processing of rotation diffraction data from crystals of initially unknown symmetry and cell constants," *J. Appl. Cryst.* 26:795-800.

Kameo et al. (Mar. 22, 2012) "Synthesis of Rhodaboratranes Bearing Phosphine-Tethered Boranes: Evaluation of the Metal-Boron Interaction," *Organometallics.* 31:3155-3162.

Katayama et al. (1976) "Solubilities of hydrogen and nitrogen in alcohols and n-hexane," *J. Chem. Eng. Data.* 21:194-196.

Keane et al. (Jun. 14, 2014) "Fine-Tuning the Energy Barrier for Metal-Mediated Dinitrogen N≡N Bond Cleavage," *J. Am. Chem. Soc.* 136:9906-9909.

Kern (1962) "Tetrahydrofuran complexes of transition metal chlorides," *J. Inorg. Nucl. Chem.* 24:1105-1109.

Kim et al. (1992) "Structural models for the metal centers in the nitrogenase molybdenum-iron protein," *Science.* 257:1677-1682.

King et al. (Mar. 15, 2011) "Catalytic C—H Bond Amination from High-Spin Iron Imido Complexes," *J. Am. Chem. Soc.* 133:4917-4923.

Kliegl (1908) "Synthese des o-Nitro-triphenylmethans," Berichte der deutschen chemischen Gesellschaft Ber. Deutch. Chem. Ges. 40:4937-4942.

Klotz et al. (2009) "Mechanism of the Iron-Mediated Alkene Aziridination Reaction: Experimental and Computational Investigations," *Inorg. Chem.* 48:801-803.

Komiya et al. (1993) "Isolation of a zerovalent iron dinitrogen complex with 1,2-bis(diethylphosphino)ethane ligands," *Chem. Commun.* pp 787-788.

Komori et al. (1989) "Preparation and properties of molybdenum and tungsten dinitrogen complexes. 25. Catalytic conversion of molecular nitrogen into silylamines using molybdenum and tungsten dinitrogen complexes," *J. Am. Chem. Soc* 111:1939-1940.

Kuriyama et al. (Jun. 4, 2014) "Catalytic Formation of Ammonia from Molecular Dinitrogen by Use of Dinitrogen-Bridged Dimolybdenum-Dinitrogen Complexes Bearing PNP-Pincer Ligands: Remarkable Effect of Substituent at PNP-Pincer Ligand," *J. Am. Chem. Soc.* 136:9719-9731.

Lancaster et al. (Jan. 8, 2013) "X-ray spectroscopic observation of an interstitial carbide in NifEN-bound FeMoco precursor," *J. Am. Chem. Soc.* 135:610-612.

Lancaster et al. (Nov. 16, 2011) "X-ray emission spectroscopy evidences a central carbon in the nitrogenase iron-molybdenum cofactor," *Science.* 334:974-977.

Landry et al. (2006) "Sythesis and Structural Characterization of [$\kappa^3$-B,S,S—B(mim$^R$)$_3$]Ir(Co)(PPh$_3$)H(R = Bu$^t$, Ph) and [$\kappa^4$-B(mim$^{But}$)$_3$]M(PPh$_3$)CI (M = Rh, Ir): Analysis of the Bonding in Metal Borane Compounds," *Inorg. Chem.* 45:2588-2597.

Lavallo et al. (2005) "Stable Cyclic (Alkyl) Amino) Carbenes as Rigid or Flexible, Bulky, Electron-Rich Ligands for Transition-Metal Catalysts: A Quaternary Carbon Atom Makes the Difference," *Angew. Chem. Int. Ed.* 44:5705-5709.

Layfield et al. (Sep. 1, 2011) "Structure and bonding in three-coordinate N-heterocyclic carbene adducts of iron(II) bis(trimethylsilyl)amide," *Chem. Commun.* 47:10623-10625.

Lee et al. (2010) "Triggering N$_2$ uptake via redox-induced expulsion of coordinated NH$_3$ and N$_2$ silylation at trigonal bipyramidal iron," *Nature Chem.* 2:558-565.

Lee et al. (Sep. 28, 2011) "A Nonclassical Dihydrogen Adduct of S = 1/2 Fe(I)," *J. Am. Chem. Soc.* 133:16366-16369.

Leigh et al. (1991) "Exchange of dinitrogen between iron and molybdenum centers and the reduction of dinitrogen bound to iron: implications for the chemistry of nitrogenases," *J. Am. Chem. Soc.* 113:5862-5863.

Lesueur et al. (1997) "A Bidentate Bisphosphine Functioning in Intramolecular Aliphatic Metalation and as an NMR Spectroscopic Probe for the Metal Coordination Environment," *Inorg. Chem.* 36:3354-3362.

Li et al. (Mar. 17, 2013) "Ammonia formation by a thiolate-bridged diiron amide complex as a nitrogenase mimic," *Nature Chem.* 5:320-326.

Lin et al. (Oct. 7, 2013) "Boryl-mediated reversible H$_2$ activation at cobalt: catalytic hydrogenation, dehydrogenation, and transfer hydrogenation," *J. Am. Chem. Soc.* 135:15310-15313.

Lu et al. (2007) "Fe(I)—Mediated Reductive Cleavage and Coupling of Co$_2$: An Fe$^{II}$($\mu$-O,$\mu$-Co)Fe$^{II}$ Core," *J. Am. Chem. Soc.* 129:4-5.

Lukoyanov et al. (Jul. 11, 2011) "ENDOR/HYSCORE Studies of the Common Intermediate Trapped During Nitrogenase Reduction of N$_2$H$_2$, CH$_3$N$_2$H, and N$_2$H$_4$ Support an Alternating Reaction Pathway for N$_2$ Reduction," *J. Am. Chem. Soc.* 133:11655-11664.

MacBeth et al. (2005) Synthesis and characterization of cationic iron complexes supported by the neutral ligands Np$^{i\text{-}Pr}_3$, NArP$^{i\text{-}Pr}_3$, and NS$^{t\text{-}Bu}_3$, *Can. J. Chem.* 83:332-340.

MacKay et al. (2004) "Dinitrogen Coordination Chemistry: On the Biomimetic Borderlands," *Chem Rev.* 104:385-402.

MacLeod et al. (May 26, 2013) "Recent developments in the homogeneous reduction of dinitrogen by molybdenum and iron," *Nature Chem.* 5:559-565.

Mahy et al. (1984) "Iron porphyrin-nitrene complexes: preparation from 1,1- dialkylhydrazines. Electronic structure from NMR, Moessbauer, and magnetic susceptibility studies and crystal structure of the [tetrakis(p- chlorophenyl)porphyrinato][(2,2,6,6-tetramethyl-1-piperidyl)nitrene]iron complex," *J. Am. Chem. Soc.* 106:1699-1706.

Mankad et al. (2007) "Terminal Fe$^I$-N$_2$ and Fe$^{II}$. . . H—C interactions supported by tris(phosphino)silyl ligands," *Angew. Chem. Int. Ed.* 46:5768-5771.

Mankad et al. (2010) "Catalytic N—N Coupling of Aryl Azides to Yield Azoarenes via Trigonal Bipyramid Iron-Nitrene Intermediates," *J. Am. Chem. Soc.* 132:4083-4085.

Manriquez et al. (1974) "Preparation of a dinitrogen complex of bis(pentamethylcyclopentadienyl)zirconium(II). Isolation and protonation leading to stoichiometric reduction of dinitrogen to hydrazine," *J. Am. Chem. Soc.* 96:6229-6230.

(56) References Cited

OTHER PUBLICATIONS

Matsunga et al. (2005) "Structural and Spectroscopic Characterization of First-Row Transition Metal(II) Substituted Blue Copper Model Complexes with Hydrotris(pyrazolyl)borate," *Inorg. Chem.* 44:325-335.

Mehn et al. (2006) "Mid- to high-valent imido and nitrido complexes of iron," *J. Inorg. Biochem.* 100:634-643.

Mehn et al. (2006) "Vibrational Spectroscopy and Analysis of Pseudo-tetrahedral Complexes with Metal Imido Bonds," *Inorg. Chem.* 45:7417-7427.

Misono et al. (1968) "Nuclear magnetic resonance evidence for the presence of a hydridic hydrogen in the nitrogen complex of cobalt," *Chem. Commun. (London).* 1044a.

Mo et al. (Jul. 15, 2014) "Two- and three-coordinate formal iron(I) compounds featuring monodentate aminocarbene ligands," *Org. Chem. Front.* 1:1040-1044.

Moret et al. (Jan. 26, 2011) "Terminal iron dinitrogen and iron imide complexes supported by a tris(phosphino)borane ligand," *Angew. Chem. Int. Ed.* 50:2063-2067.

Moret et al. (Nov. 16, 2011) "$N_2$ functionalization at iron metallaboratranes," *J. Am. Chem. Soc.* 133:18118-18121.

Mori (2004) "Activation of nitrogen for organic synthesis," *J. Organomet. Chem.* 689:4210-4227.

Müller (2009) "Practical Suggestions for Better Crystal Structures," *Crystallography Reviews.* 15:57-83.

Murata et al. (2004) "A general and efficient method for the palladium-catalyzed cross-coupling of thiols and secondary phosphines," *Tetrahedron.* 60:7397-7403.

Nieto et al. (2005) "A new synthetic route to bulky "second generation" tris(imidazol-2-ylidene)borate ligands: synthesis of a four coordinate iron(II) complex," *Chem. Commun.* pp. 3811-3813.

Nieto et al. (2008) "Thermodynamics of Hydrogen Atom Transfer to a High-Valent Iron Imido Complex," *J. Am. Chem. Soc.* 130, 2716-2717.

Nikiforov et al. (2009) "Titanium-promoted dinitrogen cleavage, partial hydrogenation, and silylation," *Angew. Chem. Int. Ed.* 48:7415-7419.

Nishibayashi (Mar. 1, 2012) "Molybdenum-catalyzed reduction of molecular dinitrogen under mild reaction conditions," *J. Chem. Soc. Dalton Trans.* 41:7447-7453.

Nishihara et al. (1980) "Reduction of Coordinated Dinitrogen in cis-$W(N_2)_2(PMe_2Ph)_4$ by means of Acidic Hydridometal Carbonyls," *Chem. Lett.* pp. 667-668.

O'Donoghue et al. (1998) "Derivatization of Dinitrogen by Molybdenum in Triamidoamine Complexes," *Inorg. Chem.* 37:5149-5158.

Oakley et al. (2006) "Synthesis of a Heterobimetallic Rhodium-Iron Complex Containing an $\Theta^3$-Interaction between Rhodium and the B—$C_{ipso}$—$C_{ortho}$ Unit of a Triarylborane," *Organometallics.* 25:5835-5838.

Oshita et al. (1992) "Preparation and properties of molybdenum and tungsten dinitrogen complexes. 40. Novel disilylation of a dinitrogen ligand in cis-[$W(N_2)_2(PMe_2Ph)_4$]. Synthesis and reactivity of [cyclic] mer-[$WI_2(NNSiMe_2CH_2CH_2SiMe_2)(PMe_2Ph)_3$]," *Organometallics.* 11:4116-4123.

Pang et al. (2006) "Palladium Complexes with PdB Dative Bonds: Analysis of the Bonding in the PalladaBoratrane Compound [$\kappa^4$-$B(mim^{But})_3$]$Pd(PMe_3)$," *Chem. Comm.* pp. 5015-5017.

Pang et al. (2008) "Reactivity of the Ni→B dative σ-bond in the nickel boratrane compounds [$\kappa^4$-$B(mim^{But})_3$]NiX (X = Cl, OAc, NCs, $N_3$): synthesis of a series of B-functionalized tris(2-mercapto-1-tert-butylimidazolyl)borato complexes, [$YTm^{But}$]NiZ," *Chem. Commun.* pp. 1008-1010.

Parkin (2006) "A Simple Description of the Bonding in Transition-Metal Borane Complexes," *Organometallics.* 25:4744-4747.

Peters et al. (1998) "X-ray Crystal Structure of the Fe-Only Hydrogenase (CpI) from *Clostridium pasteurianum* to 1.8 Angstrom Resolution," *Science.* 282:1853-1858.

Peters et al. (2006) "Bio-organometallic Approaches to Nitrogen Fixation Chemistry Activation of Small Molecules," In; *Activation of Small Molecules: Organometallic and Bioinorganic Perspectives.* Ed.: Tolman. Wiley-VCH. pp. 81-119.

Pickett et al. (1985) "Electrosynthesis of ammonia," *Nature.* 317:652-653.

Pool et al. (2004) "Hydrogenation and cleavage of dinitrogen to ammonia with a zirconium complex," *Nature.* 427:527-530.

Pun et al. (2008) "Indenyl Zirconium Dinitrogen Chemistry: N2 Coordination to an Isolated Zirconium Sandwich and Synthesis of Side-on, End-on Dinitrogen Compounds," *J. Am. Chem. Soc.* 130:6047-6054.

Ray et al. (1996) "Synthesis and Structure of a Trigonal Monopyramidal Fe(II) Complex and Its Paramagnetic Carbon Monoxide Derivative," *J. Am. Chem. Soc.* 118:6084-6085.

Redshaw et al. (1992) "o-Phenylenediamine and Related Complexes of Chromium, Vanadium and Manganese," *J. Chem. Soc. Dalton Trans.* pp. 1803-1811.

Reed et al. (1988) "Intermolecular interactions from a natural bond orbital, donor-acceptor viewpoint," *Chem. Rev.* pp. 899-926.

Riener et al. (Mar. 21, 2014) "Chemistry of Iron N-Heterocyclic Carbene Complexes: Syntheses, Structures, Reactivities, and Catalytic Applications," *Chem. Rev.* 114:5215-5272.

Rittle et al. (Sep. 16, 2013) "Fe—$N_2$/Co complexes that model a possible role for the interstitial C atom of FeMo-cofactor (FeMoco)," *Proc. Natl. Acad. Sci U.S.A.* 110:15898-15903.

Rodriguez et al. (Nov. 11, 2011) "$N_2$ reduction and hydrogenation to ammonia by a molecular iron-potassium complex," *Science.* 334:780-783.

Sacco et al. (1967) "Hydride and nitrogen complexes of cobalt," *Chem. Commun. (London).* p. 316.

Saouma et al. (2009) "Characterization of Structurally Unusual $N_xH_y$ Complexes," *J. Am. Chem. Soc.* 131:10358-10359.

Saouma et al. (Apr. 2011) "M≡E and M═E Complexes of Iron and Cobalt that Emphasize Three-fold Symmetry (E = O, N, NR)," *Coord. Chem. Rev.* 255:920-937.

Saouma et al. (Mar. 10, 2011) "Transformation of an [Fe($\eta^2$-$N_2H_3$)]$^{1+}$Species to π-Delocalized [$Fe_2(\mu$-$N_2H_2)$]$^{2+/1+}$Complexes," *Angew. Chem. Int. Ed.* 50:3446-3449.

Saouma et al. (Oct. 17, 2011) "A Five-Coordinate Phosphino/Acetate Iron(II) Scaffold That Binds $N_2$, $N_2H_2$, $N_2H_4$, and $NH_3$ in the Sixth Site," *Inorg. Chem.* 50:11285-11287.

Saouma et al. (Sep. 5, 2012) "Mononuclear Five- and Six-Coordinate Iron Hydrazido and Hydrazine Species," *Inorg. Chem.* 51:10043-10054.

Scepaniak et al. (2008) "Structural and Spectroscopic Characterization of an Electrophilic Iron Nitrido Complex," *J. Am. Chem. Soc.* 130:10515-10517.

Scepaniak et al. (2009) "Formation of Ammonia from an Iron Nitrido Complex," *Angew. Chem. Int. Ed.* 48:3158-3160.

Scepaniak et al. (Feb. 25, 2011) "Synthesis, Structure, and Reactivity of an Iron(V) Nitride," *Science.* 331:1049-1052.

Schlosser (1988) "Superbases for organic synthesis," *Pure Appl. Chem.* 60:1627-1634.

Schrock (2005) "Catalytic Reduction of Dinitrogen to Ammonia at a Single Molybdenum Center," *Acc. Chem. Res.* 38:955-962.

Schrock (2008) "Catalytic reduction of dinitrogen to ammonia by molybdenum: theory versus experiment," *Angew. Chem. Int. Ed.* 47:5512-5522.

Schrock (Jan. 24, 2011) "Nitrogen reduction: Molybdenum does it again," *Nature Chem.* 3:95-96.

Schwarz et al. (2009) "Molybdenum cofactors, enzymes and pathways," *Nature.* 460:839-847.

Scott et al. (2008) "Multiple Pathways for Dinitrogen Activation during the Reduction of an Fe Bis(iminepyridine) Complex," *Inorg. Chem.* 47:896-911

Seefeldt et al. (2009) "Mechanism of Mo-dependent nitrogenase," *Annu. Rev. Biochem.* 78:701-722.

Sellmann et al. (1989) "Nitrogenase Model Compounds: [$\mu$-$N_2H_2${Fe("$NHS_4$")}$_2$], the Prototype for the Coordination of Diazene to Iron Sulfur Centers and Its Stabilization through Strong N—H⋯S Hydrogen Bonds," *Angew. Chem. Int. Ed.* 28:1271-1272.

Sellmann et al. (1994) "Transition Metal Complexes with Sulfur Ligands, C*, Unexpectedly Facile Formation of Diazene Complexes and a New Type of Diastereomerism:

(56) References Cited

OTHER PUBLICATIONS

[μ-$N_2H_2${Fe(PPr$_3$)('S$_4$')}$_2$ ]and Analogous Complexes with [FeS]-Centers. ('S$_4$'$^{2-}$ = 1,2-Bis(2-mercaptophenylthio)ethan(2-))," *Z Naturforsch. B*. 49:76-88. —English Abstract Only.

Sellmann et al. (2002) "Transition metal complexes with sulfur ligands. Part CLV. Structural and spectroscopic characterization of hydrogen bridge diastereomers of [μ-$N_2H_2${Fe(PR$_3$)('tpS$_4$')}$_{2]}$ diazene complexes ('tpS4'$^{2-}$=1,2-bis(2-mercaptophenylthio)phenylene(2-))," *Inorg. Chim. Acta*. 337:1-10.

Sheldrick (1990) "Phase annealing in SHELX-90: direct methods for larger structures," *Acta Cryst*. A46:467-473.

Sheldrick (2008) "A short history of SHELX," *Acta Cryst*. A64:112-122.

Shiina (1972) "Reductive silylation of molecular nitrogen via fixation to tris(trialkylsilyl)amine," *J. Am. Chem. Soc*. 94:9266-9267.

Shilov (2003) "Catalytic reduction of molecular nitrogen in solutions," *Russ. Chem. Bull*. 52:2555-2562.

Shilov et al. (1971) "New nitrogenase model for reduction of molecular nitrogen in protonic media," *Nature*. 231:460-461.

Simpson et al. (1985) "A nitrogen pressure of 50 atmospheres does not prevent evolution of hydrogen by nitrogenase," *Science*. 224:1095-1097.

Sircoglou et al. (2008) "Group 10 and 11 Metal Boratranes (Ni, Pd, Pt, CuCI, AgCI, AuCI, and Au+) Derived from a Triphosphine-Borane," *J. Am. Chem. Soc*. 130:16729-16738.

Sircoglou et al. (2010) "Copper(I) Complexes derived from Mono- and Diphosphino-Boranes: Cu→B Interactions Supported by Arene Coordination," *Inorg. Chem*. 49:3983-3990.

Smith et al. (2001) "Stepwise Reduction of N—N Bond Order by a Low-Coordinate Iron Complex," *J. Am. Chem. Soc*. 123:9222-9223.

Smith et al. (2005) "Studies of Low-Coordinate Iron Dinitrogen Complexes," *J. Am. Chem. Soc*. 128:756-769.

Sofield et al. (2004) "Amidobis[eta5-1,3-bis(trimethylsilyl)cyclopentadienyl] titanium(III)," *Acta Cryst. C*. 60:465-466.

Spatzal et al. (Nov. 18, 2011) "Evidence for interstitial carbon in nitrogenase FeMo cofactor," *Science*. 334:940.

Stoian et al. (2005) "Mossbauer, Electron Paramagnetic Resonance, and Crystallographic Characterization of a High-Spin Fe(I) Diketiminate Complex with Orbital Degeneracy," *Inorg. Chem*. 44:4915-4922.

Stoll et al. (2006) "EasySpin, a comprehensive software package for spectral simulation and analysis in EPR," *J. Magn. Reson*. 178:42-55.

Suess et al. (2012) "Dihydrogen Binding to Isostructural S = 1/2 and S = 0 Cobalt Complexes," *J. Am. Chem. Soc*. 134:14158-14164.

Suess et al. (Mar. 11, 2013) "H—H and Si—H Bond Addition to Fe≡NNR2 Intermediates Derived from N2," *J. Am. Chem. Soc*. 135:4938-4941.

Sur (1989) "Measurement of magnetic susceptibility and magnetic moment of paramagnetic molecules in solution by high-field fourier transform NMR spectroscopy," *J. Magn. Reson*. 82:169-173.

Takahashi et al. (1980) "Protonation reactions of molybdenum and tungsten dinitrogen complexes with halogen acids. Hydride hydrazido(2-) and diazenido complexes as intermediate stages of reduction," *J. Am. Chem. Soc*. 102:7461-7467.

Takaoka et al. (2010) "Access to Well-Defined Ruthenium(I) and Osmium(I) Metalloradicals," *Angew. Chem. Int. Ed*. 49:4088-4091.

Tanaka et al. (Feb. 22, 2011) "Molybdenum-Catalyzed Transformation of Molecular Dinitrogen into Silylamine: Experimental and DFT Study on the Remarkable Role of Ferrocenyldiphosphine Ligands," *J. Am. Chem. Soc*. 133:3498-3506.

Tard et al. (2005) "Synthesis of the H-cluster framework of iron-only hydrogenase," *Nature*. 433:610-613.

Thomas et al. (2006) "Characterization of the Terminal Iron(IV) Imides {[PhBP$^{tBu}_2$(pz')]Fe$^{IV}$≡NAd}$^+$," *J. Am. Chem. Soc*. 128:4956-4957.

Tolman (1977) "Steric effects of phosphorus ligands in organometallic chemistry and homogeneous catalysism," *Chem. Rev*. 1977, 77, 313-348.

Tonks et al. (Apr. 16, 2012) "Groups 5 and 6 Terminal Hydrazido(2-) Complexes: NβSubstituent Effects on Ligand-to-Metal Charge-Transfer Energies and Oxidation States," *J. Am. Chem. Soc*. 134:7301-7304.

Ung et al. (Jun. 20, 2014) "Two-coordinate Fe°and Co°complexes supported by cyclic (alkyl)(amino)carbenes," *Angew. Chem. Int. Ed*. 53:8427-8431.

Vela et al. (2004) "A Sulfido-Bridged Diiron(II) Compound and Its Reactions with Nitrogenase-Relevant Substrates," *J. Am. Chem. Soc*. 126:4522-4523.

Verma et al. (2000) "A Stable Terminal Imide on Iron," *J. Am. Chem. Soc*. 122:11013-11014.

Vidyaratne et al. (2007) "Dinitrogen Coordination and Cleavage Promoted by a Vanadium Complex of a σ, 90 ,σ-Donor Ligand," *Inorg. Chem*. 46:8836-8842.

Vincent et al. (2007) "Investigating and Exploiting the Electrocatalytic Properties of Hydrogenases," *Chem. Rev*. 107:4366-4413.

Vogel et al. (2008) "An Iron Nitride Complex," *Angew. Chem. Int. Ed*. 47:2681-2684.

Vogel et al. (2010) "Unexpected reactivity resulting from modifications of the ligand periphery: Synthesis, structure, and spectroscopic properties of iron complexes of new tripodal N-heterocyclic carbene (NHC) ligands," *Inorg. Chim. Acta*. 364:226-237.

Volbeda et al. (1995) "Crystal structure of the nickel-iron hydrogenase from *Desulfovibrio gigas*," *Nature*. 373:580-587.

Watt et al. (1952) "A Spectrophotometric Method for the Determination of Hydrazine," *Anal. Chem*. 24:2006-2008.

Weare et al. (2006) "Catalytic reduction of dinitrogen to ammonia at a single molybdenum center," *Proc. Natl. Acad. Sci. U.S.A*. 103:17099-17106.

Weatherburn (1967) "Phenol-hypochlorite reaction for determination of ammonia," *Anal. Chem*. 39:971-974.

Whited et al. (2009) "Dinitrogen Complexes Supported by Tris(phosphino)silyl Ligands," *Inorg. Chem*. 48:2507-2517.

Wiesler et al. (1998) "Influence of the trans Substituent on $N_2$Bonding in Iron(II)—Phosphane Complexes: Structure, Synthesis, and Properties of the Monomeric Adducts trans-[Fe$_x$N$_2$(depe)$_2$]BPh$_4$, X=CI, Br," *Angew. Chem. Int. Ed*. 37:815-817.

Wietz et al. (1993) "The application of $C_8$K for organic synthesis: reduction of substituted naphthalenes," *J. Chem. Soc. Perkin Trans*. 1:117-120.

Wiig et al. (2012) "Radical SAM—Dependent Carbon Insertion into the Nitrogenase M-Cluster," *Science*. 337:1672-1675.

Yamamoto et al. (1967) "Study of the fixation of nitrogen. Isolation of tris(triphenylphosphine)cobalt complex co-ordinated with molecular nitrogen," *Chem. Commun. (London)*. pp. 79-80.

Yamamoto et al. (1983) "Preparation, x-ray molecular structure determination, and chemical properties of dinitrogen-coordinated cobalt complexes containing triphenylphosphine ligands and alkali metal or magnesium. Protonation of the coordinated dinitrogen to ammonia and hydrazine," *Organometallics*. 2:1429-1436.

Yandulov et al. (2002) "Reduction of dinitrogen to ammonia at a well-protected reaction site in a molybdenum triamidoamine complex," *J. Am. Chem. Soc*. 124:6252-6253.

Yandulov et al. (2003) "Catalytic reduction of dinitrogen to ammonia at a single molybdenum center," *Science*. 301:76-78.

Yandulov et al. (2003) "Synthesis and Reactions of Molybdenum Triamidoamine Complexes Containing Hexaisopropylterphenyl Substituents," *Inorg. Chem*. 42:796-813.

Yandulov et al. (2005) "Studies Relevant to Catalytic Reduction of Dinitrogen to Ammonia by Molybdenum Triamidoamine Complexes," *Inorg. Chem*. 44:1103-1117.

Yang et al. (Aug. 19, 2014) "Reconstruction and minimal gene requirements for the alternative iron-only nitrogenase in *Escherichia coli*," *Proc. Natl. Acad. Sci. U.S.A*. 111:E3718-E3725.

Yang et al. (Aug. 23, 2013) "On reversible $H_2$ loss upon $N_2$ binding to FeMo-cofactor of nitrogenase," *Proc. Natl. Acad. Sci. U.S.A*. 110:16327-16332.

(56) References Cited

OTHER PUBLICATIONS

Yuki et al. (2008) "Synthesis and Reactivity of Tungsten- and Molybdenum-Dinitrogen Complexes Bearing Ferrocenyldiphosphines toward Protonolysis," *Organometallics*. 27:3947-3953.

Yuki et al. (Dec. 2012) "Iron-catalysed transformation of molecular dinitrogen into silylamine under ambient conditions," *Nature Comm*. 3:1254.

Zhang et al. (Jun. 24, 2014) "(Aminocarbene)(Divinyltetramethyldisiloxane)Iron(0) Compounds: A Class of Low-Coordinate Iron(0) Reagents," *Angew. Chem. Int. Ed.* 53:8432-8436.

\* cited by examiner

Top: reaction mixture

Bottom: authentic [(TPB)Fe(NH₃)][BAr^F₄]

Conditions: THF-d₈, 300 MHz

Curves were generated by creating solutions of [NH$_4$][Cl] and [N$_2$H$_5$][HSO$_4$] of known concentrations and then analyzing by the aforementioned literature procedures by UV-Vis spectroscopy.[36]

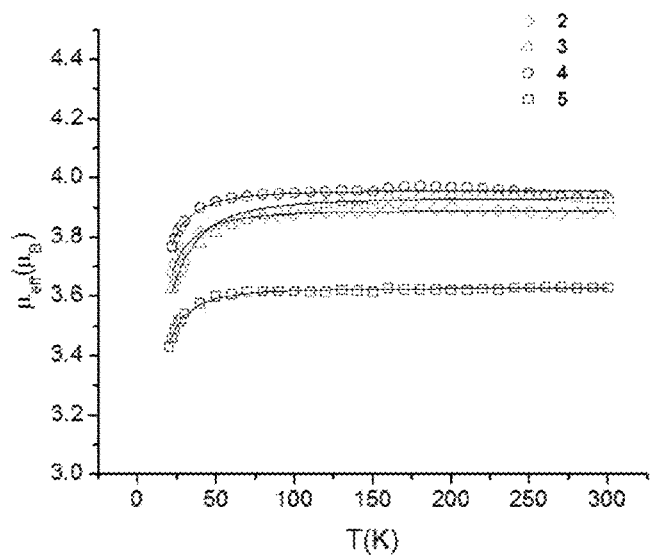
Data corrected for ~15% diamagnetic impurity of 12-crown-4, verified by $^1$H NMR integration, in 5
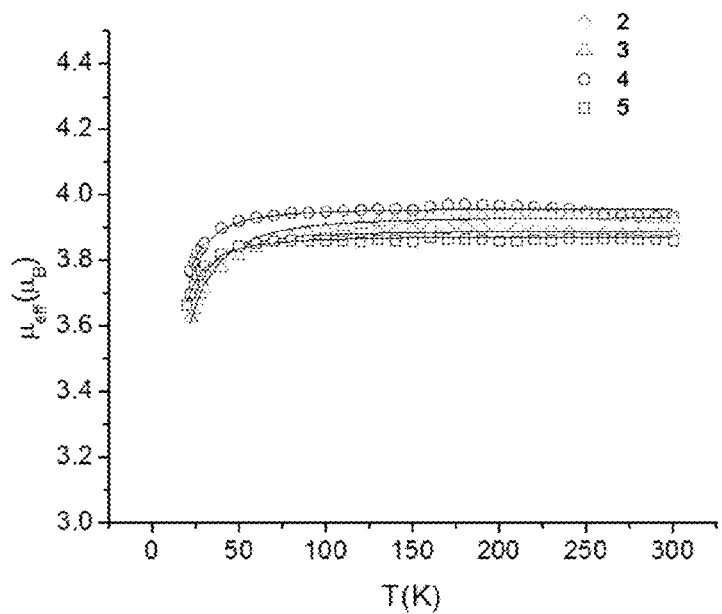
FIG. 79

Note that hydrogens have been omitted for clarity.

CATALYTIC AMMONIA SYNTHESIS BY TRANSITION METAL MOLECULAR COMPLEXES

CROSS-REFERENCE TO RELATED APPLICATIONS

This application claims the benefit of U.S. Provisional Application No. 61/891,550, filed Oct. 16, 2013, which is hereby incorporated by reference in its entirety to the extent not inconsistent herewith.

STATEMENT REGARDING FEDERALLY SPONSORED RESEARCH OR DEVELOPMENT

This invention was made with government support under GM070757 awarded by the National Institutes of Health. The government has certain rights in the invention.

BACKGROUND OF INVENTION

Catalytic conversion of molecular nitrogen to ammonia is a critical component of the global nitrogen cycle. This chemical transformation is carried out via a combination of natural biological processes and anthropogenic activities. Biological generation of ammonia via nitrogen reduction occurs primarily by natural processes mediated by organisms resulting in nitrogen fixation necessary for sustaining life. Industrial processes for nitrogen reduction, on the other hand, are believed to generate ammonia on a roughly equivalent scale to the biological sources. For example, the annual industrial production of $NH_3$ via nitrogen reduction is estimated to be approximately 200 million tonnes per year and supports a range of commercial applications including fertilizers, decontamination and/or sterilization agents, and precursors for the production of other nitrogen containing chemicals.

Industrially, the majority of ammonia is produced in commercial quantities via the Haber-Bosch process. This process involves the reaction of nitrogen gas with hydrogen gas in the presence of a solid-state catalyst to produce ammonia. A range of catalysts have been developed for the Haber-Bosh process including iron-based catalysts and ruthenium-based catalysts. The Haber-Bosch process is resource intensive as it typically involves high pressures (~100 atm), high temperatures (~450° C.), as well as an industrial supply of precursor hydrogen gas. Given these requirements, ammonia production via industrial processes represents a significant amount of total energy consumed throughout the world each year (estimated to be as much as 1%).

In contrast, the transformation of nitrogen gas to ammonia by biological processes occurs efficiently under ambient conditions. This process is mediated by organisms, such as diazotrophs, and involves cofactors of nitrogenase enzymes rich in Fe and S and which may additionally feature Mo and V. Substantial research has been directed toward understand the chemical mechanism of the iron-molybdenum cofactor, for example, that provides for catalytic conversion of nitrogen into ammonia at low temperatures and pressures. Despite extensive research over the last several decades, the exact mechanism for biological reduction of nitrogen to ammonia remains uncertain.

The development and study of functionally biomimetic catalysts provide useful tools for understanding the mechanism involved in nitrogen reduction by nitrogenase enzymes. Such functionally biomimetic catalysts also provide a potential pathway for development of industrially relevant molecular catalysts providing for the reduction of $N_2$ to $NH_3$. An example of this has been approach is the development and characterization of transition metal molecular complexes capable of binding and functionalizing $N_2$ under ambient conditions.

Molecular systems for reduction of $N_2$ to $NH_3$ have traditionally focused on Mo centers given the presence of Mo in the most thoroughly studied iron-molybdenum cofactor. Tri-amido amine Mo and phosphine-pincer Mo complexes, for example, have been demonstrated to provide moderate catalytic efficiencies for reduction of $N_2$ to $NH_3$ at ambient temperature and pressures. Attention has also been more recently directed to a potential role of iron as an active $N_2$ binding site in iron-molybdenum cofactor given the understanding that iron is the only transition metal essential to all nitrogenases. This approach is also supported by recent spectroscopic and biological data implicating iron, as opposed to molybdenum, as the active site of $N_2$ binding in the iron-molybdenum cofactor.

It will be appreciated from the foregoing that there is currently a need in the art for improved molecular catalysts and, methods capable of the facile conversion of nitrogen to ammonia. Specifically, molecular catalysts are needed for nitrogen reduction providing useful catalytic efficiencies and turnover under conditions less stringent than those in the conventional Haber-Bosh process.

SUMMARY OF THE INVENTION

This invention relates to molecular catalysts and chemical reactions utilizing the same, and particularly to catalysts and catalytic methods for reduction of molecular nitrogen. The molecular catalytic platform provided herein is capable of the facile reduction of molecular nitrogen under useful conditions such as room temperature or less and atmospheric pressure or less.

Provided herein are catalyst compositions, catalytic systems and methods for the reduction of molecular nitrogen. Transition metal catalysts, formations and catalytic methods of the invention, for example, exhibit useful catalytic efficiency and with good turnover ratio and reduction product yields under conditions supporting a range of industrial applications, including the production of ammonia. Catalysts of the invention include molecular complexes comprising iron and cobalt active sites supported by a phosphine ligand, such as a diphosphine or trisphosphine ligand, for example, a tris(phosphine)borane, tris(phosphinoaryl)borane, tris(phosphinoaryl)alkyl and tris(phosphinoaryl)silyl ligand. Catalytic systems and methods of the invention are versatile and can be implemented using a range of process conditions and reactants, including a variety of sources of protons and electrons. Catalytic systems and methods of the invention are compatible with approaches and reaction conditions for kinetically driven catalyst formation, activation and regeneration steps. In an embodiment, the invention provides functionally biomimetic Fe or Co metal catalysts and catalytic methods for efficient conversion of molecular nitrogen to reduction products such as, for example, ammonia ($NH_3$) and/or hydrazine ($H_2H_4$).

In an aspect, the invention provides a catalytic process for the reduction of molecular nitrogen ($N_2$) to generate a reduction product, the process comprising the steps of: contacting a transition metal catalyst with a source of protons and a source of electrons in the presence of the molecular nitrogen, thereby generating the reduction product; wherein the transition metal catalyst comprises a metal complex comprising a transition metal atom selected from the group consisting of Fe and Co, and a phosphine ligand (L). In an embodiment, for example, the metal complex comprises a coordination complex. In an embodiment, for example, the phosphine ligand (L) is a diphosphine ligand or a trisphosphine ligand. In an embodiment, multiple atoms or functional groups of the ligand independently establish bonds to the metal atom. In an embodiment, for example, the phosphine ligand is a polydentate ligand, such as a bidentate, tridentate or tetradentate ligand. In an embodiment, for example, the metal complex further comprises an $N_2$ group, for example bonded to a central metal atom of the metal complex.

In an embodiment, the transition metal catalyst, a source of protons, a source of electrons and molecular nitrogen are brought in physical contact with each other, for example, in a solution phase, a liquid phase, a gas phase or a combination of these. In an embodiment, for example, the process is carried out in a mixture comprising the transition metal catalyst, the source of protons, the source of electrons and molecular nitrogen, and optionally one or more solvents and/or additives. In an embodiment, for example, the reduction product is $NH_3$ and/or $N_2H_4$. In an embodiment the reduction product is substantially $NH_3$ (e.g., 90% or greater yield and optionally 99% or greater yield) or entirely $NH_3$. In an embodiment, the process occurs at a temperature less than or equal to 25° C. and/or at a pressure less than or equal to 1 atmosphere. In an embodiment, the process occurs at a temperature less than 0° C.

In an embodiment, a ligand (L) of the metal complex of the invention has the formula (FX1A), (FX1B) or (FX1C):

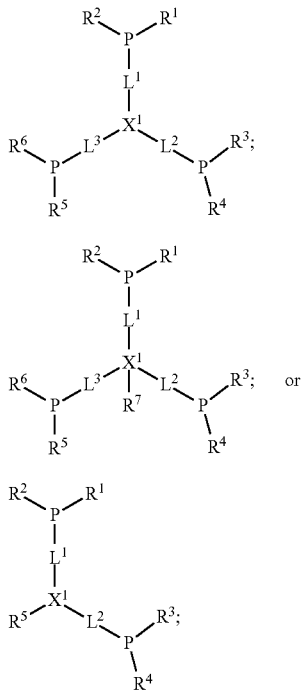

wherein $X^1$ is B, C, Si or P; each of $L^1$, $L^2$ and $L^3$ is independently a substituted or unsubstituted $C_1$-$C_{10}$ alkylene, $C_3$-$C_{10}$ cycloalkylene, $C_5$-$C_{10}$ arylene, or $C_5$-$C_{10}$ heteroarylene; each of $R^1$, $R^2$, $R^3$, $R^4$, $R^5$, $R^6$ and $R^7$ is independently hydrogen or a substituted or unsubstituted $C_1$-$C_8$ alkyl, $C_3$-$C_8$ cycloalkyl, $C_5$-$C_8$ aryl, $C_5$-$C_8$ heteroaryl, $C_1$-$C_{18}$ acyl, $C_2$-$C_8$ alkenyl, $C_2$-$C_8$ alkynyl, or —P(OR$^8$)$_2$, wherein each $R^8$ is independently H, $C_1$-$C_8$ alkyl, $C_3$-$C_8$ cycloalkyl, $C_5$-$C_8$ aryl or $C_5$-$C_8$ heteroaryl. In an embodiment, the ligand of the metal complex is neutral or is charged, such as having a charge of −1 or −2.

As will be generally understood by one having skill in the art, the ligands described herein participate in bonding with the metal atom of the metal complex, for example via electron donating interactions. Therefore, the valencies of atoms of the ligand (L) structures disclosed herein, including in formulas (FX1)-(FX10), are in some cases intended to be supplemented by the bonding of the ligand to the metal atom of the metal complexes. Bonding to the metal atom can include various atoms and functional groups of the ligand including one or more of the phosphorous atoms, central atoms ($X^1$), linking groups ($L^1$, $L^2$ and $L^3$) and/or terminating groups ($R^1$, $R^2$, $R^3$, $R^4$, $R^5$, $R^6$, $R^7$ and $R^8$) as shown in formulas (FX1)-(FX10). Accordingly, in some embodiments, the ligand structures and/or metal complex structures as shown herein may be considered ionic and/or multivalent structures (e.g., divalent, trivalent, tetravalent, etc.). In some embodiments, for example, a ligand of the metal complexes of the invention may be viewed as an anion, for example, an anion having a −1 or −2 charge state.

In an embodiment, for example, a metal complex of the invention further comprises $N_2$ and has the formula (FX2A), (FX2B) or (FX2C):

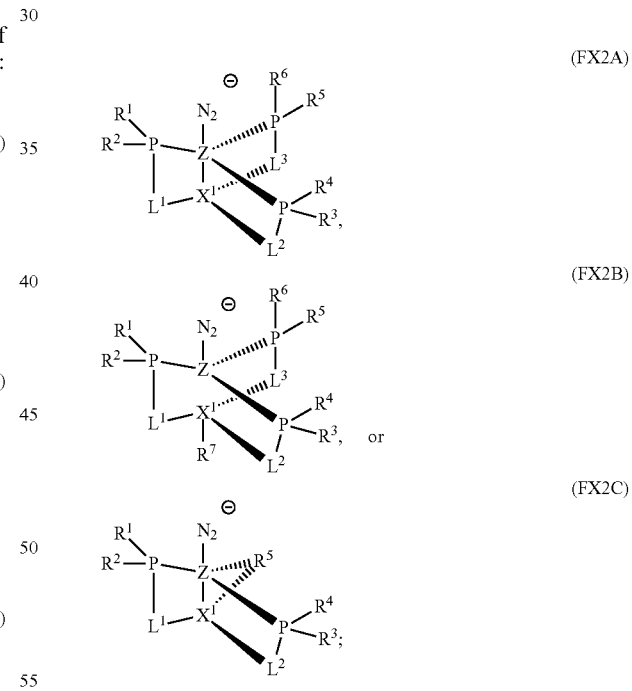

wherein Z is the transition metal atom.

An important property of the invention is the catalytic nature of the reduction process, for example, wherein the transition metal catalyst is efficiently regenerated in the process and, thus, available to subsequently react with molecular nitrogen and further generate the reduction product. In an embodiment, for example, regenerated transition metal catalyst subsequently participates in further reaction with the source of protons, source of electrons and molecular nitrogen to achieve catalytic reduction. In an embodiment, the present process is characterized by a turnover frequency greater than or equal to $1 \times 10^{-2}$ sec$^{-1}$. In an embodiment, the present process generates at least 1 reduction product equivalents per transition metal catalyst equivalent and for some applications generates at least 2 reduction product equivalents per transition metal catalyst equivalent.

In an embodiment, for example, the process is characterized by catalyst activation and regeneration steps that are capable of kinetic control, for example, via providing acids, reductants and/or additives to kinetically drive catalyst formation, activation, hydrogenation and/or regeneration steps. The present processes are compatible with a range of different sources of electrons and sources of protons such as acids including HBAr$^F_4$ (hydro tetrakis[(3,5-trifluoromethyl)phenyl]borate) and reductants including Na and KC$_8$. In an embodiment, the invention comprises the step of providing the source of protons, such as an acid, at a concentration and/or amount capable of kinetically driving catalysis formation, activation, hydrogenation and/or regeneration steps. In an embodiment, the invention comprises the step of providing the source of electrons at a concentration and/or amount capable of kinetically driving catalysis formation and/or regeneration. In an embodiment, the invention comprises the step of replenishing the concentrations and/or amounts of the transition metal catalyst, source of protons, source of electrons, molecular nitrogen or combinations thereof.

In an embodiment, the transition metal catalyst is a metal complex further comprises a N$_2$ group, for example, wherein the transition metal catalyst is characterized by a metal atom providing for binding and subsequent functionalization of a N$_2$ substrate. In an embodiment, for example, the transition metal catalyst has the formula (FX3): (L)Z(N$_2$)$^-$ (FX3), wherein L is the phosphine ligand, and Z is the transition metal atom, and optionally wherein the N$_2$ is bound to the transition metal atom. In embodiments, the process further comprises the step of protonating the transition metal catalyst so as to generate a hydrogenated metal-N$_2$ complex, such as a hydrogenated metal-N$_2$ complex characterized by one or more N—H bonds. In an embodiment, for example, protonation occurs via contacting the transition metal catalyst with an acid, such as HBAr$^F_4$ (hydro tetrakis[(3,5-trifluoromethyl)phenyl]borate), HOTf (triflic acid), HX, HBF$_4$, H(Al(OR)$_4$) where R can be fluorinated, ArNH$_3$+X or a combination of these, wherein X is a halogen (F, Cl, Br, I). In an embodiment, for example, the hydrogenated metal-N$_2$ complex has the formula (FX4): (L)Z(N$_x$H$_y$) (FX4); wherein x is 1 or 2; y is 1, 2, 3, 4 or 5; L is the phosphine ligand and Z is the transition metal atom. In some embodiments, the hydrogenated metal-N$_2$ complex, for example having formula (FX4), is an ion such as an ion having a charge equal to +2, +1, -1 or -2. In an embodiment, for example, the hydrogenated metal-N$_2$ complex has the formula (FX5A) or (FX5B): (L)Z(NH$_2$) (FX5A) or (L)Z(NH$_3$)$^+$ (FX5B); wherein the phosphine ligand and Z is the transition metal atom. In an embodiment, the catalytic process further comprises reductive protonation of the hydrogenated metal-N$_2$ complex, for example using Na, KC$_8$, Na/Hg, NaBH$_4^-$, Mg, Zn or any combination of these, thereby generating the reduction product and regenerating the transition metal catalyst.

The invention is further inclusive of transition metal catalyst precursors for generating the present transition metal catalyst. In an embodiment, for example, the invention provides methods wherein a transition metal catalyst precursors is contacted with molecular nitrogen to generate the transition metal catalyst. In an embodiment, for example, the catalytic process further comprises: (i) providing a transition metal precursor comprising a precursor transition metal complex comprising the transition metal atom and the phosphine ligand (L); and (ii) contacting the transition metal catalyst precursor with molecular nitrogen in the presence of an acid and reductant, thereby generating the transition metal catalyst comprising a N$_2$ adduct of the transition metal catalyst precursor. In an embodiment, the transition metal catalyst precursor has the formula (L)Z$^+$ (FX6), wherein L is the phosphine ligand and Z is the transition metal atom. In an embodiment, the transition metal catalyst is generated via reduction of the transition metal catalyst precursor, wherein the reducing agent is Na, Na/Hg or KC$_8$.

The transition metal atom, as well as the axial donor atom within the ligand to which it is bonded, may play an important role in certain catalysts and catalytic methods of the invention. In an embodiment, for example, an N$_2$ is directly bonded to the transition metal atom, thereby forming an N$_2$ adduct. In an embodiment, the transition metal catalyst further comprises one or more counter ions. A wide range of counter ions are useful in the present compositions and methods, for example, Na$^+$ or K$^+$, optionally solvated or coordinated by a crown, cryptand, or any donor group in principle.

In an embodiment, for example, the transition metal catalyst is a mononuclear metal complex. In an embodiment, for example, the transition metal catalyst is a metal coordination complex characterized by a coordination number of 3, 4, 5 or 6, and in some embodiments a coordination number of 4 or 5. In an embodiment, the transition metal atom of the transition metal catalyst is Fe. In an embodiment, the transition metal atom of the transition metal catalyst is Fe and characterized by an oxidation state of Fe(-1), Fe(0), Fe(I), Fe(II), Fe(III), or Fe(IV). For example, an LFe(N) precatalyst can have an oxidation state of Fe(IV), and can be an intermediate of catalysis. In an embodiment, the transition metal atom of the transition metal catalyst is Co.

In an embodiment, the phosphine ligand is a polydentate ligand, such as a tridentate or tetradentate ligand. In an embodiment, for example, the phosphine ligand is a tripodal trisphospine ligand having a boron, carbon, silicon and/or or phosphorous axial donor atom(s). In an embodiment, the phosphine ligand has an aryl backbone comprising at least one of L$^1$, L$^2$ and L$^3$ independently comprising C$_5$-C$_{10}$ arylene or C$_5$-C$_{10}$ heteroarylene. In an embodiment, for example, the phosphine ligand comprises one or more cyclohexylamine ring systems.

The invention includes transition metal catalysts comprising a metal complex, wherein at least one of, and optionally all of, L$^1$, L$^2$, L$^3$, R$^1$, R$^2$, R$^3$, R$^4$, R$^5$, R$^6$, R$^7$ and R$^8$ are substituted with one or more heteroatoms or heavy atom analogues. In an embodiment, for example, a transition metal catalysts comprises a metal complex, wherein at least one of, and optionally all of, L$^1$, L$^2$ and L$^3$ is independently substituted with one or more heteroatoms, such as one or more heteroatoms selected from the group consisting of O, N, or Si. In an embodiment, for example, a transition metal catalyst comprises a metal complex, wherein at least one of, and optionally all of, R$^1$, R$^2$, R$^3$, R$^4$, R$^5$, R$^6$, R$^7$ and R$^8$ is independently substituted with one or more heteroatoms, such as one or more heteroatoms selected from the group consisting of O, N, or Si, or heavy atom analogues, such as As.

In an embodiment, for example, the ligand of the transition metal catalyst has the formula (FX7A), (FX7B) or (FX7C):

(FX7A)

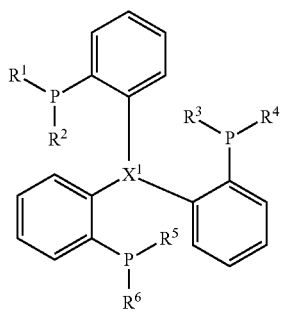

(FX7B)

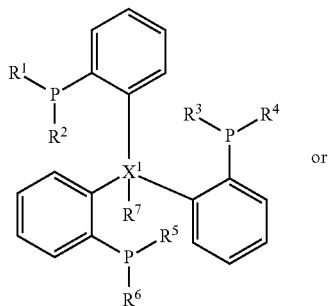

or (FX7C)

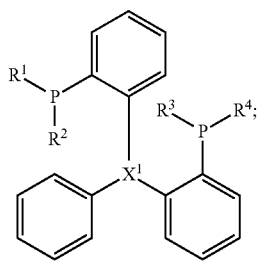

wherein $X^1$, $R^1$, $R^2$, $R^3$, $R^4$, $R^5$, $R^6$ and $R^7$, are as set forth in formulas (FX1A), (FX1B) and (FX1C). In an embodiment, the ligand of the metal complex is neutral or is charged, such as having a charge of −1 or −2. In an embodiment, for example, the metal complex further comprises $N_2$ and has the formula (FX8A), (FX8B) or (FX8C):

(FX8A)

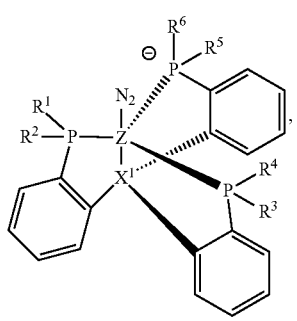

(FX8B)

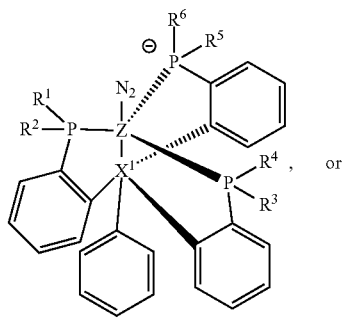

, or (FX8C)

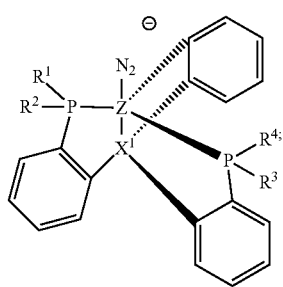

wherein Z is the transition metal atom and wherein $X^1$, $R^1$, $R^2$, $R^3$, $R^4$, $R^5$, $R^6$ and $R^7$, are as set forth in formulas (FX1A), (FX1B) and (FX1C).

In an embodiment, for example, the ligand of the transition metal catalyst has the formula (FX9A), (FX9B) or (FX9C):

(FX9A)

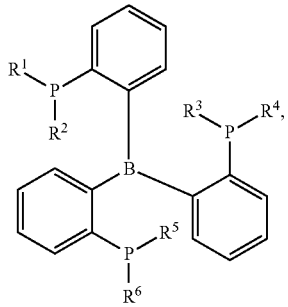

(FX9B)

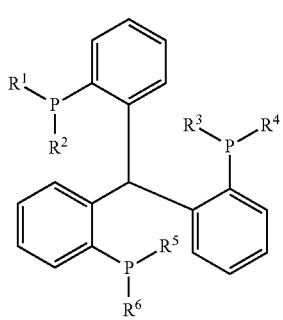

or (FX9C)

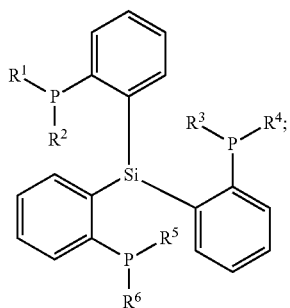

wherein $R^1$, $R^2$, $R^3$, $R^4$, $R^5$, and $R^6$ are as set forth in formulas (FX1A), (FX1B) and (FX1C). In an embodiment, for example, each of $R^1$, $R^2$, $R^3$, $R^4$, $R^5$, $R^6$ and $R^7$ is independently isopropyl, phenyl or cyclohexyl. In an embodiment, for example, one of $R^1$ and $R^2$, $R^3$ and $R^4$, and $R^5$ and $R^6$ is different from the others. In an embodiment, the ligand of the metal complex is neutral or is charged, such as having a charge of −1 or −2.

In an embodiment, for example, the ligand of the transition metal catalyst has formula (FX10A), (FX10B) or (FX10C):

(FX9A)

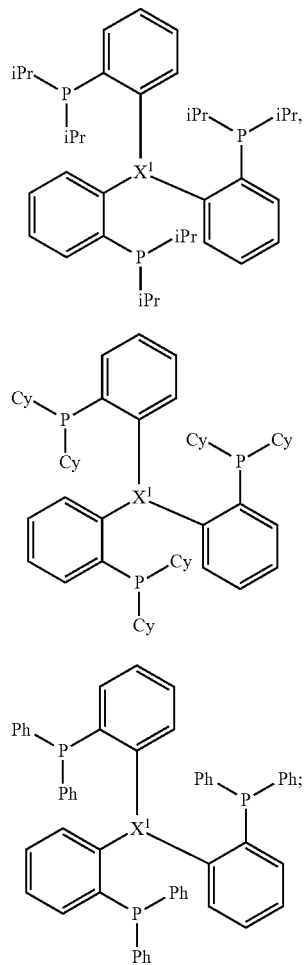

(FX9B)

(FX9C)

(FX9D)

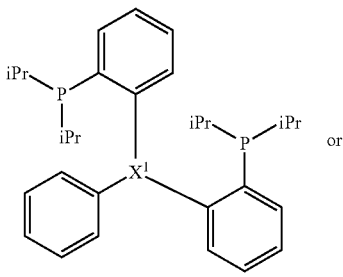
or (FX9E)

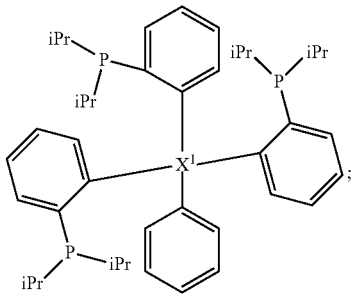

wherein iPr is isopropyl, Ph is phenyl, and Cy is cyclohexyl. In an embodiment, for example, the ligand of the transition metal catalyst has the formula (FX10A), (FX10B), (FX10C) or (FX10D):

(FX10A)

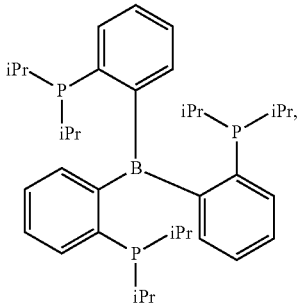

(FX10B)

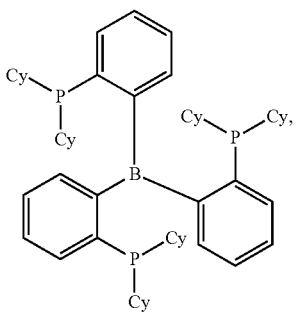

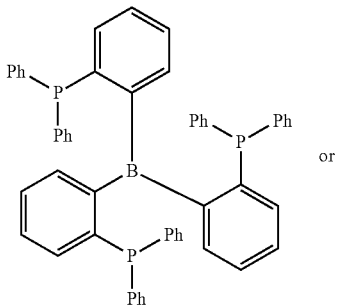

(FX10C)

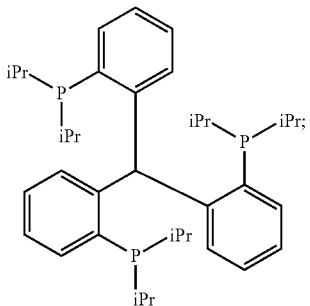

(FX10D)

wherein iPr is isopropyl, Ph is phenyl and Cy is cyclohexyl. In an embodiment, the ligand of the metal complex is neutral or is charged, such as having a charge of −1 or −2.

In an embodiment, the transition metal catalyst has the formula $[(TP^RB)Fe(N_2)]^-$, $[(CP^R_3)Fe(N_2)]^-$, $[(SiP^R_3)Fe(N_2)]^-$, $[(TP^RB)Co(N_2)]^-$, $[(CP^R_3)Co(N_2)]^-$, or $[(SiP^R_3)Co(N_2)]^-$, wherein $TP^RB$ is a tris(phosphinoaryl)borane ligand, $CP^R_3$ is a tris(phosphinoaryl)alkyl ligand and $SiP^R_3$ is tris(phosphinoaryl)silyl ligand.

An important feature of the invention is the capability of the catalysts and catalytic systems to reduce molecular nitrogen at ambient temperatures or lower and atmospheric pressures or lower using a versatile range of reaction conditions. In an embodiment, for example, the transition metal catalyst and the molecular nitrogen are each dissolved in a solvent; wherein the step of contacting the transition metal catalyst with the source of protons and the source of electrons occurs within a solution. Criteria for selection of an appropriate solvent include stability to the reductant and the acid used. In an embodiment, for example, the solution is a nonaqueous solution. In an embodiment, the solvent is selected from the group consisting of: diethyl ether, related ethereal solvent (such as tetrahydrofuran or dimethoxyethane or diglym), or an aromatic or alkane solvent such as methylcyclohexane, or mixtures thereof. In some embodiments, for example, the solvent has heteroatoms other than oxygen (including those with N or S).

In an embodiment, for example, at least one of the molecular nitrogen the transition metal catalyst, the source of protons and the source of electrons, and optionally all of, are provided in a solution comprising one or more solvents. In an embodiment, the one or more solvents is one or more nonaqueous solvents. In an embodiment, for example, the transition metal catalyst is a homogeneous catalyst, wherein the transition metal catalyst, the source of protons, the source of electrons and the molecular nitrogen are provided in contact in the solution. In an embodiment, for example, the transition metal catalyst is a heterogeneous catalyst, where the transition metal, the source of protons and the source of electrons and the molecular nitrogen are provided in the solution and provided in contact with the transition metal catalyst provided in the solid phase. In an embodiment, for example, the transition metal catalyst is a heterogeneous catalyst, where the source of protons and the source of electrons and the molecular nitrogen are provided in the solution, the molecular nitrogen is provided in the gas phase, which are provided in contact with the transition metal catalyst provided in the solid phase.

In an embodiment, for example, the concentration of the transition metal catalyst in the solution is selected from the range of 0.01 mM to 10 mM. In an embodiment, for example, the concentration of the molecular nitrogen in the solution is selected from the range of $1 \times 10^{-4}$ M to 1 M.

A wide variety of proton sources is useful in the present invention, including a range of acids. In an embodiment, the source of protons is one or more acids, for example, one or more acids selected from the group consisting of: $HBAr^F_4$ (hydro tetrakis[(3,5-trifluoromethyl)phenyl]borate), HOTf (triflic acid), HX, $HBF_4$, $H(Al(OR)_4)$ where R can be fluorinated, $ArNH_3^+X$ or a combination of these; wherein X is a halogen (e.g., F, Cl, Br, or I). In an embodiment, the concentration of the one or more acids is selected from the range of 0.01-5 M.

A wide variety of electron sources is useful in the present invention, including a range of reductants. In embodiments, the source of electrons is one or more reductants, for example, one or more reductants selected from the group consisting of Na, $KC_8$, Na/Hg, $NaBH_4^-$, Mg, Zn or any combination of these. In an embodiment, the concentration of the one or more reductants is selected from the range of 0.1-100 M.

In an embodiment, the transition metal catalyst is provided as a homogeneous catalyst, for example, wherein the catalyst and molecular nitrogen are provided, and provided in contact with each other, in the same phase, such as in solution. Alternative, the present transition metal catalysts may be provided as heterogeneous catalyst, for example, wherein the catalyst is provided as a phase different from the molecular nitrogen, such as wherein the transition metal catalyst is provided as a solid and contacted by molecular nitrogen in gas or solution phase. Examples of solvents useful for homogeneous or heterogeneous catalyst of the invention include nonaqueous solvents such as diethyl ether, tetrahydrofuran, dimethoxyethane, diglym, methylcyclohexane or any combination of these.

The catalysts and catalytic processes disclosed herein are efficient and provide benefits over conventional functional biomimetic catalyst systems for the reduction of molecular nitrogen. In an embodiment, the catalytic process generates at least 1, and optionally 2 or 10, reduction product equivalents per transition metal catalyst equivalent.

In an aspect, the invention provides a catalyst formulation for reduction of molecular nitrogen ($N_2$) to generate a reduction product, the formulation comprising: (i) a transition metal catalyst comprising a metal complex comprising a transition metal atom selected from the group consisting of Fe and Co, and a phosphine ligand (L); (ii) a source of protons comprising one or more acids; and (iii) a source of electrons comprising one or more reductants. In an embodiment, the metal complex of the transition metal catalyst further comprises a $N_2$ group, for example, an $N_2$ group bound to the metal atom. In an embodiment, for example, the catalyst formulation is provided in solution, for example, further comprising a nonaqueous solvent. As will be generally understood by those having skill in the art, any of the transition metal catalysts, metal complexes, transition metal catalyst precursors, sources of electrodes, sources of protons and solvents described herein can be used in the present catalyst formulations. In an embodiment, for example the acid is HBAr$^F_4$ (hydro tetrakis[(3,5-trifluoromethyl)phenyl] borate). In an embodiment, for example, the one or more reductants are selected from the group consisting of Na, KC$_8$, Na/Hg, NaBH$_4^-$, Mg, Zn or any combination of these. In an embodiment, the catalyst formulation of the invention is in a substantially purified state.

In another aspect, the present invention provides metal complex compositions, for example, for applications in chemical synthesis. In an embodiment, the invention provides a metal complex comprising a transition metal atom selected from the group consisting of Fe and Co, and a phosphine ligand (L); wherein the ligand (L) has the formula (FX1A), (FX1B) or (FX1C):

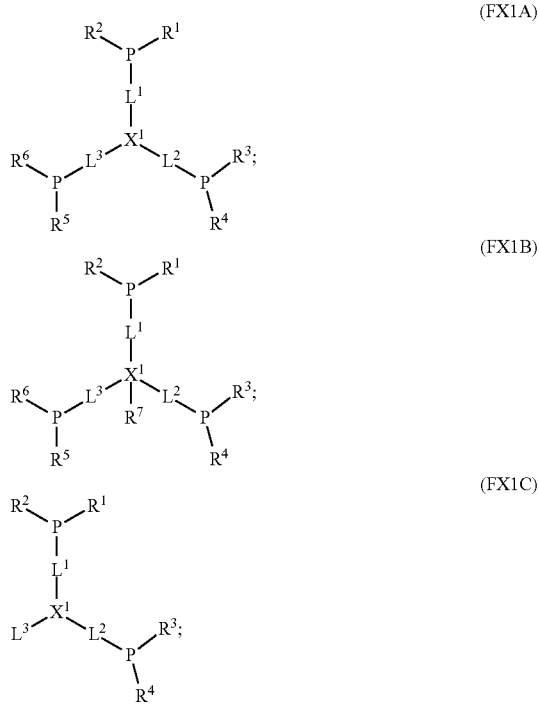

wherein X$^1$ is B, C, Si or P; each of L$^1$, L$^2$ and L$^3$ is independently a substituted or unsubstituted C$_1$-C$_{10}$ alkylene, C$_3$-C$_{10}$ cycloalkylene, C$_5$-C$_{10}$ arylene, or C$_5$-C$_{10}$ heteroarylene; each of R$^1$, R$^2$, R$^3$, R$^4$, R$^5$, R$^6$ and R$^7$ is independently hydrogen or a substituted or unsubstituted C$_1$-C$_8$ alkyl, C$_3$-C$_8$ cycloalkyl, C$_5$-C$_8$ aryl, C$_5$-C$_8$ heteroaryl, C$_1$-C$_{18}$ acyl, C$_2$-C$_8$ alkenyl, C$_2$-C$_8$ alkynyl, or —P(OR$^8$)$_2$, wherein each R$^8$ is independently H, C$_1$-C$_8$ alkyl, C$_3$-C$_8$ cycloalkyl, C$_5$-C$_8$ aryl or C$_5$-C$_8$ heteroaryl with the proviso that when the ligand (L) is tris(o-phosphinoaryl)boran, then the metal atom is Co. In an embodiment, the metal complex further comprises a N$_2$ group, for example, an N$_2$ group bound to the metal atom. In an embodiment, for example, the metal complex has the formula: (L)Z(N$_2$)$^-$ (FX3). In an embodiment, for example, the invention provides a metal complex having formula (FX1A), (FX1B) or (FX1C), wherein the metal atom is Fe. In an embodiment, for example, the invention provides a metal complex having formula (FX1A), (FX1B) or (FX1C), wherein the metal atom is Co. In an embodiment, for example, the invention provides a metal complex having formula (FX1A), (FX1B) or (FX1C), wherein X$^1$ is C or Si. In an embodiment, for example, the invention provides a metal complex having formula (FX1A), (FX1B) or (FX1C), wherein at least one of, and optionally all of, R$^1$, R$^2$, R$^3$, R$^4$, R$^5$, R$^6$ and R$^7$ is not isopropyl. In an embodiment, for example, the invention provides a metal complex having formula (FX1A), (FX1B) or (FX1C), wherein at least one of, and optionally all of, R$^1$, R$^2$, R$^3$, R$^4$, R$^5$, R$^6$ and R$^7$ is phenyl and cyclohexyl. In an embodiment, the metal complex of the invention is in a substantially purified state.

Without wishing to be bound by any particular theory, there may be discussion herein of beliefs or understandings of underlying principles relating to the devices and methods disclosed herein. It is recognized that regardless of the ultimate correctness of any mechanistic explanation or hypothesis, an embodiment of the invention can nonetheless be operative and useful.

BRIEF DESCRIPTION OF THE DRAWINGS

FIG. 79. Variable Temperature Magnetic data for 2-5.

STATEMENTS REGARDING CHEMICAL COMPOUNDS AND NOMENCLATURE

Figure 1A:
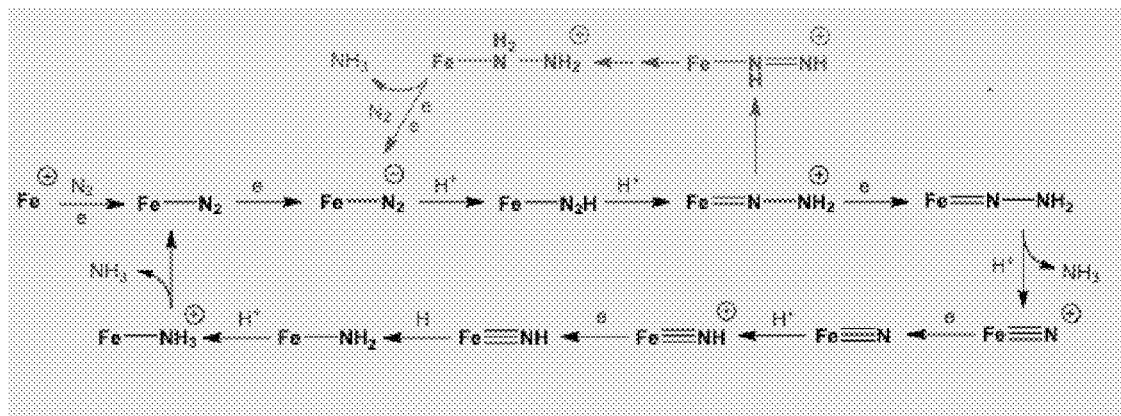
FIGS. 1A and 1B. Schematics of catalytic cycle. Schematic depictions of catalytic cycles involving transition metal catalysts of the invention.

In an embodiment, a composition or compound of the invention, such as a metal catalyst composition or formulation, is isolated or substantially purified. In an embodiment, an isolated or purified compound is at least partially isolated or substantially purified as would be understood in the art. In an embodiment, a substantially purified composition, compound or formulation of the invention has a chemical purity of 95%, optionally for some applications 99%, optionally for some applications 99.9%, optionally for some applications 99.99%, and optionally for some applications 99.999% pure.

Many of the molecules disclosed herein contain one or more ionizable groups. Ionizable groups include groups from which a proton can be removed (e.g., —COOH) or added (e.g., amines) and groups that can be quaternized (e.g., amines). All possible ionic forms of such molecules and salts thereof are intended to be included individually in the disclosure herein. With regard to salts of the compounds herein, one of ordinary skill in the art can select from among a wide variety of available counterions that are appropriate for preparation of salts of this invention for a given application. In specific applications, the selection of a given anion or cation for preparation of a salt can result in increased or decreased solubility of that salt.

The compounds of this invention can contain one or more chiral centers. Accordingly, this invention is intended to include racemic mixtures, diasteromers, enantiomers, tautomers and mixtures enriched in one or more stereoisomer. The scope of the invention as described and claimed encompasses the racemic forms of the compounds as well as the individual enantiomers and non-racemic mixtures thereof.

As used herein, the term "group" may refer to a functional group of a chemical compound. Groups of the present compounds refer to an atom or a collection of atoms that are a part of the compound. Groups of the present invention may be attached to other atoms of the compound via one or more covalent bonds. Groups may also be characterized with respect to their valence state. The present invention includes groups characterized as monovalent, divalent, trivalent, etc. valence states.

As used herein, the term "substituted" refers to a compound wherein a hydrogen is replaced by another functional group.

As is customary and well known in the art, hydrogen atoms in formulas (FX1)-(FX10) are not always explicitly shown, for example, hydrogen atoms bonded to the carbon atoms of alkylene groups and/or alicyclic rings are not always explicitly shown in formulas (FX1)-(FX10). The structures provided herein, for example in the context of the description of formulas (FX1)-(FX10), are intended to convey to one of reasonable skill in the art the chemical composition of compounds of the methods and compositions of the invention, and as will be understood by one of skill in the art, the structures provided do not indicate the specific positions of atoms and bond angles between atoms of these compounds.

Alkyl groups include straight-chain, branched and cyclic alkyl groups. Alkyl groups include those having from 1 to 30 carbon atoms. Alkyl groups include small alkyl groups having 1 to 3 carbon atoms. Alkyl groups include medium length alkyl groups having from 4-10 carbon atoms. Alkyl groups include long alkyl groups having more than 10 carbon atoms, particularly those having 10-30 carbon atoms. The term cycloalkyl specifically refers to an alky group having a ring structure such as ring structure comprising 3-30 carbon atoms, optionally 3-20 carbon atoms and optionally 2-10 carbon atoms, including an alkyl group having one or more rings. Cycloalkyl groups include those having a 3-, 4-, 5-, 6-, 7-, 8-, 9- or 10-member carbon ring(s) and particularly those having a 3-, 4-, 5-, 6-, 7- or 8-member ring(s). The carbon rings in cycloalkyl groups can also carry alkyl groups. Cycloalkyl groups can include bicyclic and tricycloalkyl groups. Alkyl groups are optionally substituted. Substituted alkyl groups include among others those which are substituted with aryl groups, which in turn can be optionally substituted. Specific alkyl groups include methyl, ethyl, n-propyl, iso-propyl, cyclopropyl, n-butyl, s-butyl, t-butyl, cyclobutyl, n-pentyl, branched-pentyl, cyclopentyl, n-hexyl, branched hexyl, and cyclohexyl groups, all of which are optionally substituted. Substituted alkyl groups include fully halogenated or semihalogenated alkyl groups, such as alkyl groups having one or more hydrogens replaced with one or more fluorine atoms, chlorine atoms, bromine atoms and/or iodine atoms. Substituted alkyl groups include fully fluorinated or semifluorinated alkyl groups, such as alkyl groups having one or more hydrogens replaced with one or more fluorine atoms. Substituted alkyl groups may include substitution to incorporate one or more silyl groups, for example wherein one or more carbons are replaced by Si.

An alkoxy group is an alkyl group that has been modified by linkage to oxygen and can be represented by the formula R—O and can also be referred to as an alkyl ether group. Examples of alkoxy groups include, but are not limited to, methoxy, ethoxy, propoxy, butoxy and heptoxy. Alkoxy groups include substituted alkoxy groups wherein the alky portion of the groups is substituted as provided herein in connection with the description of alkyl groups. As used herein MeO— refers to $CH_3O$—.

Alkenyl groups include straight-chain, branched and cyclic alkenyl groups. Alkenyl groups include those having 1, 2 or more double bonds and those in which two or more of the double bonds are conjugated double bonds. Alkenyl groups include those having from 2 to 20 carbon atoms. Alkenyl groups include small alkenyl groups having 2 to 3 carbon atoms. Alkenyl groups include medium length alkenyl groups having from 4-10 carbon atoms. Alkenyl groups include long alkenyl groups having more than 10 carbon atoms, particularly those having 10-20 carbon atoms. Cycloalkenyl groups include those in which a double bond is in the ring or in an alkenyl group attached to a ring. The term cycloalkenyl specifically refers to an alkenyl group having a ring structure, including an alkenyl group having a 3-, 4-, 5-, 6-, 7-, 8-, 9- or 10-member carbon ring(s) and particularly those having a 3-, 4-, 5-, 6-, 7- or 8-member ring(s). The carbon rings in cycloalkenyl groups can also carry alkyl groups. Cycloalkenyl groups can include bicyclic and tricyclic alkenyl groups. Alkenyl groups are optionally substituted. Substituted alkenyl groups include among others those that are substituted with alkyl or aryl groups, which groups in turn can be optionally substituted. Specific alkenyl groups include ethenyl, prop-1-enyl, prop-2-enyl, cycloprop-1-enyl, but-1-enyl, but-2-enyl, cyclobut-1-enyl, cyclobut-2-enyl, pent-1-enyl, pent-2-enyl, branched pentenyl, cyclopent-1-enyl, hex-1-enyl, branched hexenyl, cyclohexenyl, all of which are optionally substituted. Substituted alkenyl groups include fully halogenated or semihalogenated alkenyl groups, such as alkenyl groups having one or more hydrogens replaced with one or more fluorine atoms, chlorine atoms, bromine atoms and/or iodine atoms. Substituted alkenyl groups include fully fluorinated or semifluorinated alkenyl groups, such as alkenyl groups having one or more hydrogen atoms replaced with one or more fluorine atoms.

Aryl groups include groups having one or more 5-, 6-, 7- or 8-member aromatic rings, including heterocyclic aromatic rings. The term heteroaryl specifically refers to aryl groups having at least one 5-, 6-, 7- or 8-member heterocyclic aromatic rings. Aryl groups can contain one or more fused aromatic rings, including one or more fused heteroaromatic rings, and/or a combination of one or more aromatic rings and one or more nonaromatic rings that may be fused or linked via covalent bonds. Heterocyclic aromatic rings can include one or more N, O, or S atoms in the ring. Heterocyclic aromatic rings can include those with one, two or three N atoms, those with one or two O atoms, and those with one or two S atoms, or combinations of one or two or three N, O or S atoms. Aryl groups are optionally substituted. Substituted aryl groups include among others those that are substituted with alkyl or alkenyl groups, which groups in turn can be optionally substituted. Specific aryl groups include phenyl, biphenyl groups, pyrrolidinyl, imidazolidinyl, tetrahydrofuryl, tetrahydrothienyl, furyl, thienyl, pyridyl, quinolyl, isoquinolyl, pyridazinyl, pyrazinyl, indolyl, imidazolyl, oxazolyl, thiazolyl, pyrazolyl, pyridinyl, benzoxadiazolyl, benzothiadiazolyl, and naphthyl groups, all of which are optionally substituted. Substituted aryl groups include fully halogenated or semihalogenated aryl groups, such as aryl groups having one or more hydrogens replaced with one or more fluorine atoms, chlorine atoms, bromine atoms and/or iodine atoms. Substituted aryl groups include fully fluorinated or semifluorinated aryl groups, such as aryl groups having one or more hydrogens replaced with one or more fluorine atoms. Aryl groups include, but are not limited to, aromatic group-containing or heterocylic aromatic group-containing groups corresponding to any one of the following: benzene, naphthalene, naphthoquinone, diphenylmethane, fluorene, anthracene, anthraquinone, phenanthrene, tetracene, tetracenedione, pyridine, quinoline, isoquinoline, indoles, isoindole, pyrrole, imidazole, oxazole, thiazole, pyrazole, pyrazine, pyrimidine, purine, benzimidazole, furans, benzofuran, dibenzofuran, carbazole, acridine, acridone, phenanthridine, thiophene, benzothiophene, dibenzothiophene, xanthene, xanthone, flavone, coumarin, azulene or anthracycline. As used herein, a group corresponding to the groups listed above expressly includes an aromatic or heterocyclic aromatic group, including monovalent, divalent and polyvalent groups, of the aromatic and heterocyclic aromatic groups listed herein provided in a covalently bonded configuration in the compounds of the invention at any suitable point of attachment. In embodiments, aryl groups contain between 5 and 30 carbon atoms. In embodiments, aryl groups contain one aromatic or heteroaromatic six-member ring and one or more additional five- or six-member aromatic or heteroaromatic ring. In embodiments, aryl groups contain between five and eighteen carbon atoms in the rings. Aryl groups optionally have one or more aromatic rings or heterocyclic aromatic rings having one or more electron donating groups, electron withdrawing groups and/or targeting ligands provided as substituents.

Arylalkyl groups are alkyl groups substituted with one or more aryl groups wherein the alkyl groups optionally carry additional substituents and the aryl groups are optionally substituted. Specific alkylaryl groups are phenyl-substituted alkyl groups, e.g., phenylmethyl groups. Alkylaryl groups are alternatively described as aryl groups substituted with one or more alkyl groups wherein the alkyl groups optionally carry additional substituents and the aryl groups are optionally substituted. Specific alkylaryl groups are alkyl-substituted phenyl groups such as methylphenyl. Substituted arylalkyl groups include fully halogenated or semihalogenated arylalkyl groups, such as arylalkyl groups having one or more alkyl and/or aryl groups having one or more hydrogens replaced with one or more fluorine atoms, chlorine atoms, bromine atoms and/or iodine atoms.

As used herein, the terms "alkylene" and "alkylene group" are used synonymously and refer to a divalent group derived from an alkyl group as defined herein. The invention includes compounds having one or more alkylene groups. Alkylene groups in some compounds function as attaching and/or spacer groups. Compounds of the invention may have substituted and/or unsubstituted $C_1$-$C_{20}$ alkylene, $C_1$-$C_{10}$ alkylene and $C_1$-$C_5$ alkylene groups.

As used herein, the terms "cycloalkylene" and "cycloalkylene group" are used synonymously and refer to a divalent group derived from a cycloalkyl group as defined herein. The invention includes compounds having one or more cycloalkylene groups. Cycloalkyl groups in some compounds function as attaching and/or spacer groups. Compounds of the invention may have substituted and/or unsubstituted $C_3$-$C_{20}$ cycloalkylene, $C_3$-$C_{10}$ cycloalkylene and $C_3$-$C_5$ cycloalkylene groups.

As used herein, the terms "arylene" and "arylene group" are used synonymously and refer to a divalent group derived from an aryl group as defined herein. The invention includes compounds having one or more arylene groups. In an embodiment, an arylene is a divalent group derived from an aryl group by removal of hydrogen atoms from two intra-ring carbon atoms of an aromatic ring of the aryl group. Arylene groups in some compounds function as attaching and/or spacer groups. Arylene groups in some compounds function as chromophore, fluorophore, aromatic antenna, dye and/or imaging groups. Compounds of the invention include substituted and/or unsubstituted $C_3$-$C_{30}$ arylene, $C_3$-$C_{20}$ arylene, $C_3$-$C_{10}$ arylene and $C_1$-$C_5$ arylene groups.

As used herein, the terms "heteroarylene" and "heteroarylene group" are used synonymously and refer to a divalent group derived from a heteroaryl group as defined herein. The invention includes compounds having one or more heteroarylene groups. In an embodiment, a heteroarylene is a divalent group derived from a heteroaryl group by removal of hydrogen atoms from two intra-ring carbon atoms or intra-ring nitrogen atoms of a heteroaromatic or aromatic ring of the heteroaryl group. Heteroarylene groups in some compounds function as attaching and/or spacer groups. Heteroarylene groups in some compounds function as chromophore, aromatic antenna, fluorophore, dye and/or imaging groups. Compounds of the invention include substituted and/or unsubstituted $C_3$-$C_{30}$ heteroarylene, $C_3$-$C_{20}$ heteroarylene, $C_1$-$C_{10}$ heteroarylene and $C_3$-$C_5$ heteroarylene groups.

As used herein, the terms "alkenylene" and "alkenylene group" are used synonymously and refer to a divalent group derived from an alkenyl group as defined herein. The invention includes compounds having one or more alkenylene groups. Alkenylene groups in some compounds function as attaching and/or spacer groups. Compounds of the invention include substituted and/or unsubstituted $C_2$-$C_{20}$ alkenylene, $C_2$-$C_{10}$ alkenylene and $C_2$-$C_5$ alkenylene groups.

As used herein, the terms "cylcoalkenylene" and "cylcoalkenylene group" are used synonymously and refer to a divalent group derived from a cylcoalkenyl group as defined herein. The invention includes compounds having one or more cylcoalkenylene groups. Cycloalkenylene groups in some compounds function as attaching and/or spacer groups. Compounds of the invention include substituted and/or unsubstituted $C_3$-$C_{20}$ cylcoalkenylene, $C_3$-$C_{10}$ cylcoalkenylene and $C_3$-$C_5$ cylcoalkenylene groups.

As used herein, the terms "alkynylene" and "alkynylene group" are used synonymously and refer to a divalent group derived from an alkynyl group as defined herein. The invention includes compounds having one or more alkynylene groups. Alkynylene groups in some compounds function as attaching and/or spacer groups. Compounds of the invention include substituted and/or unsubstituted $C_2$-$C_{20}$ alkynylene, $C_2$-$C_{10}$ alkynylene and $C_2$-$C_5$ alkynylene groups.

As used herein, the term "halo" refers to a halogen group such as a fluoro (—F), chloro (—Cl), bromo (—Br), iodo (—I) or astato (—At).

The term "heterocyclic" refers to ring structures containing at least one other kind of atom, in addition to carbon, in the ring. Examples of such heteroatoms include nitrogen, oxygen and sulfur. Heterocyclic rings include heterocyclic alicyclic rings and heterocyclic aromatic rings. Examples of heterocyclic rings include, but are not limited to, pyrrolidinyl, piperidyl, imidazolidinyl, tetrahydrofuryl, tetrahydrothienyl, furyl, thienyl, pyridyl, quinolyl, isoquinolyl, pyridazinyl, pyrazinyl, indolyl, imidazolyl, oxazolyl, thiazolyl, pyrazolyl, pyridinyl, benzoxadiazolyl, benzothiadiazolyl, triazolyl and tetrazolyl groups. Atoms of heterocyclic rings can be bonded to a wide range of other atoms and functional groups, for example, provided as substituents.

The term "carbocyclic" refers to ring structures containing only carbon atoms in the ring. Carbon atoms of carbocyclic rings can be bonded to a wide range of other atoms and functional groups, for example, provided as substituents.

The term "alicyclic ring" refers to a ring, or plurality of fused rings, that is not an aromatic ring. Alicyclic rings include both carbocyclic and heterocyclic rings.

The term "aromatic ring" refers to a ring, or a plurality of fused rings, that includes at least one aromatic ring group. The term aromatic ring includes aromatic rings comprising carbon, hydrogen and heteroatoms. Aromatic ring includes carbocyclic and heterocyclic aromatic rings. Aromatic rings are components of aryl groups.

The term "fused ring" or "fused ring structure" refers to a plurality of alicyclic and/or aromatic rings provided in a fused ring configuration, such as fused rings that share at least two intra ring carbon atoms and/or heteroatoms.

As used herein, the term "alkoxyalkyl" refers to a substituent of the formula alkyl-O-alkyl.

As used herein, the term "polyhydroxyalkyl" refers to a substituent having from 2 to 12 carbon atoms and from 2 to 5 hydroxyl groups, such as the 2,3-dihydroxypropyl, 2,3,4-tri hydroxybutyl or 2,3,4,5-tetrahydroxypentyl residue.

As used herein, the term "polyalkoxyalkyl" refers to a substituent of the formula alkyl-(alkoxy)n-alkoxy wherein n is an integer from 1 to 10, preferably 1 to 4, and more preferably for some embodiments 1 to 3.

Amino acids include glycine, alanine, valine, leucine, isoleucine, methionine, proline, phenylalanine, tryptophan, asparagine, glutamine, glycine, serine, threonine, serine, asparagine, glutamine, tyrosine, cysteine, lysine, arginine, histidine, aspartic acid, glutamic acid, selenocysteine and pyrrolysine. As used herein, reference to "a side chain residue of a natural α-amino acid" specifically includes the side chains of the above-referenced amino acids.

As to any of the groups described herein that contain one or more substituents, it is understood that such groups do not contain any substitution or substitution patterns which are sterically impractical and/or synthetically non-feasible. In addition, the compounds of this invention include all stereochemical isomers arising from the substitution of these compounds. Optional substitution of alkyl groups includes substitution with one or more alkenyl groups, aryl groups or both, wherein the alkenyl groups or aryl groups are optionally substituted. Optional substitution of alkenyl groups includes substitution with one or more alkyl groups, aryl groups, or both, wherein the alkyl groups or aryl groups are optionally substituted. Optional substitution of aryl groups includes substitution of the aryl ring with one or more alkyl groups, alkenyl groups, or both, wherein the alkyl groups or alkenyl groups are optionally substituted.

Optional substituents for any alkyl, alkenyl and aryl group includes substitution with one or more of the following substituents, among others:

halogen, including fluorine, chlorine, bromine or iodine;

pseudohalides, including —CN;

—COOR, where R is a hydrogen or an alkyl group or an aryl group and more specifically where R is a methyl, ethyl, propyl, butyl, or phenyl group all of which groups are optionally substituted;

—COR, where R is a hydrogen or an alkyl group or an aryl group and more specifically where R is a methyl, ethyl, propyl, butyl, or phenyl group all of which groups are optionally substituted;

—CON(R)$_2$, where each R, independently of each other R, is a hydrogen or an alkyl group or an aryl group and more specifically where R is a methyl, ethyl, propyl, butyl, or phenyl group all of which groups are optionally substituted;

and where R and R can form a ring which can contain one or more double bonds and can contain one or more additional carbon atoms;

—$OCON(R)_2$, where each R, independently of each other R, is a hydrogen or an alkyl group or an aryl group and more specifically where R is a methyl, ethyl, propyl, butyl, or phenyl group all of which groups are optionally substituted; and where R and R can form a ring which can contain one or more double bonds and can contain one or more additional carbon atoms;

—$N(R)_2$, where each R, independently of each other R, is a hydrogen, or an alkyl group, or an acyl group or an aryl group and more specifically where R is a methyl, ethyl, propyl, butyl, phenyl or acetyl group, all of which are optionally substituted; and where R and R can form a ring that can contain one or more double bonds and can contain one or more additional carbon atoms;

—SR, where R is hydrogen or an alkyl group or an aryl group and more specifically where R is hydrogen, methyl, ethyl, propyl, butyl, or a phenyl group, which are optionally substituted;

—$SO_2R$, or —SOR, where R is an alkyl group or an aryl group and more specifically where R is a methyl, ethyl, propyl, butyl, or phenyl group, all of which are optionally substituted;

—OCOOR, where R is an alkyl group or an aryl group;

—$SO_2N(R)_2$, where each R, independently of each other R, is a hydrogen, or an alkyl group, or an aryl group all of which are optionally substituted and wherein R and R can form a ring that can contain one or more double bonds and can contain one or more additional carbon atoms;

—OR, where R is H, an alkyl group, an aryl group, or an acyl group all of which are optionally substituted. In a particular example R can be an acyl yielding —OCOR", wherein R" is a hydrogen or an alkyl group or an aryl group and more specifically where R" is methyl, ethyl, propyl, butyl, or phenyl groups all of which groups are optionally substituted.

Specific substituted alkyl groups include haloalkyl groups, particularly trihalomethyl groups and specifically trifluoromethyl groups. Specific substituted aryl groups include mono-, di-, tri, tetra- and pentahalo-substituted phenyl groups; mono-, di-, tri-, tetra-, penta-, hexa-, and hepta-halo-substituted naphthalene groups; 3- or 4-halo-substituted phenyl groups, 3- or 4-alkyl-substituted phenyl groups, 3- or 4-alkoxy-substituted phenyl groups, 3- or 4-RCO-substituted phenyl, 5- or 6-halo-substituted naphthalene groups. More specifically, substituted aryl groups include acetylphenyl groups, particularly 4-acetylphenyl groups; fluorophenyl groups, particularly 3-fluorophenyl and 4-fluorophenyl groups; chlorophenyl groups, particularly 3-chlorophenyl and 4-chlorophenyl groups; methylphenyl groups, particularly 4-methylphenyl groups; and methoxyphenyl groups, particularly 4-methoxyphenyl groups.

As to any of the above groups that contain one or more substituents, it is understood that such groups do not contain any substitution or substitution patterns which are sterically impractical and/or synthetically non-feasible. In addition, the compounds of this invention include all stereochemical isomers arising from the substitution of these compounds. The compounds of this invention can contain one or more chiral centers. Accordingly, this invention is intended to include racemic mixtures, diasteromers, enantiomers, tautomers and mixtures enriched in one or more stereoisomer. The scope of the invention as described and claimed encompasses the racemic forms of the compounds as well as the individual enantiomers and non-racemic mixtures thereof.

DETAILED DESCRIPTION OF THE INVENTION

In general, the terms and phrases used herein have their art-recognized meaning, which can be found by reference to standard texts, journal references and contexts known to those skilled in the art. The following definitions are provided to clarify their specific use in the context of the invention.

Reduction generally refers to a process involving the gain of one or more electrons or a decrease in the oxidation state of an atom or group of atoms in a molecule or ion. Reduction may refer to a reduction half reaction in an oxidation-reduction reaction (i.e., Redox reaction). Reduction may involve reaction of a reactant undergoing reduction with a reductant (also referred to as reducing agent), thereby resulting in a reduction product having one or more atoms characterized by a lower oxidation state as compared to the reactant undergoing reduction. In an embodiment, for example, reduction of molecular nitrogen ($N_2$) results in generation of an ammonia ($NH_3$) or hydrazine ($N_2H_4$) reduction product.

"Reduction product" refers to a reaction product of a reduction reaction. A reduction product may be characterized by one or more atoms having a lower oxidation state as compared to that of a reactant undergoing reduction. For example, molecular nitrogen ($N_2$) can be reduced to form the reduction product ammonia ($NH_3$) or hydrazine ($N_2H_4$).

"Metal complex" refers to a composition comprising one or more metal atoms or ions bound to one or more ligands. In an embodiment, metal complex refers to a coordination complex comprising one or more transition metal atom, such as Fe or Co, bound to one or more phosphine ligand, and optionally one or more other groups. The invention includes metal complexes comprising a transition metal atom selected from the group consisting of Fe and Co and a phosphine ligand (L), and optionally a $N_2$ group. Metal complexes may be neutral or ionically charged, for example, having a charge of +2, +1, −1 or −2.

"Catalyst" refers to a composition that increases the rate of one or more chemical reactions of one or more reactants and is not consumed in the chemical reaction. In an embodiment, for example, a catalyst lowers the activation energy of a chemical reaction, thereby requiring less energy to achieve the transition state(s). Catalysts may participate in multiple chemical transformations in a reaction sequence, thereby increasing the rate of on overall transformation of reactants to products. In an embodiment, the invention provides catalysts for reduction of molecular nitrogen, for example, transition metal catalysts comprising an iron or cobalt complex.

This invention is further explained with the following embodiments, which are not intended to limit the scope of this invention.

FIG. 1A provides a schematic overview of a catalytic cycle for reduction of molecular nitrogen ($N_2$) to ammonia ($NH_3$) involving a transition metal catalyst of the invention. In FIG. 1A, the symbol "Fe" is used as a short hand representation of an iron coordination complex of the invention comprising an iron atom and a phosphine ligand (L). Thus, in FIG. 1A, "Fe" is not merely depicting an iron atom but rather designates an Fe complex of the invention. As shown in FIG. 1, the dinitrogen adduct (Fe—$N_2$)⁻ under goes protonation and reduction reactions to generate various hydrogenated metal complex intermediates prior to release of a $NH_3$ reduction product.

Figure 1B:
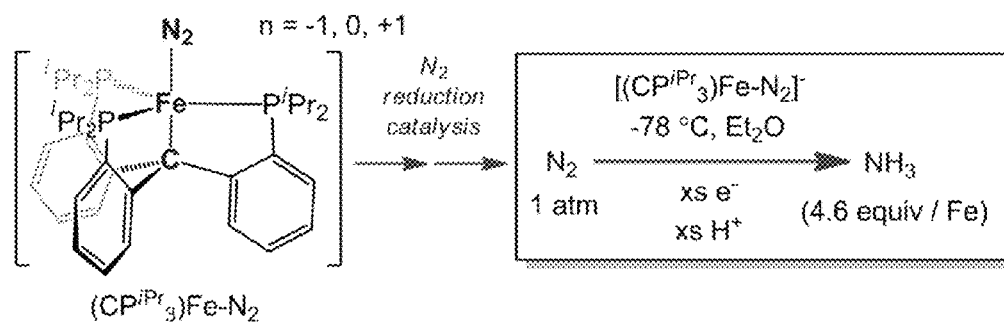

FIG. 1B provides a schematic overview of a catalytic cycle for reduction of molecular nitrogen ($N_2$) to ammonia ($NH_3$) involving the specific metal complex (TPB)Fe($N_2$)−, which comprises an iron atom bound to a tris(phosphinoaryl)borane ligand and a $N_2$ group. As shown in FIG. 1B, the (TPB)Fe($N_2$) catalyst participates in protonation and reduction reactions in the presence of 1 atmosphere of $N_2$ resulting in generation of a $NH_3$ reduction product.

EXAMPLE 1

Catalytic Conversion of Nitrogen to Ammonia by a Molecular Fe Model Complex

Nitrogen reduction to $NH_3$ is a requisite transformation for life.[1] While it is widely appreciated that the Fe-rich cofactors of nitrogenase enzymes facilitate this transformation,[2,3,4,5] how they do so remains poorly understood. A central element of debate has been the site(s) of nitrogen coordination and reduction.[6,7] The synthetic inorganic community placed an early emphasis on Mo[8] because Mo was thought to be an essential element of nitrogenases,[3] and because pioneering work by Chatt and his coworkers established that well-defined Mo model complexes could mediate the stoichiometric conversion of coordinated $N_2$ to $NH_3$.[9] Indeed, such a transformation has now been validated in a catalytic fashion by two well-defined molecular systems that feature Mo centres.[10,11] It is now thought that Fe is the only transition metal essential to all nitrogenases,[3] and recent biochemical and spectroscopic data has implicated Fe instead of Mo as the site of $N_2$ binding in the FeMo-cofactor.[12] These observations motivate a search for functional Fe catalysts. In this Example, we disclose a tris (phosphine)borane (TPB) supported Fe complex that catalyzes the reduction of $N_2$ to $NH_3$ under mild conditions, wherein >40% of the $H^+/e^-$ equivalents are delivered to $N_2$. These results intimate that a single Fe site is capable of stabilizing the various $N_xH_y$ intermediates generated en route to catalytic $NH_3$ formation. Geometric tunability at Fe imparted by a flexible Fe—B interaction in the model system appears to be important for efficient catalysis.[13,14,15] The results also support the interpretation that the interstitial light C-atom recently assigned in the nitrogenase cofactor may play a similar role,[16,17] potentially enabling a single Fe site to mediate the enzymatic catalysis via a flexible Fe—C interaction.[18]

Figure 2:
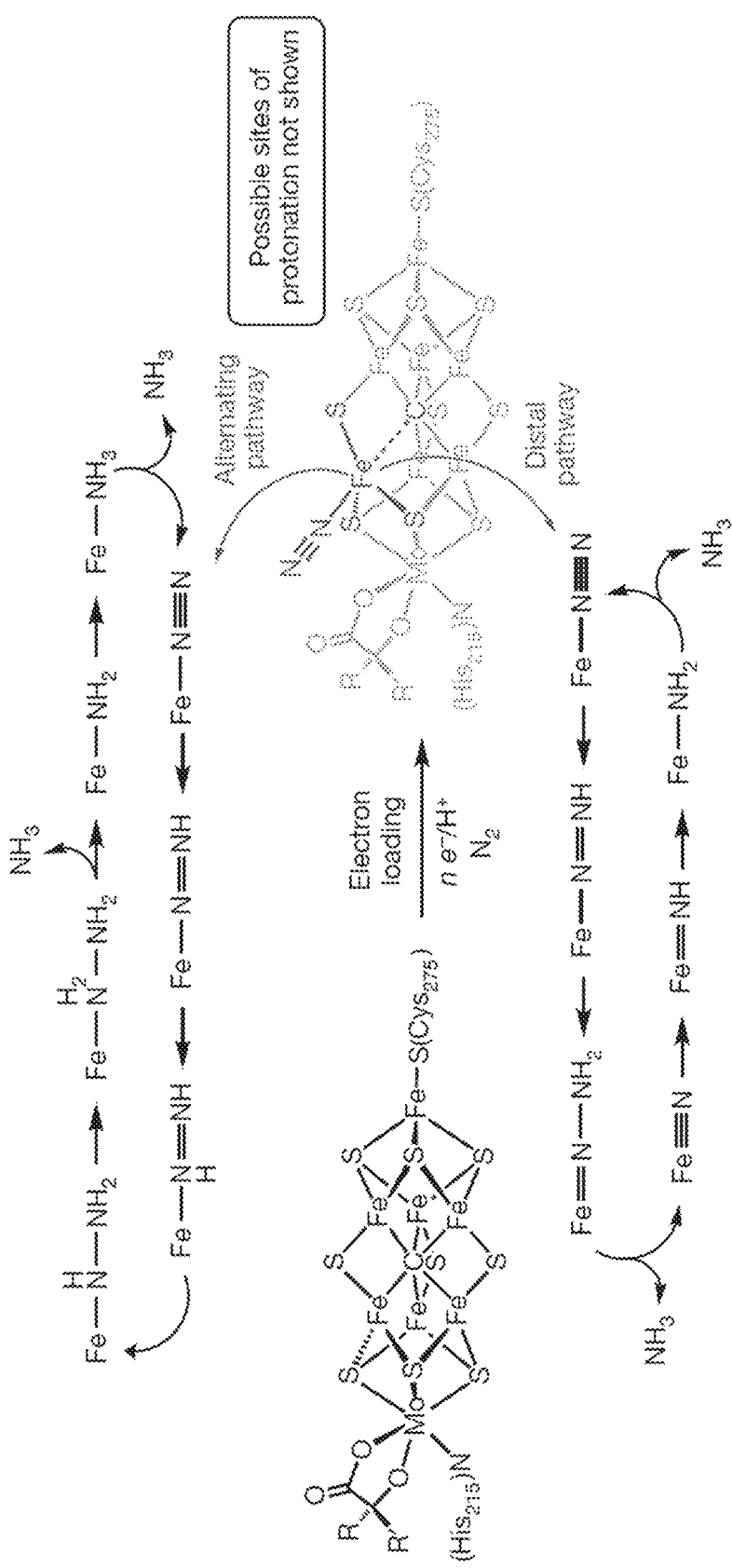
FIG. 2. Chemical line representations of the FeMo-cofactor of nitrogenase. A schematic depiction of N$_2$ binding and reduction at an Fe site via limiting alternating (top) and distal (bottom) mechanisms. The drawing emphasizes a possible hemi-labile role for the interstitial C-atom with respect to an Fe—N$_2$ binding site.

Nitrogen is fixed on a staggering scale by the industrial Haber-Bosch process using a solid-state Fe catalyst at very high temperatures and pressures, and in nature by nitrogenase enzymes under ambient conditions.[1] These enzymes feature active site cofactors rich in S and Fe (FeFe-cofactor), and can additionally contain a Mo (FeMo-cofactor; FIG. 2) or V (FeV-cofactor) site.[2,3]

The intimate mechanism of biological nitrogen fixation is a topic that has fascinated chemists, biochemists, and biologists alike.[4,5,6,7] Synthetic chemists have searched for decades for well-defined complexes that can catalyze $N_2$ reduction to $NH_3$.[19,20,21,22] Chatt's early work with low-valent Mo complexes provided a mechanistic outline for approaching this problem now commonly called the "Chatt" or "distal" mechanism, wherein a terminal nitride intermediate is generated upon liberation of the first $NH_3$ equivalent (FIG. 2, bottom).[9] Other mechanisms, including an "alternating" scenario (FIG. 2, top), have also received attention.[6]

To date, even modest catalysis of $NH_3$ production directly from $N_2$ by a well-defined model complex is still limited to the original tri(amido)amine Mo systems of Schrock and coworkers, and the more recently discovered phosphine-pincer Mo system of Nishibayashi and coworkers.[10,11] Earlier work by Pickett had established the electrochemical feasibility of an $NH_3$ production cycle with W.[19]

Synthetic efforts to establish whether one or more Fe sites can catalyze $N_2$ reduction to $NH_3$ in a well-defined model complex have progressed more slowly. For example, previous Fe—$N_2$ model complexes have not afforded more than ca. 10% of $NH_3$ per Fe equivalent upon treatment with proton sources.[7,23,24] Despite significant advances,[24] which have most recently included reductive $N_2$ cleavage at iron[22] and the catalytic reductive silylation of $N_2$ facilitated by unknown Fe species derived from Fe precursors such as ferrocene and iron pentacarbonyl,[25] the delivery of protons and electrons to $N_2$ to catalytically generate $NH_3$ at a synthetic Fe complex has remained an unsolved challenge. Here we show that a mononuclear Fe complex, [(TPB)Fe($N_2$)][Na(12-crown-4)$_2$] (TPB=tris(phosphine)borane; see FIG. 3A)[13,14] can catalyze the reduction of $N_2$ to $NH_3$ by protons and electrons in solution at −78° C. under one atmosphere of $N_2$.

Figure 3:
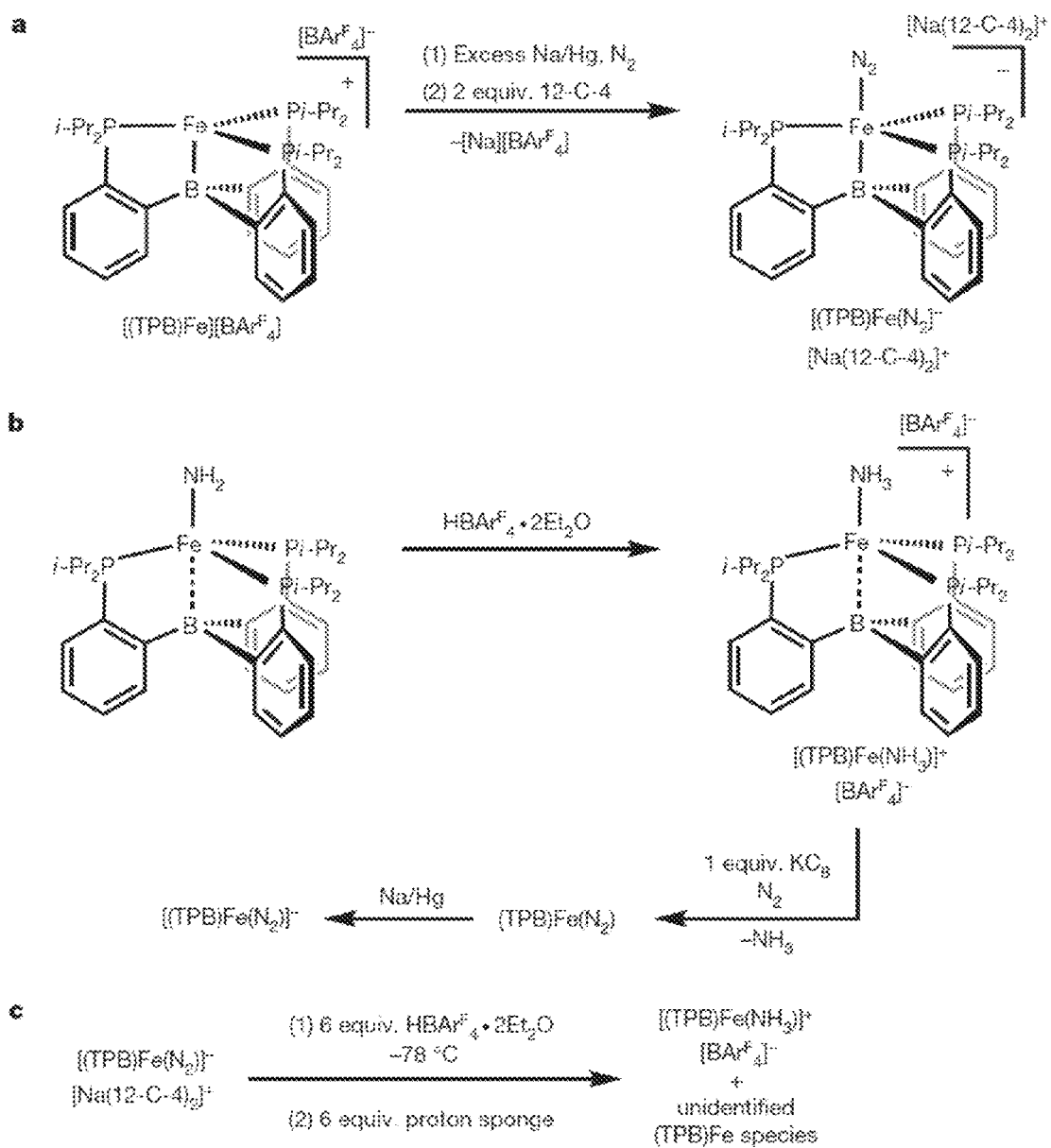
FIG. 3. Stoichiometric (TPB)Fe—N$_2$ model reactions. (a) N$_2$ binding to [(TPB)Fe][BAr$^F_4$] under electron-loading to generate [(TPB)Fe(N$_2$)][Na(12-crown-4)$_2$]. (b) Reductive protonolysis of (TPB)Fe(NH$_2$) to release NH$_3$ with concomitant N$_2$ uptake. (c) Generation of [(TPB)Fe(NH$_3$)][BAr$^F_4$] and other (TPB)Fe-species upon addition of acid to [(TPB)Fe(N$_2$)][Na(12-crown-4)$_2$] at low temperature, followed by warming and then addition of base. 12-C-4 is an abbreviation for 12-crown-4. Note: TPB=tris(phosphine) borane.

The Fe center of the "(TPB)Fe" fragment readily binds dinitrogen as evidenced by the featured 5-coordinate complex [(TPB)Fe($N_2$)][Na(12-crown-4)$_2$] and the neutral $N_2$ adduct, (TPB)Fe($N_2$).[14] The same scaffold also accommodates a variety of other nitrogenous ligands relevant to $NH_3$ generation, including terminally bonded $NH_2$, $NH_3$, and $N_2H_4$ ligands.[15] Both the substrate-free complex, [(TPB)Fe][BAr$^F_4$] (where [BAr$^F_4$]− represents the weakly coordinating anion [B(3,5-($CF_3$)$_2$—$C_6H_3$)$_4$]−),[15] and (TPB)Fe($N_2$) may be reduced to [(TPB)Fe($N_2$)][Na(12-crown-4)$_2$] by Na/Hg reduction under 1 atm $N_2$ followed by the addition of two equivalents of 12-crown-4 to encapsulate the sodium cation (FIG. 3A). Model reactions with silyl electrophiles have also shown that the β-N of the coordinated $N_2$ ligand can be mono- or difunctionalized with concomitant lengthening of the Fe—B distance.[13] Furthermore, starting from (TPB)Fe($NH_2$), a reductive protonation sequence has been established (FIG. 3B) that liberates $NH_3$ and affords (TPB)Fe($N_2$).[15] This reaction sequence demonstrates the synthetic viability of reductive release of $NH_3$ from an Fe—$NH_2$ intermediate with simultaneous uptake of $N_2$. In sum, the rich reaction chemistry of the (TPB)Fe scaffold with nitrogenous ligands supports the possibility that it might catalyze $N_2$ fixation.

The addition of excess acid to [(TPB)Fe($N_2$)][Na(12-crown-4)$_2$] at −78° C. was investigated. When [(TPB)Fe($N_2$)][Na(12-crown-4)$_2$] was dissolved in THF, cooled to −78° C., and exposed to six equivalents of $H^+$ in the form of HBAr$^F_4$.2 Et$_2$O, a previously unobserved yellow solution resulted that, upon warming followed by addition of proton sponge (1,8-bis(dimethylamino)naphthalene), was shown by $^1H$ NMR analysis to contain the complex [(TPB)Fe($NH_3$)][BAr$^F_4$] (ca. 30-35% of the total Fe),[15] along with resonances consistent with [(TPB)Fe][BAr$^F_4$] (ca. 40-45% of the total Fe) and two other minor and as yet unidentified paramagnetic (TPB)Fe-species (see Sl). An independent EPR study of this low temperature protonation reaction in 2-methyltetrahydrofuran revealed a new rhombic S=½ signal (see Sl) that we speculate may be (TPB)Fe(=N—$NH_2$)+ or an alternative structural isomer such as (TPB)Fe (NH=NH)+. Spin quantification of this species shows it to represent >85% of the Fe species in solution, and its rhombic EPR spectrum is highly similar to the rhombic EPR signature that is obtained upon oxidation of (TPB)Fe=N(p-tolyl) to generate (TPB)Fe=N(p-tolyl)$^+$ (SI). Subsequent low temperature reduction of a similarly prepared mixture regenerates [(TPB)FeN$_2$][Na(12-crown-4)$_2$], as determined by IR spectroscopy, suggesting the possibility of cycling protonation and reduction with this Fe system.

To explore the possibility of N$_2$ reduction catalysis using this (TPB)Fe system, we canvassed several reductants (e.g., Na[naphthalenide], Mg(THF)$_3$(anthracene), Na/Hg, KC$_8$) and acids (e.g., HCl, trifluoromethanesulfonic acid, HBAr$^F_4$.2 Et$_2$O) in a variety of solvents and solvent mixtures (e.g., tetrahydrofuran, dimethoxyethane, diethyl ether, toluene). When carried out at −78° C. numerous reaction conditions showed unusually high yields of NH$_3$ relative to the number of Fe equivalents in the reaction vessel, and the combination of KC$_8$, HBAr$^F_4$.2 Et$_2$O, and Et$_2$O solvent enabled the catalytic generation of NH$_3$.

Figure 4:
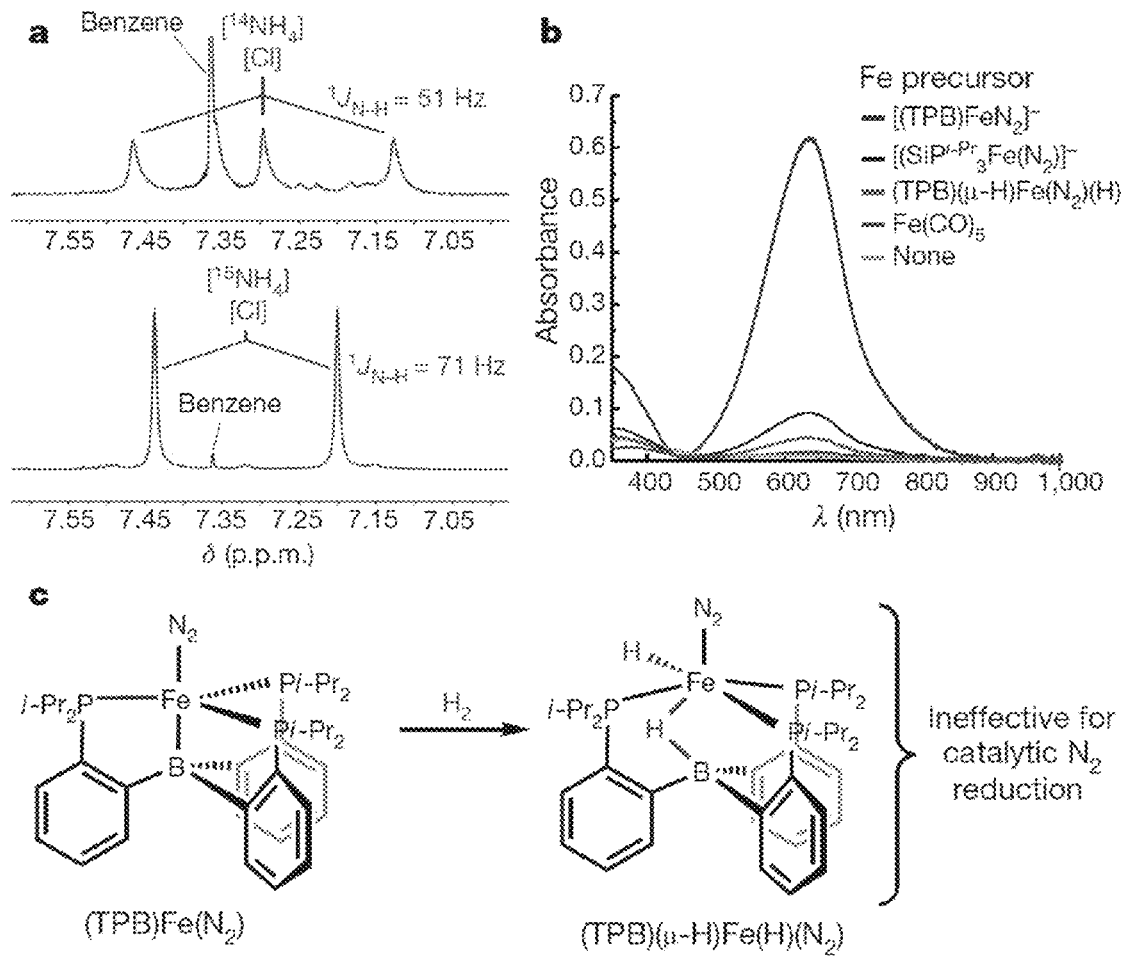
FIG. 4. Spectral data for ammonia analysis, and catalyst poisoning. (a) $^1$H NMR spectrum (300 MHz) of [$^{14}$NH$_4$][Cl] in DMSO-d$_6$ produced from a catalytic run under $^{14}$N$_2$ (top) and of [$^{15}$NH$_4$][Cl] in DMSO-d$_6$ produced from an independent catalytic run under 1 atm $^{15}$N$_2$. (b) Representative optical data for NH$_3$ product analysis using the indophenol method from catalytic runs using the standard conditions with the precursors indicated. (c) H$_2$ binds to (TPB)Fe(N$_2$) to generate (TPB)(μ-H)Fe(N$_2$)(H), which itself is ineffective for the catalytic generation of NH$_3$ from N$_2$ under the standard conditions. Note: TPB=tris(phosphine)borane; DMSO=dimethylsulfoxide.

In a representative catalytic run, red [(TPB)Fe(N$_2$)][Na(12-crown-4)$_2$] was suspended in diethyl ether in a reaction vessel at −78° C., followed by the sequential addition of excess acid and then excess reductant. Ammonia analysis followed the indophenol protocol (see Methods and SI) and the independent identification of ammonium salts by $^1$H NMR spectroscopy in DMSO by comparison with an authentic sample of [NH$_4$][Cl] (FIG. 4A). An experiment performed using the [(TPB)Fe($^{14}$N$_2$)][Na(12-crown-4)$_2$] catalyst under an $^{15}$N$_2$ atmosphere, followed by $^1$H NMR analysis (FIG. 4A) of the volatile reaction products, confirmed the production of [$^{15}$NH$_4$][Cl], as expected, with only trace [$^{14}$NH$_4$][Cl]. This overall procedure has been repeated many times, and Table 1 includes data averaged from 16 independent runs (entry 1) wherein yields were, on average, 7.0 equiv NH$_3$ per Fe equiv. Using 7.0 equiv NH$_3$ as the product stoichiometry, 44% of the added protons are reliably delivered to N$_2$ to produce NH$_3$. Individual runs have in our hands reached a maximum of 8.5 equiv NH$_3$ per Fe equiv under these standard conditions. [(TPB)Fe][BAr$^F_4$] is also an effective catalyst and afforded 6.2±0.7 equiv NH$_3$ per added Fe equivalent (Table 1, entry 2). For comparison, the Mo systems of Schrock and Nishibayashi have afforded between 7-12 equiv NH$_3$ per Mo equiv.[10,11] The current Fe system appears to be active at a low temperature (−78° C.) but benefits from a strong reductant (KC$_8$). Options for carrying out the process at higher temperatures may include circumventing generation of the (TPB)Fe(N$_2$)$^-$ anion during catalysis.

Table 1 lists several sets of conditions (entries 10-15) other than the standard conditions described above that were canvassed. Several of these alternative conditions showed NH$_3$ generation, though not in catalytic or in high yields. N$_2$H$_4$ was not detected (SI) as an additional product when using the standard catalytic protocol for NH$_3$ generation with [(TPB)Fe(N$_2$)][Na(12-crown-4)$_2$] (SI). If two equivalents N$_2$H$_4$ (per Fe) are added to [(TPB)Fe(N$_2$)][Na(12-crown-4)$_2$] in diethyl ether, followed by subjecting the mixture to the standard catalytic conditions and work-up, only trace N$_2$H$_4$ remains (SI). This result supports the understanding that if N$_2$H$_4$ is generated as an intermediate during catalysis it would not likely be detectable upon work-up and analysis. Worth noting is that HBAr$^F_4$.2 Et$_2$O and KC$_8$ reacts in the absence of an Fe precursor, under the standard catalytic conditions at −78° C., to generate H$_2$ but not NH$_3$ (>75% yield of H$_2$ after 40 minutes). That H$_2$ generation is kinetically feasible without the addition of an Fe precursor, and yet NH$_3$ can nonetheless be generated upon the addition of [(TPB)Fe(N$_2$)][Na(12-crown-4)$_2$] or [(TPB)Fe][BAr$^F_4$], underscores the facility by which this Fe system mediates overall H-atom delivery to N$_2$.

To further explore whether a (TPB)Fe containing precursor is needed to facilitate the overall catalysis, beyond the stoichiometric model reactions summarized above, we canvassed several Fe complexes under analogous conditions. Of most interest is the complex [(SiP$^{iPr}_3$)Fe(N$_2$)][Na(12-crown-4)$_2$], which is isostructural to [(TPB)Fe(N$_2$)][Na(12-crown-4)$_2$] but replaces the B atom of TPB by a Si atom.[26] A central difference between (TPB)Fe and (SiP$^{iPr}_3$)Fe complexes is the far great flexibility of the Fe—B versus the Fe—Si bond that is positioned trans to the apical ligand.[13,14,15,26] While some NH$_3$ generation was observed for [(SiP$^{iPr}_3$)Fe(N$_2$)][Na(12-crown-4)$_2$] when subjected to the standard catalytic reaction conditions described above, sub-stoichiometric yields of NH$_3$ relative to Fe were obtained (0.7±0.5 equiv NH$_3$ per Fe equiv; entry 3). We also conducted additional control experiments under the standard catalytic conditions with FeCl$_2$.1.5 THF, FeCl$_3$, Cp$_2$Fe,[25] and Fe(CO)$_5$[25] (entries 5-8) and found that only trace amounts of NH$_3$ (<0.2 equiv in all cases on average; 4 runs) were produced by these Fe precursors (SI).[27] The known phosphine-supported Fe(0)-N$_2$ complex Fe(depe)$_2$(N$_2$)[28] was also subjected to the standard conditions and afforded sub-stoichiometric yields of NH$_3$ per Fe equivalent.

In separate work, the addition of an atmosphere of H$_2$ to (TPB)Fe(N$_2$) was shown to generate (TPB)(μ-H)Fe(N$_2$)(H) as a stable product (FIG. 4C).[29] We hence suspect that catalyst poisoning might occur in part via the formation of (TPB)(μ-H)Fe(N$_2$)(H) under the catalytic reaction conditions. In accord with this idea, when [(TPB)Fe(N$_2$)][Na(12-crown-4)$_2$] was exposed to 10 equiv HBAr$^F_4$.2 Et$_2$O and 12 equiv KC$_8$ at low temperature, IR and $^{31}$P NMR analysis of the resulting mixture showed the presence of (TPB)(μ-H)Fe(N$_2$)(H) via its signature spectroscopic features (30% of total Fe by $^{31}$P NMR integration; SI).[29] (TPB)(μ-H)Fe(N$_2$)(H) is stable for short periods to both HBAr$^F_4$.2 Et$_2$O and also KC$_8$ in Et$_2$O at room temperature, and when subjected to the standard catalytic conditions for NH$_3$ production liberates only 0.5±0.1 equiv NH$_3$ per Fe equiv (Table 1 entry 4).

The general absence of a functional, catalytic Fe model system over the past few decades has often led to an emphasis on Mo[30] as a plausible site of N$_2$ uptake and reduction at the most widely studied FeMo-cofactor. While this may yet prove to be true, recent spectroscopic and biochemical evidence has sharpened the focus on an Fe center as the N$_2$ binding site.[12] The results provided in this Example establish that it is possible to catalyze the conversion of N$_2$ to NH$_3$ by protons and electrons using a well-defined mononuclear Fe—N$_2$ complex, and suggests the possibility that a single Fe-binding site of the cofactor could in principle mediate N$_2$ reduction catalysis.[18] To achieve this catalytic behavior, geometric flexibility at the Fe—N$_2$ binding site is beneficial in some embodiments as it would stabilize N$_x$H$_y$ intermediates of different electronic demands. Such geometric and redox flexibility, under the local three-fold symmetry presented by an Fe center, its three neighboring sulfides, and the interstitial light atom of the FeMo-co,[16,17] may at least in part be achieved by attributing a hemi-labile role to the interstitial C-atom (FIG. 2). Such a role could serve to expose an initial Fe—N$_2$ binding site by Fe—C elongation. Subsequent modulation of the Fe—C interaction and hence the local Fe geometry as a function of the N$_2$ reduction state would enable the Fe center to stabilize the various N$_x$H$_y$ intermediates along a pathway to NH$_3$. This approach is rooted in the functional (TPB)Fe catalysis described herein, along with the types of (TPB)Fe complexes and stoichiometric transformations described for this scaffold.[13,14,15]

While all of the model complexes relevant to the (TPB)Fe—$N_xH_y$ system are mononuclear, there is a possibility of bimolecular reaction intermediates. The $N_2$ reduction catalysis may proceed along a distal pathway via a terminal nitride intermediate, such as (TPB)Fe(N) or (TPB)Fe(N)$^+$, via intermediates along an alternating pathway, such as (TPB)Fe—NH—$NH_2$ or (TPB)Fe—$NH_2$—$NH_2^+$, or via some hybrid pathway. The assigned (TPB)Fe=N—$NH_2^+$ species that can be observed by EPR spectroscopy provides us a useful starting point for addressing this issue. In light of the identification of C as the interstitial light atom of the cofactor, it is also of interest to develop and compare synthetic model systems that feature a C-atom in the ligand backbone instead of a B-atom.

TABLE 1

Catalytic ammonia generation from N2 mediated by Fe precursors.

Using standard catalytic conditions as described in the text

| Entry | Fe precursor | $NH_3$ equiv/Fe[a,b,c] |
|---|---|---|
| 1 | [(TPB)Fe($N_2$)][Na(12-crown-4)$_2$] | 7.0 ± 1[d] |
| 2 | [(TPB)Fe][BAr$^F_4$] | 6.2 |
| 3 | [(SiP$^{iPr}_3$)Fe($N_2$)][Na(12-crown-4)$_2$] | 0.7 |
| 4 | (TPB)(μ-H)Fe($N_2$)(H) | 0.5 |
| 5 | $FeCl_2 \cdot 1.5$ THF | <0.1 |
| 6 | $FeCl_3$ | <0.1 |
| 7 | $Cp_2Fe$ | <0.2 |
| 8 | $Fe(CO)_5$ | <0.1 |
| 9 | None | <0.1 |

Variations on standard conditions using [(TPB)Fe$N_2$][Na(12-crown-4)$_2$]

| Entry | Variation | $NH_3$ equiv/Fe[a,b,c] |
|---|---|---|
| 10 | HOTf as acid[e] | 0.4 |
| 11 | [Lutidinium][BAr$^F_4$] as acid | <0.1 |
| 12 | HCl as acid | <0.1 |
| 13 | Cp*$_2$Co as reductant | 0.6 |
| 14 | Cp*$_2$Cr as reductant | <0.2 |
| 15 | K metal as reductant | 0.4 |

[a]$NH_3$ was collected by vacuum transfer of the reaction volatiles into HCl in diethyl ether. A dimethoxyethane solution of [Na][O$^t$Bu] (20 equiv relative to Fe) was added to the reaction vessel residue, followed by an additional vacuum transfer, to ensure complete liberation of all $NH_3$. The [$NH_4$][Cl] precipitate formed in the acidic $Et_2O$ collection vessel was reconstituted in deionized $H_2O$, from which an aliquot was taken for indophenol quantification. Analysis of the [$NH_4$][Cl] formed by $^1$H NMR spectroscopy in DMSO, compared with an authentic sample, provided independent confirmation of $NH_3$ generation.
[b]Data for individual experimental runs, and additional runs using potential precatalysts that are not presented in this table, are provided in the SI.
[c]Unless noted otherwise, all yields are reported as an average of 4 runs.
[d]Average of 16 runs.
[e]HOTf = trifluoromethanesulfonic acid.

Methods Summary

General considerations. All complexes and reagents were prepared according to literature procedures referenced herein unless otherwise noted. Manipulations were carried out under an $N_2$ atmosphere utilizing standard dry glove-box or Schlenk-line techniques. All solvents used were deoxygenated and dried by an argon sparge followed by passage through an activated alumina column. Spectroscopy. NMR measurements were obtained on Varian 300 MHz spectrometers. Deuterated solvents for these measurements were obtained from Cambridge Isotope Laboratories and were dried and degassed prior to use. All $^1$H NMR spectra were referenced to residual solvent peaks. EPR X-band spectra were obtained on a Bruker EMX spectrometer with the aid of the Bruker Win-EPR software suite version 3.0. The EPR spectrometer was equipped with a rectangular cavity that operated in the $TE_{102}$ mode. Temperature control was achieved with a liquid-$N_2$-filled quartz-dewar in which the sample was submerged during data collection. UV-Vis spectra were acquired on a Cary 50 spectrometer from 1100 nm to 200 nm in the fast scan mode. IR spectra were obtained via KBr pellets on a Bio-Rad Excalibur FTS 3000 spectrometer using Varian Resolutions Pro software set at 4 cm$^{-1}$ resolution.

Catalysis and Ammonia Collection and Quantification. The standard catalysis protocol involved the addition first of acid, followed by reductant, to a suspension of the precatalyst in diethyl ether at −78° C. in a closed vessel under 1 atm $N_{-2}$. Ammonia produced during each catalytic run was collected by vacuum transfer of the reaction volatiles onto anhydrous HCl in diethyl ether. The resulting slurry was dried and extracted into water and aliquots were then tested for the presence of ammonia via the indophenol method.

Methods

General Considerations. [(TPB)Fe($N_2$)][Na(12-crown-4)$_2$],[14] [(TPB)Fe][BAr$^F_4$],[15] (TPB)(μ-H)Fe(H)($N_2$),[29] [Lutidinium][BAr$^F_4$],[31] HBAr$^F_4$·2 $Et_2O$,[32] [(SiP$^{iPr}_3$)Fe($N_2$)][Na(12-crown-4)$_2$],[26] $FeCl_2$·(THF)$_{1.5}$,[33] $KC_8$,[34] [(TPB)Fe($NH_3$)][BAr$^F_4$],[15] [(TPB)Fe($N_2H_4$)][BAr$^F_4$],[15] and Fe(depe)$_2$$N_2$[28] were prepared according to literature procedures. Note: [Lutidinium]=2,6-dimethylpyridinium; [BAr$^F_4$]=[B(3,5-(CF$_3$)$_2$—C$_6$H$_3$)$_4$]$^-$. Labeled $^{15}N_2$ (98% purity) was obtained from Cambridge Isotope Laboratories. Solvents used for catalytic runs were additionally stirred for more than 2 hours over Na/K alloy and then filtered prior to use, in addition to standard sparging (Ar gas) and passage through an activated alumina column.

Ammonia Quantification. A Schlenk tube was charged with HCl (3 mL of a 2.0 M solution in $Et_2O$, 6 mmol). Reaction mixtures were vacuum transferred into this collection flask. Residual solid in the reaction vessel was treated with a solution of [Na][O-t-Bu] (40 mg, 0.4 mmol) in 1,2-dimethoxyethane (1 mL) and sealed. The resulting suspension was allowed to stir for 10 minutes before all volatiles were again vacuum transferred into the collection flask. After completion of the vacuum transfer, the flask was sealed and warmed to room temperature. Solvent was removed in vacuo and the remaining residue was dissolved in $H_2O$ (1 mL). An aliquot of this solution (20 or 40 μL) was then analyzed for the presence of $NH_3$ (trapped as [$NH_4$][Cl]) via the indophenol method.[35] Quantification was performed with UV-Vis spectroscopy by analyzing absorbance at 635 nm. The tables shown indicate the raw data for the runs. Runs with small absorbance levels (<0.02 absorbance units) suffer from a large degree of error due to a small signal-to-noise ratio. Catalytic runs that used a 40 μL aliquot are denoted with an asterisk, accounting for larger relative absorbances.

Standard Catalytic Protocol. [(TPB)Fe($N_2$)][Na(12-crown-4)$_2$] (2 mg, 0.002 mmol) was suspended in $Et_2O$ (0.5 mL) in a 20 mL scintillation vial equipped with a stir bar. This suspension was vigorously stirred and cooled to −78° C. in a cold well inside of the glove box. A similarly cooled solution of HBAr$^F_4$·2 $Et_2O$ (93 mg, 0.092 mmol) in $Et_2O$ (1.5 mL) was added to the suspension in one portion with rapid stirring. Any remaining acid was dissolved in cold $Et_2O$ (0.25 mL) and added subsequently. The reaction mixture turned light yellow-orange and homogeneous upon addition of acid and the resulting solution was allowed to stir for 5 minutes before being transferred into a pre-cooled Schlenk tube equipped with a stirbar. The original reaction vial was washed with cold $Et_2O$ (0.25 mL) and was subsequently transferred to the Schlenk tube. Solid $KC_8$ (15 mg, 0.100 mmol) was suspended in cold Et$_2$O (0.75 mL) and added dropwise to the rapidly stirred solution in the Schlenk tube and was then tightly sealed. The reaction was allowed to stir for 40 minutes at −78° C. before being warmed to room temperature and stirred for 15 minutes.

REFERENCES (1) Smil, V. *Enriching the Earth*. Cambridge, Mass., MIT Press (2001).
(2) Burgess, B. K. & Lowe, D. J. Mechanism of molybdenum nitrogenase. *Chem. Rev.* 96, 2983-3011 (1996).
(3) Eady, R. R. Structure-function relationships of alternative nitrogenases. *Chem. Rev.* 96, 3013-3030 (1996).
(4) Howard, J. B. & Rees, D. C. How many metals does it take to fix N$_2$? A mechanistic overview of biological nitrogen fixation. *Proc. Natl. Acad. Sci. U.S.A.* 103, 17088-17093 (2006).
(5) Schwarz, G., Mendel R. R. & Ribbe, M. W. Molybdenum cofactors, enzymes and pathways. *Nature* 460, 839-847 (2009)
(6) Seefeldt, L., Hoffman, B. M. & Dean, D. R. Mechanism of Mo-dependent nitrogenase. *Annu. Rev. Biochem.*, 78, 701-722 (2009)
(7) Peters, J. C. & Mehn, M. P. in *Bio-organometallic Approaches to Nitrogen Fixation Chemistry Activation of Small Molecules*, Tolman, W. B. Ed. (Wiley-VCH, 2006) pp. 81-119.
(8) Shilov, A. E. et al. New nitrogenase model for reduction of molecular nitrogen in protonic media. *Nature* 231, 460-461 (1971).
(9) Chatt, J., Dilworth, J. R. & Richards, R. L. Recent advances in chemistry of nitrogen-fixation. *Chem. Rev.* 78, 589-625 (1978).
(10) Yandulov, D. V. & Schrock R. R. Catalytic reduction of dinitrogen to ammonia at a single molybdenum center. *Science* 301, 76-78 (2003).
(11) Arashiba, A., Miyake, Y. & Nishibayashi, Y. A molybdenum complex bearing PNP-type pincer ligands leads to the catalytic reduction of dinitrogen into ammonia. *Nature Chem.* 3, 120-125 (2011).
(12) Hoffman, B. M., Dean, D. R. & Seefeldt, L. C. Climbing nitrogenase: toward a mechanism of enzymatic nitrogen fixation. *Acc. Chem. Res.* 42, 609-619 (2009).
(13) Moret, M.-E. & Peters, J. C. N$_2$ functionalization at iron metallaboratranes. *J. Am. Chem. Soc.* 133, 18118-18121 (2011).
(14) Moret, M.-E. & Peters, J. C. Terminal iron dinitrogen and iron imide complexes supported by a tris(phosphino)borane ligand. *Angew. Chem. Int. Ed.* 50, 2063-2067 (2011).
(15) Anderson, J. A., Moret, M.-E. & Peters, J. C. Conversion of Fe—NH$_2$ to Fe—N$_2$ with release of NH$_3$. *J. Am. Chem. Soc.* 135, 534-537 (2013).
(16) K. M. Lancaster et al. X-ray emission spectroscopy evidences a central carbon in the nitrogenase iron-molybdenum cofactor. *Science* 334, 974-977 (2011).
(17) T. M. Spatzal et al. Evidence for interstitial carbon in nitrogenase FeMo cofactor. *Science* 334, 940-940 (2011).
(18) M. P. Hendrich et al. On the feasibility of N$_2$ fixation via a single-site Fe$^I$/Fe$^{IV}$ cycle: Spectroscopic studies of Fe$^I$(N$_2$)Fe$^I$, Fe$^{IV}$≡N, and related species. *Proc. Natl. Acad. Sci. U.S.A.* 103, 17107-17112 (2006).
(19) Pickett, C. J. & Talarmin J. Electrosynthesis of ammonia. *Nature* 317, 652-653 (1985).
(20) Fryzuk, M. D., Love, J. B., Rettig, S. J. & Young, V. G. Transformation of coordinated dinitrogen by reaction with dihydrogen and primary silanes. *Science* 275, 1445-1447 (1997).
(21) Pool, J. A., Lobkovsky, E. & Chirik, P. J. Hydrogenation and cleavage of dinitrogen to ammonia with a zirconium complex. *Nature* 427, 527-530 (2004).
(22) Rodriguez, M. M., Bill, E., Brennessel, W. W. & Holland, P. L. N$_2$ reduction and hydrogenation to ammonia by a molecular iron-potassium complex. *Science* 334, 780-783 (2011).
(23) Hills, A. et al. Bis[1,2-bis(dimethylphosphino)ethane] dihydrogenhydridoiron(II) tetraphenylborate as a model for the function of nitrogenases. *J. Chem. Soc. Dalton Trans.* 25, 3041-3049 (1993).
(24) Crossland, J. L. & Tyler, D. R. Iron-dinitrogen coordination chemistry: Dinitrogen activation and reactivity. *Coord. Chem. Rev.* 255, 949-974 (2011).
(25) Yuki, M., Tanaka, H., Miyake, Y., Yoshizawa, K. & Nishibayashi, Y. Iron-catalysed transformation of molecular dinitrogen into silylamine under ambient conditions. *Nature Comm.* 3, 1254 (2012).
(26) Lee, Y. H., Mankad, N. P. & Peters, J. C. Triggering N$_2$ uptake via redox-induced expulsion of coordinated NH$_3$ and N$_2$ silylation at trigonal bipyramidal iron. *Nature Chem.* 2, 558-565 (2010).
(27) Bell, L. G. & Brintzinger, H. H. Stoichiometric reduction of molecular nitrogen by iron complexes. *J. Am. Chem. Soc.* 92, 4464-4465 (1970).
(28) D. A. Hall, G. J. Leigh, *J. Chem. Soc., Dalton*, 3539-3541 (1996).
(29) Fong, H., Moret, M.-E., Lee, Y. H. & Peters, J. C. Heterolytic H$_2$ cleavage and catalytic hydrogenation by an iron metallaboratrane. *Organometallics* 32, 3053-3062 (2013).
(30) Schrock, R. R. Nitrogen reduction: molybdenum does it again. *Nature Chem.* 3, 95-96 (2011).
(31) Yandulov, D. V. & Schrock, R. R. Reduction of dinitrogen to ammonia at a well-protected reaction site in a molybdenum triamidoamine complex. *J. Am. Chem. Soc.* 124, 6252-6253 (2002).
(32) Brookhart, M., Grant, B. & Volpe Jr., A. F. [(3,5-(CF$_3$)$_2$C$_6$H$_3$)$_4$B]$^-$[H(OEt$_2$)$_2$]$^+$: a convenient reagent for generation and stabilization of cationic, highly electrophilic organometallic complexes. *Organometallics* 11, 3920-3922 (1992).
(33) Kern, R. J. Tetrahydrofuran complexes of transition metal chlorides. *J. Inorg. Nucl. Chem.* 24, 1105-1109 (1962).
(34) Wietz, I. S. & Rabinovitz, M. The application of C$_8$K for organic synthesis: reduction of substituted naphthalenes. *J. Chem. Soc., Perkin Trans.* 1, 117-120 (1993).
(35) Komiya, S. et al., Isolation of a zerovalent iron dinitrogen complex with 1,2-bis(diethylphosphino)ethane ligands. *J. Chem. Soc., Chem. Commun.* 1993, 787-788.
(36) Weatherburn, M. W. Phenol-hypochlorite reaction for determination of ammonia. *Anal. Chem.* 39, 971 (1967).
(37) Watt, G. W. & Chrisp, J. D. A Spectrophotometric Method for the Determination of Hydrazine. *Anal. Chem.* 24, 2006 (1952).

General Considerations

Unless otherwise noted, all compounds were purchased from commercial sources and used without further purification. [(TPB)Fe(N$_2$)][Na(12-crown-4)$_2$],[14] [(TPB)Fe][BAr$^F_4$],[15] (TPB)(μ-H)Fe(H)(N$_2$),[29] [Lutidinium][BAr$^F_4$],[31] HBAr$^F_4$.2 Et$_2$O,[32] [(SiP$^{iPr}_3$)Fe(N$_2$)][Na(12-crown-4)$_2$],[26] FeCl$_2$.1.5 THF,[33] KC$_8$,[34] [(TPB)Fe(NH$_3$)][BAr$^F_4$],[15] [(TPB)

Fe(N$_2$H$_4$)][BAr$^F_4$],[15] (TPB)Fe≡N(p-C$_6$H$_4$OMe),[14] and Fe(depe)$_2$N$_2$[35] were prepared according to literature procedures ([Lutidinium]=2,6-dimethylpyridinium, [BAr$^F_4$]=[B(3,5-(CF$_3$)$_2$—C$_6$H$_3$)$_4$B]$^-$). All manipulations were carried out under an N$_2$ atmosphere utilizing standard glovebox or Schlenk techniques. Solvents were dried and de-oxygenated by an argon sparge followed by passage through an activated alumina column purchased from S.G. Waters Company. Labeled $^{15}$N$_2$ (98% purity) was obtained from Cambridge Isotope Laboratories. Solvents for catalytic runs were additionally stirred for more than 2 hours over Na/K alloy then filtered prior to use.

IR Spectroscopy

IR spectra were obtained via KBr pellets on a Bio-Rad Excalibur FTS 3000 spectrometer using Varian Resolutions Pro software set at 4 cm$^{-1}$ resolution.

NMR Spectroscopy

NMR measurements were obtained on Varian 300 MHz or 500 MHz spectrometers. Deuterated solvents for these measurements were obtained from Cambridge Isotope Laboratories and were dried and degassed prior to use. All $^1$H NMR spectra were referenced to residual solvent peaks.

EPR Spectroscopy

EPR X-band spectra were obtained on a Bruker EMX spectrometer with the aid of Bruker Win-EPR software suite version 3.0. The spectrometer was equipped with a rectangular cavity which operated in the TE$_{102}$ mode. Temperature control was achieved with a liquid N$_2$ filled quartz dewar in which the sample was submerged during data collection.

UV-Visible Spectroscopy

UV-Visible spectra were taken on a Cary 50 spectrometer from 1100 nm to 200 nm in the fast scan mode. Samples were prepared in a 1 cm path length quartz cuvette. All samples had a blank sample background subtraction applied.

Standard Catalytic Protocol

[(TPB)Fe(N$_2$)][Na(12-crown-4)$_2$] (2 mg, 0.002 mmol) was suspended in Et$_2$O (0.5 mL) in a 20 mL scintillation vial equipped with a stir bar. This suspension was vigorously stirred and cooled to −78° C. in a cold well inside of the glove box. A similarly cooled solution of HBAr$^F_4$.2 Et$_2$O (93 mg, 0.092 mmol) in Et$_2$O (1.5 mL) was added to the suspension in one portion with rapid stirring. Any remaining acid was dissolved in cold Et$_2$O (0.25 mL) and added subsequently. The reaction mixture turned light yellow-orange and homogeneous upon addition of acid and the resulting solution was allowed to stir for 5 minutes before being transferred into a pre-cooled Schlenk tube equipped with a stir bar. The original reaction vial was washed with cold Et$_2$O (0.25 mL) which was subsequently transferred to the Schlenk tube. Solid KC$_8$ (15 mg, 0.100 mmol) was suspended in cold Et$_2$O (0.75 mL) and added dropwise to the rapidly stirred solution in the Schlenk tube which was then tightly sealed. The reaction was allowed to stir for 40 minutes at −78° C. before being warmed to room temperature and stirred for 15 minutes.

Ammonia Quantification

A Schlenk tube was charged with HCl (3 mL of a 2.0 M solution in Et$_2$O, 6 mmol). Reaction mixtures were vacuum transferred into this collection flask. Residual solid in the reaction vessel was treated with a solution of [Na][O-t-Bu] (40 mg, 0.4 mmol) in 1,2-dimethoxyethane (1 mL) and sealed. The resulting suspension was allowed to stir for 10 minutes before all volatiles were again vacuum transferred into the collection flask. After completion of the vacuum transfer, the flask was sealed and warmed to room temperature. Solvent was removed in vacuo and the remaining residue was dissolved in H$_2$O (1 mL). An aliquot of this solution (20 or 40 μL) was then analyzed for the presence of NH$_3$ (trapped as [NH$_4$][Cl]) via the indophenol method.[36] Quantification was performed with UV-Visible spectroscopy by analyzing the absorbance at 635 nm. The tables shown below list the raw data for the runs. Runs with small absorbance levels (<0.02 absorbance units) suffer from a large degree of error due to a small signal-to-noise ratio. Catalytic runs that used a 40 μL aliquot are denoted with an asterisk, accounting for larger relative absorbances.

TABLE 2

N$_2$ reduction catalysis absorption data using [(TPB)Fe(N$_2$)][Na(12-crown-4)$_2$].

| Run | Absorbance | Equiv NH$_3$/Fe | % Yield based on H$^+$ |
|---|---|---|---|
| A* | 1.095 | 6.52 | 40.7 |
| B* | 1.150 | 6.84 | 42.7 |
| C* | 0.724 | 4.30 | 26.9 |
| D* | 1.105 | 6.58 | 41.1 |
| E* | 1.165 | 6.93 | 43.3 |
| F* | 1.339 | 7.97 | 49.8 |
| G* | 1.050 | 6.25 | 39.1 |
| H* | 1.428 | 8.49 | 53.1 |
| I* | 1.418 | 8.44 | 52.7 |
| J* | 1.008 | 6.00 | 37.5 |
| L | 0.608 | 7.24 | 45.2 |
| M | 0.579 | 6.89 | 43.1 |
| N | 0.640 | 7.62 | 47.6 |
| O | 0.592 | 7.05 | 44.1 |
| P | 0.616 | 7.33 | 45.8 |

Catalytic Protocol Under $^{15}$N$_2$

Figure 8:
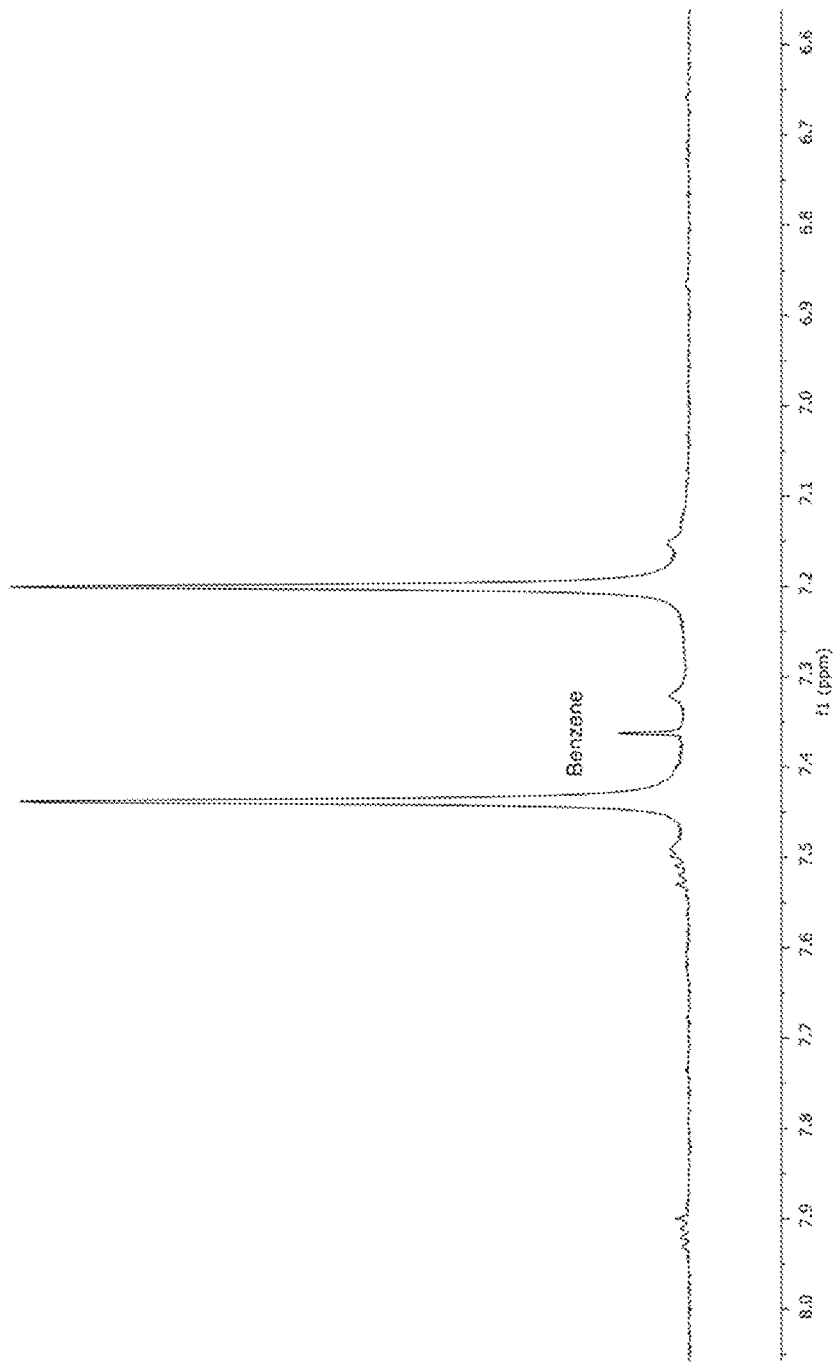
FIG. 8. $^1$H NMR spectrum of [$^{15}$NH$_4$][Cl] produced from [(TPB)Fe(N$_2$)][Na(12-crown-4)$_2$], HBAr$^F_4$.2 Et$_2$O, and KC$_8$ under $^{15}$N$_2$.
Figure 9:
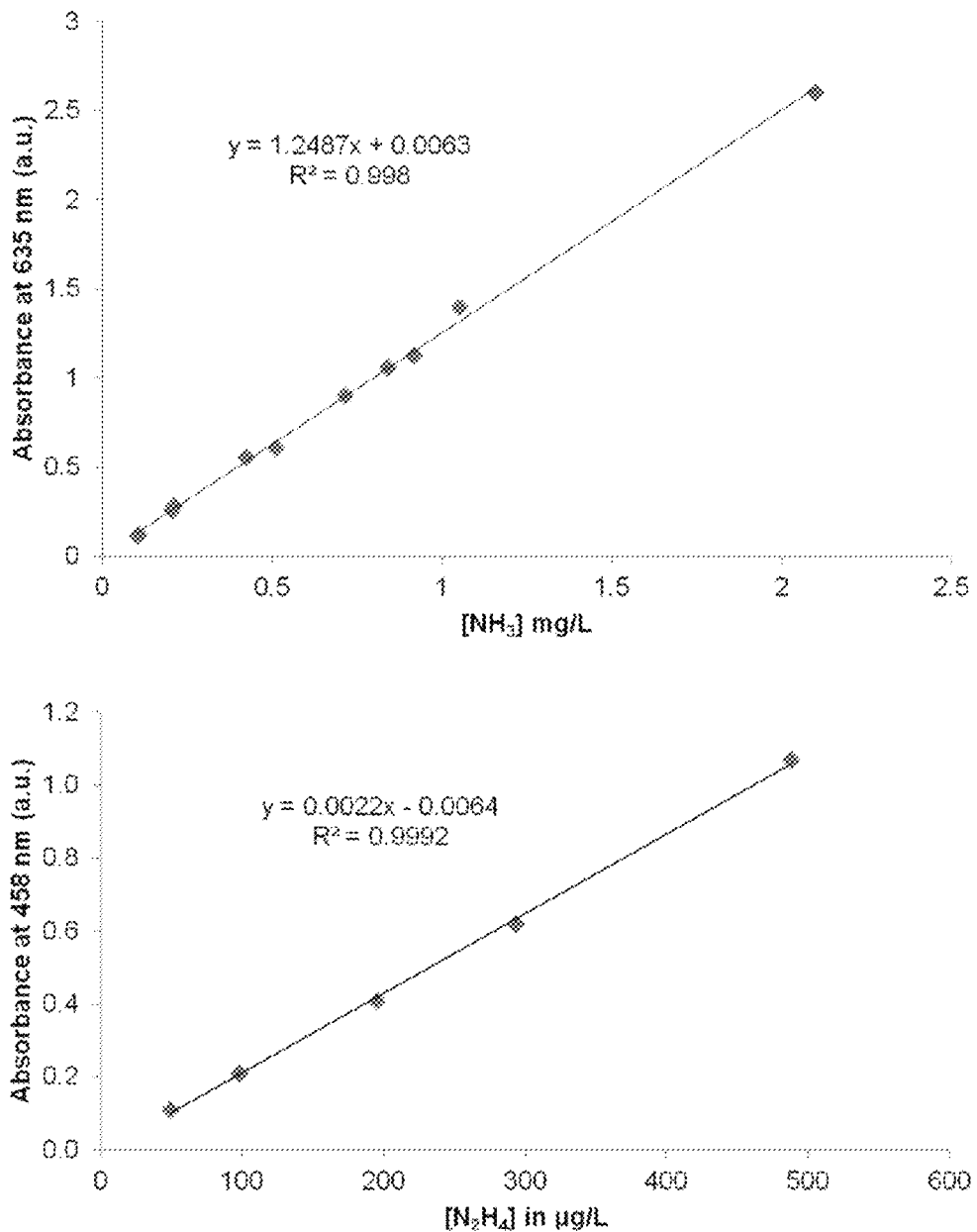
FIG. 9. Calibration curves for $NH_3$ and $N_2H_4$ UV-Vis quantification.

[(TPB)Fe(N$_2$)][Na(12-crown-4)$_2$] (4 mg, 0.004 mmol) was suspended in Et$_2$O (3 mL) in a 25 mL three neck flask (ground-glass, 14/20) equipped with a stir bar. The flask was then equipped with a stopcock adaptor in the central opening, a solid addition arm containing HBAr$^F_4$.2 Et$_2$O (188 mg, 0.186 mmol) in one of the side openings, and an additional solid addition arm containing KC$_8$ (37 mg, 0.274 mmol) in the final opening. The apparatus was sealed, brought out of the glovebox, and connected to a high-vacuum manifold. The solution was degassed via four freeze-pump-thaw cycles and then allowed to thaw to −78° C. with stirring. The flask was backfilled with 1 atm $^{15}$N$_2$. At this point the acid was added to the solution in one portion via the solid addition arm. The resulting solution was allowed to stir for 5 minutes before KC$_8$ was added via the other solid addition arm resulting in a dark suspension. This suspension was allowed to stir for 40 minutes at −78° C. and then an additional 10 minutes at room temperature prior to the standard work-up. The presence of [$^{15}$NH$_4$][Cl] was verified by $^1$H NMR spectroscopy (FIG. 8). The yield of NH$_3$ was 3.64 equiv NH$_3$/Fe as measured using the indophenol method. The NH$_3$ yield, while still showing catalysis, was lower than the average obtained by the standard protocol, presumably due to differences associated with adding the HBAr$^F_4$.2 Et$_2$O and KC$_8$ solids via the solid addition arms.

Runs with [(TPB)Fe][BAr$^F_4$] as Precursor

The procedure was identical to that of the standard catalytic protocol with the changes noted. The precursor used was [(TPB)Fe][BAr$^F_4$] (2.3 mg, 0.002 mmol) which is a dark orange solid. Note that [(TPB)Fe][BAr$^F_4$] was soluble in Et$_2$O and formed a yellow solution. No substantial color change was observed upon addition of acid.

TABLE 3

$N_2$ reduction catalysis absorption data using [(TPB)Fe][BAr$^F_4$].

| Run | Absorbance | Equiv NH$_3$/Fe | % Yield based on H$^+$ |
|---|---|---|---|
| A* | 1.169 | 6.96 | 43.5 |
| B* | 1.000 | 5.95 | 37.2 |
| C* | 0.911 | 5.42 | 33.9 |
| D* | 1.117 | 6.65 | 41.6 |

Runs with [(SiP$^{iPr}_3$)Fe(N$_2$)][Na(12-crown-4)$_2$] as Precursor

The procedure was identical to that of the standard catalytic protocol with the changes noted. The precursor used was [(SiP$^{iPr}_3$)Fe(N$_2$)][Na(12-crown-4)$_2$] (2 mg, 0.002 mmol) which is a dark purple solid.

TABLE 4

Attempted $N_2$ reduction catalysis absorption data using [(SiP$^{iPr}_3$)Fe(N$_2$)][Na(12-crown-4)$_2$].

| Run | Absorbance | Equiv NH$_3$/Fe | % Yield based on H$^+$ |
|---|---|---|---|
| A* | 0.203 | 1.21 | 7.5 |
| B* | 0.059 | 0.35 | 2.1 |
| C* | 0.064 | 0.38 | 2.3 |
| D* | 0.183 | 1.09 | 6.8 |

Runs with (TPB)(μ-H)Fe(H)(N$_2$) as Precursor

The procedure was identical to that of the standard catalytic protocol with the changes noted. The precursor used was (TPB)(μ-H)Fe(H)(N$_2$) (1.3 mg, 0.002 mmol) which is a yellow solid. Note that (TPB)(μ-H)Fe(H)(N$_2$) was insoluble in Et$_2$O and did not dissolve upon addition of acid. As such, the resulting mixture was a suspension through the remaining manipulations.

TABLE 5

Attempted $N_2$ reduction catalysis absorption data using (TPB)(μ-H)Fe(H)(N$_2$).

| Run | Absorbance | Equiv NH$_3$/Fe | % Yield based on H$^+$ |
|---|---|---|---|
| A* | 0.084 | 0.50 | 3.1 |
| B* | 0.072 | 0.43 | 2.7 |
| C | 0.035 | 0.42 | 2.6 |
| D | 0.055 | 0.65 | 4.1 |

Runs with FeCl$_2$·1.5 THF as Precursor

The procedure was identical to that of the standard catalytic protocol with the changes noted. The precursor used was FeCl$_2$·1.5 THF (0.5 mg, 0.002 mmol) which is an off white powder. Note that FeCl$_2$·1.5 THF did not dissolve upon addition of acid. As such, the resulting mixture was a suspension through the remaining manipulations.

TABLE 6

Attempted $N_2$ reduction catalysis absorption data using FeCl$_2$·1.5 THF.

| Run | Absorbance | Equiv NH$_3$/Fe | % Yield based on H$^+$ |
|---|---|---|---|
| A | 0.002 | 0.02 | 0.1 |
| B | 0.011 | 0.13 | 0.8 |
| C | 0.005 | 0.06 | 0.4 |
| D | 0.007 | 0.08 | 0.5 |

Runs with FeCl$_3$ as Precursor

The procedure was identical to that of the standard catalytic protocol with the changes noted. The precursor used was FeCl$_3$ (0.3 mg, 0.002 mmol) which is a dark solid. Note that FeCl$_3$ was soluble in Et$_2$O and formed a yellow solution. No substantial color change was observed upon addition of acid.

TABLE 7

Attempted $N_2$ reduction catalysis absorption data using FeCl$_3$.

| Run | Absorbance | Equiv NH$_3$/Fe | % Yield based on H$^+$ |
|---|---|---|---|
| A | −0.0021 | 0 | 0 |
| B | −0.0002 | 0 | 0 |
| C | 0.0002 | 0.002 | 0.01 |
| D | 0.0010 | 0.01 | 0.06 |

Runs with Fe(CO)$_5$ as Precursor

The procedure was identical to that of the standard catalytic protocol with the changes noted. The precursor used was Fe(CO)$_5$ (0.35 mg, 0.002 mmol) which is a pale yellow liquid. Note that Fe(CO)$_5$ was soluble in Et$_2$O and formed a colorless solution. No substantial color change was observed upon addition of acid.

TABLE 8

Attempted $N_2$ reduction catalysis absorption data using Fe(CO)$_5$.

| Run | Absorbance | Equiv NH$_3$/Fe | % Yield based on H$^+$ |
|---|---|---|---|
| A | 0.016 | 0.19 | 1.2 |
| B | 0.003 | 0.04 | 0.2 |
| C | 0.004 | 0.05 | 0.3 |
| D | 0.006 | 0.07 | 0.4 |

Runs with FeCp$_2$ as Precursor

The procedure was identical to that of the standard catalytic protocol with the changes noted. The precursor used was FeCp$_2$ (0.35 mg, 0.002 mmol) which is an orange solid. Note that FeCp$_2$ was soluble in Et$_2$O and formed a yellow solution. No substantial color change was observed upon addition of acid.

TABLE 9

Attempted $N_2$ reduction catalysis absorption data using FeCp$_2$.

| Run | Absorbance | Equiv NH$_3$/Fe | % Yield based on H$^+$ |
|---|---|---|---|
| A | 0.007 | 0.08 | 0.5 |
| B | 0.018 | 0.21 | 1.3 |
| C | 0.027 | 0.32 | 2.0 |
| D | 0.015 | 0.18 | 1.1 |

Runs without an Fe Precursor

The procedure was identical to that of the standard catalytic protocol with the changes noted. A 2 mL Et$_2$O solution of HBAr$^F_4$·2 Et$_2$O (93 mg, 0.092 mmol) was added directly into a Schlenk tube equipped with a stir bar and cooled to −78° C. Addition of KC$_8$ and subsequent work-up was identical to the standard catalytic protocol.

TABLE 10

Attempted $N_2$ reduction catalysis absorption data in the absence of an Fe precursor.

| Run | Absorbance | Equiv NH$_3$/Fe | % Yield based on H$^+$ |
|---|---|---|---|
| A | 0.015 | 0.18 | 1.1 |
| B | 0.005 | 0.06 | 0.4 |

TABLE 10-continued

Attempted $N_2$ reduction catalysis absorption data in the absence of an Fe precursor.

| Run | Absorbance | Equiv $NH_3$/Fe | % Yield based on $H^+$ |
|---|---|---|---|
| C | 0.006 | 0.07 | 0.4 |
| D | 0.008 | 0.09 | 0.6 |

Runs with [Lutidinium][BAr$^F_4$] as Acid

The procedure was identical to that of the standard catalytic protocol with the changes noted. The acid used was [Lutidinium][BAr$^F_4$] (0.090 g, 0.092 mmol).

TABLE 11

Attempted $N_2$ reduction catalysis absorption data using [Lutidinium][BAr$^F_4$] as the acid.

| Run | Absorbance | Equiv $NH_3$/Fe | % Yield based on $H^+$ |
|---|---|---|---|
| A | 0.026 | 0.31 | 1.9 |
| B | 0.004 | 0.05 | 0.3 |
| C* | 0.013 | 0.08 | 0.5 |
| D* | 0.018 | 0.11 | 0.7 |

Runs with HCl as Acid

The procedure was identical to that of the standard catalytic protocol with the changes noted. The acid used was anhydrous HCl (46 μL of a 2.0 M solution in Et$_2$O, 0.092 mmol) which was added without further dilution. The red suspension turned light yellow upon addition of acid, and subsequently precipitated a fine yellow solid. All subsequent manipulations were carried out with this suspension.

TABLE 12

Attempted $N_2$ reduction catalysis absorption data using anhydrous HCl.

| Run | Absorbance | Equiv $NH_3$/Fe | % Yield based on $H^+$ |
|---|---|---|---|
| A | 0.007 | 0.08 | 0.5 |
| B | 0.005 | 0.06 | 0.4 |
| C | 0.010 | 0.12 | 0.8 |
| D | 0.004 | 0.05 | 0.3 |

Runs with Trifluoromethanesulfonic Acid as Acid

The procedure was identical to that of the standard catalytic protocol with the changes noted. The acid used was trifluoromethanesulfonic acid (131 μL of a 0.7 M solution in Et$_2$O, 0.092 mmol) which was added without further dilution. The red suspension turned light yellow-green and homogenized upon addition of acid.

TABLE 13

Attempted $N_2$ reduction catalysis absorption data using trifluoromethanesulfonic acid.

| Run | Absorbance | Equiv $NH_3$/Fe | % Yield based on $H^+$ |
|---|---|---|---|
| A* | 0.101 | 0.60 | 3.7 |
| B* | 0.069 | 0.41 | 2.6 |
| C* | 0.081 | 0.48 | 3.0 |
| D* | 0.067 | 0.40 | 2.5 |

Runs with K as Reductant

The procedure was identical to that of the standard catalytic protocol with the changes noted. The reductant used was K metal (4 mg, 0.1 mmol) which was added as a solid. The reaction mixture was allowed to stir at −78° C. for 40 minutes and was then warmed slowly to RT overnight. After this time, a pale red-orange solution was present. Longer reaction times were employed to ameliorate the effect of the small surface area of the K metal.

TABLE 14

Attempted $N_2$ reduction catalysis absorption data using K as the reductant.

| Run | Absorbance | Equiv $NH_3$/Fe | % Yield based on $H^+$ |
|---|---|---|---|
| A | 0.060 | 0.71 | 4.4 |
| B | 0.049 | 0.58 | 3.6 |
| C | 0.025 | 0.30 | 1.9 |
| D | 0.019 | 0.23 | 1.4 |

Runs with CoCp*$_2$ as Reductant

The procedure was identical to that of the standard catalytic protocol with the changes noted. The reductant used was decamethylcobaltocene, CoCp*$_2$, (19 mg, 0.058 mmol) which was added as a solid. A heterogeneous mixture resulted at −78° C. that homogenized at room temperature, producing a yellow solution.

TABLE 15

Attempted $N_2$ reduction catalysis absorption data using CoCp*$_2$.

| Run | Absorbance | Equiv $NH_3$/Fe | % Yield based on $H^+$ |
|---|---|---|---|
| A | 0.103 | 1.23 | 7.7 |
| B | 0.062 | 0.74 | 4.6 |
| C | 0.045 | 0.27 | 1.7 |
| D | 0.069 | 0.41 | 2.6 |

Runs with CrCp*$_2$ as Reductant

The procedure was identical to that of the standard catalytic protocol with the changes noted. The reductant used was decamethylchromocene, CrCp*$_2$, (20 mg, 0.062 mmol) which was added as a solid. The resulting suspension darkened before gradually returning to a yellow color.

TABLE 16

Attempted $N_2$ reduction catalysis absorption data using CrCp*$_2$.

| Run | Absorbance | Equiv $NH_3$/Fe | % Yield based on $H^+$ |
|---|---|---|---|
| A | 0.012 | 0.14 | 0.9 |
| B | 0.016 | 0.19 | 1.2 |
| C* | 0.022 | 0.13 | 0.8 |
| D* | 0.007 | 0.04 | 0.2 |

Supplemental Discussion

In addition to the standard precatalyst [(TPB)Fe(N$_2$)][Na(12-crown-4)$_2$] and the cationic complex [(TPB)Fe][BAr$^F_4$], we examined the related TPB-containing complexes [(TPB)Fe(NH$_3$)][BAr$^F_4$][15] and [(TPB)Fe(N$_2$H$_4$)][BAr$^F_4$][15] as precatalysts for NH$_3$ production using the standard catalytic conditions. The modest attenuation in NH$_3$ yields (see below) relative to the yields when [(TPB)Fe(N$_2$)][Na(12-crown-4)$_2$] is used as the precatalyst may reflect less than quantitative cycling of the cationic derivatives to the Fe-bound N$_2$ species.

Runs with [(TPB)Fe(NH$_3$)][BAr$^F_4$] as Precursor

The procedure was identical to that of the standard catalytic protocol with the changes noted. The precursor used was [(TPB)Fe(NH$_3$)][BAr$^F_4$] (2.9 mg, 0.002 mmol) which is an orange solid. Note that the solution became homogeneous with no significant color change upon addition of acid.

TABLE 17

Attempted N$_2$ reduction catalysis absorption data using [(TPB)Fe(NH$_3$)][BAr$^F_4$].

| Run | Absorbance | Equiv NH$_3$/Fe | % Yield based on H$^+$ |
|-----|------------|-----------------|------------------------|
| A | 0.475 | 5.65 | 35.3 |
| B | 0.487 | 5.80 | 36.2 |
| C | 0.493 | 5.87 | 36.7 |
| D | 0.472 | 5.62 | 35.1 |

Runs with [(TPB)Fe(N$_2$H$_4$)][BAr$^F_4$] as Precursor

The procedure was identical to that of the standard catalysis protocol with the changes noted. The precursor used was [(TPB)Fe(N$_2$H$_4$)][BAr$^F_4$] (2.9 mg, 0.002 mmol) which is an orange solid. Note that the solution became homogeneous with no significant color change upon addition of acid.

TABLE 18

Attempted N$_2$ reduction catalysis absorption data using [(TPB)Fe(N$_2$H$_4$)][BAr$^F_4$].

| Run | Absorbance | Equiv NH$_3$/Fe | % Yield based on H$^+$ |
|-----|------------|-----------------|------------------------|
| A | 0.531 | 6.32 | 39.5 |
| B | 0.417 | 4.96 | 31.0 |
| C | 0.580 | 6.90 | 43.1 |
| D | 0.441 | 5.25 | 32.8 |

Runs with Fe(depe)$_2$N$_2$ as Precursor

The procedure was identical to that of the standard catalytic protocol with the changes noted. The precursor used was Fe(depe)$_2$N$_2$ (1 mg, 0.002 mmol), which is a dark red solid. Note that the solution became homogeneous with no significant color change upon addition of acid.

TABLE 19

Attempted N$_2$ reduction catalysis absorption data using Fe(depe)$_2$N$_2$.

| Run | Absorbance | Equiv NH$_3$/Fe | % Yield based on H$^+$ |
|-----|------------|-----------------|------------------------|
| A | 0.028 | 0.33 | 2.1 |
| B | 0.057 | 0.67 | 4.2 |
| C | 0.033 | 0.39 | 2.4 |
| D | 0.021 | 0.25 | 1.6 |

Runs at Room Temperature

The procedure was identical to that of the standard catalytic protocol with the changes noted. All manipulations were performed analogously to the standard conditions at room temperature.

TABLE 20

Attempted N$_2$ reduction catalysis at room temperature absorption data.

| Run | Absorbance | Equiv NH$_3$/Fe | % Yield based on H$^+$ |
|-----|------------|-----------------|------------------------|
| A | 0.158 | 1.88 | 11.7 |
| B | 0.130 | 1.55 | 9.7 |
| C | 0.114 | 1.36 | 8.5 |
| D | 0.045 | 0.54 | 3.4 |

Supplemental Discussion

Hydrazine (N$_2$H$_4$) is a possible product of the N$_2$ reduction catalysis described but is not detected under the standard catalytic protocol using [(TPB)Fe(N$_2$)][Na(12-crown-4)$_2$] as the precatalyst. As the experiment below establishes, even if N$_2$H$_4$ is produced as an intermediate en route to NH$_3$ formation, it would be likely be consumed and converted to NH$_3$ under the standard catalysis conditions employed.

Inclusion of Hydrazine in a Catalytic Run with [(TPB)Fe(N$_2$)][Na(12-crown-4)$_2$]

The procedure was identical to that of the standard catalytic protocol with the following changes noted. Hydrazine (0.12 µL, 0.004 mmol) was added directly to the suspension of [(TPB)Fe(N$_2$)][Na(12-crown-4)$_2$] prior to subjecting the mixture to the standard catalytic protocol. No color change was observed upon addition of N$_2$H$_4$. After workup the aqueous solution was analyzed for NH$_3$ as described above, and also for N$_2$H$_4$ via a literature protocol.[37] The results obtained show most all of the N$_2$H$_4$ had been consumed, indicating that if it is produced in some amount under the standard catalytic protocol it is unlikely to be detectable. As a control experiment it was shown that N$_2$H$_4$ was not degraded to NH$_3$ under the standard catalytic conditions in the absence of [(TPB)Fe(N$_2$)][Na(12-crown-4)$_2$].

TABLE 21

Absorption data for a standard catalytic run in which N$_2$H$_4$ was added prior to [(TPB)Fe(N$_2$)][NA(12-crown-4)$_2$] acid and reductant.

| Run | Abs. for N$_2$H$_4$ | Equiv N$_2$H$_4$/Fe | Abs. for NH$_3$ | Equiv NH$_3$/Fe |
|-----|---------------------|---------------------|-----------------|-----------------|
| A | 0.085 | 0.16 | 0.771 | 9.18 |
| B | 0.116 | 0.22 | 0.424 | 5.05 |

Figure 10:
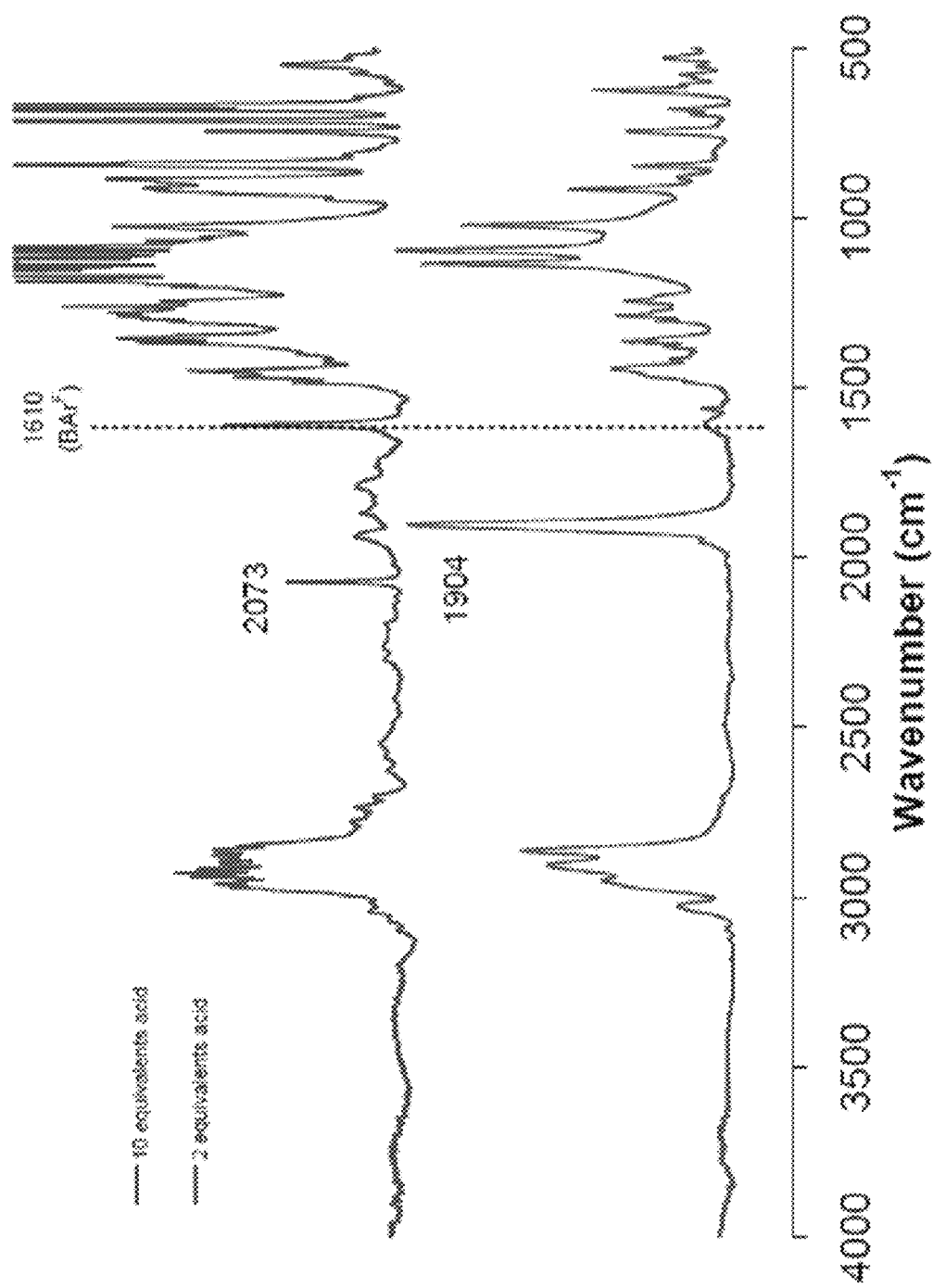
FIG. 10. IR spectra of addition of 10 equiv $HBAr^F_4 \cdot 2 Et_2O$ to $[(TPB)Fe(N_2)][Na(12\text{-crown-}4)_2]$, followed by 12 equiv $KC_8$.

IR Spectral Analysis of Addition of 2 Equiv HBAr$^F_4$·2 Et$_2$O to [(TPB)Fe(N$_2$)][Na(12-crown-4)$_2$], Followed by 3 Equiv KC$_8$ A 20 mL scintillation vial was charged with a stir bar and [(TPB)Fe(N$_2$)][Na(12-crown-4)$_2$] (8 mg, 0.0074 mmol). In a separate vial, HBAr$^F_4$·2 Et$_2$O (15 mg, 0.015 mmol) was dissolved in Et$_2$O (1 mL). Finally, a third vial was prepared containing a suspension of potassium graphite (3 mg, 0.023 mmol) in Et$_2$O (1 mL). All three vials were chilled in the cold well to −70+/−5° C. for 30 minutes. The solution of HBAr$^F_4$·2 Et$_2$O was quickly added to the stirring suspension of [(TPB)Fe(N$_2$)][Na(12-crown-4)$_2$] with a glass pipette pre-cooled to −70° C. Any residue of the acid was washed with pre-chilled Et$_2$O (0.5 mL) and transferred to the stirring solution. The resulting solution turned homogeneous. After stirring for 5 minutes, the suspension of KC$_8$ was added rapidly to the stirring solution. Any additional KC$_8$ was washed with pre-chilled Et$_2$O (0.5 mL) and the resulting suspension was transferred to the stirring mixture. After addition of KC$_8$ the solution adopted a red color. This mixture was capped and stirred at −70° C. for 40 minutes and then brought to room temperature and stirred for 10 minutes. The red color persisted upon thawing to room temperature. Graphite was removed by filtration through glass filter paper. To the red solution was added 12-crown-4 (13.1 mg, 74.3 µmol) in Et$_2$O (1 mL) and the resulting solution was stirred for 10 minutes. The solution was then cooled to −70° C. for 30 minutes and stirred vigorously, leading to a red precipitate. The precipitate was collected on a filter pad and the light orange filtrate was concentrated to dryness in vacuo. IR analysis of the precipitate (KBr pellet) showed an intense band at $v_{NN}$=1904 cm$^{-1}$, identical to that of authentic [(TPB)Fe(N$_2$)][Na(12-crown-4)$_2$] ($v_{NN}$=1905 cm$^{-1}$, KBr pellet). No assignable $v_{NN}$ IR bands were observed for the filtrate in the window of 1700-2300 cm$^{-1}$. See FIG. 10.

Figure 11:
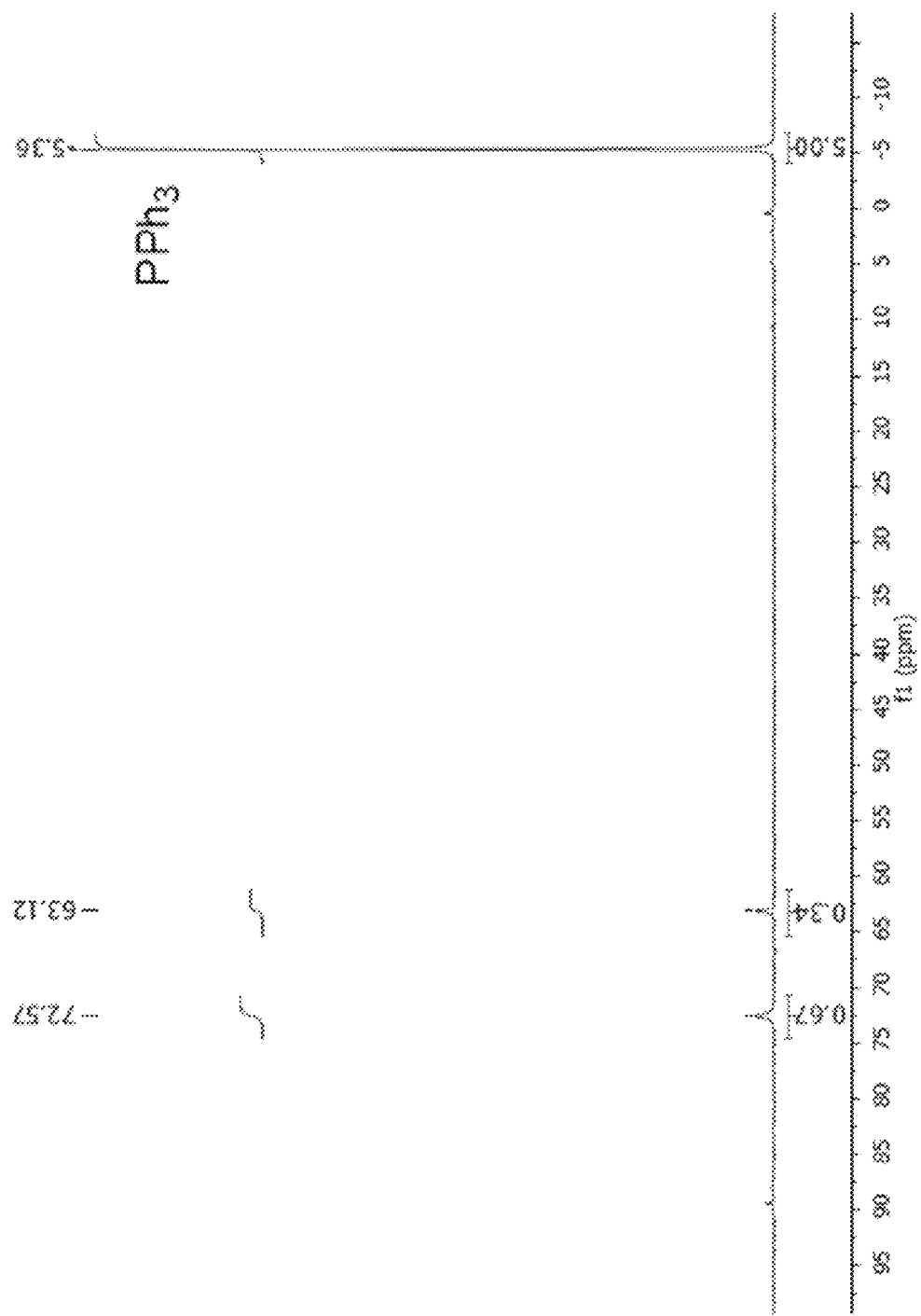
FIG. 11. $^{31}P\{^1H\}$ NMR spectra of addition of 10 equiv $HBAr^F_4 \cdot 2 Et_2O$ to $[(TPB)Fe(N_2)][Na(12\text{-crown-}4)_2]$, followed by 12 equiv $KC_8$.

IR and $^{31}$P NMR Spectral Analysis of Addition of 10 Equiv HBAr$^F_4$.2 Et$_2$O to [(TPB)Fe(N$_2$)][Na(12-crown-4)$_2$], Followed by 12 Equiv KC$_8$ A 20 mL scintillation vial was charged with a stir bar and [(TPB)Fe(N$_2$)][Na(12-crown-4)$_2$] (10.4 mg, 10.2 μmol). In a separate vial, HBAr$^F_4$.2 Et$_2$O (103 mg, 102 μmol) was dissolved in Et$_2$O (1 mL). Finally, a third vial was prepared containing a suspension of potassium graphite (16.5 mg, 122 μmol) in Et$_2$O (1 mL). All three vials were chilled in the cold well to −70+/−5° C. for 30 minutes. The solution of HBAr$^F_4$.2 Et$_2$O was quickly added to the stirring suspension of [(TPB)Fe(N$_2$)][Na(12-crown-4)$_2$] with a glass pipette pre-cooled to −70° C. Any residue of the acid was washed with pre-chilled Et$_2$O (0.5 mL) and transferred to the stirring solution. The resulting solution turned homogeneous. After stirring for 5 minutes, the suspension of KC$_8$ was added rapidly to the stirring solution. Any additional KC$_8$ was washed with pre-chilled Et$_2$O (0.5 mL) and the resulting suspension was transferred to the stirring mixture. The large amount of graphite present in the vial prevented the color of the resulting solution to be accurately discerned. This mixture was capped and stirred at −70° C. for 40 minutes and then brought to RT and stirred for 10 minutes. Graphite was removed by filtration through glass filter paper. To the resulting orange solution was added 12-crown-4 (60 mg, 340 μmol) in Et$_2$O (1 mL) and a $^{31}$P NMR integration standard of triphenylphosphine (11.9 mg, 45.4 μmol) in toluene (1 mL) followed by stirring for 10 minutes. The solution was then cooled to −70° C. for 30 minutes and stirred vigorously. No precipitate formed and volatiles were removed in vacuo. The orange powder was dissolved in THF and integration of $^{31}$P NMR resonances suggest the formation of (TPB)(μ-H)Fe(N$_2$)(H) (3.4 μmol) in 30% yield. Solid-state IR analysis of the orange solid (KBr pellet) showed a strong, sharp band at $v_{NN}$=2073 cm$^{-1}$ (s), identical to that of authentic (TPB)(μ-H)Fe(N$_2$)(H). Additional broad, weak bands were observed at 1942, 1875, 1802, 1734 cm$^{-1}$ that could not be assigned. $^{31}$P{$^1$H} NMR (400 MHz, THF): 72.6, 63.1 ppm. See FIGS. 10 and 11.

Reactivity of (TPB)(μ-H)Fe(N$_2$)(H) with KC$_8$

A 20 mL scintillation vial was charged with a stir bar and (TPB)(μ-H)Fe(N$_2$)(H) (11 mg, 0.016 mmol) suspended in Et$_2$O (2 mL). A separate vial was charged with KC$_8$ (2.6 mg, 0.019 mmol) suspended in Et$_2$O (2 mL). Both vials were cooled to −70+/−5° C. and the Fe-containing vial was stirred vigorously. The suspension of KC$_8$ was quickly transferred to the vial containing (TPB)(μ-H)Fe(N$_2$)(H) and stirred for 10 minutes at low temperature. The vial was then brought to room temperature and the brown color of KC$_8$ slowly turned to black over 1 hour. Graphite was filtered through a glass filter pad and the orange filtrate was transferred to a vial containing 12-crown-4 (21.0 mg, 119.17 μmol, 7.25 equivalents) and stirred vigorously at −70° C. for 10 minutes. No precipitate formed and the resulting orange solution was brought to room temperature and concentrated to dryness in vacuo. IR analysis of the residue (KBr pellet) showed a strong stretch at $v_{NN}$=2073 cm$^{-1}$, consistent with authentic (TPB)(μ-H)Fe(N$_2$)(H) (2073 cm$^{-1}$, KBr pellet). $^1$H NMR analysis was consistent with the presence of predominately (TPB)(μ-H)Fe(N$_2$)(H) and minor amounts of unidentified paramagnetic species.

Reactivity of (TPB)(μ-H)Fe(N$_2$)(H) with HBAr$^F_4$.2 Et$_2$O

A 20 mL scintillation vial was charged with a stir bar and (TPB)(μ-H)Fe(N$_2$)(H) (9 mg, 0.014 mmol) suspended in Et$_2$O (2 mL). A separate vial was charged with HBAr$^F_4$.2 Et$_2$O (15 mg, 0.015 mmol, 1.08) suspended in Et$_2$O (2 mL). Both vials were cooled to −70+/−5° C. and the Fe-containing vial was stirred vigorously. The solution of HBAr$^F_4$. 2 Et$_2$O was quickly transferred to the vial containing (TPB)(μ-H)Fe(N$_2$)(H) and stirred for 10 minutes at low temperature. The vial was then brought to room temperature and no noticeable color change was observed over 1 hour. The solution was concentrated to dryness in vacuo and the remaining residue was analyzed with IR spectroscopy (KBr pellet) which showed a strong stretch at $v_{NN}$=2073 cm$^{-1}$, consistent with authentic (TPB)(μ-H)Fe(N$_2$)(H) (2073 cm$^{-1}$, KBr pellet). The residue was then re-dissolved in C$_6$D$_6$ and analyzed by $^1$H NMR spectroscopy which showed (TPB)(μ-H)Fe(N$_2$)(H) with minor amounts of unidentified paramagnetic species and resonances from the BAr$^F_4$ anion. Complete consumption of (TPB)(μ-H)Fe(N$_2$)(H) to unidentified paramagnetic species was observed after 12 hours at room temperature.

Identification of [(TPB)Fe(NH$_3$)][BAr$^F_4$] from Protonation of [(TPB)Fe(N$_2$)][Na(12-crown-4)$_2$]

Figure 5:
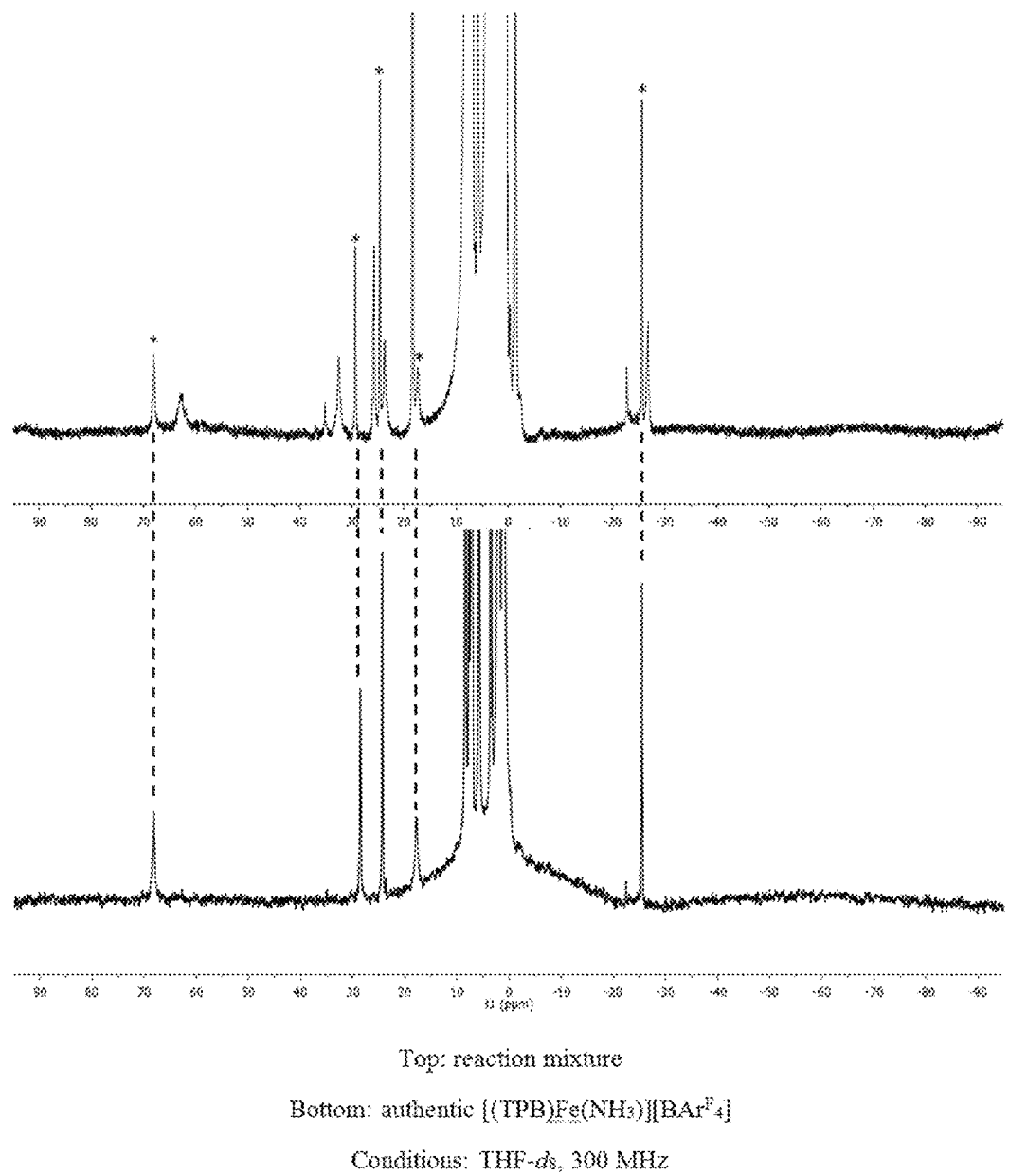
FIG. 5. $^1$H NMR spectrum of the reaction mixture following protonation of [(TPB)Fe(N$_2$)][Na(12-crown-4)$_2$] compared with an authentic sample of [(TPB)Fe(NH$_3$)][BAr$^F_4$].

[(TPB)Fe(N$_2$)][Na(12-crown-4)$_2$] (5 mg, 0.005 mmol) was dissolved in 2 mL of THF and cooled to −78° C. This dark red solution was added dropwise to a similarly cooled 2 mL THF solution of HBAr$^F_4$.2 Et$_2$O (29 mg, 0.029 mmol) with stirring. The resulting yellow-orange solution was allowed to stir for 10 minutes at low temperature before being warmed to room temperature and stirred for an additional 40 minutes. 1,8-Bis(dimethylamino)naphthalene (6 mg, 0.029 mmol) was added and the solution was allowed to stir for 15 minutes with no noticeable color change. Volatiles were removed from the solution and the resulting yellow residue was taken up in THF-d$_8$. The presence of [(TPB)Fe(NH$_3$)][BAr$^F_4$][15] was determined by comparison of the $^1$H NMR spectrum with that of an authentic sample prepared as recently reported. Additionally, a capillary insert of the (TPB)FeMe[15] in THF-d$_8$ was added to the NMR sample which allowed for crude measurements of the yield of [(TPB)Fe(NH$_3$)][BAr$^F_4$], a species tentatively assigned as [(TPB)Fe][BAr$^F_4$][15] and the total amount of S=3/2 TPB species as roughly 30%, 50%, and 100% respectively. Note that there is likely a significant degree of error on these measurements due to the broad paramagnetic peaks used for integration. See FIG. 5.

Identification of H$_2$ in Standard Catalytic Runs

The catalytic runs were performed according to the standard procedure. Prior to the vacuum transfer of volatiles, the solutions inside of the Schlenk tubes were frozen. The ground glass joint of the Schlenk tube was then sealed with a rubber septum and the head space between the Teflon stopcock of the Schlenk tube and the septum was evacuated. This head space was left under static vacuum and the Teflon stopcock of the reaction vessel was opened after which a 10 mL aliquot of the headspace was sampled through the septa via a gas-tight syringe. This sample was then analyzed for hydrogen with an Agilent 7890A gas chromatograph using a thermal conductivity detector. After H$_2$ analysis, the reaction vessel was sealed and subjected to the standard analysis for NH$_3$. As some H$_2$ leakage is unavoidable by the procedure used, these values represent lower limits of the H$_2$ yield.

TABLE 22

Absorption and gas chromatograph integration data for standard catalytic runs.

| Run | Absorbance | Equiv NH$_3$/Fe | % Yield based on H$^+$ | % Yield of H$_2$ |
|---|---|---|---|---|
| A | 0.500 | 5.95 | 37.2 | 30 |
| B | 0.365 | 4.34 | 27.1 | 40 |

Identification of H₂ in Runs without an Fe Precursor

A Schlenk tube was charged with a stir bar and a suspension of KC$_8$ (14 mg, 0.100 mmol) in Et$_2$O (0.5 mL). The Schlenk tube was then fitted with a Teflon stopcock, but not sealed. The ground glass joint on the Schlenk tube was sealed with a rubber septum. This reaction vessel was then cooled to −78° C. A pre-cooled solution of HBAr$^F_4$·2 Et$_2$O (92 mg, 0.092 mmol) in Et$_2$O (2 mL) was then syringed directly into the reaction vessel with stirring after which the vessel was rapidly sealed with its Teflon stopcock. The reaction was allowed to stir for 40 minutes at low temperature before the headspace between the Teflon valve and the septa was evacuated. After evacuation, the Teflon stopcock was opened and a 10 mL aliquot of the headspace was sampled via a gas tight syringe. This sample was then analyzed for hydrogen with an Agilent 7890A gas chromatograph using a thermal conductivity detector. The yield of hydrogen observed, based on proton-equivalents was 66% and 88% for each of two runs, respectively. As some H$_2$ leakage is unavoidable by the procedure used, these values represent lower limits of the H$_2$ yield.

Figure 6:
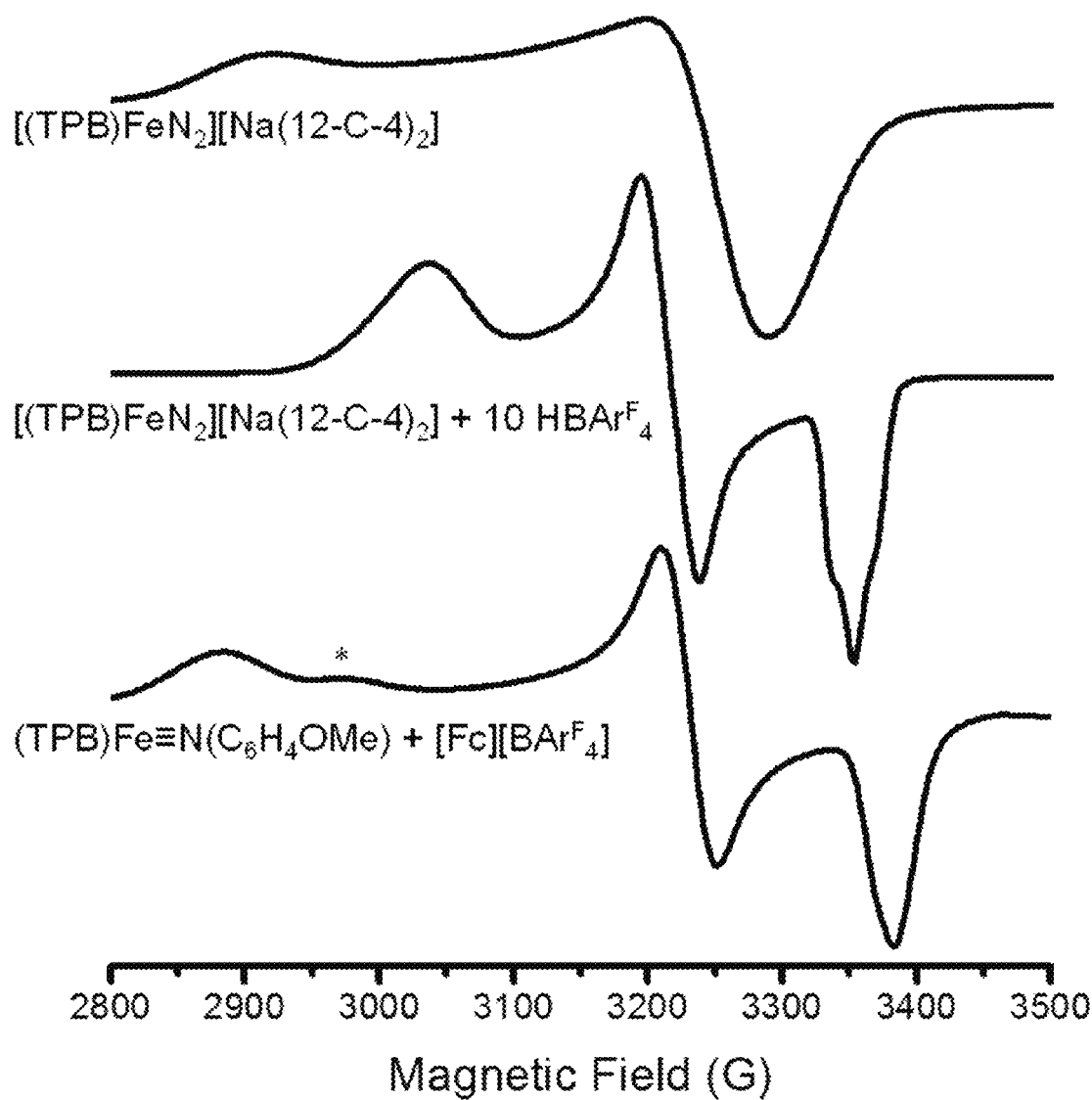
FIG. 6. Stacked EPR spectra at 77 K of [(TPB)Fe(N$_2$)][Na(12-crown-4)$_2$], the yellow species generated upon addition of acid to [(TPB)Fe(N$_2$)][Na(12-crown-4)$_2$], and the green-yellow species generated from (TPB)Fe≡N(p-C$_6$H$_4$OMe) and [Fc][BAr$^F_4$] at 77 K.
Figure 7:
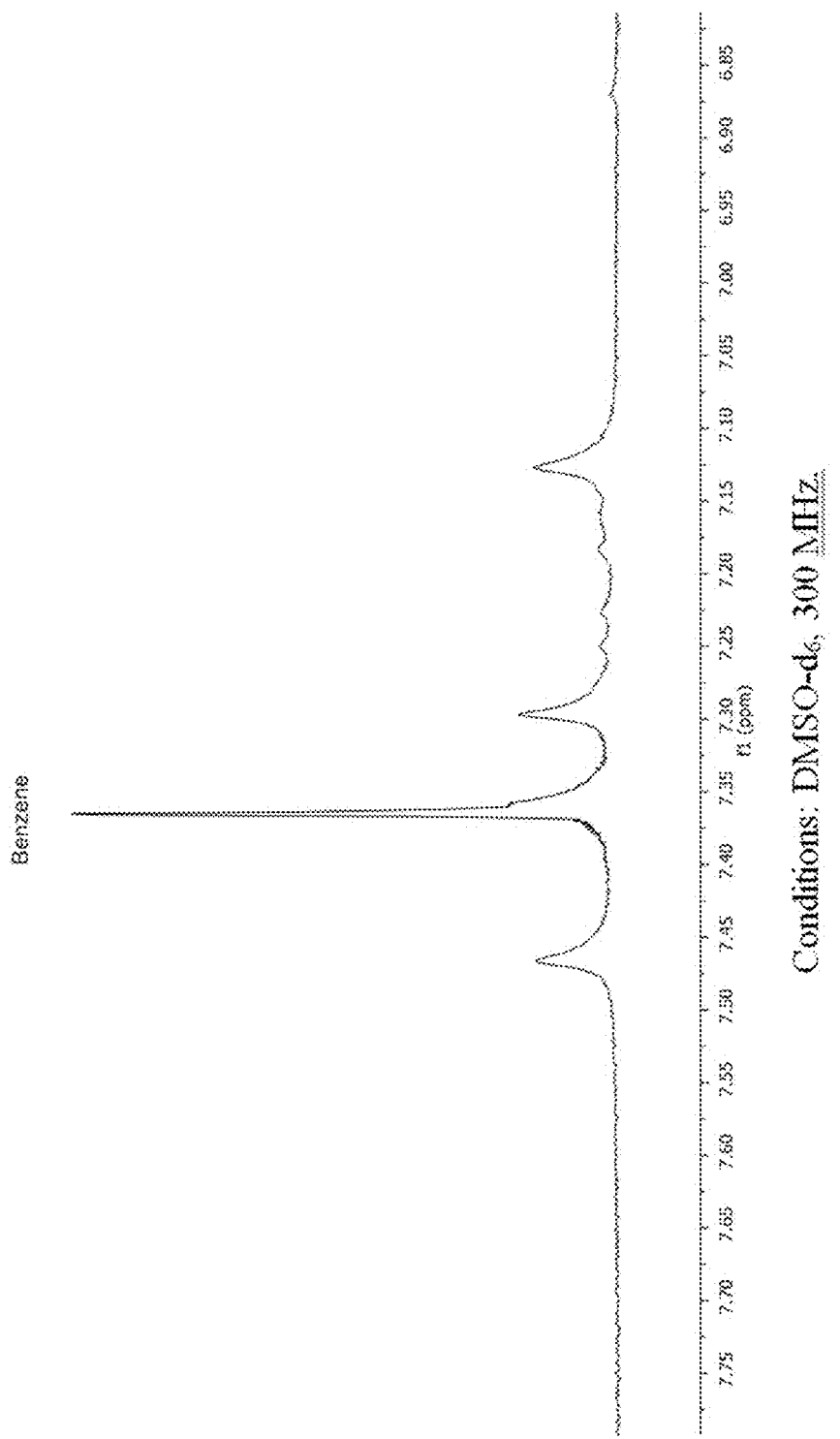
FIG. 7. $^1$H NMR spectrum of [$^{14}$NH$_4$][Cl] produced from [(TPB)Fe(N$_2$)][Na(12-crown-4)$_2$], HBAr$^F_4$. 2 Et$_2$O, and KC$_8$ under $^{14}$N$_2$.

Referring to FIG. 6, the middle spectrum was generated by dissolving [(TPB)Fe(N$_2$)][Na(12-crown-4)$_2$] (4 mg, 0.004 mmol) in 250 μL of 2-MeTHF to generate a deep red solution. This solution was then transferred to an EPR tube and frozen within a liquid N$_2$ cooled cold well. Another 250 μL 2-MeTHF solution of HBAr$^F_4$·2 Et$_2$O (38 mg, 0.037 mmol) was prepared and carefully layered onto the frozen solution of [(TPB)Fe(N$_2$)][Na(12-crown-4)$_2$] in the EPR tube. The layered solutions were then frozen. At this time, the solutions were warmed until barely thawing (−140° C.) and mechanically mixed with a long needle. Upon mixing, the red color of [(TPB)Fe(N$_2$)][Na(12-crown-4)$_2$] disappeared and a yellow solution was obtained. The solution was frozen and the EPR spectrum shown was obtained at 77 K. Immediately prior to obtaining this spectrum, a spectrum of a sample of [(TPB)Fe(N$_2$)][Na(12-crown-4)$_2$] (4 mg, 0.004 mmol) in 500 μL of 2-MeTHF was obtained under identical conditions. Both spectra were then doubly integrated and compared to obtain an integrated yield for the formation of the new S=½ species shown in the figure. Repetition of this experiment in triplicate provided an average yield of ~90%.

Referring to FIG. 6, the bottom spectrum was generated by dissolving (TPB)Fe≡N(p-C$_6$H$_4$OMe)[14] (3 mg, 0.004 mmol) in 250 μL of 2-MeTHF. This solution was then cooled to −78° C. and then mixed with a similarly cooled 250 μL solution of [Fc][BAr$^F_4$] (Fc=ferrocenium) (4 mg, 0.004 mmol) with rapid stirring. Upon mixing the dark blue color of [Fc][BAr$^F_4$] disappeared and the dark green color of (TPB)Fe≡N(p-C$_6$H$_4$OMe) lightened slightly to green-yellow. The solution was allowed to stir for an additional 10 minutes then transferred to a quartz EPR tube and frozen. The EPR spectrum shown was obtained at 77 K. Note that the asterisk denotes a signal of an unknown S=½ component of the product mixture.

EXAMPLE 2

Catalytic Reduction of N$_2$ to NH$_3$ b an Fe—N$_2$ Complex Featuring a C-Atom Anchor Abstract While recent spectroscopic studies have established the presence of an interstitial carbon atom at the center of the iron-molybdenum cofactor (FeMoco) of MoFe-nitrogenase, its role is unknown. In this Example we pursue Fe—N$_2$ model chemistry to characterize whereby this C-atom (previously denoted as a light X-atom) may provide a flexible trans interaction with an Fe center to expose an Fe—N$_2$ binding site. This Example, describes Fe complexes of a new tris(phosphino)alkyl (CP$^{iPr}_3$) ligand featuring an axial carbon donor. It is established that the iron center in this scaffold binds dinitrogen trans to the C$_{alkyl}$-atom anchor in three distinct and structurally characterized oxidation states. Fe—C$_{alkyl}$ lengthening is observed upon reduction, reflective of significant ionic character in the Fe—C$_{alkyl}$ interaction. The anionic (CP$^{iPr}_3$)FeN$_2^-$ species can be functionalized by a silyl electrophile to generate (CP$^{iPr}_3$)Fe—N$_2$SiR$_3$. (CP$^{iPr}_3$)FeN$_2^-$ also functions as a modest catalyst for the reduction of N$_2$ to NH$_3$ when supplied with electrons and protons at −78° C. under 1 atm N$_2$ (4.6 equiv NH$_3$/Fe).

Introduction

The biological reduction of atmospheric N$_2$ to NH$_3$ is a fascinating yet poorly understood transformation that is essential to life.[1] The iron-molybdenum cofactor (FeMoco) of MoFe nitrogenase catalyzes N$_2$ reduction and has been extensively studied.[2] This cofactor has attracted the attention of inorganic and organometallic chemists for decades who have sought inspiration to explore the ability of synthetic iron and molybdenum complexes to bind and reduce dinitrogen.[3,4,5,6] Advances in the past decade have included two molybdenum systems that facilitate catalytic turnover of N$_2$ to NH$_3$ in the presence of inorganic acid and reductant sources,[7,8,9] and iron complexes that support a range of N$_x$H$_y$ ligands relevant to nitrogen fixation,[10,11,12,13] effect reductive N$_2$ cleavage,[14,15] and facilitate N$_2$ functionalization.[16,17,18]

Figure 12:
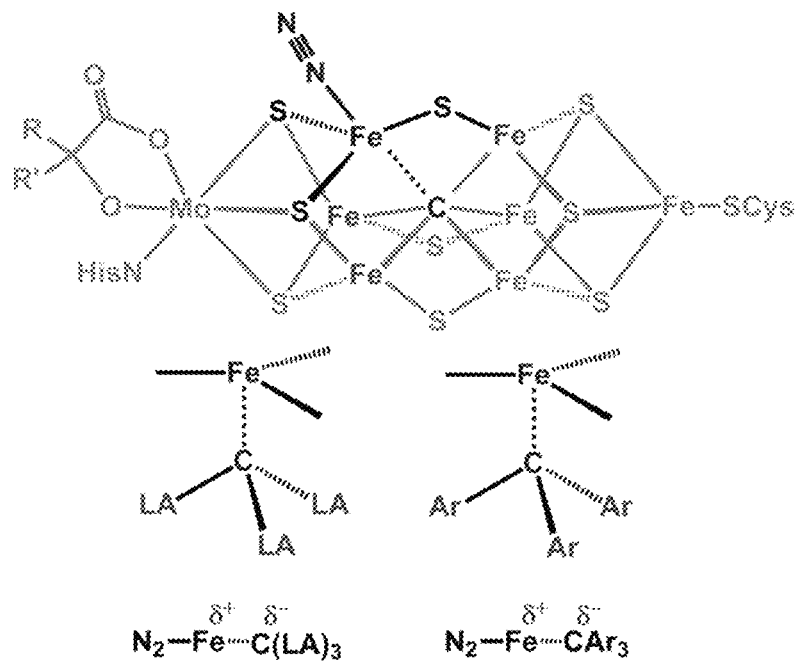
FIG. 12. (Top) Structure of the FeMo cofactor of nitrogenase, showing a putative site for dinitrogen binding and highlighting the trigonal bipyramidal coordination environment at Fe. Possible sites of H-atoms on cofactor prior to $N_2$ binding not shown. (Bottom) Possible role of Lewis acidic (LA) or aryl substituents in stabilizing ionic character in the $N_2$—Fe—$C_{alkyl}$ interaction.

The presence of an interstitial light atom in the MoFe nitrogenase cofactor was established in 2002,[19] and structural, spectroscopic, and biochemical data have more recently established its identity as a C-atom.[20] The role of the C-atom is unknown. This state of affairs offers an opportunity for organometallic chemists to undertake model studies that can illuminate plausible roles for this interstitial C-atom, and hence important aspects of the mechanism of N$_2$ reduction catalysis. In particular, Fe-alkyl complexes that are more ionic in nature than a prototypical transition metal-alkyl may be relevant to modeling the Fe—C$_{interstitial}$ interaction of the possible N$_2$ binding site in the cofactor (FIG. 12).

These results support a possible role played by the interstitial C-atom is to provide a flexible Fe—C$_{interstitial}$ interaction that exposes an Fe—N$_2$ binding site on a belt iron atom trans to the Fe—C linkage (FIG. 12).[3,15,21,22,23] Subsequent modulation of the Fe—C interaction and hence the local Fe geometry as a function of the N$_2$ reduction state might enable the Fe center to stabilize the various N$_x$H$_y$ intermediates sampled along a pathway to NH$_3$.

Figure 13:
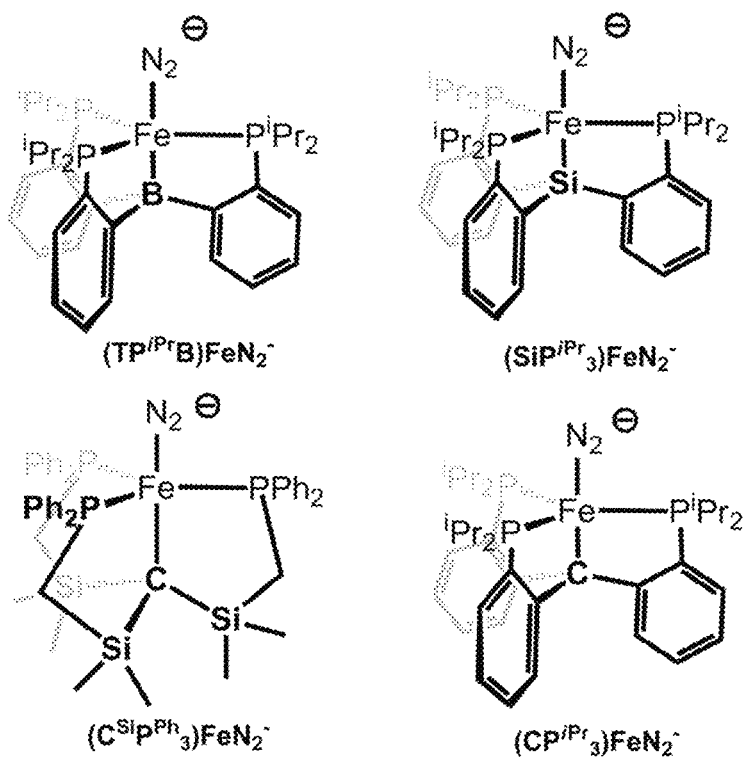
FIG. 13. Select trigonal bipyramidal scaffolds and the $(CP^{iPr}_3)FeN_2^-$ system.

To characterize Fe-mediated N$_2$ reduction, our group has employed phosphine-supported Fe complexes in approximately trigonal geometries (pseudotetrahedral, trigonal pyramidal, or trigonal bipyramidal) to bind and functionalize dinitrogen. Tripodal trisphosphine ligands featuring an axial donor (X=N, Si, B) and aryl backbones have been used to canvass the ability of low-valent iron in such geometries to bind and activate dinitrogen (FIG. 13).[23,24,25] The (TP$^{iPr}$B)Fe-system (TP$^R$B=tris(o-phosphinoaryl)borane) has proven rich in this context, and has been shown in Example 1 to be an effective catalyst for the reduction of N$_2$ to NH$_3$ in the presence of proton and electron sources at low temperature and 1 atm N$_2$.[21] An important feature of the (TP$^{iPr}$B)Fe-system is the presence of a flexible Fe—B interaction.[15,25] This flexibility may facilitate the formation of intermediates featuring Fe—N$_X$ π-bonding (e.g., Fe=NNH$_2$, Fe≡N, Fe=NH) during catalysis. Whether the aforementioned hypothesis concerning a hemi-labile role for the interstitial C-atom of FeMoco is correct or not, these inorganic model studies demonstrate the principles of coordination chemistry are concerned.

To extend our studies to systems that place a C-atom in a position trans to an Fe—N$_2$ binding site we have sought related ligand scaffolds that feature a C-atom anchor. In designing these scaffolds we have hypothesized that the proposed flexibility of the Fe—C linkage in the FeMo cofactor may be facilitated by the ability of the environment around the interstitial carbide—five additional electropositive Fe atoms—to stabilize developing negative charge on the carbon. With this in mind we reported iron complexes of a tris(phosphino)alkyl ligand whose axial carbon binding site is flanked by three electropositive silyl groups (FIG. 13) which may play a role in stabilizing the substantial ionic character of this Fe—C$_{alkyl}$ bond (FIG. 12).[22]

In this Example, we report a new tris(phosphino)alkyl ligand, (CP$^{iPr}_3$), featuring aryl linkers bound to the axial carbon. We reasoned that possible delocalization of negative or positive charge buildup into the aryl π-system would allow for increased flexibility in the Fe—C bond; this flexibility is expected to facilitate possible catalytic N$_2$ functionalization and reduction, as discussed above. Additionally, as this ligand is closely structurally related to the SiP$_3$, TPB, and NP$_3$ ligands whose iron coordination chemistry we have extensively explored, Fe complexes of CP$_3^{iPr}$ are of obvious comparative interest and would be particularly beneficial with regard to considering the role an Fe—C$_{interstitial}$ interaction might play in facilitating N$_2$ binding and reduction within the cofactor. To this end, we embarked on the synthesis of the new ligand (CP$^{iPr}_3$)H and the development of its Fe—N$_2$ chemistry.

Results and Discussion

Ligand Synthesis. Whereas the ligands (SiP$^{iPr}_3$)H and TP$^{iPr}$B are straightforward to synthesize by the addition of lithiated o-phosphinophenyl precursors to HSiCl$_3$ and BCl$_3$,[24,26] the preparation of (CP$^{iPr}_3$)H via an analogous method by addition of phosphinoaryllithium moieties to a C$_1$ source (e.g., triple addition to dimethylcarbonate followed by deoxygenation of the resultant triarylmethanol product) has proven ineffective in our hands. However, an orthogonal synthetic approach based on elaboration of an initially formed triarylmethane scaffold afforded a viable approach to the preparation of (CP$^{iPr}_3$)H on a multigram scale and in reasonable yields. This synthesis of (CP$^{iPr}_3$)H follows an approach inspired by a previously reported synthesis of Ph$_2$P(o-C$_6$H$_4$CH$_2$C$_6$H$_4$-o)PPh$_2$,[27] and hinges on the sequential formation and cleavage of two diaryliodonium ions to give the tris(2-halophenyl)methane precursor (5) (Scheme 1).

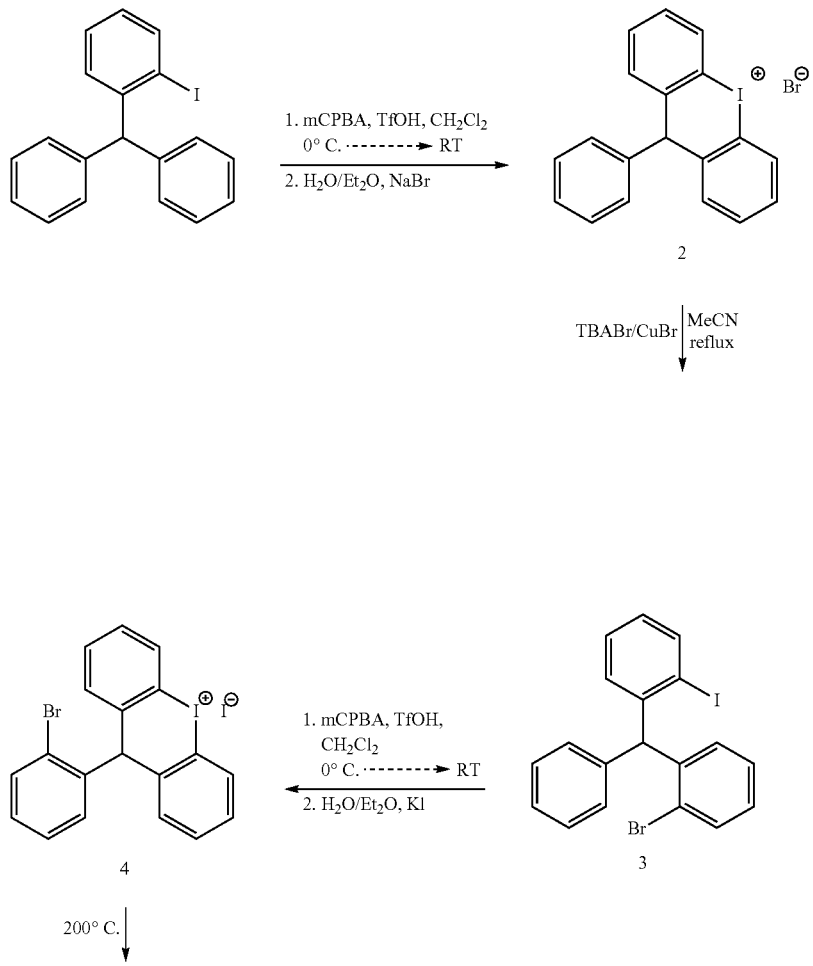

Scheme 1. Synthesis of (CP$^{iPr}_3$)H (1).

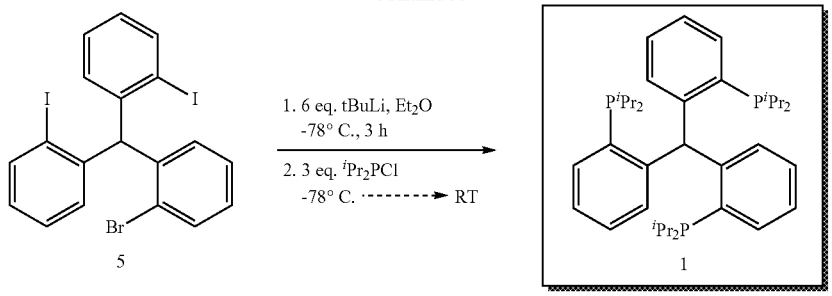

The synthesis of o-iodotriphenylmethane has been reported[28] and is readily effected in three steps from commercially available 2-nitrobenzaldehyde on a 20-gram scale. Cyclization of this species to the diaryliodonium bromide salt (2) is accomplished by a reported technique.[29] Slow but clean ring-opening of 2 by CuBr and [TBA][Br] in acetonitrile gives 2-bromo-2'-iodotriphenylmethane (3). The 2-bromo-2'-iodotriphenylmethane species was targeted rather than 2,2'-diiodotriphenylmethane in order to mitigate the possibility of complications from excessive oxidation in the next step.

Formation of a second diaryliodonium cation as its iodide salt follows via an analogous procedure to regioselectively generate 4, which can be straightforwardly decomposed to 2-bromo-2',2''-diiodotriphenylmethane (5) by heating to 200° C. for 15 minutes under an inert atmosphere. Each step in the synthesis of 5 from o-iodotriphenylmethane can be accomplished in 75% yield or more (overall yield: 38% over five steps).

Lithiation of 5 with six equiv of tert-butyllithium at −78° C. followed by treatment with three equiv of diisopropylphosphine chloride gives the desired tris(o-diisopropylphosphinophenyl)methane, $(CP^{iPr}_3)H$ (1) in 67% yield (Scheme 1). The protonated form of the ligand, 1, is characterized by a single peak in its phosphorus NMR spectrum at −9.1 ppm. The $^1H$ NMR spectrum, while indicative of three-fold symmetry, also shows features suggestive of a rigid ligand scaffold where rotation about the phosphine-carbon bonds is hindered; in particular, four magnetically inequivalent sets of resonances are observed for the isopropyl methyl hydrogens. Additionally, the central C—H methine proton is shifted markedly downfield (8.15 ppm) and manifests as a quartet due to through-space coupling to the three phosphorus atoms. Similar NMR properties were observed for the central methine proton in a related trisphosphine ligand based on a tris(indolyl)methane scaffold.[30]

Metallation at Iron and Precursor Complexes. We initially sought to effect metallation of 1 by first deprotonating it to give an alkali metal complex followed by transmetallation with an iron (II) halide or other transition metal precursor. To our frustration, 1 proved unexpectedly difficult to deprotonate even with very strong bases such as benzyl potassium and Schlosser's base,[31] perhaps due in part to the steric protection of the methine proton; additionally, the acidity of this proton is likely not as high as for bare triphenylmethane since the ligand bulk limits the extent to which the aryl rings can approach a coplanar configuration to afford resonance stabilization of a resulting carbanion.[32] Furthermore, the strategy used for metallation of the $(SiP^{iPr}_3)H$ ligand on iron—using methyl Grignard with $FeCl_2$ to generate a methyl iron complex which then eliminates methane with concomitant formation of the iron-silicon bond[24]—was not effective for $(CP^{iPr}_3)H$. It appeared to instead result in reduction of iron without the formation of the desired iron-carbon bond. Thus, it was necessary to develop a different protocol for the formation of a $(CP^{iPr}_3)$Fe-complex featuring an iron-carbon bond.

Combining 1 and iron(II) iodide in toluene cleanly affords the tetracoordinate, κ2-bisphosphine diiodide high-spin iron (II) complex (6) as a yellow powder (Scheme 2). Its solid-state structure (FIG. 14) shows a tetrahedral environment at the iron center and a bidentate binding mode for the ligand. One-electron reduction of 6 in benzene or toluene using a range of reagents including sodium amalgam, potassium graphite, or alkylmagnesium/lithium reagents, results in the formation of the deep brick-red four-coordinate iron(I) complex $\{(CP^{iPr}_3)H\}FeI$ (7). The bromide congener, $\{(CP^{iPr}_3)H\}FeBr$ (8), is analogously prepared and has been crystallographically characterized (FIG. 14); its most notable feature is the endo orientation of the unactivated methine C—H. This proton is located within the ligand cage pointed nearly linearly towards the iron center. Both 7 and 8 are unstable with respect to disproportionation to Fe(0), $(CP^{iPr}_3)$H, and $\{(CP^{iPr}_3)H\}FeX_2$ (X=I, Br), especially in coordinating solvents. However, if appropriate conditions are employed, 7 is sufficiently long-lived to be generated and used without further purification for subsequent reactions.

Scheme 2. Synthesis of iron complexes of (CP$^{iPr}_3$)H.

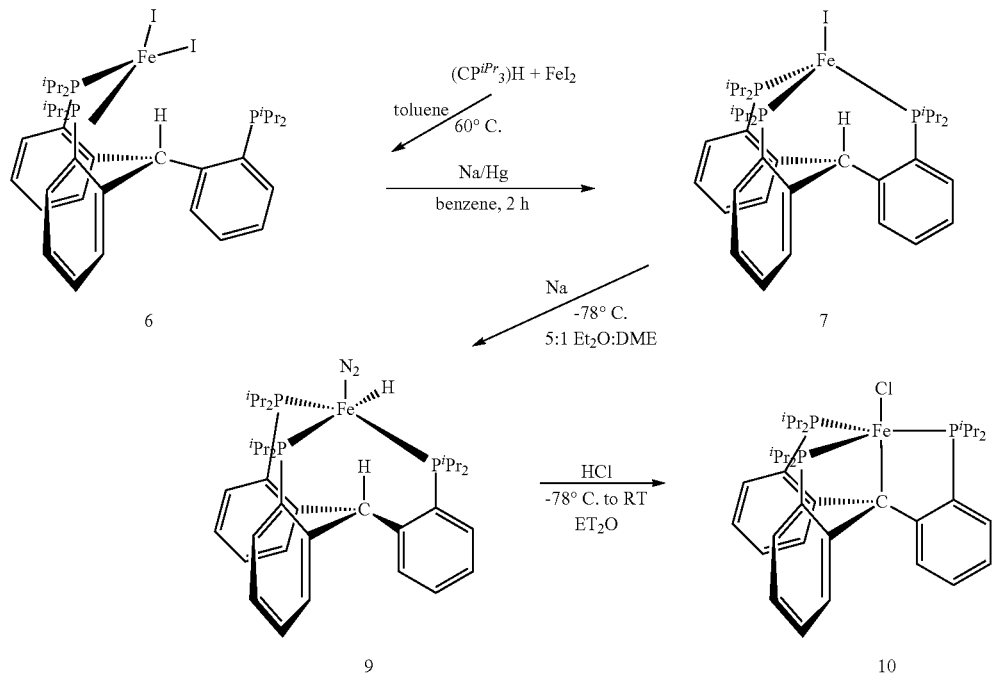

Figure 14:
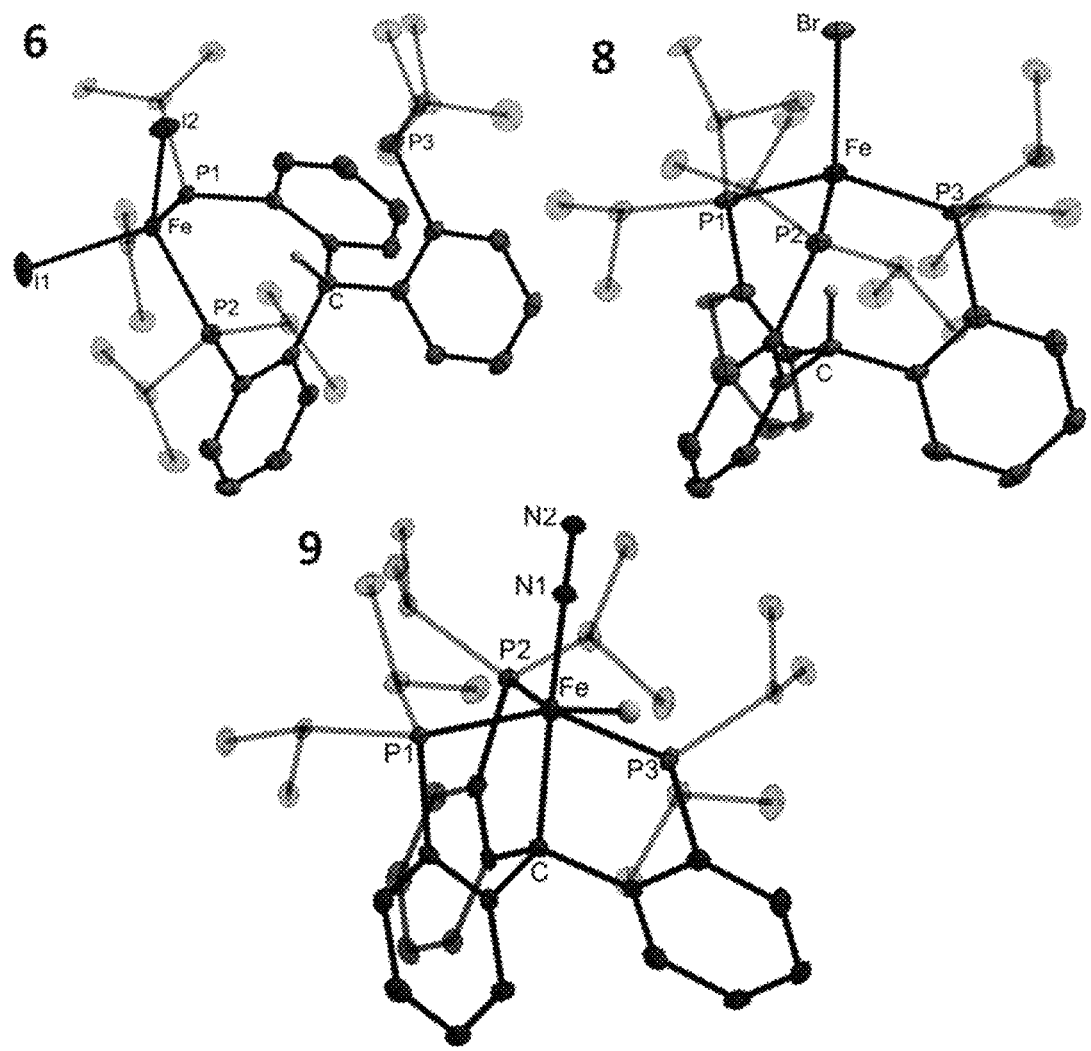
FIG. 14. Crystal structures of $\{(CP^{iPr}_3)H\}FeI_2$ (6, top left), $\{(CP^{iPr}_3)H\}FeBr$ (8, top right), and $(CP^{iPr}_3)Fe(H)(N_2)$ (9, bottom). Ellipsoids shown at 50% probability; hydrogen atoms (except the triarylmethine C—H and Fe—H hydride) and solvent molecules omitted for clarity.

Further reduction of 7 with sodium metal in a 5:1 mixture of Et$_2$O and DME at −78° C. causes formal insertion of the Fe center into the C—H bond of the (CP$^{iPr}_3$)H ligand and uptake of atmospheric N$_2$ to give yellow, diamagnetic (CP$^{iPr}_3$)Fe(H)(N$_2$) (9). The position of the iron hydride is identifiable in the XRD difference map of 9, as is the presence of an Fe—C bond at 2.155(2) Å (FIG. 14). IR data for 9 show a strong N—N vibration at 2046 cm$^{-1}$ and an Fe—H vibration at 1920 cm$^{-1}$; The properties of 9 can be compared to the isostructural (SiP$^{iPr}_3$)Fe(H)(N$_2$) and [(NP$^{iPr}_3$)Fe(H)(N$_2$)]$^+$ complexes[23,33] and other closely related species such as {[P(CH$_2$CH$_2$P$^i$Pr$_2$)$_3$]Fe(H)(N$_2$)}$^+$;[34] the vibrational and metrical properties of the N$_2$ ligand suggest a more activated dinitrogen moiety in 9 relative to its congeners.

Deprotonation of 9 to afford (CP$^{iPr}_3$)FeN$_2^-$ was canvassed but proved unsuccessful. A more circuitous but ultimately effective route to (CP$^{iPr}_3$)FeN$_2^-$ proceeded via treatment of 9 with anhydrous HCl in Et$_2$O to afford dark red-orange (CP$^{iPr}_3$)FeCl (10) in good yield (Scheme 2). The crystal structure of 10 was not reliably determined due to its propensity to crystallize in a cubic space group with extensive whole molecule disorder. Complex 10 is paramagnetic and its room temperature solution magnetic moment of 4.9 $\mu_B$ is suggestive of a high-spin, S=2 ground state. A lower spin state might have been reasonably anticipated to arise from a presumably strong-field ligand set comprised of three diisopropylarylphosphines and an alkyl group. For comparison, (SiP$^{iPr}_3$)FeCl exhibits an intermediate S=1 ground state.[24] The C$_{alkyl}$ anchor in 10 thereby appears to be a weaker-field donor than the silyl anchor in (SiP$^{iPr}_3$)FeCl.

Synthesis and characterization of the {(CP$^{iPr}_3$)FeN$_2$}$^n$ (n=0, −1, +1) series. Reduction of the chloride precursor 10 affords entry into the desired series of trigonal bipyramidal iron dinitrogen complexes. Stirring 10 over sodium metal in THF produces the neutral low-spin Fe(I) complex (CP$^{iPr}_3$) FeN$_2$ (11) (υ(NN)=1992 cm$^{-1}$) (Scheme 3). Complex 11 is low-spin and paramagnetic (S=½); it has been crystallographically characterized (FIG. 15) and shows a distortion from trigonal symmetry with one widened P—Fe—P angle (132.5°), as expected due to the Jahn-Teller active ground state. The N$_2$ vibrational frequency and N—N bond length (1.134(4) Å) show that the dinitrogen ligand in this complex is somewhat more activated than that in the isoelectronic (SiP$^{iPr}_3$)FeN$_2$ complex (υ(NN)=2003 cm$^{-1}$, N—N=1.1245 (2) Å) or in the neutral Fe(0) complex (TP$^{iPr}$B)FeN$_2$ (υ (NN)=2011 cm$^{-1}$).[17,25] These differences are relatively small and as such are difficult to reliably interpret. But given the fact that (CP$^{iPr}_3$) appears to have a weaker-field donor set than (SiP$^{iPr}_3$) according to the observed ground spin states of (CP$^{iPr}_3$)FeCl (S=2) and (SiP$^{iPr}_3$)FeCl (S=1), one might have reasonably anticipated (SiP$^{iPr}_3$)FeN$_2$ to have a lower υ(NN) than (CP$^{iPr}_3$)FeN$_2$.

Scheme 3. Synthesis of the dinitrogen adduct series (CP$^{iPr}_3$)FeN$_2$ (11), (CP$^{iPr}_3$)FeN$_2^-$ (12), and (CP$^{iPr}_3$)FeN$_2^+$ (13).

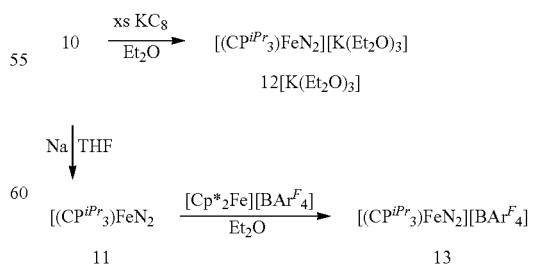

Figure 16:
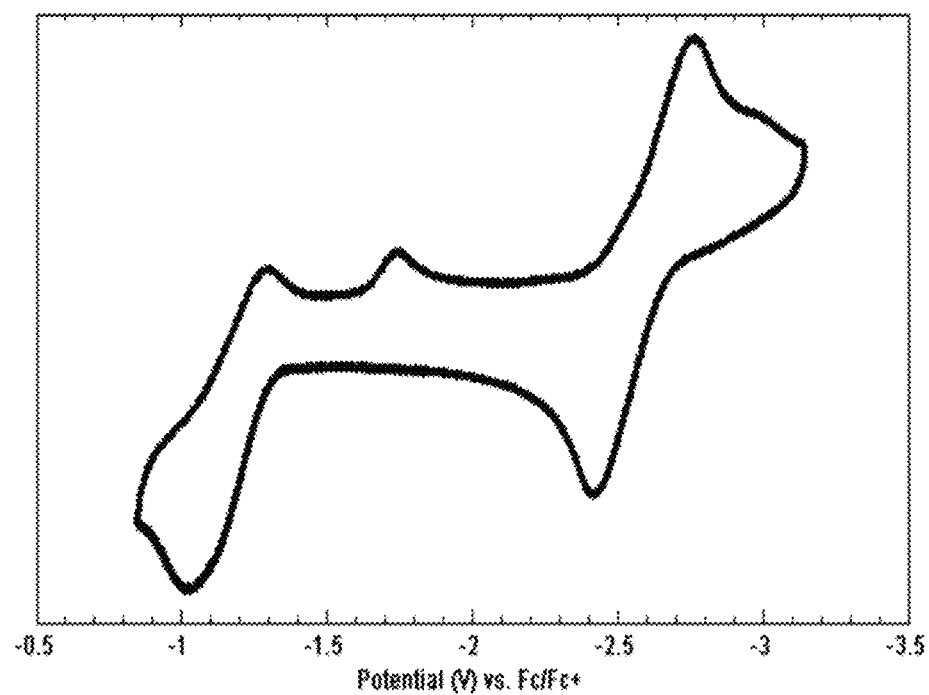
FIG. 16. Cyclic voltammogram of 11; scan rate 0.5 V/s.

Both a one-electron oxidation and a one-electron reduction of 11 are accessible (FIG. 16). The Fe(II/I) couple appears at −1.20 V (vs Fc/Fc$^+$) and is quasi-reversible; the current in the cathodic wave is diminished and an irreversible reduction wave appears at −1.65 V. This is very similar electrochemical behavior to what has been documented for (SiP$^{iPr}_3$)FeN$_2$ and suggests that the same phenomenon is responsible for the observations in this system[17]—that is, N$_2$ coordinates reversibly to the {(CP$^{iPr}_3$)Fe}$^+$ complex; partial loss of N$_2$ upon oxidation of (CP$^{iPr}_3$)FeN$_2$ is likely responsible for the quasi-reversibility of the (II/I) couple, and the reduction at −1.65 V is most reasonably attributed to the cationic species {(CP$^{iPr}_3$)Fe(L)}$^+$ (where L may be THF, or may be a vacant site), which then takes up N$_2$ upon reduction. The Fe(I/0) couple is fully reversible, consistent with the formation of a stable (CP$^{iPr}_3$)FeN$_2^-$ anion. This reduction occurs at an unusually negative potential (−2.55 V vs Fc/Fc$^+$). For comparison, the reduction of (SiP$^{iPr}_3$)FeN$_2$ to (SiP$^{iPr}_3$)FeN$_2^-$ occurs at −2.2 V.[17]

The Fe—N$_2$ adduct triad {(CP$^{iPr}_3$)FeN$_2$}$^n$ (n=0 (11), −1 (12), +1 (13)) proved synthetically accessible. Treatment of 10 with an excess of potassium graphite (KC$_8$) in Et$_2$O results in immediate reduction to the very dark brown-blue CP$^{iPr}_3$FeN$_2^-$ anion (12). The IR spectrum of a thin film deposited from diethyl ether solution shows a υ(NN) vibration at 1870 cm$^{-1}$, suggestive of a close ion pair with the potassium ion capping the N$_2$ moiety. Accordingly, treatment of the potassium complex with two equivalents of 12-crown-4 results in the formation of [(CP$^{iPr}_3$)FeN$_2$][K(12-crown-4)$_2$] (12[K(12-crown-4)$_2$]) with a shift of the υ(NN) vibration to 1905 cm$^{-1}$. The anion has been crystallographically characterized (FIG. 15) as its K(Et$_2$O)$_3$ salt, [(CP$^{iPr}_3$)FeN$_2$][K(Et$_2$O)$_3$] (12[K(Et$_2$O)$_3$]; the bulk material after drying is solvated by 0.5 molecules of Et$_2$O per anion, 12[K(Et$_2$O)$_{0.5}$]).

Figure 15:
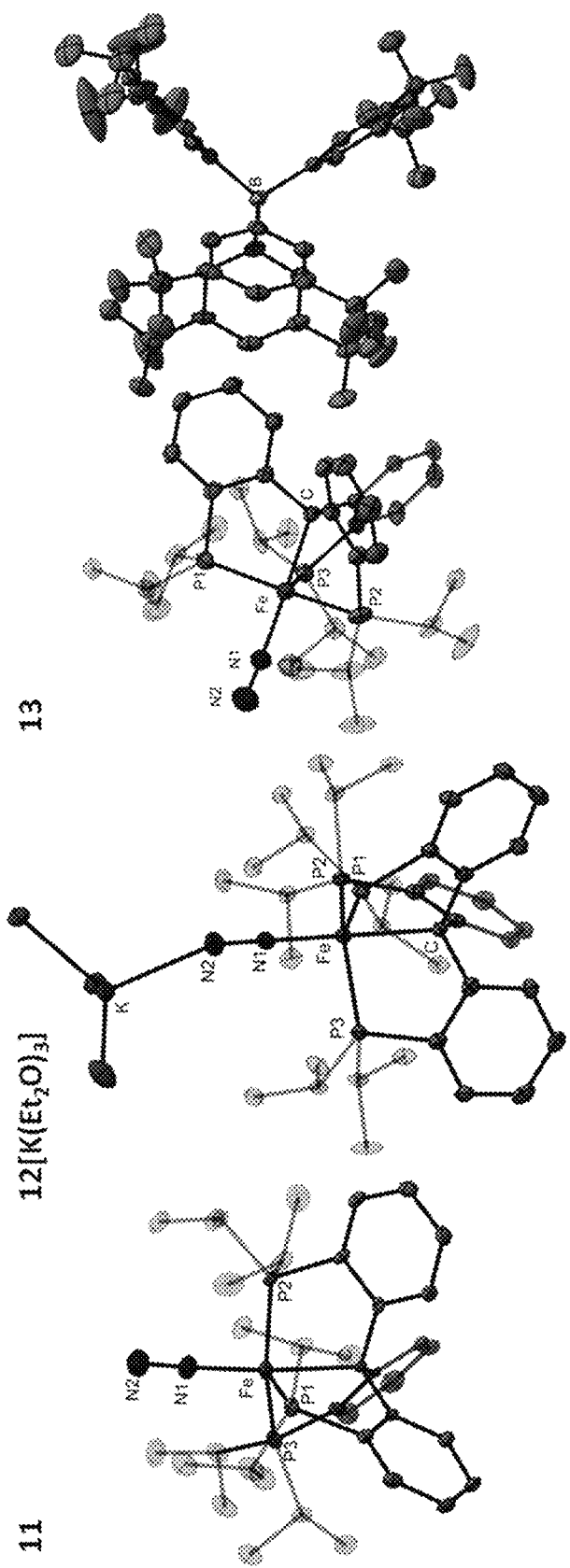
FIG. 15. Crystal structures of $(CP^{iPr}_3)FeN_2$ (11, left), $(CP^{iPr}_3)FeN_2^-$ ($12[K(Et_2O)_3]$, center, ethyl groups of coordinated $Et_2O$ molecules omitted), and $(CP^{iPr}_3)FeN_2^+$ (13, right). Ellipsoids are shown at 50% probability and hydrogen atoms are omitted for clarity.

Oxidation of 11 with one equivalent of [Cp*$_2$Fe][BAr$^F_4$] (Ar$^F$=3,5-trifluoromethylphenyl; Cp*=pentamethylcyclopentadienide) in Et$_2$O gives rise to [(CP$^{iPr}_3$)FeN$_2$][BAr$^F_4$] (13) as an orange crystalline solid, which has also been structurally characterized (FIG. 15). The dinitrogen ligand in 13 (υ(NN)=2128 cm$^{-1}$), is labile and in solution under an N$_2$ atmosphere appears to be in equilibrium with a solvated or vacant cation [(CP$^{iPr}_3$)Fe(L)]$^+$; in addition to the electrochemical properties discussed above, evidence from UV-Vis spectroscopy is consistent with the loss of coordinated N$_2$ under vacuum.

Whereas a related series was accessible for the silyl-anchored {(SiP$^{iPr}_3$)FeN$_2$}$^n$ system (n=0, +1, −1),[17] only the anion (C$^{Si}$P$^{Ph}_3$)FeN$_2^-$ proved accessible for the C$_{alkyl}$-anchored system.[22] Hence, the present {(CP$^{iPr}_3$)FeN$_2$}$^n$ series allows for a direct comparison of how the anchoring atom (Si vs C) responds across three redox states when positioned trans to an N$_2$ ligand of an isostructural trigonal bipyramidal framework.

In the case of the {(SiP$^{iPr}_3$)FeN$_2$}$^n$ series, the Fe—Si bond distance decreases upon reduction from 2.298(7) Å in the (SiP$^{iPr}_3$)FeN$_2$+ cation to 2.2526(9) Å in the (SiP$^{iPr}_3$)FeN$_2^-$ anion. In direct contrast, the Fe—C bond distance in {(CP$^{iPr}_3$)FeN$_2$}$^n$ increases upon reduction, from 2.081(3) Å in 13 to 2.152(3) Å in 11 to 2.1646(17) Å in 12. The different responses manifest in these two systems may be due to the electropositive silicon atom binding more strongly to the more electron-rich iron, whereas the more electronegative C$_{alkyl}$ binds more strongly to the higher-valent, more electron-deficient iron center.

Notably, the overall change in the bond length is greater in the CP$^{iPr}_3$ case (0.084 Å from 13 to 12) than for the more covalent SiP$^{iPr}_3$ system, where the overall change is only 0.045 Å despite the longer total bond length. This suggests a greater degree of flexibility in the Fe—C$_{alkyl}$ interaction. A similar conclusion was drawn for the {(C$^{Si}$P$^{Ph}_3$)Fe(CO)}$^n$ (n=+1, 0, −1) series, where an even more pronounced Fe—C lengthening was observed upon reduction.[22]

TABLE 23

Select characterization data for the Fe—N$_2$ adducts {(CP$^{iPr}_3$)FeN$_2$}$^n$ and {(S$^{iPr}_3$)FeN$_2$}$^n$ (n = −1, 0, 1).

| X = C, Si$^a$ | [X—Fe—N2]$^{-b}$ | X—Fe—N2 | [X—Fe—N2]$^+$ |
|---|---|---|---|
| Fe—C (Å) | 2.1646(17) | 2.152(3) | 2.081(3) |
| Fe—Si (Å) | 2.2526(9) | 2.2713(6) | 2.298(7) |
| Fe—N$_{x-c}$ (Å) | 1.7397(16) | 1.797(2) | 1.864(7) |
| Fe—N$_{x-si}$ (Å) | 1.763(3) | 1.8191(1) | 1.914(2) |
| υ(N$_2$)$_{x-c}$ (cm$^{-1}$) | 1870 | 1992 | 2128 |
| υ(N$_2$)$_{x-si}$ (cm$^{-1}$) | 1891 | 2003 | 2143 |
| spin state | S = 0 | S = ½ | S = 1 |

$^a$All data tabulated for X = Si is taken from reference 17.
$^b$For X = C, data provided is for the [K(Et$_2$O)$_3$]$^+$ salt (Figure 15). For X = Si, data provided is for the [Na(THF)$_3$]$^+$ salt.

In the case of the (TP$^{iPr}$B)Fe system, a highly flexible Fe—B interaction has been observed as a function of the ligand positioned trans to the B-atom that may be important to its success in activating N$_2$ in both stoichiometric and catalytic reactions.[15,21,35] However, an analogous series of N$_2$ complexes has not been characterized to allow for direct comparison. Whereas the anion [(TP$^{iPr}$B)]FeN$_2$]$^-$ has been studied by X-ray crystallography (Fe—B=2.311(2) Å), the [(TP$^{iPr}$B)Fe]$^+$ cation does not coordinate N$_2$ at atmospheric pressure, and attempts to obtain the crystal structure of neutral (TP$^{iPr}$B)FeN$_2$ have been unsuccessful.[25,35] Nonetheless, our chemical intuition is that the Fe—B linkage in (TP$^{iPr}$B)Fe will be appreciably more flexible than the Fe—C linkage in (CP$^{iPr}_3$)Fe.

Figure 17:
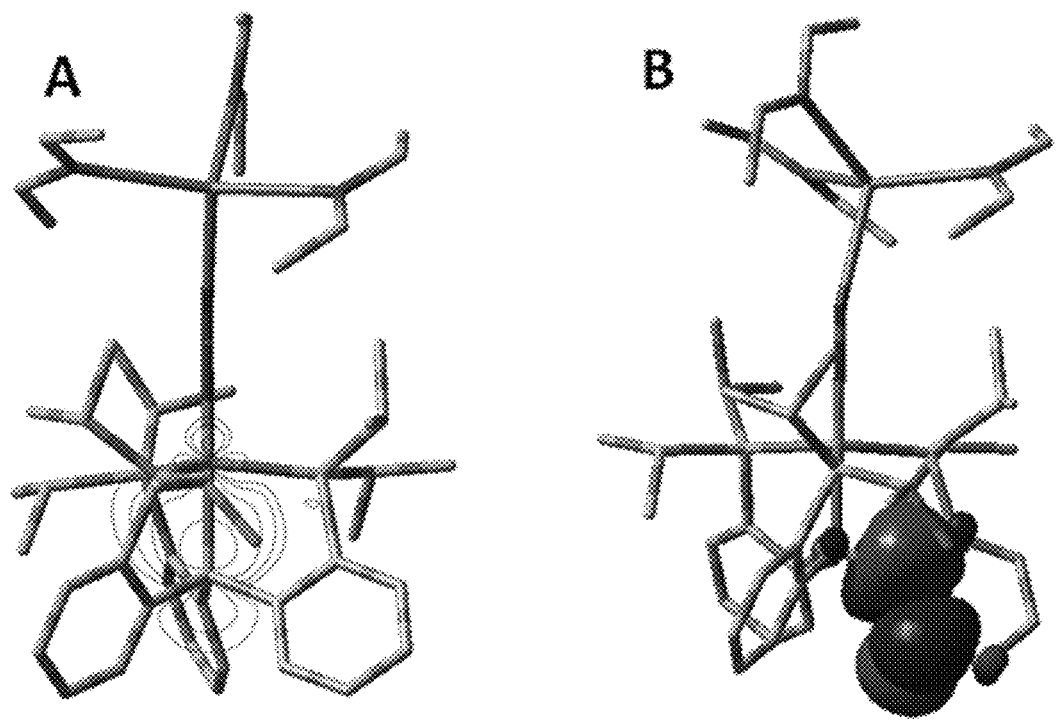
FIG. 17. (A) Isocontour plot of the Fe—$C_{alkyl}$ σ bond of $12[K(Et_2O)_3]$ located from NBO analyses. (B) Contour plot of one of the $C_{aryl}$ π* orbitals which accepts delocalized electron density from the Fe—$C_{alkyl}$ σ bond.

The C$_{alkyl}$-Fe interactions in both (CP$^{iPr}_3$)FeN$_2^-$ (12) and (C$^{Si}$P$^{Ph}_3$)FeN$_2^-$ reflect a higher degree of ionic character than in a prototypical Fe—C$_{alkyl}$ bond, with (C$^{Si}$P$^{Ph}_3$)FeN$_2^-$ being most striking in this context.[22] Comparative DFT studies of (C$^{Si}$P$^{Ph}_3$)FeN$_2^-$ and (CP$^{iPr}_3$)FeN$_2^-$ including NBO analyses, support this view,[22,36] predicting strong polarization of the σ-bond pair towards the C-atom (23% Fe/77% C in (S$^{Si}$P$^{Ph}_3$)FeN$_2^-$; 27% Fe/73% C in (CP$^{iPr}_3$)FeN$_2^-$) (FIG. 17). As expected, the Fe—C bond in 12 is slightly more covalent than that in (C$^{Si}$P$^{Ph}_3$)FeN$_2^-$, where the axial carbon is flanked by electropositive silicon atoms. Comparative NBO analyses for (C$^{Si}$P$^{Ph}_3$)FeN$_2^-$, (SiP$^{iPr}_3$)FeN$_2^-$.

Second-order perturbation analysis from an NBO calculation indicates the presence of stabilizing donor-acceptor interactions between filled and virtual orbitals, representing deviations from a simple Lewis structure description due to electronic delocalization.[36] In the case of 12, significant interactions between the filled Fe—C$_{alkyl}$ σ bond and π* orbitals of the aryl rings (C$_{ipso}$-C$_{ortho}$) are evident (FIG. 17). Three primary donor-acceptor interactions (one to each ring) are located, representing stabilizations of 6.70 kcal/mol, 5.99 kcal/mol, and 5.95 kcal/mol. This result supports that stabilization of the negative charge on carbon by delocalization onto the aryl rings is at least partially responsible for the observed ionic character of the Fe—C bond, and hence for its increased flexibility. A similar stabilization of ionic character at an N$_2$—Fe—C$_{interstitial}$ site of the cofactor may facilitate N$_2$ binding.

Reactivity Studies. To compare the reactivity of (CP$^{iPr}_3$)FeN$_2^-$ at the bound N$_2$ ligand with (SiP$^{iPr}_3$)FeN$_2^-$, (C$^{Si}$P$^{Ph}_3$)FeN$_2^-$, and (TP$^{iPr}$B)FeN$_2^-$, treatment of 12 with TMSCl at −78° C. was examined and afforded the diamagnetic diazenido complex (CP$^{iPr}_3$)FeN$_2$SiMe$_3$ (14) (υ(NN)=1736 cm$^{-1}$). This product, though it has not been structurally characterized, is spectroscopically similar to those obtained for the structurally related Si- and B-anchored systems.[15,17]

More interesting is the comparative behavior of (CP$^{iPr}_3$)FeN$_2^-$ on treatment with proton/electron equivalents at low temperature. Numerous studies have explored the possibility of Fe—N$_2$ protonation/reduction to release ammonia,[3,4,5,6,37] which in all but one case[21] afforded low chemical yields of NH$_3$ (ca. ≤10% per Fe in one step; 35% per Fe overall in two independent synthetic steps[14]). The C-anchored system (C$^{SiPPh}_3$)FeN$_2^-$ (FIG. 13) follows a similar trend, affording negligible NH$_3$ on treatment at low temperature with [H(Et$_2$O)$_2$][BAr$^F_4$] and KC$_8$. The Si-anchored system (SiP$^{iPr}_3$)FeN$_2^-$ also affords sub-stoichiometric NH$_3$ yields (35% per Fe) when similarly treated, and instead produces some N$_2$H$_4$ (~45% per Fe) when H(Et$_2$O)BF$_4$ and CrCl$_2$ are employed.[24]

By contrast, cooling a solution of 12[K(Et$_2$O)$_{0.5}$] in Et$_2$O at −78° C. followed by the addition of 40 equiv KC$_8$ and then 38 equiv [H(Et$_2$O)$_2$][BAr$^F_4$] leads to the formation of 4.6±0.8 equiv NH$_3$ (230% per Fe; average of 8 runs; Eq. 1), a yield that establishes a modest degree of N$_2$ reduction catalysis at low temperature. No N$_2$H$_4$ is observed. With 12[K(12-crown-4)$_2$] as the catalyst, the NH$_3$ yield is slightly lower at 3.5±0.3 equiv. NH$_3$ quantification was carried out by UV-Vis using the indophenol protocol[38] as recently described in detail for the (TP$^{iPr}$B)FeN$_2^-$ catalyst system.[21] The total NH$_3$ product yield is lower for (CP$^{iPr}_3$)FeN$_2^-$ than that which was obtained for (TP$^{iPr}$B)FeN$_2^-$ when acid was added prior to the reductant. The significance of these modest differences is unclear, especially given the extreme air-sensitivity of the catalysts and the low turnover numbers. The order of addition of reagents has a minor effect; reversing the order and adding first acid, then reductant to 12[K(Et$_2$O)$_{0.5}$] decreases the yield to 3.8±0.6 equiv. NH$_3$ per Fe. In side-by-side comparisons using the same batches of reagents (KC$_8$ and [H(Et$_2$O)$_2$][BAr$^F_4$]) and the same order of addition (reductant added first), 12[K(Et2O)0.5] afforded 4.4±0.2 equiv. NH3 per Fe, as compared to 5.0±1.1 for (TPiPrB)FeN2- and 0.8±0.4 for (SiPiPr3)FeN2-.

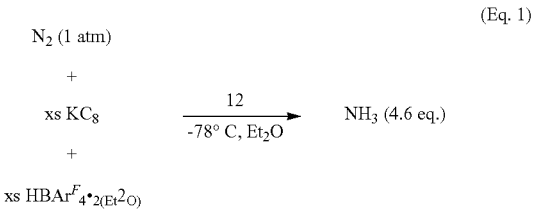

(Eq. 1)

Treatment of 12[K(Et$_2$O)$_{o.5}$] with 10 equivalents of [H(Et$_2$O)$_2$][BAr$^F_4$] in the absence of added reductant generates negligible ammonia (<0.05 equivalents), verifying that both acid and reductant are necessary for the production of substantial amounts of NH$_3$.

In order to examine possible reasons for the limited turnover for ammonia production with this system, we sought to determine the fate of the precatalyst over the course of the experiment. An analysis of the iron-containing products of a reaction mixture using 10 equivalents of [H(Et$_2$O)$_2$][BAr$^F_4$] and 12 equivalents of KC$_8$ (FIG. 18) identified the major iron-containing product as (CP$^{iPr}_3$)FeN$_2$ (11), which is readily reduced by KC$_8$ even at low temperature to reform the precatalyst 12. However, a significant amount of (CP$^{iPr}_3$)Fe(N$_2$)(H) (9) is also present; 9 is not catalytically competent, generating no detectable ammonia when subjected to the catalytic conditions, and its formation is likely an important limiting factor in the catalyst performance. Another identifiable species by $^1$H NMR is (CP$^{iPr}_3$)FeCl (10). Despite our efforts to remove all Cl$^-$ in the preparation of [H(Et$_2$O)$_2$][BAr$^F_4$], the large excess of acid employed in this experiment likely ensures a non-negligible Cl$^-$ impurity that may also attenuate catalyst activity. The $^1$H NMR is generally indicative of another diamagnetic hydride-bearing species.

Figure 18:
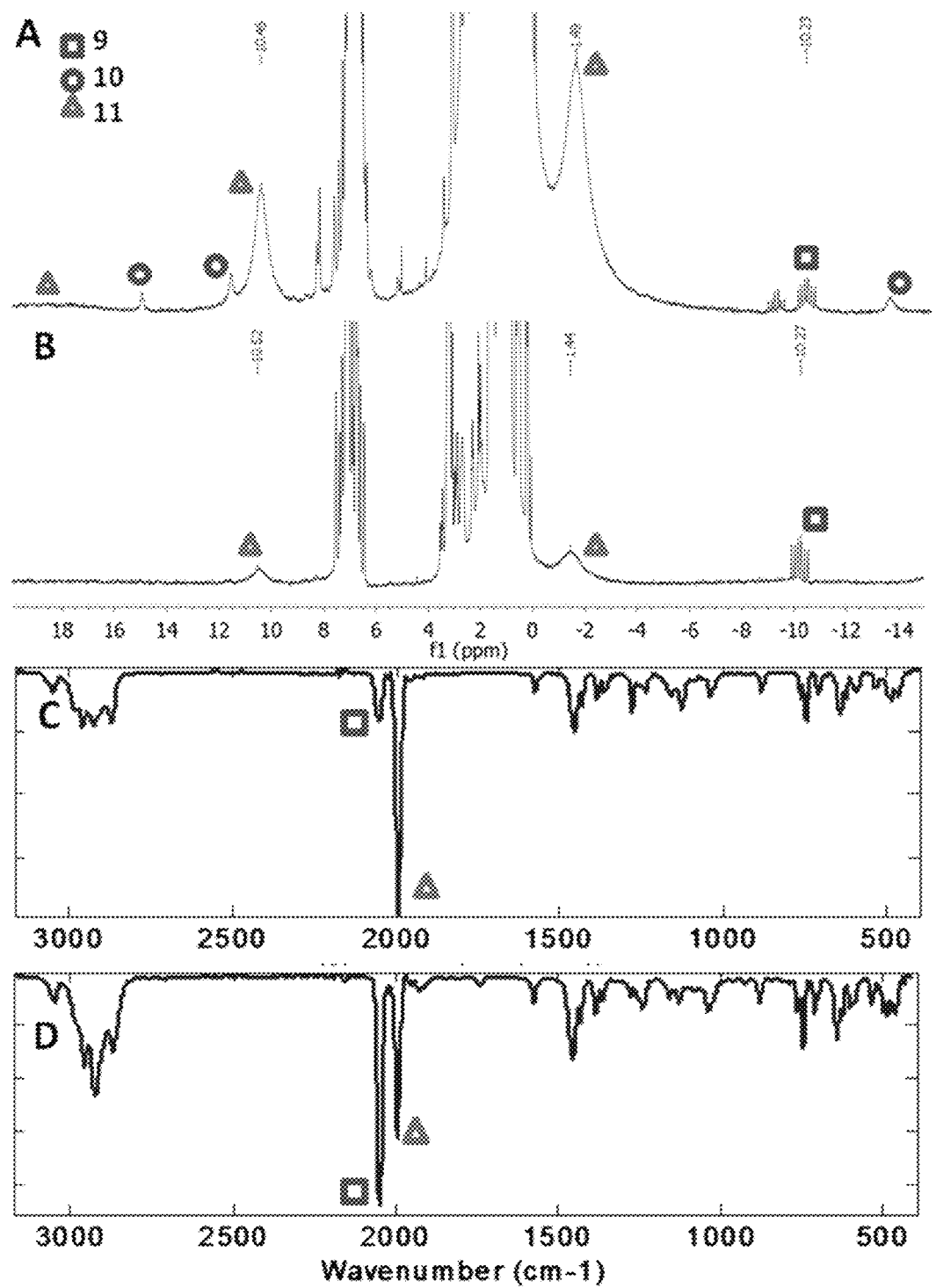
FIG. 18. Spectroscopic analyses of reaction mixtures following the catalytic production of $NH_3$ using $12[K(Et_2O)_{0.5}]$ as a catalyst. Symbols indicate characteristic resonances attributed to 9, 10, and 11. (A),(C) $^1H$ NMR and IR spectra of a post-catalytic reaction mixture using 10 equiv. of $[H(Et_2O)_2][BAr^F_4]$ and 12 equiv. of $KC_8$. (B),(D) $^1H$ NMR and IR spectra of a post-catalytic reaction mixture using 38 equiv. of $[H(Et_2O)_2][BAr^F_4]$ and 40 equiv. of $KC_8$.
Figure 19:
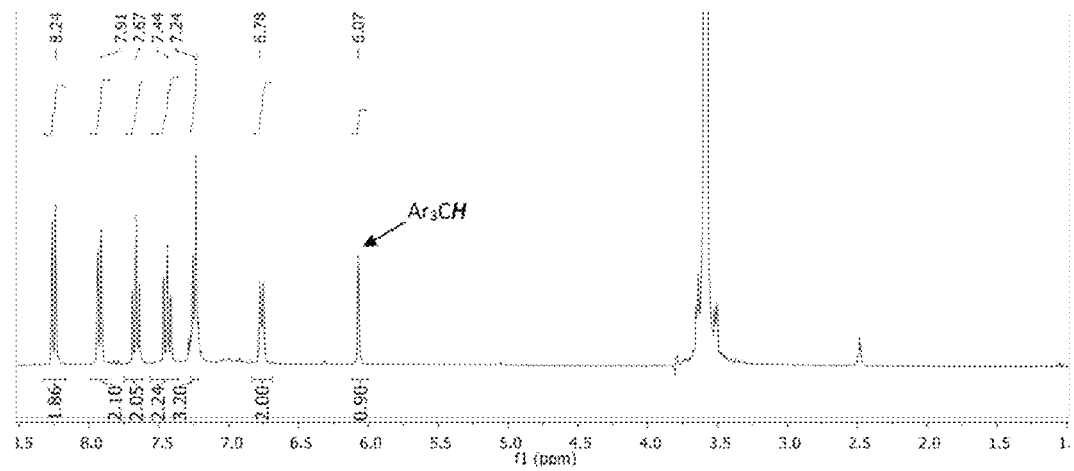
FIG. 19. $^1H$ NMR of 2 (DMSO-$d_6$, 300 MHz).
Figure 20:
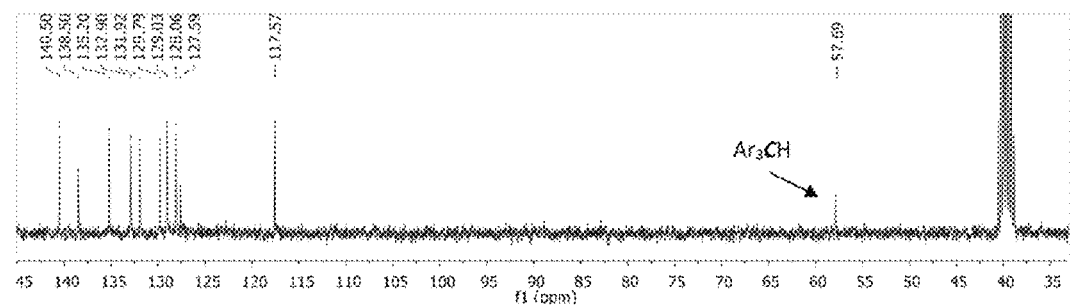
FIG. 20. $^{13}C$ NMR of 2 (DMSO-$d_6$, 75 MHz).
Figure 21:
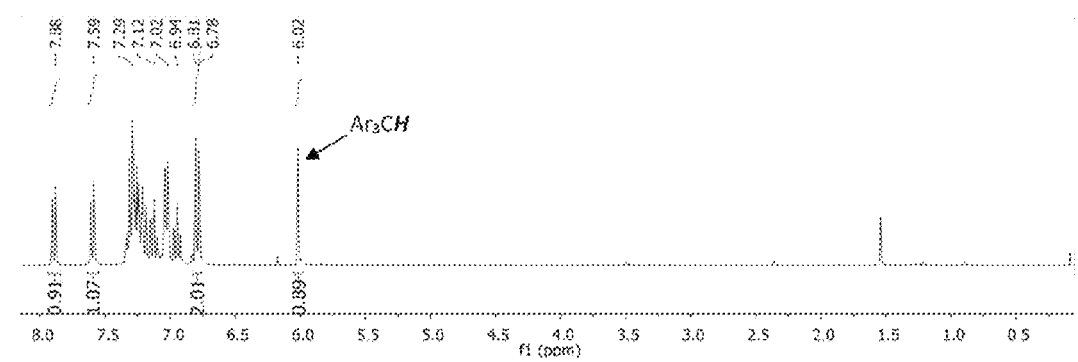
FIG. 21. $^1H$ NMR of 3 ($CDCl_3$, 300 MHz).
Figure 22:
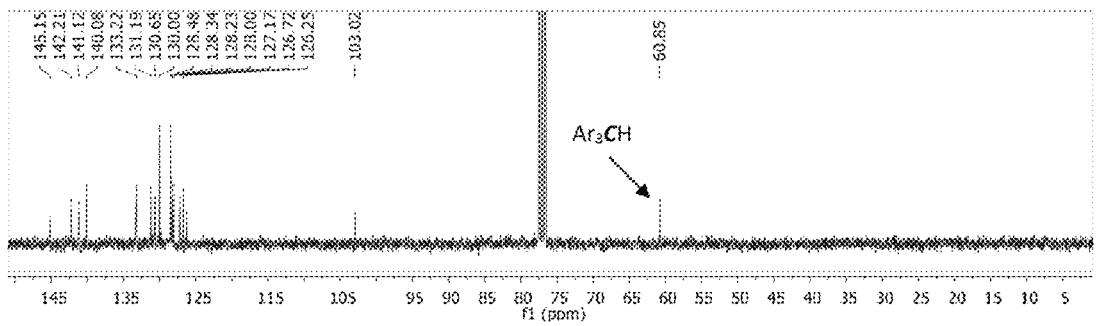
FIG. 22. $^{13}C$ NMR of 3 ($CDCl_3$, 75 MHz).
Figure 23:
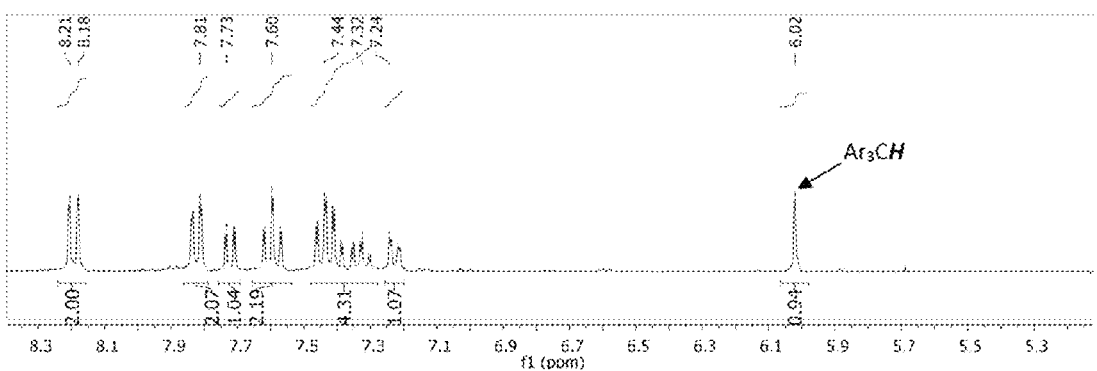
FIG. 23. $^1H$ NMR of 4 (aromatic region) in DMSO-$d_6$ (300 MHz).
Figure 24:
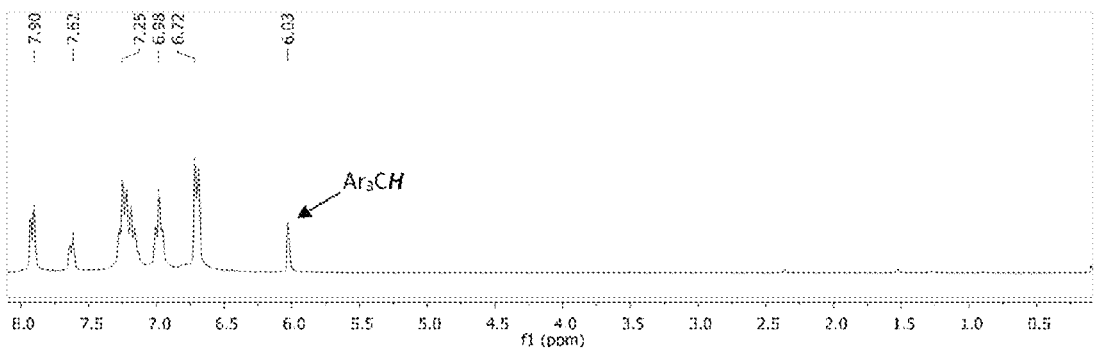
FIG. 24. $^1H$ NMR of 5 ($CDCl_3$, 300 MHz).
Figure 25:
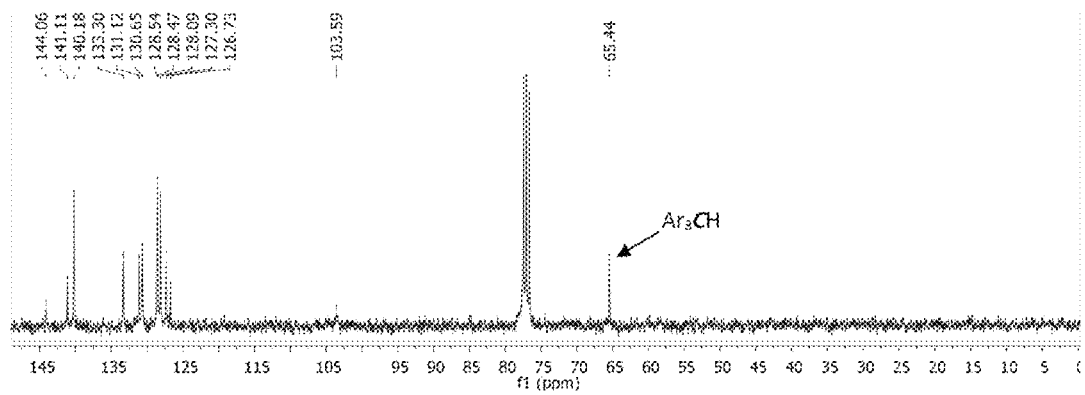
FIG. 25. $^{13}C$ NMR of 5 ($CDCl_3$, 75 MHz).
Figure 26:
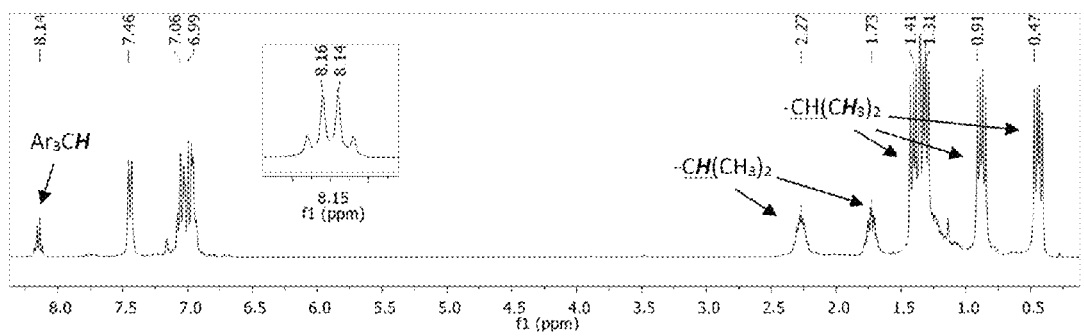
FIG. 26. $^1H$ NMR of 1 ($C_6D_6$, 300 MHz) with inset showing coupling to central methine proton.
Figure 27:
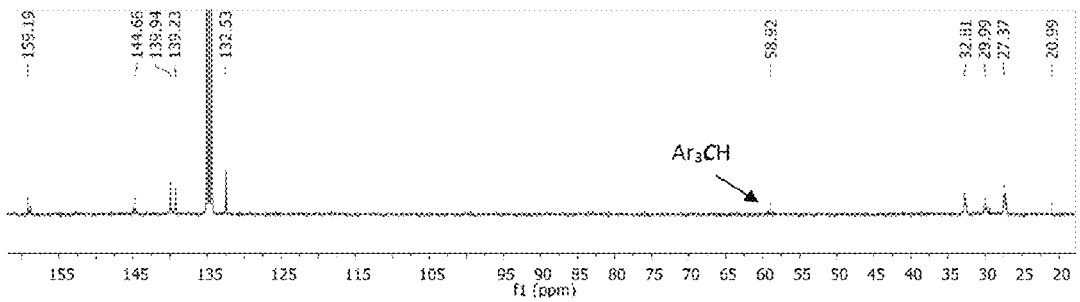
FIG. 27. $^{13}C$ NMR of 1 ($C_6D_6$, 75 MHz).
Figure 28:
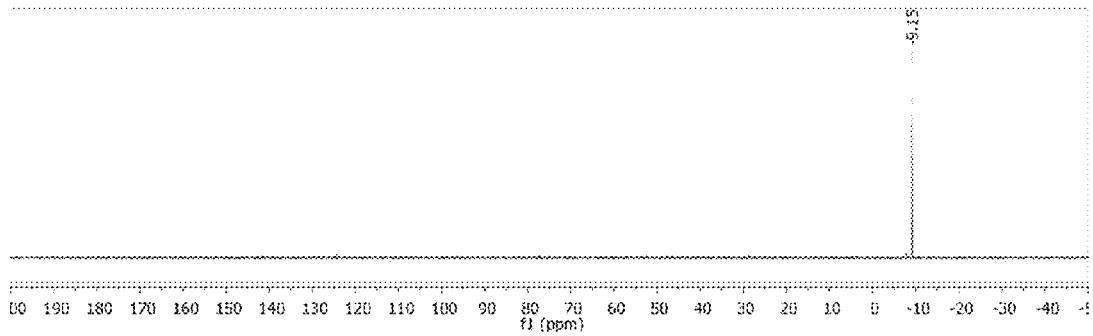
FIG. 28. $^{31}P$ NMR of 1 ($C_6D_6$, 300 MHz).
Figure 29:
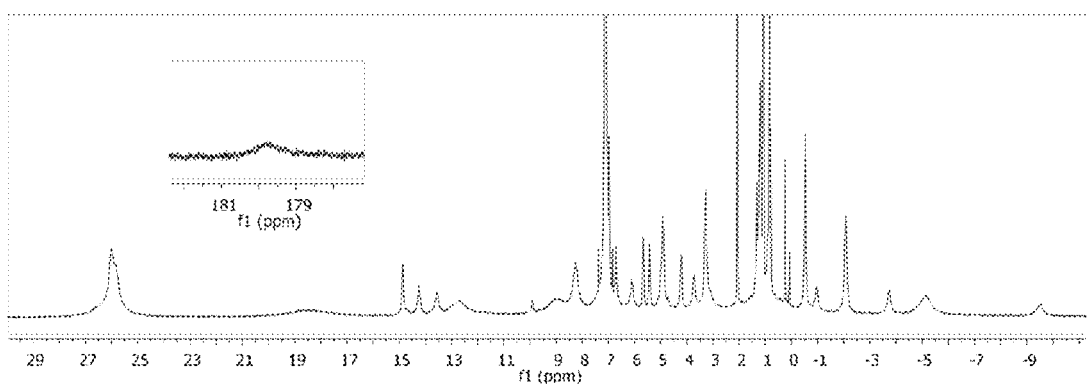
FIG. 29. $^1H$ NMR of 6 ($C_6D_6$) with inset showing peak at 180 ppm. No other peaks appear outside the range depicted.
Figure 30:
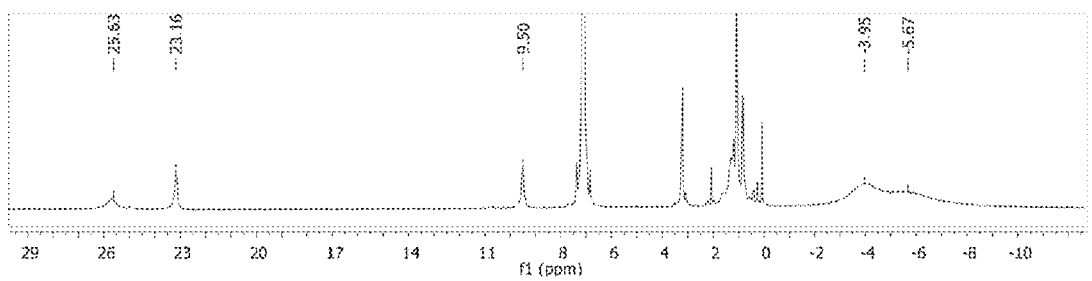
FIG. 30. $^1H$ NMR of 7 ($C_6D_6$, 300 MHz), unpurified, generated by reduction of 6 with sodium amalgam in benzene.
Figure 31:
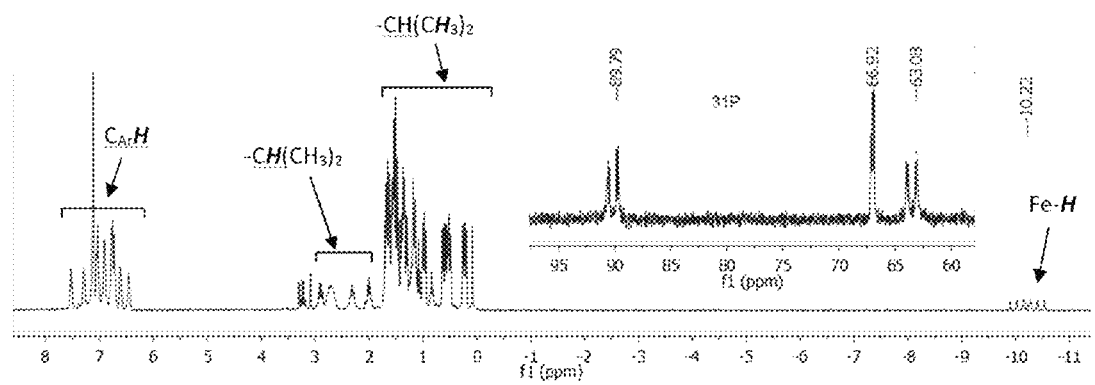
FIG. 31. $^1H$ NMR of 9 ($C_6D_6$, 300 MHz) with inset showing $^{31}P$ NMR.
Figure 32:
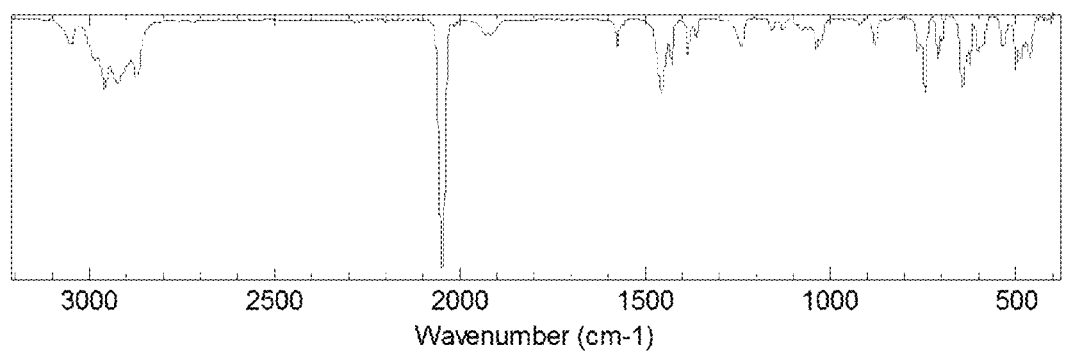
FIG. 32. IR (thin film deposited from benzene) of 9; v(NN)=2046 $cm^{-1}$; v(FeH)=1920 $cm^{-1}$.
Figure 33:
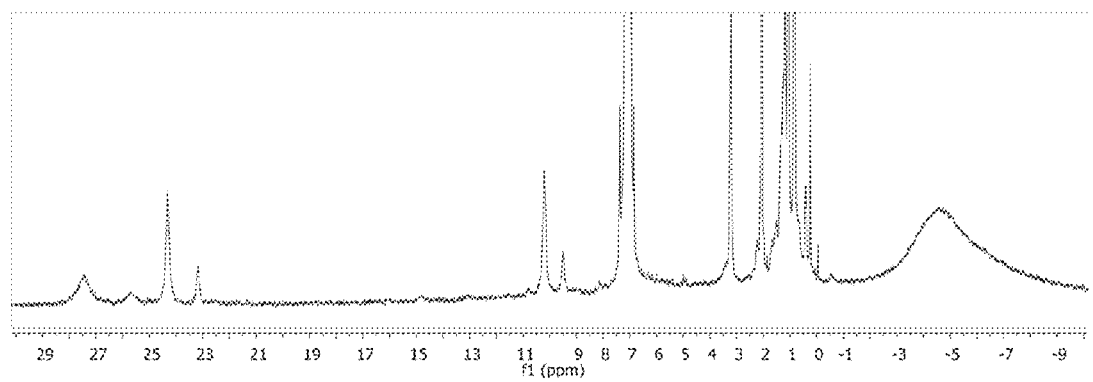
FIG. 33. $^1H$ NMR of 8 ($C_6D_6$, 300 MHz), unpurified, generated by reduction of CP3HFeBr2 with isopropyl magnesium chloride in toluene. For unknown reasons the reaction appears to yield a mixture of two closely related paramagnetic species.
Figure 34:
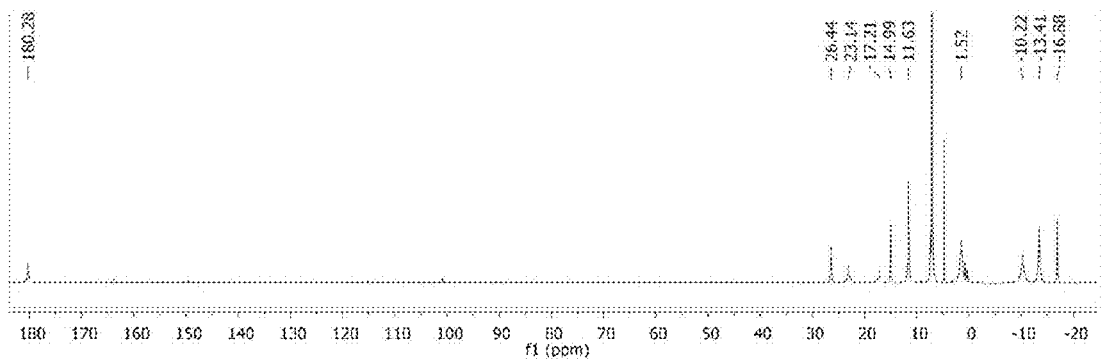
FIG. 34. $^1H$ NMR of 10 ($C_6D_6$, 300 MHz).
Figure 35:
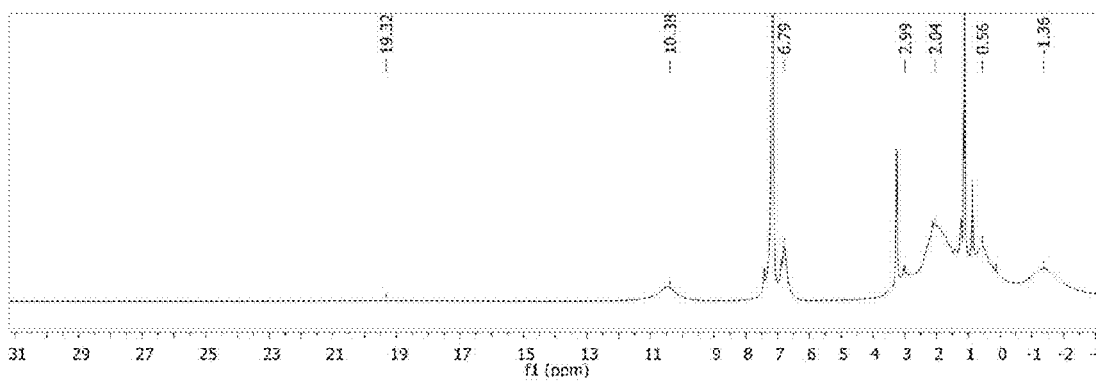
FIG. 35. $^1H$ NMR of 11 ($C_6D_6$, 300 MHz).
Figure 36:
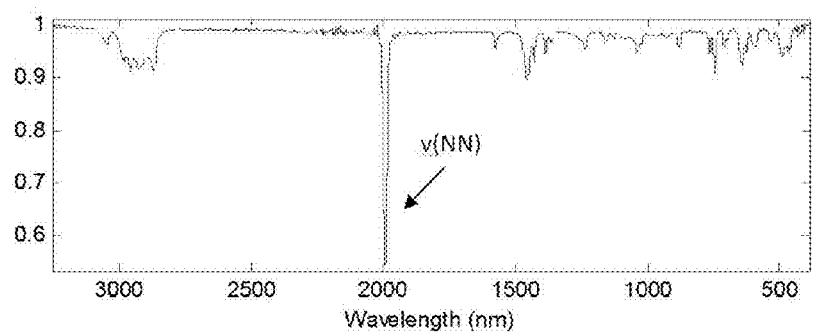
FIG. 36. IR (thin film deposited from benzene) of 11. v(NN)=1992 $cm^{-1}$.
Figure 37:
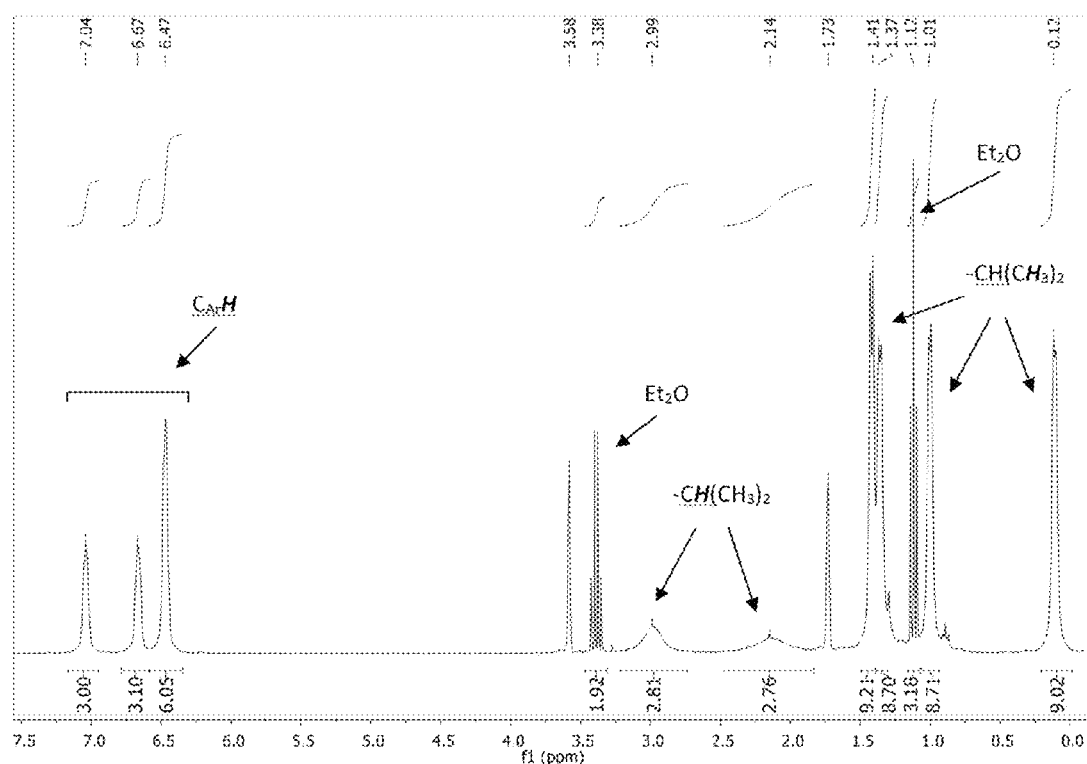
FIG. 37. $^1H$ NMR of 12 ($d^8$-THF, 300 MHz).
Figure 38:
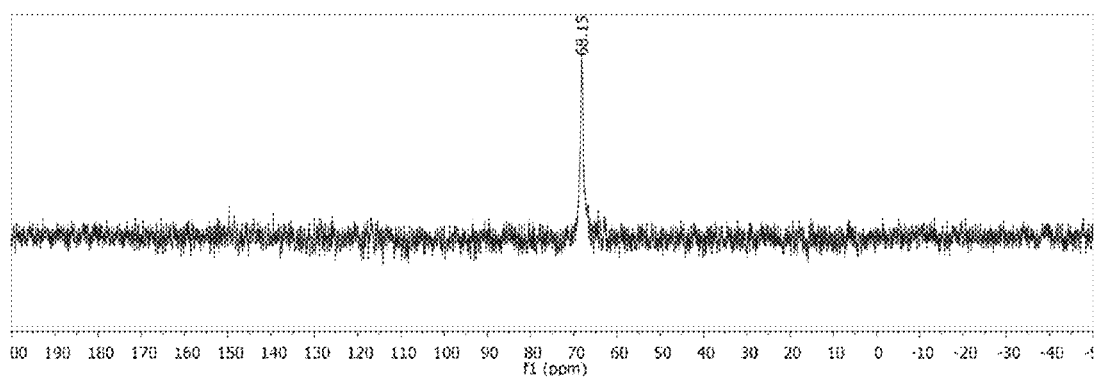
FIG. 38. $^{31}P$ NMR of 12.
Figure 39:
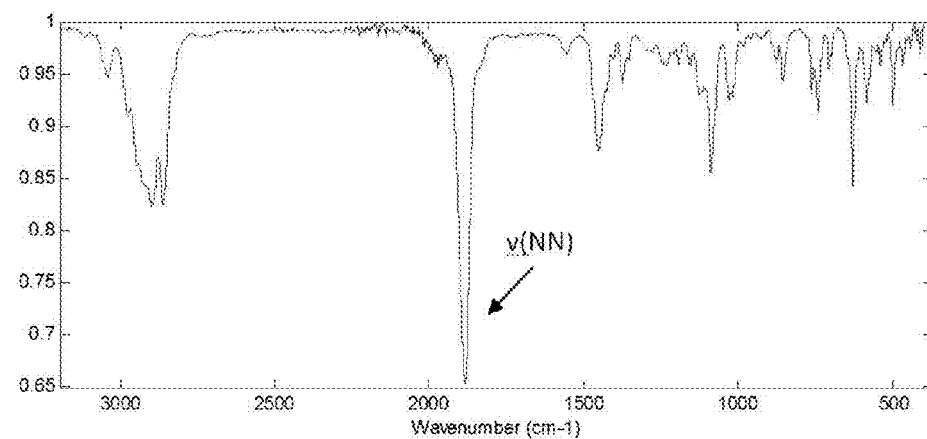
FIG. 39. IR spectrum of 12 as a thin film deposited from dimethoxyethane.
Figure 40:
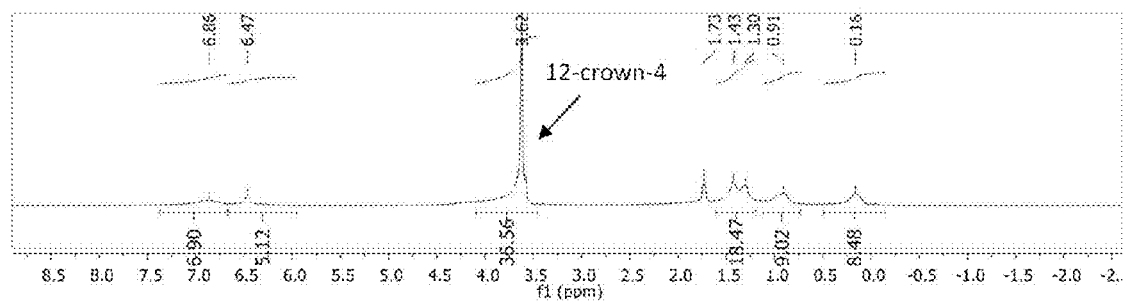
FIG. 40. $^1H$ NMR of $12[K(12\text{-crown-}4)_2]$ in $d_8$-THF.
Figure 41:
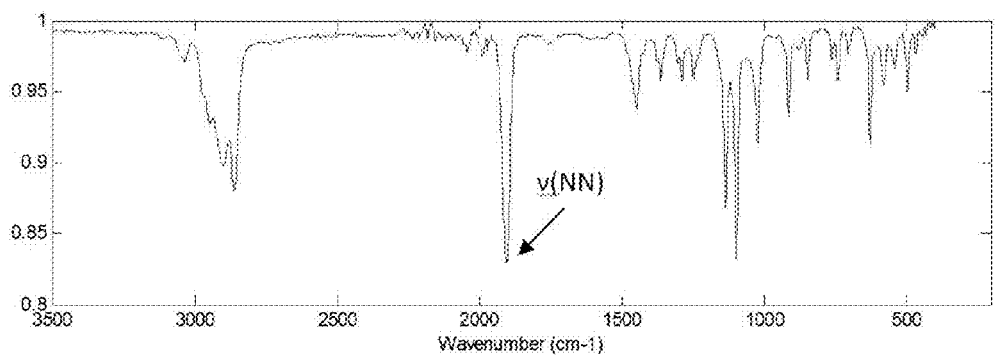
FIG. 41. IR of $12[K(12\text{-crown-}4)_2]$ (thin film from THF).
Figure 42:
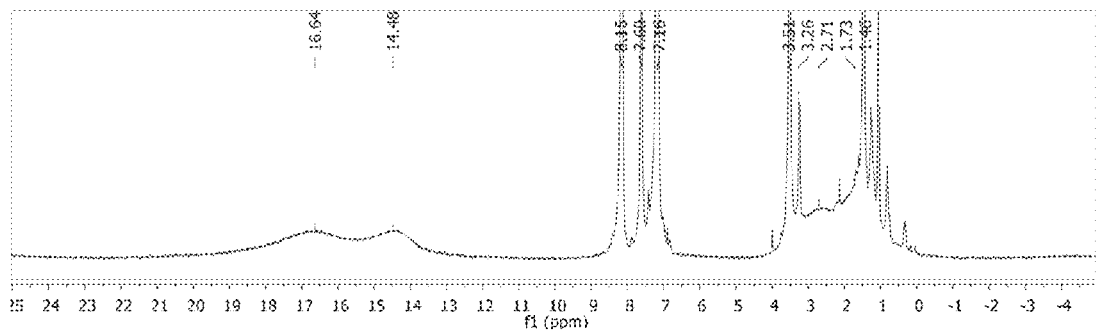
FIG. 42. $^1H$ NMR (4:1 $C_6D_6$/THF-$d_8$ under $N_2$, 300 MHz, 298 K) of 13.
Figure 43:
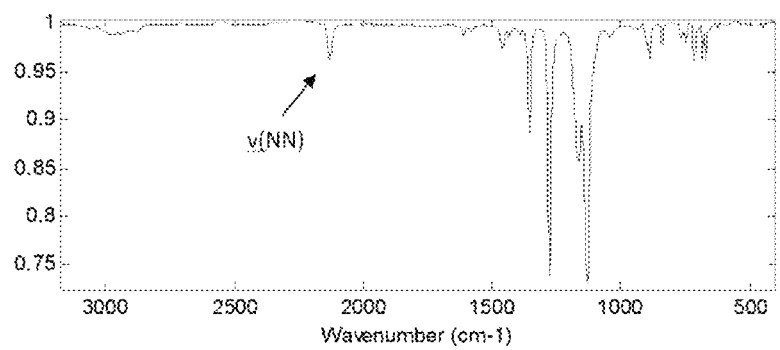
FIG. 43. IR of 13 as a thin film deposited from THF.
Figure 44:
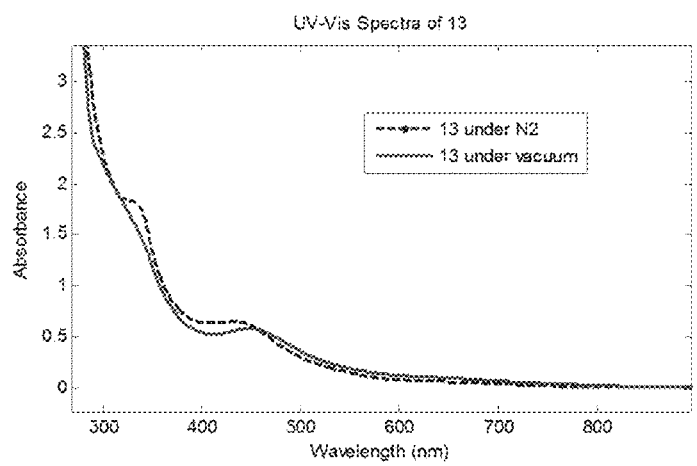
FIG. 44. UV-Vis spectra of 13 under $N_2$ and under static vacuum (after three freeze-pump-thaw cycles). 13 is in a solution of 3:1 $Et_2O$:THF at a concentration of 0.54 mM.
Figure 45:
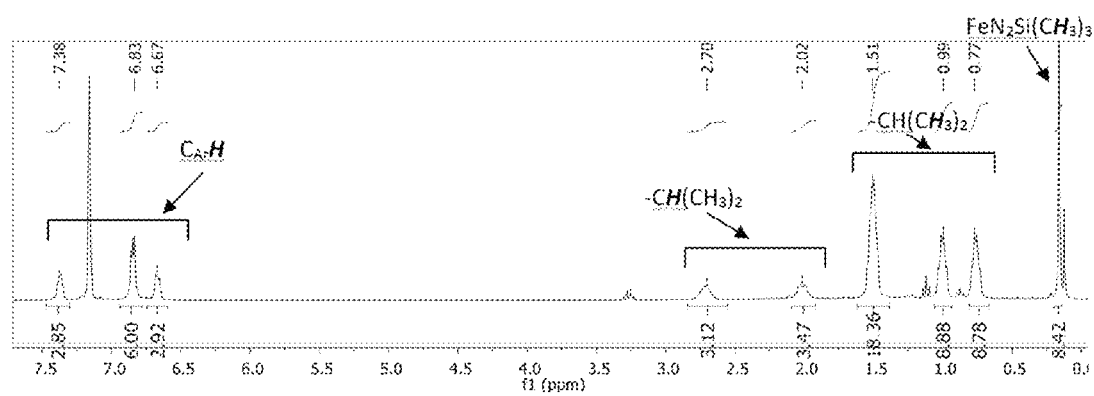
FIG. 45. $^1H$ NMR of 14, $C_6D_6$.
Figure 46:
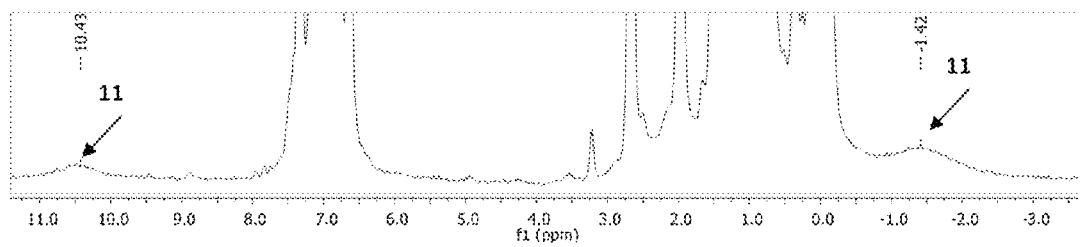
FIG. 46. $^1H$ NMR of 14, showing paramagnetic regions magnified to show minor contamination with $CP^{iPr}_3FeN_2$ (11).
Figure 47:
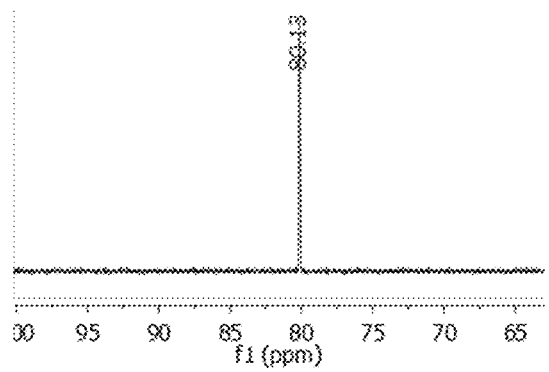
FIG. 47. $^{31}P$ NMR of 14 ($C_6D_6$).
Figure 48:
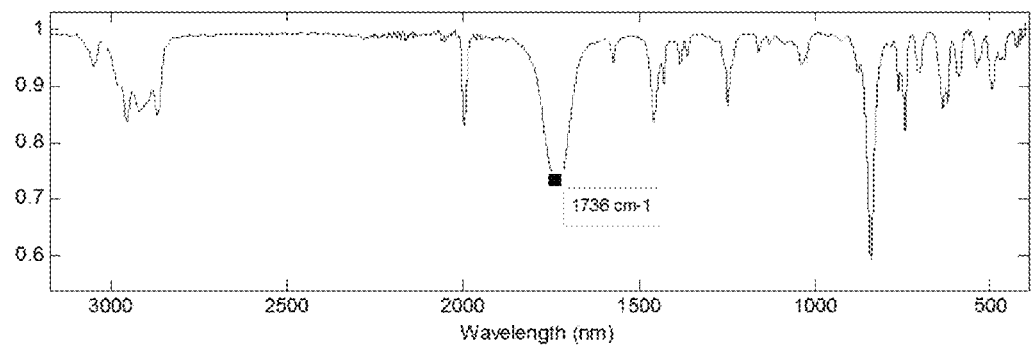
FIG. 48. IR (thin-film from $C_6D_6$) of 14. Peak at 1992 $cm^{-1}$ is contamination by $CP^{iPr}_3FeN_2$.

Further product analysis using the full catalytic conditions (38 equivalents of [H(Et$_2$O)$_2$][BAr$^F_4$] and 40 equivalents of KC$_8$ with respect to the catalyst), showed that increasing amounts of (CP$^{iPr}_3$)Fe(N$_2$)(H) (9) are formed as the system goes through more turnovers, corroborating the idea that this species serves as a catalytically inactive sink which builds up throughout the reaction. Integration of the NMR spectrum of such a reaction mixture against an internal standard suggests that approximately 70% of the catalyst has been converted to 9; even at this point, however, some active catalyst remains in the form of 11 (FIG. 18). The unknown hydride species present in the aforementioned reaction mixture derived from fewer equivalents of acid and reductant is no longer observed.

Notably, in neither of these experiments was any free ligand 1 (nor any ligand decomposition product) detected; it appears that all of the iron present remains ligated by the CP$^{iPr}_3$ ligand. This lack of degradation is promising, and suggests that improvements to the N$_2$ reduction catalysis, in terms of turnover number, may yet prove possible if the formation of terminal hydride 9 can be limited by modification of either the ligand scaffold and/or the catalytic conditions. Indeed, it may be that biological nitrogenases are designed to avoid catalytically inactive hydride sinks by being themselves modest hydrogenases.[39] A cluster approach would be a particularly good design in this context.[40]

CONCLUSIONS

To conclude, we have synthetically introduced the tripodal (CPiPr3)H ligand and have prepared and structurally compared its {(CP$^{iPr}_3$)FeN$_2$}$^n$ complexes (n=0, −1, +1) with those of the isostructural series {(SiP$^{iPr}_3$)FeN$_2$}$^n$. The {(CP$^{iPr}_3$)FeN$_2$}$^n$ complexes feature an axial N$_2$ ligand bound trans to an axial C-atom in a trigonal bipyramidal geometry, a design meant to model one plausible geometry for a single Fe—N$_2$ binding site in the iron-molybdenum cofactor (FeMoco). The C$_{alkyl}$-Fe interaction in the (CP$^{iPr}_3$) Fe system exhibits a substantially higher degree of ionic character, and is more flexible, than for the related Si$_{silyl}$-Fe interaction in the isostructural and isoelectronic (SiP$^{iPr}_3$)Fe system.[17] These results support that this type of Fe—C flexibility generally models the flexibility one can intuit for an N$_2$—Fe—C$_{interstitial}$ interaction within FeMoco. Whereas the N$_2$ anion (SiP$^{iPr}_3$)FeN$_2^-$ does not effectively facilitate the delivery of H-atoms to N$_2$ to produce NH$_3$ via proton/reductant equivalents, an Et$_2$O solution of (CP$^{iPr}_3$)FeN$_2^-$ under 1 atm of N$_2$ releases ca. 4.6 equiv NH$_3$ relative to Fe. The modest catalytic N$_2$ reduction behavior of (CP$^{iPr}_3$)FeN$_2^-$ at −78° C. is comparable to (TP$^{iPr}$B) FeN$_2^-$.[21]

It is noteworthy that amongst the isostructural SiP$^{iPr}_3$, TP$^{iPr}$B, and CP$^{iPr}_3$ series, the system with the most flexible axial linkage, (TP$^{iPr}$B)Fe, gives the greatest catalytic yield under a common set of reaction conditions, while the least flexible, (SiP$^{iPr}_3$)Fe, gives only substoichiometric yields of ammonia; the (CP$^{iPr}_3$)Fe system falls in between the two both in terms of flexibility and catalytic competence. These results may be consistent with the hypothesis that a flexible Fe—$C_{interstitial}$ interaction might facilitate $N_2$ binding and reduction at a single Fe site within FeMoco. Our structural and DFT studies[22] demonstrate that, in the right environment, a carbon atom can serve as a modestly flexible ligand trans to an Fe—$N_2$ binding site, and that this flexibility is enhanced by the ability of the carbon to accommodate a significant ionic charge. It seems likely to us that the inorganic carbide ligand in FeMoco is similarly, and likely more, able to stabilize substantial ionic character in the Fe—$C_{interstitial}$ bond (FIG. 12), resulting in a flexible interaction that initially exposes an $N_2$ binding site that can be further modulated as a function of the $N_xH_y$ reduction state.

Within our synthetic series, it may be that different catalysts follow different mechanistic pathways (distal vs. alternating, or some hybrid path);[21,41] for instance the most flexible system, (TP$^{iPr}$B)Fe, may be better suited to facilitate a distal pathway that samples strongly pi-bonded intermediates, while (CP$^{iPr}_3$)Fe, which we presume is less flexible, could instead be dominated by an alternating or hybrid pathway.

Experimental Methods

General. All manipulations were carried out using standard Schlenk or glovebox techniques under an $N_2$ atmosphere. Unless otherwise noted, solvents were deoxygenated and dried by thoroughly sparging with $N_2$ followed by passage through an activated alumina column in a solvent purification system by SG Water, USA LLC. Non-halogenated solvents were tested with a standard purple solution of sodium benzophenone ketyl in tetrahydrofuran in order to confirm effective moisture removal. O-iodotriphenylmethane,[28] H(OEt$_2$)$_2$[B(3,5-(CF$_3$)$_2$—C$_6$H$_3$)$_4$],[42] KC$_8$,[43] [(TPB)FeN$_2$][Na(12-crown-4)$_2$],[25] [(SiP$^{iPr}_3$)FeN$_2$][Na(12-crown-4)$_2$][17] and [(C$^{Si}$P$^{Ph}_3$)FeN$_2$][K(18-crown-6)$_2$][22] were prepared according to literature procedures. [Decamethylferrocenium][B(3,5-(CF$_3$)$_2$—C$_6$H$_3$)$_4$] was prepared by treating [ferrocenium][B(3,5-(CF$_3$)$_2$—C$_6$H$_3$)$_4$][44] with decamethylferrocene and used without purification. FeI$_2$(THF)$_2$ was prepared by treating Fe powder with $I_2$ in THF,[45] and was dried to FeI$_2$ by heating under vacuum at 80° C. for 6 hours. All other reagents were purchased from commercial vendors and used without further purification unless otherwise stated.

Physical Methods. Elemental analyses were performed by Robinson Microlit Laboratories (Ledgewood, N.J.). Deuterated solvents were purchased from Cambridge Isotope Laboratories, Inc., degassed, and dried over active 3-Å molecular sieves prior to use. $^1$H and $^{13}$C chemical shifts are reported in ppm relative to tetramethylsilane, using residual proton and $^{13}$C resonances from solvent as internal standards. $^{31}$P and $^{19}$F chemical shifts are reported in ppm relative to 85% aqueous $H_3PO_4$ and $CFCl_3$, respectively. Solution phase magnetic measurements were performed by the method of Evans.[46] Optical spectroscopy measurements were taken on a Cary 50 UV-Vis spectrophotometer using a 1-cm two-window quartz cell. Electrochemical measurements were carried out in a glovebox under a dinitrogen atmosphere in a one compartment cell using a CH Instruments 600B electrochemical analyzer. A glassy carbon electrode was used as the working electrode and platinum wire was used as the auxiliary electrode. The reference electrode was Ag/AgNO$_3$ in THF. The ferrocene couple Fc+/Fc was used as an internal reference. Solutions (THF) of electrolyte (0.2 M tetra-n-butylammonium hexafluorophosphate) and analyte were also prepared under an inert atmosphere.

X-ray Crystallography. XRD studies were carried out at the Beckman Institute Crystallography Facility on a Bruker Kappa Apex II diffractometer (Mo Kα radiation). Structures were solved using SHELXS and refined against $F^2$ on all data by full-matrix least squares with SHELXL.[47] The crystals were mounted on a wire loop. Methyl group hydrogen atoms not involved in disorder were placed at calculated positions starting from the point of maximum electron density. All other hydrogen atoms, except where otherwise noted, were placed at geometrically calculated positions and refined using a riding model. The isotropic displacement parameters of the hydrogen atoms were fixed at 1.2 (1.5 for methyl groups) times the $U_{eq}$ of the atoms to which they are bonded.

Computations. A single-point calculation and Natural Bond Orbital (NBO) analysis was carried out on [(CP$^{iPr}_3$)FeN$_2$][K(Et$_2$O)$_3$] (12) using the crystallographically determined atomic coordinates at the B3LYP/6-31++G(d,p) level of theory using the Gaussion03 suite of programs.[48] NBO analysis located a polarized α interaction between Fe and the C-atom anchor (C01).

10-phenyl-10H-dibenzo[b,e]iodininium Bromide (2). The procedure for the generation of 2 and 4 (below) was adapted from a reported method for the generation of diaryliodonium salts.[29] 3-chloroperoxybenzoic acid (9.0 g, ~70% by mass, ~0.037 mol) was dissolved in dichloromethane (150 mL) and cooled to 0° C. 2-iodotriphenylmethane (11.7 g, 0.0316 mol) was added as a solid in portions over the course of 10 minutes, during which time there was no observable change to the reaction mixture. This mixture was stirred at 0° C. for 10 minutes and then neat trifluoromethanesulfonic acid (8.74 mL, 0.0990 mol) was added via syringe over the course of 5 minutes. The reaction mixture turned dark brown. After an additional 20 minutes, the reaction mixture was allowed to warm to room temperature and stirred for one hour, and then the solvent was removed in vacuo. The solid material was suspended in 200 mL of diethyl ether and 200 mL of water, and then solid sodium bromide (14 g, 0.136 mol) was added and the mixture was shaken vigorously for 5 minutes, during which time a fine off-white precipitate developed. The precipitate was collected atop a sintered glass frit and washed copiously with water and diethyl ether (14.2 g, 0.0316 mol, quant). $^1$H NMR ((CD$_3$)$_2$S=O, 300 MHz, 298 K, δ): 8.27 (dd, J=8 Hz, 1 Hz, 2H), 7.68 (td, J=8 Hz, 1 Hz, 2H), 7.46 (td, J=8 Hz, 1 Hz), 7.27 (m, 3H), 6.78 (dm, J=8 Hz, 2H), 6.09 (s, 1H) ppm. $^{13}$C NMR ((CD$_3$)$_2$S=O, 75.4 MHz, 298 K, δ): 140.3 (s), 138.3 (s), 135.0 (s), 132.7 (s), 131.7 (s), 129.6 (s), 128.9 (s), 127.9 (s), 127.4 (s), 117.4 (s), 57.7 (s) ppm. ESI-MS (positive ion, amu): Calc. 370.0; Found 370.0.

2-bromo-2'-iodotriphenylmethane (3). 10-phenyl-10H-dibenzo[b,e]iodininium bromide (16.11 g, 0.0358 mol) was suspended in dry, degassed acetonitrile (250 mL), and solid tetrabutylammonium bromide (25 g, 0.078 mol) and copper (I) bromide (8 g, 0.06 mol) were added. The mixture was heated to a vigorous reflux and stirred at reflux for five days. The dark brown reaction mixture was then concentrated to dryness in vacuo, extracted with toluene, and filtered through a silica plug. The pale yellow filtrate was concentrated to dryness and the resulting material was recrystalized from methanol to give the desired product as an off-white powder which was collected atop a sintered glass frit and washed with cold methanol (12.7 g, 0.0282 mol, 79%). $^1$H NMR (CDCl$_3$, 300 MHz, 298 K, δ): 7.90 (dd, J=8 Hz, 1 Hz, 1H), 7.60 (dd, J=8 Hz, 1 Hz, 1H), 7.34-7.18 (m, 5H), 7.13 (td, J=8 Hz, 1 Hz, 1H), 7.03 (dd, J=8 Hz, 1 Hz, 2H), 6.95 (td, J=8 Hz, 1 Hz, 1H), 6.79 (dd, J=8 Hz, 1 Hz, 2H), 6.02 (s, 1H) ppm. $^{13}$C NMR (CDCl$_3$, 75.4 MHz, 298 K, δ): 145.2 (s), 142.2 (s), 141.1 (s), 140.1 (s), 133.1 (s), 131.2 (s), 130.7 (s), 130.0 (s), 128.5 (s), 128.3 (s), 128.2 (s), 128.0 (s), 127.2 (s), 126.7 (s), 126.3 (s), 102.9 (s), 60.8 (s) ppm. MS (amu): Calc. 449.9, 447.9; Found 449.9, 447.9.

10-(2-bromophenyl)-10H-dibenzo[b,e]iodininium iodide (4). 3-chloroperoxybenzoic acid (5 g, ~70% by mass, ~0.0203 mol) was dissolved in dichloromethane (200 mL) and cooled to 0° C. 2-bromo-2'-iodotriphenylmethane (8.2 g, 0.0182 mol) was added as a solid in portions over the course of 10 minutes, during which time there was no observable change in the reaction mixture. This mixture was stirred at 0° C. for 10 minutes and then neat trifluoromethanesulfonic acid (5.04 mL, 0.0571 mol) was added via syringe over the course of 5 minutes. The reaction mixture turned dark brown. After an additional 30 minutes, the reaction mixture was allowed to warm to room temperature and stirred for 30 minutes, and then the solvent was removed in vacuo. The solid material was suspended in 200 mL of diethyl ether and 200 mL of water, and then solid potassium iodide (15 g, 0.090 mol) was added and the mixture was shaken vigorously for 5 minutes, during which time a fine yellow precipitate developed. The precipitate was collected atop a sintered glass frit and washed copiously with water and diethyl ether (9.95 g, 0.0173 mol, 95%). $^1$H NMR ((CD$_3$)$_2$S=O, 300 MHz, 298 K, δ): 8.20 (dd, J=8 Hz, 1 Hz, 2H), 7.83 (dd, J=8 Hz, 1 Hz, 2H), 7.72 (dd, J=8 Hz, 1 Hz, 1H), 7.60 (td, J=8 Hz, 1 Hz, 2H), 7.47-7.39 (m, 3H), 7.33 (td, J=8 Hz, 1 Hz, 1H), 7.23 (dd, J=8 Hz, 1 Hz, 1H), 6.02 (s, 1H) ppm. $^{13}$C NMR ((CD$_3$)$_2$S=O, 75.4 MHz, 298 K, δ): 138.9 (s), 135.4 (s), 135.1 (s), 135.0 (s), 133.4 (s), 132.8 (s), 131.7 (s), 130.7 (s), 130.0 (s), 128.0 (s), 117.2 (s), 110.0 (s), 58.8 (s) ppm. ESI-MS (positive ion, amu): Calc. 446.9, 448.9; Found 446.9, 448.9.

2-bromo-2',2"-diiodotriphenylmethane (5): Solid 10-(2-bromophenyl)-10H-dibenzo[b,e]iodininium iodide (4.54 g, 7.88 mmol) was sealed inside a Schlenk tube under N$_2$ and heated to 200° C. for 15 minutes, and then cooled to room temperature. The resulting dark violet residue was taken up in dichloromethane (50 mL) and washed with saturated aqueous sodium thiosulfate (50 mL) and then water (30 mL) and saturated aqueous sodium chloride (30 mL), then dried over magnesium sulfate, filtered, and concentrated to dryness in vacuo. The resulting off-white residue was recrystallized from methanol to give the desired product as a fine white powder, which was collected atop a sintered glass frit and washed with cold methanol (3.4 g, 5.90 mmol, 75%). $^1$H NMR (CDCl$_3$, 300 MHz, 298 K, δ): 7.93 (d, J=8 Hz, 2H), 7.64 (d, J=8 Hz, 1H), 7.30-7.16 (m, 4H), 7.00 (t, J=8 Hz, 2H), 6.72 (d, J=8 Hz, 3H), 6.04 (s, 1H) ppm. $^{13}$C NMR (CDCl$_3$, 75.4 MHz, 298 K, δ): 144.1 (s), 141.1 (s), 140.2 (s), 133.3 (s), 131.1 (s), 130.7 (s), 128.6 (s), 128.5 (s), 127.3 (s), 126.7 (s), 103.6 (s), 65.4 (s) ppm. MS (amu): Calc. 573.8, 575.8; Found 446.9, 448.9 ([M-I]+), 368.1 ([M-I-Br]+), 320.1, 322.1 ([M-2I]+).

Tris(2-(diisopropylphosphino)phenyl)methane ("C$^{iPr}$P$_3$)H") (1): 2-bromo-2',2"-diiodotriphenylmethane (2.00 g, 3.48 mmol) was dissolved in diethyl ether (100 mL) and cooled to −78° C. while stirring. Solid t-butyllithium (1.36 g, 21.23 mmol) was added in portions over the course of 10 minutes and the reaction mixture was stirred at low temperature for 3 hours. Then chlorodiisopropylphosphine (1.96 g, 12.8 mmol) was dissolved in 10 mL of diethyl ether and added to the reaction mixture. The reaction mixture was allowed to warm slowly to room temperature overnight, resulting in the precipitation of a fine white solid. The reaction mixture was filtered through silica and the pale yellow-orange filtrate was concentrated to a sticky yellow solid which was triturated with acetonitrile to give an off-white powder. The solid was washed copiously with acetonitrile and then dried under vacuum, giving 1.4 g (2.36 mmol, 68%) of the desired product. $^1$H NMR (C$_6$D$_6$, 300 MHz, 298 K, δ): 8.15 (q, J=6 Hz, 1H), 7.44 (d, J=7 Hz, 3H), 7.06 (td, J=7 Hz, 2 Hz, 3H), 7.00-6.93 (m, 6H), 2.27 (septet of doublets, J=4 Hz, 7 Hz, 3H), 1.73 (septet of doublets, J=3 Hz, 7 Hz, 3H), 1.40 (dd, J=7 Hz, 13 Hz, 9H), 1.32 (dd, J=7 Hz, 12 Hz, 9H), 0.88 (dd, J=7 Hz, 13 Hz, 9H), 0.44 (dd, J=7 Hz, 12 Hz, 9H) ppm. $^{13}$C NMR (C$_6$D$_6$, 75.4 MHz, 298 K, δ): 159.0 (d, J=29 Hz), 144.8 (d, J=17 Hz), 140.0 (s), 139.3 (s), 132.4 (s), 59.1 (m), 32.7 (m), 30.0 (m), 29.4 (s), 27.3 (m), 21.0 (s) ppm. $^{31}$P NMR (C$_6$D$_6$, 121.4 MHz, 298 K, δ): −9.1 ppm. Anal. Calcd. for C$_{37}$H$_{55}$P$_3$: C, 74.97; H, 9.35. Found: C, 74.73; H, 9.49.

{(CP$^{iPr}$$_3$)H}FeI$_2$ (6): (CP$^{iPr}$$_3$)H (500 mg, 0.843 mmol) was added to FeI$_2$ (350 mg, 1.13 mmol) in 15 mL of toluene and stirred at 60° C. for 2 hours, at which point the reaction mixture was filtered through Celite and the yellow filtrate was concentrated to give a yellow powder (761 mg, 0.843 mmol, quant). Crystals suitable for X-ray diffraction were grown by layering of pentane over a saturated toluene solution. $^1$H NMR (C$_6$D$_6$, 300 MHz, 298 K, δ): 179.69, 26.00, 18.60, 14.92, 14.28, 13.62, 12.74, 9.96, 9.00, 8.29, 6.76, 6.16, 5.72, 5.48, 4.97, 4.28, 3.78, 0.30, 0.13, −0.48, −0.91, −2.02, −3.68, −5.09, −9.45 ppm. μ$_{eff}$ (C$_6$D$_6$, Evans' method, 298 K): 4.85 μ$_B$.

(CP$^{iPr}$$_3$)Fe(N$_2$)H (9): (CP$^{iPr}$$_3$)HFeI$_2$ (370 mg, 0.410 mmol) was suspended in benzene (10 mL) and stirred vigorously over an excess of 0.7% sodium/mercury amalgam (25 mg Na, 1.1 mmol) for two hours. The initially yellow suspension turned a deep brick red color during this time due to the formation of {(CP$^{iPr}$$_3$)H}FeI (7). The reaction mixture was filtered through Celite and concentrated to dryness in vacuo. The deep red residue was then suspended in diethyl ether (15 mL) at −78° C. and 3 mL of dimethoxyethane was added; this solution was vigorously stirred over excess sodium mirror for 4 hours at −78° C., during which time the color lightened to orange. The reaction mixture was then filtered through Celite and concentrated to dryness. The residue was extracted into pentane and again filtered through Celite, giving a lighter yellow-orange filtrate which was concentrated to dryness again. This residue could be recrystallized from diethyl ether by slow evaporation to give yellow crystalline solids. These solids were washed with hexamethyldisiloxane and minimal cold diethyl ether, and then dried in vacuo to give 155 mg (0.229 mmol, 56%) of the desired product. Crystals suitable for X-ray diffraction were grown by evaporation of a concentrated pentane solution into hexamethyldisiloxane. $^1$H NMR (C$_6$D$_6$, 300 MHz, 298 K, δ): 7.57 (t, J=6 Hz, 1H), 7.34 (m, 1H), 7.08 (m, 2H), 6.96 (m, 2H), 6.83-6.75 (m, 4H), 6.65 (m, 1H), 6.50 (m, 1H), 2.94 (septet, J=8 Hz, 1H), 2.75 (m, 2H), 2.36 (septet, J=6 Hz, 1H), 2.05 (septet, J=7 Hz, 1H), 1.75-1.17 (m, 25H), 1.02 (dd, J=7 Hz, 11 Hz, 3H), 0.65 (dd, J=7 Hz, 15 Hz, 3H), 0.56 (dd, J=7 Hz, 10 Hz, 3H), 0.27 (dd, J=8 Hz, 13 Hz, 3H), −10.2 (ddd, J=38 Hz, 53 Hz, 50 Hz) ppm. $^{31}$P NMR (C$_6$D$_6$, 121.4 MHz, 298 K, δ): 90.1 (dt, J=100 Hz, 17 Hz, 1P), 67.0 (m, 1P), 63.4 (dt, J=100 Hz, 17 Hz, 1P) ppm. IR (thin film; cm$^{-1}$): 2046 (N—N), 1920 (Fe—H). Anal. Calcd. for C$_{37}$H$_{55}$FeP$_3$N$_2$: C, 65.68; H, 8.19; N, 4.14. Found: C, 65.91; H, 7.89; N, 3.94.

{(CP$^{iPr}$$_3$)H}FeBr (8): {(CP$^{iPr}$$_3$)H}FeBr$_2$ (5.0 mg, 0.0070 mmol, generated by treating CP$_3$H with anhydrous FeBr$_2$ in toluene) was dissolved in toluene, cooled to −78° C., and treated with isopropyl magnesium chloride (3.5 μL, 2.0M in Et$_2$O). The reaction mixture rapidly turned dark brick-red. It was stirred at low temperature for one hour and then allowed to warm to room temperature for thirty minutes before being filtered and concentrated. The dark red powder was not purified, but was analyzed by NMR in C$_6$D$_6$, and X-ray quality crystals were grown by layering pentane over a filtered benzene solution.

(CP$^{iPr}$$_3$)FeCl (10): (CP$^{iPr}$$_3$)Fe(N$_2$)H (61 mg, 0.0901 mmol) was dissolved in diethyl ether (8 mL) and cooled to −78° C. HCl in diethyl ether (1.0 M, 108 μL, 0.108 mmol) was added to the solution in one portion. The reaction mixture was stirred at low temperature for one hour and then warmed to room temperature and stirred overnight. The color darkened to deep red-orange, and the reaction mixture was filtered through Celite and concentrated to dryness. The red residue was recrystallized by evaporation of a pentane solution into hexamethyldisiloxane and the resulting dark red crystals were washed sparingly with cold pentane and dried in vacuo, giving 46 mg (0.0673 mmol, 75%) of (CP$^{iPr}$$_3$)FeCl. Crystals suitable for X-ray diffraction were grown by evaporation of a concentrated pentane solution into hexamethyldisiloxane. $^1$H NMR (C$_6$D$_6$, 300 MHz, 298 K, δ): 179.93, 26.47, 23.05, 17.44, 17.22, 15.03, 11.66, 1.52, −10.27, −13.36, −16.82 ppm. μ$_{eff}$(C$_6$D$_6$, Evans' method, 298 K): 4.92 μ$_B$. Anal. Calcd. for C$_{37}$H$_{54}$FeP$_3$Cl: C, 65.06; H, 7.97. Found: C, 64.96; H, 8.01.

(CP$^{iPr}$$_3$)FeN$_2$ (11): (CP$^{iPr}$$_3$)FeCl (82 mg, 0.120 mmol) was dissolved in THF (2 mL) and stirred over sodium mirror for 20 minutes, or until NMR analysis showed complete consumption of the starting material, and then filtered and concentrated. The residue was extracted with pentane and filtered through Celite, and concentrated to a brownish-orange residue which was recrystallized by evaporation of a pentane solution into hexamethyldisiloxane. The dark brown-orange crystals were washed with hexamethyldisiloxane and cold pentane and dried in vacuo to give 39 mg (0.0581 mmol, 48%) of (CP$^{iPr}$$_3$)FeN$_2$. Crystals suitable for X-ray diffraction were grown by evaporation of a concentrated pentane solution into hexamethyldisiloxane. $^1$H NMR (C$_6$D$_6$, 300 MHz, 298 K, δ): 19.3 (very broad), 10.4, 6.8, 3.0, 2.0, 0.6, −1.4 ppm. μ$_{eff}$(C$_6$D$_6$, Evans' method, 298 K): 1.75 μ$_B$. IR (thin film; cm$^{-1}$): 1992 (N—N). Anal. Calcd. for C$_{37}$H$_{54}$FeP$_3$N$_2$: C, 65.78; H, 8.06; N, 4.15. Found: C, 66.03; H, 8.01; N, 3.86.

[(CP$^{iPr}$$_3$)FeN$_2$][K(Et$_2$O)$_{0.5}$] (12[K(Et$_2$O)$_{0.5}$]): (CP$^{iPr}$$_3$)FeCl (40 mg, 0.0586 mmol) was dissolved in diethyl ether (5 mL) at room temperature and an excess of potassium graphite (KC$_8$, 25 mg) was added. The reaction mixture was stirred for 10 minutes and then filtered through Celite. The dark brown solution was concentrated to about 2 mL and then pentane was layered over the ether solution and it was allowed to stand overnight during which time dark bluish-brown crystals formed. The supernatant was decanted and the crystals were washed thoroughly with pentane and thoroughly dried under vacuum, giving 26 mg of the desired product (0.0277 mmol, 47%). NMR analysis indicates the presence of 0.5 ether solvent molecules per anion. Crystals suitable for X-ray diffraction were grown by vapor diffusion of pentane into a diethyl ether solution; in these crystals the potassium cation is solvated by three diethyl ether molecules. $^1$H NMR (d$_8$-THF, 300 MHz, 298 K, δ): 7.04 (s, 3H), 6.67 (s, 3H), 6.47 (s, 6H), 3.38 (q, J=7 Hz, 2H, diethyl ether (CH$_3$CH$_2$)$_2$O), 2.99 (br s, 3H), 2.14 (br s, 3H), 1.42 (d, J=6 Hz, 9H), 1.36 (d, J=5 Hz, 9H), 1.12 (t, J=7 Hz, 3H, diethyl ether (CH$_3$CH$_2$)$_2$O), 1.01 (d, J=5 Hz, 9H), 0.12 (d, 9H) ppm. $^{31}$P NMR (5:1 C$_6$D$_6$/d$_8$-THF, 121.4 MHz, 298 K, δ): 68.1 ppm. IR (thin film deposited from Et$_2$O; cm$^{-1}$): 1870 (N—N).

[(CP$^{iPr}$$_3$)FeN$_2$][K(12-c-4)$_2$] (12[K(12-c-4)$_2$]). A sample of 12 (15 mg, 0.020 mmol) was dissolved in diethyl ether (1 mL) and 12-crown-4 (8.8 mg, 0.050 mmol) was added as a solution in diethyl ether (1 mL). The resulting solution was layered with pentane and allowed to stand overnight, resulting in the crystallization of 12[K(12-crown-4)$_2$] as a very dark blue solid. The crystals were washed with pentane and dried under vacuum, giving 10 mg of material (53% yield). $^1$H NMR (d$_8$-THF, 300 MHz, 298 K, δ) 6.86 (br s, 6H), 6.47 (s, 6H), 3.62 (s, 36H, 12-crown-4), 1.43 (s, 9H), 1.30 (s, 9H), 0.91 (s, 9H), 0.16 (s, 9H) ppm. $^{31}$P (C$_6$D$_6$, 121.4 MHz, 298 K, δ): 66 ppm. IR (thin film; cm$^{-1}$) 1905 (N—N).

[(CP$^{iPr}$$_3$)FeN$_2$][B(3,5-(CF$_3$)$_2$—C$_6$H$_3$)$_4$] (13): (C$^{iPr}$P$_3$)FeN$_2$ (7.3 mg) was dissolved in diethyl ether (1 mL) and a solution of [Fe(C$_5$Me$_5$)$_2$][B(3,5-(CF$_3$)$_2$—C$_6$H$_3$)$_4$] in diethyl ether (1 mL) was added dropwise while stirring at room temperature. The reaction mixture was then concentrated to give an orange solid which was washed with benzene and then dried in vacuo. Crystals suitable for X-ray diffraction were grown by slow evaporation of a diethyl ether solution into hexamethyldisiloxane. $^1$H NMR (4:1 C$_6$D$_6$/THF-d$_8$ under N$_2$, 300 MHz, 298 K, δ): 16.65, 14.48, 8.15, 7.60, 2.71 ppm. (Note: the exact position of the paramagnetically shifted NMR peaks varies with the composition of the solvent due to the likely exchange of the N$_2$ ligand with THF). μ$_{eff}$(d$_8$-THF, Evans' method, 298 K): 4.3 μ$_B$. IR (thin film; cm$^{-1}$): 2128 (N—N). Satisfactory elemental analysis could not be obtained due to the lability of the coordinated N$_2$ ligand.

(CP$^{iPr}$$_3$)FeN$_2$SiMe$_3$ (14): [(CP$^{iPr}$$_3$)FeN$_2$][K(Et$_2$O)$_{0.5}$] (35 mg, 0.0465 mmol) was dissolved in diethyl ether (2 mL) and cooled to −78° C. Trimethylsilyl chloride (6 μL, 0.0473 mmol) was dissolved in diethyl ether (1 mL) and added dropwise to the stirring reaction mixture. The reaction was stirred at low temperature for one hour and then warmed to room temperature for one hour, concentrated to dryness, taken up in pentane, filtered through Celite, and concentrated. The red-orange residue was recrystallized by slow evaporation of a pentane solution into hexamethyldisiloxane, and the resulting red solids were washed with cold hexamethyldisiloxane and dried in vacuo to give 21 mg (0.0280 mmol, 60%) of solid material, which was contaminated with a small amount of CP$_3$FeN$_2$ (11) which we were unable to remove by repeated recrystallization. 14 decomposes slowly to 11 over time. $^1$H NMR (C$_6$D$_6$, 300 MHz, 298 K, δ) 7.33 (br m, 3H), 6.80 (t, J=4 Hz, 6H), 6.63 (m, 3H), 2.67 (septet, J=7 Hz, 3H), 1.97 (septet, J=7 Hz, 3H), 1.45 (m, 18H), 0.96 (q, J=7 Hz, 9H), 0.72 (q, J=7 Hz, 9H), 0.12 (s, 3H) ppm. $^{31}$P (C$_6$D$_6$, 121.4 MHz, 298 K, δ): 80.1 ppm. IR (thin film; cm$^{-1}$) 1736 (N—N).

Ammonia Quantification. A Schlenk tube was charged with HCl (4 mL of a 1.0 M solution in Et$_2$O, 4 mmol). Reaction mixtures were vacuum transferred into this collection flask. Residual solid in the reaction vessel was treated with a solution of [Na][O-t-Bu] (40 mg, 0.4 mmol) in 1,2-dimethoxyethane (1 mL) and sealed. The resulting suspension was allowed to stir for 10 minutes before all volatiles were again vacuum transferred into the collection flask. After completion of the vacuum transfer, the flask was sealed and warmed to room temperature. Solvent was removed in vacuo and the remaining residue was dissolved in H$_2$O (1 mL). An aliquot of this solution (20 μL) was then analyzed for the presence of NH$_3$ (trapped as [NH$_4$][Cl]) via the indophenol method.[38] Quantification was performed with UV-Vis spectroscopy by analyzing absorbance at 635 nm.

Standard catalytic procedure with [(CP$^{iPr}$$_3$)FeN$_2$][K(Et$_2$O)$_{0.5}$] (12): [(CP$^{iPr}$$_3$)FeN$_2$][K(Et$_2$O)$_{0.5}$] (1.9 mg, 0.0025 mmol) was dissolved in Et$_2$O (0.5 mL) in a small Schlenk tube equipped with a stir bar. This solution was cooled to −78° C. in a cold well inside of the glove box. A suspension of KC$_8$ (14 mg, 0.100 mmol) in Et$_2$O (0.75 mL) was cooled to −78° C. and added to the reaction mixture with stirring. After five minutes, a similarly cooled solution of HBAr$^F$$_4$·2 Et$_2$O (93 mg, 0.092 mmol) in Et$_2$O (1.0 mL) was added to the suspension in one portion with rapid stirring. Any remaining acid was dissolved in cold Et$_2$O (0.25 mL) and added subsequently, and the Schlenk tube was sealed. The reaction was allowed to stir for 60 minutes at −78° C. before being warmed to room temperature and stirred for 15 minutes.

REFERENCES

1. Smil, V. *Enriching the Earth* (MIT Press, Cambridge, 2001).
2. (a) Burgess, B. K.; Lowe, D. J. *Chem. Rev.* 1996, 96, 2983-3011. (b) Eady, R. R. *Chem. Rev.* 1996, 96, 3013-3030.
3. Peters, J. C.; Mehn, M. P. in *Activation of Small Molecules: Organometallic and Bioinorganic Perspectives* ed. Tolman, W. B.) 81-119 (Wiley-VCH, 2006).
4. Hazari, N. *Chem. Soc. Rev.* 2010, 39, 4044.
5. MacLeod, K. C.; Holland, P. L. *Nature Chem.* 2013, 5, 559.
6. Crossland, J. L.; Tyler, D. R. *Coord. Chem. Rev.* 2010, 254, 1883.
7. Yandulov, D. V.; Schrock, R. R. *Science* 2003, 301, 76.
8. Arashiba, K.; Miyake, Y.; Nishibayashi, Y. *Nature Chem.* 2011, 3, 120.
9. Weare, W. W.; Dai, X.; Byrnes, M.; Chin, J.-M.; Schrock, R. R.; Muller, P. *Proc. Natl. Acad. Sci.* 2006, 103, 17099.
10. (a) Saouma, C. T.; Lu, C. C.; Peters, J. C. *Inorg. Chem.* 2012, 51, 10043. (b) Saouma, C. T.; Kinney, R. A.; Hoffman, B. M.; Peters, J. C. *Angew. Chem. Int. Ed.* 2011, 50, 1. (c) Saouma, C. T.; Muller, P.; Peters, J. C. *J. Am. Chem. Soc.* 2009, 131, 10358.
11. Smith, J. M. Lachiotte, R. J.; Pittard, K. A.; Cundari, T. R.; Lukat-Rodgers, G.; Holland, P. L. *J. Am. Chem. Soc.* 2001, 123, 9222.
12. Field, L. D.; Li, H.; Magill, A. M. *Inorg. Chem.* 2001, 48, 5.
13. Li, Y.; Li, Y.; Wang, B.; Luo, Y.; Yang, D.; Tong, P.; Zhao, J.; Luo, L.; Zhou, Y.; Chen, S.; Cheng, F.; Qu, J. *Nature Chem.* 2013, 5, 320.
14. Rodriguez, M. M.; Bill, E.; Brennessel, W. W.; Holland, P. L. *Science* 2011, 334, 780.
15. Moret, M. E.; Peters, J. C.; *J. Am. Chem. Soc,* 2011, 133, 18118.
16. Yuki, M.; Tanaka, H.; Sasaki, K.; Miyake, Y.; Yoshizawa, K.; Nishibayashi, Y. *Nature Comm.* 2012, 3, 1254.
17. Lee, Y.; Mankad, N. P., Peters, J. C. *Nature Chem.* 2012, 2, 558.
18. (a) Leigh, G. J.; Jimenez-Tenorio, M. *J. Am. Chem. Soc.* 1991, 113, 5862. (b) Hall, D. A.; Leigh, G. J. *J. Chem. Soc. Dalton Trans.* 1996, 3539. (c) Gilbertson, J. D.; Szymczak, N. K.; Tyler, D. R. *J. Am. Chem. Soc.* 2005, 127, 10184. (d) Yamamoto, A.; Miura, Y.; Ito, T.; Chen, H. L.; Iri, K.; Ozawa, F.; Miki, K.; Sei, T.; Tanaka, N.; Kasai, N. *Organometallics* 1993, 2, 1429. (e) George, T. A.; Rose, D. J.; Chang, Y.; Chen, Q.; Zubieta, J. *Inorg. Chem.* 1995, 34, 1295. (f) Borodko, Y. G.; Broitman, M. O.; Kachapina, L. M.; Shilov, A. E.; Ukhin, L. Y. *J. Chem. Soc. D,* 1971, 1185.
19. Einsle, O.; Tezcan, A.; Andrade, S. L. A.; Schmid, B.; Yoshida, M.; Howard, J. B.; Reese, D. C. *Science* 2002, 297, 1696.
20. (a) Spatzal, T.; Aksoyoglu, M.; Zhang, L.; Andrade, S. L. A.; Schleicher, E.; Weber, S.; Rees, D. C.; Einsle, O. *Science* 2011, 334, 940. (b) Lancaster, K. M.; Roemelt, M.; Ettenhuber, P.; Hu, Y.; Ribbe, M. W.; Neese, F.; Bergmann, U.; DeBeer, S. *Science* 2011, 334, 974-7. (c) Lancaster, K. M.; Hu, Y.; Bergmann, U.; Ribbe, M. W.; DeBeer, S. *J. Am. Chem. Soc.* 2013, 135, 610-2. (d) Wiig, J. A.; Hu, Y.; Lee, C. C.; Ribbe, M. W. *Science,* 2012, 337, 1672-1675.
21. Anderson, J. S.; Rittle, J.; Peters, J. C. *Nature* 2013, 501, 84.
22. Rittle, J.; Peters, J. C. *Proc. Natl. Acad. Sci. U.S.A.* [Online early access]. DOI: 10.1073/pnas.1310153110. Published Online: Sep. 16, 2013.
23. Macbeth, C. E.; Harkins, S. B.; Peters, J. C. *Can. J. Chem.* 2005, 83, 332.
24. Mankad, N. P.; Whited, M. T.; Peters, J. C. *Angew. Chem. Int. Ed.* 2007, 46, 5768.
25. Moret, M.-E.; Peters, J. C. *Angew. Chem. Int. Ed.* 2011, 50, 2063.
26. Bontemps, S.; Bouhadir, G.; Dyer, P. W.; Miqueu, K.; Bourissou, D. *Inorg. Chem.* 2007, 46, 5149.
27. Lesueur, W.; Solari, E.; Floriani, C.; Chiesi-Villa, A.; Rizzoli, C. *Inorg. Chem.* 1997, 36, 3354.
28. Bickelhaupt, F.; Jongsma, C.; de Koe, P.; Lourens, R.; Mast, N. R.; van Mourik, G. L.; Vermeer, H.; Weustink, R. J. M. *Tetrahedron* 1976, 32, 1921.
29. Bielawski, M.; Olofsson, B. *Chem. Commun.* 2007, 2521.
30. Ciclosi, M.; Lloret, J.; Estevan, F.; Lahuerta, P.; Sanau, M.; Perez-Prieto, J. *Angew. Chem. Int. Ed.* 2006, 45, 6741.
31. Schlosser, M. *Pure Appl. Chem.* 1988, 60, 1627.
32. Hoffmann, R.; Bissel, R.; Farnum, D. G. *J. Phys. Chem.* 1969, 73, 1789.
33. Lee, Y.; Kinney, R. A.; Hoffman, B. M.; Peters, J. C. *J. Am. Chem. Soc.* 2011, 133, 16366.
34. Field, L. D.; Guest, R. W.; Vuong, K. Q.; Dalgarno, S. J. Jensen, P. *Inorg. Chem.* 2009, 48, 2246.
35. Anderson, J. S.; Moret, M.-E.; Peters, J. C. *J. Am. Chem. Soc.* 2013, 135, 534.
36. Weinhold, F.; Landis, C. (2005) *Valency and Bonding: A Natural Bond Orbital Donor-Acceptor Perspective* (Cambridge, Univ. Press, Cambridge).
37. Hills, A.; Hughes, D. L.; Jimenez-Tenorio, M.; Leigh, G. F.; Rowley, A. T. *J. Chem. Soc. Dalton Trans.* 1993, 25, 3041.
38. Weatherburn, M. W. *Anal. Chem.* 1967, 39, 971.
39. (a) Yang, Z.-Y.; Khadka, N.; Lukoyanov, D.; Hoffman, B. M.; Dean, D. R.; Seefeldt, L. C. *Proc. Natl. Acad. Sci. U.S.A.* 2013, 110, 16327. (b) Simpson, F. B.; Burris, R. H. *Science* 1984, 224, 1095.
40. (a) Tard, C.; Liu, X.; Ibrahim, S. K.; Maurizio, B.; DeGioia, L.; Davis, S. C.; Yang, X.; Wang, L.-S.; Sawers, G.; Pickett, C. J. *Nature* 2005, 433, 610. (b) Gloaguen, F.; Rauchfuss, T. B. *Chem. Soc. Rev.* 2009, 38, 100. (c) Darensbourg, M. Y.; Lyon, E. J.; Smee, J. J. *Coord. Chem. Rev.* 2000, 206-207, 533. (d) Peters, J. W.; Lanzilotta, W. N.; Lemon, B. J.; Seefeldt, L. C. *Science* 1998, 282, 1853. (e) Volbeda, A.; Charon, M.-H.; Piras, C.; Hatchikian, E. C.; Frey, M.; Fontecilla-Camps, J. C. *Nature* 1995, 373, 580. (f) Vincent, K. A.; Parkin, A.; Armonstrong, F. A. *Chem. Rev.* 2007, 107, 4366.
41. (a) Chatt, J.; Dilworth, J. R.; Richards, R. L. *Chem. Rev.* 1978, 78, 589. (b) Seefeldt, L.; Hoffman, B. M.; Dean, D. R. *Annu. Rev. Biochem.* 2009, 78, 701. (c) Lukoyanov, D.; Dikanov, S. A.; Yang, Z.-Y.; Barney, B. M.; Samoilova, R. I.; Narasimhulu, K. V.; Dean, D. R.; Seefeldt, L. C.; Hoffman, B. M. *J. Am. Chem. Soc.* 2011, 133, 11655.
42. Brookhart, M.; Grant, B.; Volpe, A. F. Jr. *Organometallics,* 1992, 11, 3920.
43. Wietz, I. S.; Rabinovitz, M. J. *J. Chem. Soc. Perkin Trans.,* 1993, 1, 117.
44. Chavez, I.; Alvarez-Carena, A.; Molins, E.; Roig, A.; Maniukiewicz, W.; Arancibia, A.; Arancibia, V.; Brand, H.; Manriquez, J. M. *J. Organomet. Chem.* 2000, 601, 126.
45. Job, R.; Earl, R. *Inorg. Nuc. Chem. Lett.* 1979, 15, 21.
46. Evans, D. F. *J. Chem. Soc.* 1959, 2003.
47. Sheldrick, G. M. *Acta Cryst. A.* 2008, 82, 169.
48. Gaussian 03, Revision C.02, Frisch, M. J.; Trucks, G. W.; Schlegel, H. B.; Scuseria, G. E.; Robb, M. A.; Cheeseman, J. R.; Montgomery, Jr., J. A.; Vreven, T.; Kudin, K. N.; Burant, J. C.; Millam, J. M.; Iyengar, S. S.; Tomasi, J.; Barone, V.; Mennucci, B.; Cossi, M.; Scalmani, G.; Rega, N.; Petersson, G. A.; Nakatsuji, H.; Hada, M.; Ehara, M.; Toyota, K.; Fukuda, R.; Hasegawa, J.; Ishida, M.; Nakajima, T.; Honda, Y.; Kitao, O.; Nakai, H.; Klene, M.; Li, X.; Knox, J. E.; Hratchian, H. P.; Cross, J. B.; Bakken, V.; Adamo, C.; Jaramillo, J.; Gomperts, R.; Stratmann, R. E.; Yazyev, O.; Austin, A. J.; Cammi, R.; Pomelli, C.; Ochterski, J. W.; Ayala, P. Y.; Morokuma, K.; Voth, G. A.; Salvador, P.; Dannenberg, J. J.; Zakrzewski, V. G.; Dapprich, S.; Daniels, A. D.; Strain, M. C.; Farkas, O.; Malick, D. K.; Rabuck, A. D.; Raghavachari, K.; Foresman, J. B.; Ortiz, J. V.; Cui, Q.; Baboul, A. G.; Clifford, S.; Cioslowski, J.; Stefanov, B. B.; Liu, G.; Liashenko, A.; Piskorz, P.; Komaromi, I.; Martin, R. L.; Fox, D. J.; Keith, T.; Al-Laham, M. A.; Peng, C. Y.; Nanayakkara, A.; Challacombe, M.; Gill, P. M. W.; Johnson, B.; Chen, W.; Wong, M. W.; Gonzalez, C.; and Pople, J. A.; Gaussian, Inc., Wallingford Conn., 2004.

Synthesis of o-nitrotriphenylmethane: (Note: The synthesis of this species, a precursor to o-iodotriphenylmethane, has been reported;[1] here we report the synthesis again in order to detail slight modifications to the workup and purification procedures that facilitate its synthesis. The syntheses of o-aminotriphenylmethane and o-iodotriphenylmethane have not been substantially modified from the reported procedures.) Aluminum chloride (30.36 g, 0.228 mol) was suspended in 100 mL of benzene and o-nitrobenzaldehyde (15 g, 0.099 mol) was added as a solid in portions over 15 minutes while stirring at room temperature. The reaction mixture was heated to reflux for 6 hours, then cooled to room temperature and poured over ice (300 mL). The mixture was diluted with another 100 mL of benzene and 100 mL of water. The aqueous layer was removed and washed twice with benzene (100 mL); the dark brown organic washings were then combined and washed repeatedly with concentrated $H_2SO_4$ until the color was light yellow-orange. The organic layer was then washed with water (100 mL) and brine (2×50 mL), dried over magnesium sulfate, filtered, and concentrated. The off-white oily residue was recrystallized from methanol to give a white crystalline solid which was collected atop a glass frit and washed with cold methanol (15.6 g, 54%). $^1$H NMR (CDCl$_3$, 300 MHz, 298 K, δ): 7.89 (d, J=8 Hz, 1H), 7.49 (t, J=8 Hz, 1H), 7.39 (t, J=8 Hz, 1H), 7.34-7.23 (m, 6H), 7.14-7.08 (m, 4H) ppm.

$^{13}$C NMR (CDCl$_3$, 75.4 MHz, 298 K, δ): 149.77 (s), 141.95 (s), 138.13 (s), 132.41 (s), 132.04 (s), 129.51 (s), 128.54 (s), 127.49 (s), 126.85 (s), 124.76 (s) ppm.

Catalytic Production of NH$_3$ using [(CP$^{iPr}$$_3$)FeN$_2$][K(Et$_2$O)$_{0.5}$]

Standard catalytic procedure with [(CP$^{iPr}$$_3$)FeN$_2$][K(Et$_2$O)$_{0.5}$] (12): [(CP$^{iPr}$$_3$)FeN$_2$][K(Et$_2$O)$_{0.5}$] (1.9 mg, 0.0025 mmol) was suspended in Et$_2$O (0.5 mL) in a small Schlenk tube equipped with a stir bar. This solution was cooled to −78° C. in a cold well inside of the glove box. A suspension of KC$_8$ (14 mg, 0.100 mmol) in Et$_2$O (0.75 mL) was cooled to −78° C. and added to the reaction mixture with stirring. After five minutes, a similarly cooled solution of HBAr$^F$$_4$.2 Et$_2$O (93 mg, 0.092 mmol) in Et$_2$O (1.0 mL) was added to the suspension in one portion with rapid stirring. Any remaining acid was dissolved in cold Et$_2$O (0.25 mL) and added subsequently, and the Schlenk tube was sealed. The reaction was allowed to stir for 60 minutes at −78° C. before being warmed to room temperature and stirred for 15 minutes.

| Results of Individual Runs | | | |
|---|---|---|---|
| Run | Absorbance | Eq. NH$_3$/Fe | % Yield based on H+ |
| A[1] | 0.446 | 3.6 | 28 |
| B | 0.466 | 4.3 | 34 |
| C | 0.655 | 6.0 | 47 |
| D | 0.476 | 4.4 | 35 |
| E | 0.491 | 4.5 | 36 |
| F | 0.451 | 4.2 | 33 |
| G | 0.472 | 4.3 | 34 |
| H | 0.587 | 5.4 | 43 |
| Avg | 0.514 ± 0.08 | 4.6 ± 0.8 | 36 ± 6 |

[1]Used 2.2 mg (.0029 mmol) of catalyst; omitted from average absorbance.

Hydrazine was not detected in the catalytic runs using a standard UV-Vis quantification method[2].

Modified "acid-first" catalytic procedure with [(CP$^{iPr}$$_3$)FeN$_2$][K(Et$_2$O)$_{0.5}$](12): [(CP$^{iPr}$$_3$)FeN$_2$][K(Et$_2$O)$_{0.5}$] (1.9 mg, 0.0025 mmol) was dissolved in Et$_2$O (0.5 mL) in a 20 mL scintillation vial equipped with a stir bar. This dark brown solution was vigorously stirred and cooled to −78° C. in a cold well inside of the glove box. A similarly cooled solution of HBAr$^F$$_4$.2 Et$_2$O (93 mg, 0.092 mmol) in Et$_2$O (1.5 mL) was added to the solution in one portion with rapid stirring. Any remaining acid was dissolved in cold Et$_2$O (0.25 mL) and added subsequently. The reaction mixture turned light orange upon addition of acid and the resulting solution was allowed to stir for 5 minutes before being transferred into a pre-cooled Schlenk tube equipped with a stirbar. The original reaction vial was washed with cold Et$_2$O (0.25 mL) which was subsequently transferred to the Schlenk tube. Solid KC$_8$ (14 mg, 0.100 mmol) was suspended in cold Et$_2$O (0.75 mL) and added dropwise to the rapidly stirred solution in the Schlenk tube which was then tightly sealed. The reaction was allowed to stir for 60 minutes at −78° C. before being warmed to room temperature and stirred for 15 minutes.

| Results of individual runs | | | |
|---|---|---|---|
| Run | Absorbance | Eq. NH$_3$/Fe | % Yield based on H$_2$ |
| I[1] | 0.375 | 3.0 | 24 |
| J | 0.483 | 4.3 | 34 |

-continued

| Results of individual runs | | | |
|---|---|---|---|
| Run | Absorbance | Eq. NH$_3$/Fe | % Yield based on H$_2$ |
| K | 0.484 | 4.4 | 35 |
| M | 0.407 | 3.8 | 30 |
| Avg. | 0.458 ± 0.04 | 3.8 ± 0.6 | 30 ± 5 |

[1]Used 2.2 mg (.0029 mmol) of catalyst; omitted from average absorbance.

Standard Catalytic Procedure with [(TPB)FeN$_2$][Na(12-c-4)$_2$]: [(TPB)FeN$_2$][Na(12-c-4)$_2$] (2.0 mg, 0.002 mmol) was suspended in Et$_2$O (0.5 mL) in a small Schlenk tube equipped with a stir bar. This solution was cooled to −78° C. in a cold well inside of the glove box. A suspension of KC$_8$ (14 mg, 0.100 mmol) in Et$_2$O (0.75 mL) was cooled to −78° C. and added to the reaction mixture with stirring. After five minutes, a similarly cooled solution of HBAr$^F_4$.2 Et$_2$O (93 mg, 0.092 mmol) in Et$_2$O (1.0 mL) was added to the suspension in one portion with rapid stirring. Any remaining acid was dissolved in cold Et$_2$O (0.25 mL) and added subsequently, and the Schlenk tube was sealed. The reaction was allowed to stir for 60 minutes at −78° C. before being warmed to room temperature and stirred for 15 minutes.

| Results of Individual Runs | | | |
|---|---|---|---|
| Run | Absorbance | Eq. NH$_3$/Fe | % Yield based on H+ |
| N | 0.528 | 6.1 | 38 |
| O | 0.422 | 3.9 | 24 |
| Avg. | 0.475 ± 0.05 | 5.0 ± 1.1 | 31 ± 7 |

Standard catalytic procedure with [(CP$^{iPr}_3$)FeN$_2$][K(12-c-4)$_2$] (12[K(12-crown-4)$_2$]): [(CP$^{iPr}_3$)FeN$_2$][K(12-c-4)$_2$] (2.0 mg, 0.002 mmol) was suspended in Et$_2$O (0.5 mL) in a small Schlenk tube equipped with a stir bar. This solution was cooled to −78° C. in a cold well inside of the glove box. A suspension of KC$_8$ (14 mg, 0.100 mmol) in Et$_2$O (0.75 mL) was cooled to −78° C. and added to the reaction mixture with stirring. After five minutes, a similarly cooled solution of HBAr$^F_4$.2 Et$_2$O (93 mg, 0.092 mmol) in Et$_2$O (1.0 mL) was added to the suspension in one portion with rapid stirring. Any remaining acid was dissolved in cold Et$_2$O (0.25 mL) and added subsequently, and the Schlenk tube was sealed. The reaction was allowed to stir for 60 minutes at −78° C. before being warmed to room temperature and stirred for 15 minutes.

| Results of Individual Runs | | | |
|---|---|---|---|
| Run | Absorbance | Eq. NH$_3$/Fe | % Yield based on H+ |
| P | 0.327 | 3.7 | 23 |
| Q | 0.328 | 3.7 | 23 |
| R[1] | 0.344 | 3.1 | 24 |
| Avg. | 0.328 ± 0.001 | 3.5 ± 0.3 | 23 ± 0.3 |

[1]Used 2.5 mg (.0025 mmol) of catalyst; omitted from average absorbance.

Standard catalytic procedure with [(SiP$^{iPr}_3$)FeN$_2$][Na(12-c-4)$_2$]: [(SiP$^{iPr}_3$)FeN$_2$][Na(12-c-4)$_2$] (2.0 mg, 0.002 mmol) was suspended in Et$_2$O (0.5 mL) in a small Schlenk tube equipped with a stir bar. This solution was cooled to −78° C. in a cold well inside of the glove box. A suspension of KC$_8$ (14 mg, 0.100 mmol) in Et$_2$O (0.75 mL) was cooled to −78° C. and added to the reaction mixture with stirring. After five minutes, a similarly cooled solution of HBAr$^F_4$.2 Et$_2$O (93 mg, 0.092 mmol) in Et$_2$O (1.0 mL) was added to the suspension in one portion with rapid stirring. Any remaining acid was dissolved in cold Et$_2$O (0.25 mL) and added subsequently, and the Schlenk tube was sealed. The reaction was allowed to stir for 60 minutes at −78° C. before being warmed to room temperature and stirred for 15 minutes.

| Results of Individual Runs | | | |
|---|---|---|---|
| Run | Absorbance | Eq. NH$_3$/Fe | % Yield based on H+ |
| S | 0.109 | 1.2 | 8 |
| T | 0.040 | 0.4 | 3 |
| Avg. | 0.075 ± 0.03 | 0.8 ± 0.4 | 5 ± 3 |

Identification of H$_2$ in a standard catalytic run. A catalytic run was performed with 0.0025 mmol of 12 according to the standard procedure. Prior to the vacuum transfer of volatiles, the solutions inside of the Schlenk tubes were frozen. The ground glass joint of the Schlenk tube was then sealed with a rubber septum and the head space between the Teflon stopcock of the Schlenk tube and the septum was evacuated. This head space was left under static vacuum and the Teflon stopcock of the reaction vessel was opened after which a 10 mL aliquot of the headspace was sampled through the septum via a gas-tight syringe. This sample was then analyzed for hydrogen with an Agilent 7890A gas chromatograph using a thermal conductivity detector. 45% yield of H$_2$ relative to H+ was quantified.

IR spectral analysis of addition of 12 equiv. of KC$_8$, followed by 10 equiv of HBAr$^F_4$.2 Et$_2$O to [(CP$^{iPr}_3$)FeN$_2$][K(Et$_2$O)$_{0.5}$]. A 20 mL scintillation vial was charged with a stir bar and [(CP$^{iPr}_3$)FeN$_2$][K(Et$_2$O)$_{0.5}$] (7.6 mg, 0.0101 mmol). In a separate vial, HBAr$^F_4$.2 Et$_2$O (75 mg, 0.074 mmol) was dissolved in Et$_2$O (1 mL). Finally, a third vial was prepared containing a suspension of potassium graphite (12 mg, 0.090 mmol) in Et$_2$O (1 mL). All three vials were chilled in the cold well to −78° C. for 10 minutes. The suspension of KC$_8$ was quickly added to the stirring suspension of [(CP$^{iPr}_3$)FeN$_2$][K(Et$_2$O)$_{0.5}$]. After stirring for 5 minutes, HBAr$^F_4$.2 Et$_2$O was added rapidly to the stirring reaction mixture. This solution was capped and stirred at −78° C. for 60 minutes and then brought to r.t. and stirred for 15 minutes. The resulting reaction mixture was concentrated to dryness, taken up in C$_6$D$_6$, and filtered through Celite, giving an orange solution which was analyzed by IR and NMR. By IR, the major species appeared to be (CP$^{iPr}_3$)FeN$_2$ (11), and the presence of a smaller amount of (CP$^{iPr}_3$)Fe(N$_2$)(H) (9) was also apparent. By NMR, 11, 9, and (CP$^{iPr}_3$)FeCl (10) were detected as well as an additional unidentified diamagnetic species present in small amounts. No uncoordinated (CP$^{iPr}_3$)H ligand could be detected.

IR spectral analysis of addition of 40 equiv. of KC$_8$, followed by 38 equiv of HBAr$^F_4$.2 Et$_2$O to [(CP$^{iPr}_3$)FeN$_2$][K(Et$_2$O)$_{0.5}$]. A 20 mL scintillation vial was charged with a stir bar and [(CP$^{iPr}_3$)FeN$_2$][K(Et$_2$O)$_{0.5}$] (8.0 mg, 0.0106 mmol). In a separate vial, HBAr$^F_4$.2 Et$_2$O (392 mg, 0.403 mmol) was dissolved in Et$_2$O (1 mL). Finally, a third vial was prepared containing a suspension of potassium graphite (59 mg, 0.424 mmol) in Et$_2$O (1 mL). All three vials were chilled in the cold well to −78° C. for 10 minutes. The suspension of KC$_8$ was quickly added to the stirring suspension of [(CP$^{iPr}_3$)FeN$_2$][K(Et$_2$O)$_{0.5}$]. After stirring for 5 minutes, HBAr$^F_4$.2 Et$_2$O was added rapidly to the stirring reaction mixture. This solution was capped and stirred at −78° C. for 60 minutes and then brought to r.t. and stirred for 15 minutes. The resulting reaction mixture was concentrated to dryness, taken up in $C_6D_6$, and filtered through Celite, giving an orange solution which was analyzed by IR and NMR. By IR and NMR, the major species appeared to be $(CP^{iPr}_3)Fe(N_2)(H)$ (9), and some $(CP^{iPr}_3)FeN_2$ (11) was also present. No uncoordinated $(CP^{iPr}_3)H$ ligand could be detected.

Figure 49:
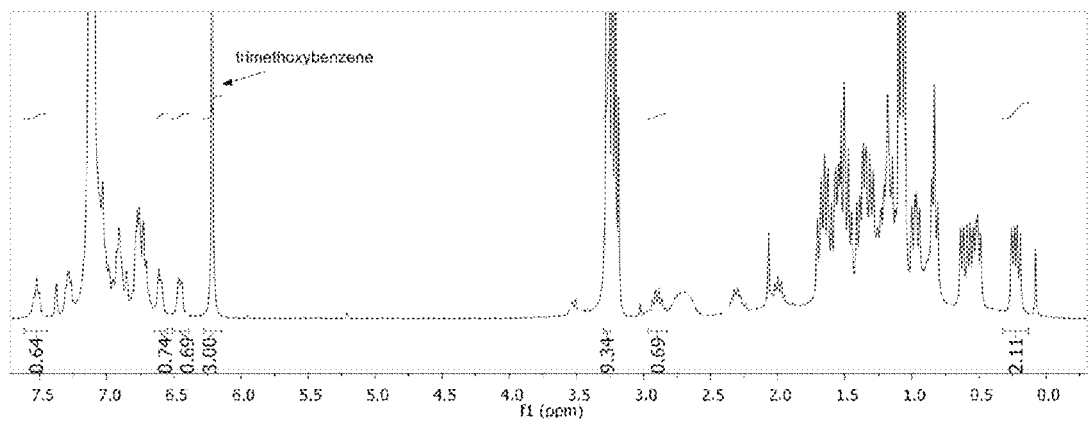
FIG. 49. NMR of reaction mixture after catalysis with internal standard (1,3,5-trimethoxybenzene).
Figure 50:
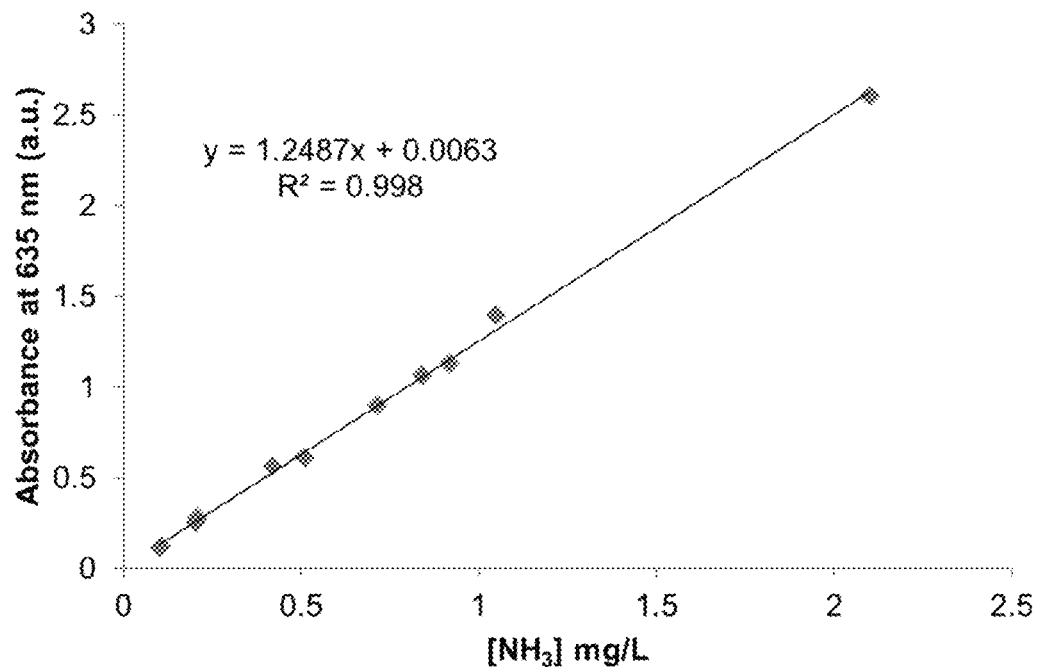
FIG. 50. Calibration curve for $NH_3$ quantification via indophenol method.
Figure 51:
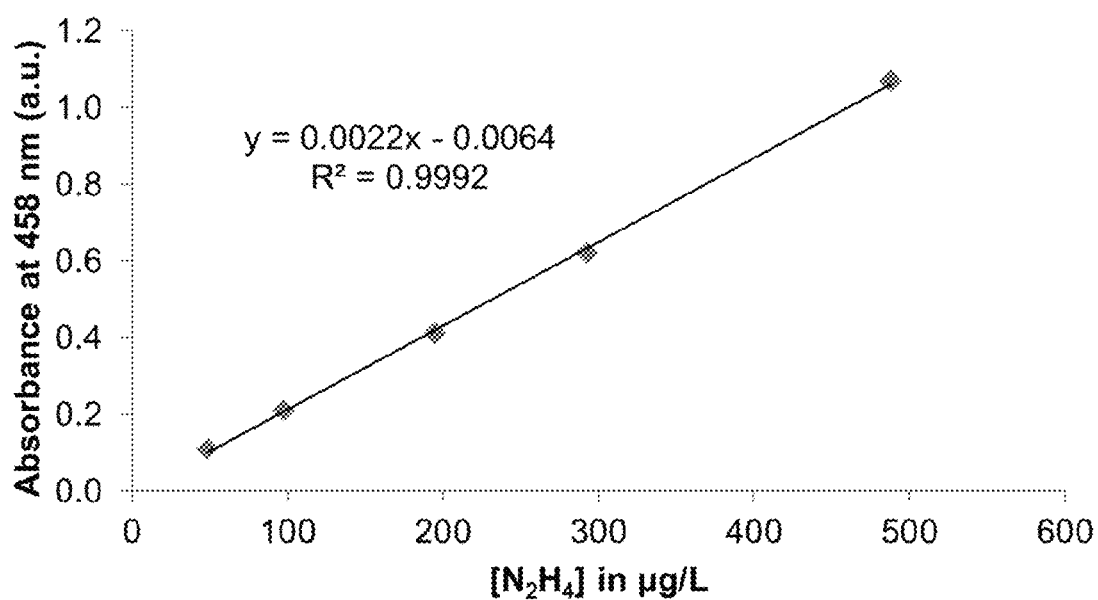
FIG. 51. Calibration curve for UV-Vis quantification of hydrazine.

In a separate experiment, the reaction was carried out as above, but after being allowed to stir at room temperature for 15 minutes the reaction mixture was filtered and to the filtrate was added an aliquot of a standard solution of 1,3,5-trimethoxybenzene (0.0106 mmol). The combined solution was concentrated to dryness, taken up in $C_6D_6$, filtered through Celite, and analyzed by IR and NMR. NMR integration (d1=10 sec) of the diamagnetic peaks shows approximately 70% yield of 9 relative to the starting catalyst (FIG. 49).

Curves were generated by creating solutions of $[NH_4][Cl]$ and $[N_2H_5][HSO_4]$ of known concentrations and then analyzing by the appropriate UV-Vis methodology (vide supra)

Quantification of ammonia formed without added reductant. A sample of $12[K(Et_2O)_{0.5}]$ was dissolved in $Et_2O$ (1 mL) and cooled to −78° C. in a Schlenk tube. $HBAr^F_4 \cdot 2$ $Et_2O$ (10 equiv.) was dissolved in cold $Et_2O$ (1 mL) and added in one portion with rapid stirring. The reaction mixture was stirred at −78° C. for 1 hour and then at room temperature for 20 minutes, and then subjected to the standard ammonia quantification procedure. One run using 0.0025 mmol of $12[K(Et_2O)_{0.5}]$ gave <0.05 equiv. of $NH_3$ (below detection limits) while a second run using 0.005 mmol of $12[K(Et_2O)_{0.5}]$ gave 0.06 equiv. of $NH_3$/Fe.

was cooled to −78° C. and added to the reaction mixture with stirring. After five minutes, a similarly cooled solution of $HBAr^F_4 \cdot 2$ $Et_2O$ (93 mg, 0.092 mmol) in $Et_2O$ (1.0 mL) was added to the suspension in one portion with rapid stirring. Any remaining acid was dissolved in cold $Et_2O$ (0.25 mL) and added subsequently, and the Schlenk tube was sealed. The reaction was allowed to stir for 60 minutes at −78° C. before being warmed to room temperature and stirred for 15 minutes. The reaction was subjected to the standard workup and ammonia detection procedure; no ammonia was detected.

Attempted catalysis with $[(C^{Si}P^{Ph}_3)FeN_2][K(benzo-15-crown-5)_2]$: $[(C^{Si}P^{Ph}_3)FeN_2][K(benzo-15-crown-5)_2]$ (2.0 mg, 0.0020 mmol) was dissolved in $Et_2O$ (0.5 mL) in a 20 mL scintillation vial equipped with a stir bar. This dark brown solution was vigorously stirred and cooled to −78° C. in a cold well inside of the glove box. A similarly cooled solution of $HBAr^F_4 \cdot 2$ $Et_2O$ (93 mg, 0.092 mmol) in $Et_2O$ (1.5 mL) was added to the solution in one portion with rapid stirring. Any remaining acid was dissolved in cold $Et_2O$ (0.25 mL) and added subsequently. The reaction mixture was allowed to stir for 5 minutes before being transferred into a pre-cooled Schlenk tube equipped with a stirbar. The original reaction vial was washed with cold $Et_2O$ (0.25 mL) which was subsequently transferred to the Schlenk tube. Solid $KC_8$ (14 mg, 0.100 mmol) was suspended in cold $Et_2O$ (0.75 mL) and added dropwise to the rapidly stirred solution in the Schlenk tube which was then tightly sealed. The reaction was allowed to stir for 60 minutes at −78° C. before being warmed to room temperature and stirred for 15 minutes. Ammonia was quantified via the standard method. Two trials were performed, giving 0.40 and 0.14 equiv. $NH_3$/Fe.

Crystal Structure Tables and Refinement Information

| Crystal data and structure refinement for $[(CP^{iPr}_3)H]FeI_2$ (6) | |
|---|---|
| Empirical formula | C40.50 H59 Fe I2 P3 |
| Formula weight | 948.44 |
| Temperature | 296(2) K |
| Wavelength | 0.71073 Å |
| Crystal system | Monoclinic |
| Space group | C2/c |
| Unit cell dimensions | a = 39.338(2) Å    α = 90°. |
| | b = 12.1860(7) Å   β = 111.327(2)°. |
| | c = 18.6670(11) Å  γ = 90°. |
| Volume | 8335.6(8) Å$^3$ |
| Z | 8 |
| Density (calculated) | 1.512 Mg/m$^3$ |
| Absorption coefficient | 1.985 mm$^{-1}$ |
| F(000) 3832 | |
| Theta range for data collection | 1.76 to 26.37°. |
| Index ranges | −49 <= h <= 49, −15 <= k <= 15, −23 <= l <= 23 |
| Reflections collected | 117932 |
| Independent reflections | 8536 [R(int) = 0.0714] |
| Completeness to theta = 26.37° | 100.0% |
| Absorption correction | Semi-empirical from equivalents |
| Max. and min. transmission | .7460 and .6679 |
| Refinement method | Full-matrix least-squares on F$^2$ |
| Data/restraints/parameters | 8536/464/433 |
| Goodness-of-fit on F$^2$ | 1.037 |
| Final R indices [I>2sigma(I)] | R1 = 0.0256, wR2 = 0.0462 |
| R indices (all data) | R1 = 0.0397, wR2 = 0.0501 |
| Largest diff. peak and hole | 0.491 and −0.498 e.Å$^{-3}$ |

Attempted catalysis with 9. $(CP_3^{iPr})Fe(N_2)(H)$ (1.7 mg, 0.002 mmol) was suspended in $Et_2O$ (0.5 mL) in a small Schlenk tube equipped with a stir bar. This solution was cooled to −78° C. in a cold well inside of the glove box. A suspension of $KC_8$ (14 mg, 0.100 mmol) in $Et_2O$ (0.75 mL)

One solvent molecule is present in the structure of 6, a toluene molecule which was modeled as disordered over a two-fold special position. Additionally, one isopropyl group on the ligand was refined as a disorder over two positions in a 76:24 ratio.

| Crystal data and structure refinement for [(CP$^{iPr}{}_3$)H]FeBr (8) | |
|---|---|
| Empirical formula | C43 H61 Br Fe P3 |
| Formula weight | 814.48 |
| Temperature | 100(2) K |
| Wavelength | 0.71073 Å |
| Crystal system | Monoclinic |
| Space group | P2(1)/c |
| Unit cell dimensions | a = 12.5154(8) Å   α = 90°. |
| | b = 15.3220(10) Å   β = 92.849(3)°. |
| | c = 20.9097(10) Å   γ = 90°. |
| Volume | 4004.7(4) Å$^3$ |
| Z | 4 |
| Density (calculated) | 1.351 Mg/m$^3$ |
| Absorption coefficient | 1.525 mm$^{-1}$ |
| F(000) | 1684 |
| Crystal size | 0.30 × 0.06 × 0.02 mm$^3$ |
| Theta range for data collection | 1.63 to 27.89°. |
| Index ranges | −16 <= h <= 16, −19 <= k <= 19, −27 <= l <= 26 |
| Reflections collected | 61095 |
| Independent reflections | 9120 [R(int) = 0.1687] |
| Completeness to theta = 25.00° | 100.0% |
| Absorption correction | Semi-empirical from equivalents |
| Max. and min. transmission | 0.9701 and 0.6576 |
| Refinement method | Full-matrix least-squares on F$^2$ |
| Data/restraints/parameters | 9120/0/427 |
| Goodness-of-fit on F$^2$ | 0.970 |
| Final R indices [I>2sigma(I)] | R1 = 0.0618, wR2 = 0.1127 |
| R indices (all data) | R1 = 0.1742, wR2 = 0.1545 |
| Largest diff. peak and hole | 1.110 and −0.862 e.Å$^{-3}$ |

The structure of 8 includes one benzene molecule per asymmetric unit.

| Crystal data and structure refinement for (CP$^{iPr}{}_3$)Fe(N$_2$)(H) (9) | |
|---|---|
| Empirical formula | C37 H55 Fe N2 P3 |
| Formula weight | 676.59 |
| Temperature | 296(2) K |
| Wavelength | 0.71073 Å |
| Crystal system | Orthorhombic |
| Space group | P2(1)2(1)2(1) |
| Unit cell dimensions | a = 10.8051(3) Å   α = 90°. |
| | b = 15.4905(5) Å   β = 90°. |
| | c = 20.7380(7) Å   γ = 90°. |
| Volume | 3471.05(19) Å$^3$ |
| Z | 4 |
| Density (calculated) | 1.295 Mg/m$^3$ |
| Absorption coefficient | 0.601 mm$^{-1}$ |
| F(000) | 1448 |
| Crystal size | 0.50 × 0.49 × 0.38 mm$^3$ |
| Theta range for data collection | 1.96 to 25.00°. |
| Index ranges | −12 <= h <= 12, −18 <= k <= 18, −24 <= l <= 24 |
| Reflections collected | 65697 |
| Independent reflections | 6113 [R(int) = 0.0393] |
| Completeness to theta = 25.00° | 99.9% |
| Absorption correction | Semi-empirical from equivalents |
| Max. and min. transmission | 0.8037 and 0.7530 |
| Refinement method | Full-matrix least-squares on F$^2$ |
| Data/restraints/parameters | 6113/341/398 |
| Goodness-of-fit on F$^2$ | 1.059 |
| Final R indices [I>2sigma(I)] | R1 = 0.0304, wR2 = 0.0776 |
| R indices (all data) | R1 = 0.0306, wR2 = 0.0777 |
| Absolute structure parameter | 0.099(12) |
| Largest diff. peak and hole | 1.783 and −0.639 e.Å$^{-3}$ |

| Crystal data and structure refinement for (CP$^{iPr}{}_3$)FeN$_2$ (11) | |
|---|---|
| Empirical formula | C37 H54 Fe N2 P3 |
| Formula weight | 675.58 |
| Temperature | 100(2) K |
| Wavelength | 0.71073 Å |

Crystal data and structure refinement for (CP$^{iPr}_3$)FeN$_2$ (11)

| | |
|---|---|
| Crystal system | Trigonal |
| Space group | R-3 |
| Unit cell dimensions | a = 19.4069(5) Å, α = 90°. |
| | b = 19.4069(5) Å, β = 90°. |
| | c = 47.9751(17) Å, γ = 120°. |
| Volume | 15648.0(8) Å$^3$ |
| Z | 18 |
| Density (calculated) | 1.290 Mg/m$^3$ |
| Absorption coefficient | 0.600 mm$^{-1}$ |
| F(000) | 6498 |
| Theta range for data collection | 1.27 to 25.03°. |
| Index ranges | −23 <= h <= 11, −23 <= k <= 23, −57 <= l <= 57 |
| Reflections collected | 12326 |
| Independent reflections | 12326 [R(int) = 0.0000] |
| Completeness to theta = 25.03° | 100.0% |
| Absorption correction | Semi-empirical from equivalents |
| Refinement method | Full-matrix least-squares on F$^2$ |
| Data/restraints/parameters | 12326/335/389 |
| Goodness-of-fit on F$^2$ | 1.106 |
| Final R indices [I>2sigma(I)] | R1 = 0.0624, wR2 = 0.1624 |
| R indices (all data) | R1 = 0.0655, wR2 = 0.1672 |
| Largest diff. peak and hole | 2.593 and −0.891 e.Å$^{-3}$ |

The refinement of the crystal structure of 11 used SHELX HKLF 5 refinement to treat the presence of a non-merohedral twin accounting for 20% of the observed reflections.

Crystal data and structure refinement for [(CP$^{iPr}_3$)FeN$_2$][K(Et$_2$O)$_3$] (12)

| | |
|---|---|
| Empirical formula | C49 H84 Fe K N2 O3 P3 |
| Formula weight | 937.04 |
| Temperature | 296(2) K |
| Wavelength | 0.71073 Å |
| Crystal system | Monoclinic |
| Space group | Cc |
| Unit cell dimensions | a = 10.9229(4) Å, α = 90°. |
| | b = 26.9376(10) Å, β = 94.663(2)°. |
| | c = 17.6054(7) Å, γ = 90°. |
| Volume | 5163.0(3) Å$^3$ |
| Z | 4 |
| Absorption coefficient | 0.505 mm$^{-1}$ |
| F(000) | 2024 |
| Theta range for data collection | 1.91 to 35.46°. |
| Index ranges | −17 <= h <= 17, −38 <= k <= 43, −28 <= l <= 28 |
| Reflections collected | 77464 |
| Independent reflections | 21119 [R(int) = 0.0624] |
| Completeness to theta = 35.46° | 94.5% |
| Absorption correction | Semi-empirical from equivalents |
| Max. and min. transmission | 0.9701 and 0.6576 |
| Refinement method | Full-matrix least-squares on F$^2$ |
| Data/restraints/parameters | 21119/2/544 |
| Goodness-of-fit on F$^2$ | 1.008 |
| Final R indices [I>2sigma(I)] | R1 = 0.0438, wR2 = 0.0843 |
| R indices (all data) | R1 = 0.0755, wR2 = 0.0949 |
| Absolute structure parameter | 0.130(8) |
| Largest diff. peak and hole | 0.902 and −0.524 e.Å$^{-3}$ |

Crystal data and structure refinement for [(CP$^{iPr}_3$)FeN$_2$][BAr$_4^F$] (13)

| | |
|---|---|
| Empirical formula | C69 H66 B Cl0.12 F24 Fe N1.77 P3 |
| Formula weight | 1539.84 |
| Temperature | 296(2) K |
| Wavelength | 0.71073 Å |
| Crystal system | Orthorhombic |
| Space group | Pbca |
| Unit cell dimensions | a = 19.7846(11) Å, α = 90°. |
| | b = 25.8800(14) Å, β = 90°. |
| | c = 26.6463(13) Å, γ = 90°. |

| Crystal data and structure refinement for [(CP$^{iPr}_3$)FeN$_2$][BAr$_4^F$] (13) | |
|---|---|
| Volume | 13643.6(13) Å$^3$ |
| Z | 8 |
| Density (calculated) | 1.499 Mg/m$^3$ |
| Absorption coefficient | 0.405 mm$^{-1}$ |
| F(000) | 6291 |
| Theta range for data collection | 1.50 to 30.53°. |
| Index ranges | −28 <= h <= 28, −36 <= k <= 36, −38 <= l <= 36 |
| Reflections collected | 224578 |
| Independent reflections | 20858 [R(int) = 0.1311] |
| Completeness to theta = 30.53° | 99.9% |
| Absorption correction | Semi-empirical from equivalents |
| Max. and min. transmission | 0.9701 and 0.6576 |
| Refinement method | Full-matrix least-squares on F$^2$ |
| Data/restraints/parameters | 20858/1048/946 |
| Goodness-of-fit on F$^2$ | 1.118 |
| Final R indices [I>2sigma(I)] | R1 = 0.0845, wR2 = 0.2235 |
| R indices (all data) | R1 = 0.1320, wR2 = 0.2520 |
| Largest diff. peak and hole | 1.915 and −1.004 e.Å$^{-3}$ |

This crystal structure was modeled with a 12% occupancy of the chloride complex, CP$_3$FeCl. Additionally, one isopropyl group of the CP$_3$ ligand was modeled as disordered over two positions in a 49:51 ratio, and one trifluoromethyl group of the BArF anion was modeled as disordered over two positions in a 48:52 ratio.

Tables of Selected Bond Lengths and Angles

| Selected bond lengths [Å] and angles [°] for [(CP$^{iPr}_3$)H]FeI$_2$ (6): | |
|---|---|
| I(2)—Fe(1) | 2.5884(4) |
| I(1)—Fe(1) | 2.6062(4) |
| Fe(1)—P(2) | 2.4587(7) |
| Fe(1)—P(1) | 2.5134(7) |
| P(2)—Fe(1)—P(1) | 113.21(2) |
| P(2)—Fe(1)—I(2) | 109.349(19) |
| P(1)—Fe(1)—I(2) | 116.625(19) |
| P(2)—Fe(1)—I(1) | 102.335(19) |
| P(1)—Fe(1)—I(1) | 99.721(18) |
| I(2)—Fe(1)—I(1) | 114.490(14) |

| Selected bond lengths [Å] and angles [°] for [(CP$^{iPr}_3$)H]FeBr (8) | |
|---|---|
| Br(1)—Fe(1) | 2.4647(7) |
| Fe(1)—P(1) | 2.3759(15) |
| Fe(1)—P(2) | 2.3940(15) |
| Fe(1)—P(3) | 2.3968(15) |
| P(1)—Fe(1)—P(2) | 110.58(5) |
| P(1)—Fe(1)—P(3) | 109.39(5) |
| P(2)—Fe(1)—P(3) | 110.12(5) |
| P(1)—Fe(1)—Br(1) | 109.39(4) |
| P(2)—Fe(1)—Br(1) | 107.70(4) |
| P(3)—Fe(1)—Br(1) | 109.63(4) |

| Selected bond lengths [Å] and angles [°] for (CP$^{iPr}_3$)Fe(N$_2$)(H) (9). | |
|---|---|
| Fe(1)—N(1) | 1.8144(19) |
| Fe(1)—C(0) | 2.155(2) |
| Fe(1)—P(2) | 2.1857(7) |
| Fe(1)—P(3) | 2.2502(7) |
| Fe(1)—P(1) | 2.2779(7) |
| Fe(1)—H(01) | 1.45(3) |
| N(1)—N(2) | 1.106(3) |
| N(1)—Fe(1)—C(0) | 177.27(9) |
| N(1)—Fe(1)—P(2) | 95.87(7) |
| C(0)—Fe(1)—P(2) | 86.48(6) |
| N(1)—Fe(1)—P(3) | 94.18(7) |
| C(0)—Fe(1)—P(3) | 83.11(6) |
| P(2)—Fe(1)—P(3) | 141.23(3) |
| N(1)—Fe(1)—P(1) | 97.38(7) |
| C(0)—Fe(1)—P(1) | 83.41(6) |
| P(2)—Fe(1)—P(1) | 103.08(3) |
| P(3)—Fe(1)—P(1) | 112.60(2) |
| N(1)—Fe(1)—H(01) | 95.5(13) |
| C(0)—Fe(1)—H(01) | 83.9(13) |
| P(2)—Fe(1)—H(01) | 72.5(13) |
| P(3)—Fe(1)—H(01) | 69.3(13) |
| P(1)—Fe(1)—H(01) | 166.8(13) |

| Selected bond lengths [Å] and angles [°] for (CP$^{iPr}_3$)FeN$_2$ (11) | |
|---|---|
| Fe(1)—N(1) | 1.797(2) |
| Fe(1)—C(01) | 2.152(3) |
| Fe(1)—P(1) | 2.2349(8) |
| Fe(1)—P(3) | 2.2602(8) |
| Fe(1)—P(2) | 2.2660(8) |
| N(1)—N(2) | 1.134(4) |
| N(1)—Fe(1)—C(01) | 174.80(11) |
| N(1)—Fe(1)—P(1) | 96.71(8) |
| C(01)—Fe(1)—P(1) | 82.62(6) |
| N(1)—Fe(1)—P(3) | 103.51(9) |
| C(01)—Fe(1)—P(3) | 81.50(7) |
| P(1)—Fe(1)—P(3) | 110.81(3) |
| N(1)—Fe(1)—P(2) | 94.67(9) |
| C(01)—Fe(1)—P(2) | 82.11(6) |
| P(1)—Fe(1)—P(2) | 132.54(3) |
| P(3)—Fe(1)—P(2) | 110.90(3) |

| Selected bond lengths [Å] and angles [°] for [(CP$^{iPr}_3$)FeN$_2$][K(Et$_2$O)$_3$] | |
|---|---|
| Fe(1)—N(1) | 1.7397(16) |
| Fe(1)—C(01) | 2.1646(17) |
| Fe(1)—P(3) | 2.1947(5) |
| Fe(1)—P(2) | 2.2045(5) |
| Fe(1)—P(1) | 2.2047(5) |
| K(1)—N(2) | 2.6560(18) |
| N(1)—N(2) | 1.153(2) |
| N(1)—Fe(1)—C(01) | 179.68(7) |
| N(1)—Fe(1)—P(3) | 96.27(5) |
| C(01)—Fe(1)—P(3) | 83.81(5) |
| N(1)—Fe(1)—P(2) | 96.29(5) |
| C(01)—Fe(1)—P(2) | 83.93(5) |

| Selected bond lengths [Å] and angles[°] for [(CP$^{iPr}$₃)FeN₂][K(Et₂O)₃] | |
|---|---|
| P(3)—Fe(1)—P(2) | 120.051(19) |
| N(1)—Fe(1)—P(1) | 96.07(5) |
| C(01)—Fe(1)—P(1) | 83.62(5) |
| P(3)—Fe(1)—P(1) | 118.686(19) |
| P(2)—Fe(1)—P(1) | 117.797(19) |
| N(2)—N(1)—Fe(1) | 179.86(19) |
| N(1)—N(2)—K(1) | 155.77(15) |

| Selected bond lengths [Å] and angles [°] for [(CP$^{iPr}$₃)FeN₂][BAr$_4^F$] (13) | |
|---|---|
| Fe(1)—N(1) | 1.864(7) |
| Fe(1)—C(01) | 2.081(3) |
| Fe(1)—P(1) | 2.3248(9) |
| Fe(1)—P(3) | 2.3604(9) |
| Fe(1)—P(2) | 2.3885(10) |
| N(1)—Fe(1)—C(01) | 177.7(2) |
| N(1)—Fe(1)—P(1) | 93.62(18) |
| C(01)—Fe(1)—P(1) | 84.31(8) |
| N(1)—Fe(1)—P(3) | 96.5(2) |
| C(01)—Fe(1)—P(3) | 85.20(8) |
| P(1)—Fe(1)—P(3) | 117.04(3) |
| N(1)—Fe(1)—P(2) | 95.8(2) |
| C(01)—Fe(1)—P(2) | 84.67(8) |
| P(1)—Fe(1)—P(2) | 124.77(4) |
| P(3)—Fe(1)—P(2) | 115.66(3) |
| N(2)—N(1)—Fe(1) | 178.4(6) |

Computational Results:

Coordinates for NBO analysis of 12[K(Et₂O)₃]
(from crystallographic structure):

| Center Number | Atomic Number | Atomic Type | X | Y | Z |
|---|---|---|---|---|---|
| 1 | 26 | 0 | −1.103223 | −0.012183 | 0.135795 |
| 2 | 19 | 0 | 4.315234 | −0.139004 | −0.090250 |
| 3 | 15 | 0 | −1.675324 | −1.173876 | 1.915082 |
| 4 | 15 | 0 | −1.065123 | −1.018414 | −1.816226 |
| 5 | 15 | 0 | −1.284994 | 2.184405 | 0.235987 |
| 6 | 8 | 0 | 4.528660 | 2.280807 | −1.344490 |
| 7 | 8 | 0 | 5.911867 | 0.348888 | 1.940111 |
| 8 | 7 | 0 | 0.612427 | −0.071693 | 0.411598 |
| 9 | 7 | 0 | 1.748732 | −0.115596 | 0.595993 |
| 10 | 8 | 0 | 4.713206 | −2.836955 | −0.525656 |
| 11 | 6 | 0 | −3.683547 | −1.101439 | −1.107075 |
| 12 | 6 | 0 | −2.848212 | 2.944956 | 2.477923 |
| 13 | 1 | 0 | −2.902445 | 3.411133 | 3.314657 |
| 14 | 1 | 0 | −2.943217 | 2.002256 | 2.629817 |
| 15 | 1 | 0 | −3.549324 | 3.247396 | 1.896562 |
| 16 | 6 | 0 | −5.300719 | 0.467098 | 1.314827 |
| 17 | 1 | 0 | −5.754021 | 0.820458 | 0.583473 |
| 18 | 6 | 0 | −4.001912 | −0.590231 | 3.509773 |
| 19 | 1 | 0 | −3.561669 | −0.948234 | 4.247172 |
| 20 | 6 | 0 | −3.352643 | −0.565059 | 2.266253 |
| 21 | 6 | 0 | −5.340093 | −2.690118 | −1.938757 |
| 22 | 1 | 0 | −6.213047 | −3.009821 | −1.927115 |
| 23 | 6 | 0 | −3.239989 | 0.059982 | −0.210069 |
| 24 | 6 | 0 | −5.939548 | 0.424855 | 2.554070 |
| 25 | 1 | 0 | −6.807180 | 0.746825 | 2.637851 |
| 26 | 6 | 0 | −3.995744 | −0.009489 | 1.140999 |
| 27 | 6 | 0 | −4.738827 | 1.530724 | −1.725792 |
| 28 | 1 | 0 | −5.272600 | 0.789814 | −1.900313 |
| 29 | 6 | 0 | −2.833970 | 2.529034 | −0.662244 |
| 30 | 6 | 0 | −0.699925 | −0.964724 | 3.508975 |
| 31 | 1 | 0 | −1.255246 | −1.274126 | 4.255707 |
| 32 | 6 | 0 | −3.177781 | 3.758444 | −1.223575 |
| 33 | 1 | 0 | −2.652914 | 4.506767 | −1.050375 |
| 34 | 6 | 0 | −5.064227 | 2.756173 | −2.308949 |
| 35 | 1 | 0 | −5.796246 | 2.817735 | −2.878437 |
| 36 | 6 | 0 | −1.997936 | −3.044284 | 2.072403 |
| 37 | 1 | 0 | −1.172254 | −3.499981 | 1.807364 |
| 38 | 6 | 0 | −3.630193 | 1.387339 | −0.885512 |
| 39 | 6 | 0 | −4.982113 | −1.629900 | −1.110692 |
| 40 | 1 | 0 | −5.621718 | −1.261735 | −0.545281 |
| 41 | 6 | 0 | −5.290076 | −0.092274 | 3.658747 |
| 42 | 1 | 0 | −5.709168 | −0.107013 | 4.489935 |
| 43 | 6 | 0 | −3.084558 | −3.496396 | 1.100751 |
| 44 | 1 | 0 | −3.186989 | −4.449759 | 1.155643 |
| 45 | 1 | 0 | −2.836970 | −3.251424 | 0.205987 |
| 46 | 1 | 0 | −3.914011 | −3.072883 | 1.330188 |
| 47 | 6 | 0 | −2.374639 | −3.573776 | 3.467980 |
| 48 | 1 | 0 | −3.208651 | −3.185989 | 3.743407 |
| 49 | 1 | 0 | −1.689325 | −3.336150 | 4.096275 |
| 50 | 1 | 0 | −2.461494 | −4.529577 | 3.434330 |
| 51 | 6 | 0 | −3.115644 | −2.771435 | −2.799728 |
| 52 | 1 | 0 | −2.483847 | −3.154087 | −3.366548 |
| 53 | 6 | 0 | −0.750968 | −1.148162 | −4.740497 |
| 54 | 1 | 0 | −1.580024 | −1.620407 | −4.840874 |
| 55 | 1 | 0 | −0.038712 | −1.776973 | −4.607887 |
| 56 | 1 | 0 | −0.578243 | −0.631117 | −5.530824 |
| 57 | 6 | 0 | 1.502649 | −2.065440 | −2.315231 |
| 58 | 1 | 0 | 1.815103 | −1.592208 | −1.539649 |
| 59 | 1 | 0 | 1.549957 | −1.489740 | −3.081720 |
| 60 | 1 | 0 | 2.053171 | −2.837709 | −2.460536 |
| 61 | 6 | 0 | −2.747844 | −1.699193 | −1.980183 |
| 62 | 6 | 0 | −0.325574 | 0.487045 | 3.757235 |
| 63 | 1 | 0 | 0.179496 | 0.553496 | 4.571506 |
| 64 | 1 | 0 | −1.124499 | 1.014869 | 3.832211 |
| 65 | 1 | 0 | 0.203405 | 0.811036 | 3.024982 |
| 66 | 6 | 0 | −0.022549 | −3.492168 | −0.929395 |
| 67 | 1 | 0 | 0.581790 | −4.220856 | −1.087339 |
| 68 | 1 | 0 | −0.916832 | −3.829177 | −0.851393 |
| 69 | 1 | 0 | 0.221701 | −3.043661 | −0.116590 |
| 70 | 6 | 0 | −1.487758 | 3.224594 | 1.824152 |
| 71 | 1 | 0 | −0.808956 | 2.902562 | 2.452414 |
| 72 | 6 | 0 | 0.050193 | −2.507521 | −2.095661 |
| 73 | 1 | 0 | −0.255203 | −2.969370 | −2.904599 |
| 74 | 6 | 0 | 0.580691 | −1.821703 | 3.461949 |
| 75 | 1 | 0 | 1.123702 | −1.546872 | 2.719257 |
| 76 | 1 | 0 | 0.343951 | −2.746055 | 3.359005 |
| 77 | 1 | 0 | 1.073156 | −1.706308 | 4.278167 |
| 78 | 6 | 0 | −0.838007 | −0.212835 | −3.526978 |
| 79 | 1 | 0 | 0.005710 | 0.283396 | −3.493229 |
| 80 | 6 | 0 | 5.552067 | 0.484633 | 3.317571 |
| 81 | 1 | 0 | 5.929145 | 1.302376 | 3.676051 |
| 82 | 1 | 0 | 5.908135 | −0.261935 | 3.825677 |
| 83 | 6 | 0 | 7.315816 | 0.488607 | 1.718843 |
| 84 | 1 | 0 | 7.801006 | −0.186282 | 2.219940 |
| 85 | 1 | 0 | 7.613666 | 1.363018 | 2.015963 |
| 86 | 6 | 0 | −1.299822 | 4.739239 | 1.722486 |
| 87 | 1 | 0 | −1.914962 | 5.096379 | 1.078526 |
| 88 | 1 | 0 | −0.400500 | 4.932966 | 1.446202 |
| 89 | 1 | 0 | −1.464279 | 5.140526 | 2.579276 |
| 90 | 6 | 0 | −4.406596 | −3.272724 | −2.778249 |
| 91 | 1 | 0 | −4.643071 | −3.990150 | −3.321219 |
| 92 | 6 | 0 | −0.039374 | 3.319208 | −0.609736 |
| 93 | 1 | 0 | −0.364441 | 4.240727 | −0.526365 |
| 94 | 6 | 0 | 5.211785 | 3.482161 | −0.977128 |
| 95 | 1 | 0 | 4.717915 | 4.251132 | −1.301884 |
| 96 | 1 | 0 | 6.092941 | 3.493459 | −1.381554 |
| 97 | 6 | 0 | 5.431388 | −3.446517 | −1.561156 |
| 98 | 1 | 0 | 4.909694 | −4.171249 | −1.941774 |
| 99 | 1 | 0 | 6.257089 | −3.817878 | −1.214349 |
| 100 | 6 | 0 | 1.307915 | 3.224629 | 0.107122 |
| 101 | 1 | 0 | 1.676736 | 2.348031 | −0.020042 |
| 102 | 1 | 0 | 1.184523 | 3.386169 | 1.045478 |
| 103 | 1 | 0 | 1.909864 | 3.882193 | −0.252694 |
| 104 | 6 | 0 | 4.068393 | 0.517784 | 3.442582 |
| 105 | 1 | 0 | 3.721485 | 1.265472 | 2.948807 |
| 106 | 1 | 0 | 3.827230 | 0.606058 | 4.366826 |

Coordinates for NBO analysis of 12[K(Et₂O)₃] (from crystallographic structure):

| Center Number | Atomic Number | Atomic Type | X | Y | Z |
|---|---|---|---|---|---|
| 107 | 1 | 0 | 3.699349 | −0.296154 | 3.090825 |
| 108 | 6 | 0 | 7.581088 | 0.327433 | 0.244385 |
| 109 | 1 | 0 | 7.263162 | −0.529819 | −0.046117 |
| 110 | 1 | 0 | 8.524717 | 0.391569 | 0.080971 |
| 111 | 1 | 0 | 7.123341 | 1.019454 | −0.239674 |
| 112 | 6 | 0 | −1.943089 | 0.817273 | −3.782952 |
| 113 | 1 | 0 | −1.701239 | 1.365393 | −4.533243 |
| 114 | 1 | 0 | −2.051741 | 1.370207 | −3.005635 |
| 115 | 1 | 0 | −2.768224 | 0.362999 | −3.969832 |
| 116 | 6 | 0 | 0.135799 | 3.014067 | −2.094347 |
| 117 | 1 | 0 | 0.816189 | 3.583836 | −2.459410 |
| 118 | 1 | 0 | −0.692505 | 3.169693 | −2.553507 |
| 119 | 1 | 0 | 0.395576 | 2.095831 | −2.203060 |
| 120 | 6 | 0 | 5.338946 | 3.557421 | 0.519011 |
| 121 | 1 | 0 | 4.464517 | 3.536775 | 0.915276 |
| 122 | 1 | 0 | 5.781619 | 4.374392 | 0.762325 |
| 123 | 1 | 0 | 5.851605 | 2.809564 | 0.835438 |
| 124 | 6 | 0 | 4.081567 | 2.325066 | −2.694760 |
| 125 | 1 | 0 | 4.843965 | 2.383314 | −3.292513 |
| 126 | 1 | 0 | 3.527624 | 3.108279 | −2.831847 |
| 127 | 6 | 0 | −4.305306 | 3.877919 | −2.045170 |
| 128 | 1 | 0 | −4.540148 | 4.701034 | −2.407612 |
| 129 | 6 | 0 | 5.733516 | −2.440262 | −2.609574 |
| 130 | 1 | 0 | 4.912970 | −2.089325 | −2.961565 |
| 131 | 1 | 0 | 6.234523 | −2.854135 | −3.317077 |
| 132 | 1 | 0 | 6.248687 | −1.726357 | −2.227943 |
| 133 | 6 | 0 | 3.297851 | 1.090761 | −2.994716 |
| 134 | 1 | 0 | 3.881903 | 0.327903 | −2.972567 |
| 135 | 1 | 0 | 2.902512 | 1.166548 | −3.865794 |
| 136 | 1 | 0 | 2.606298 | 0.983340 | −2.337683 |
| 137 | 6 | 0 | 3.297906 | −3.191439 | 1.321519 |
| 138 | 1 | 0 | 3.844961 | −2.661537 | 1.906929 |
| 139 | 1 | 0 | 2.836541 | −3.860832 | 1.835131 |
| 140 | 1 | 0 | 2.656223 | −2.626817 | 0.883823 |
| 141 | 6 | 0 | 4.136732 | −3.836024 | 0.327386 |
| 142 | 1 | 0 | 4.839780 | −4.339808 | 0.765526 |
| 143 | 1 | 0 | 3.606577 | −4.453089 | −0.201928 |

Natural Population and Charge Analysis

Summary of Natural Population Analysis:

| Atom | No | Charge | Core | Valence | Rydberg | Total |
|---|---|---|---|---|---|---|
| Fe | 1 | −1.46741 | 17.98394 | 9.44097 | 0.04249 | 27.46741 |
| K | 2 | 0.64775 | 17.99326 | 0.35849 | 0.00050 | 18.35225 |
| P | 3 | 1.27701 | 9.99593 | 3.65507 | 0.07199 | 13.72299 |
| P | 4 | 1.27393 | 9.99590 | 3.65507 | 0.07311 | 13.72607 |
| P | 5 | 1.26960 | 9.99597 | 3.66199 | 0.07244 | 13.73040 |
| O | 6 | −0.62206 | 1.99980 | 6.60170 | 0.02056 | 8.62206 |
| O | 7 | −0.62871 | 1.99981 | 6.61012 | 0.01878 | 8.62871 |
| N | 8 | 0.13757 | 1.99930 | 4.78375 | 0.07939 | 6.86243 |
| N | 9 | −0.38115 | 1.99962 | 5.34359 | 0.03794 | 7.38115 |
| O | 10 | −0.61888 | 1.99980 | 6.59853 | 0.02055 | 8.61888 |
| C | 11 | 0.03324 | 1.99900 | 3.94356 | 0.02420 | 5.96676 |
| C | 12 | −0.58933 | 1.99939 | 4.58194 | 0.00799 | 6.58933 |
| H | 13 | 0.20074 | 0.00000 | 0.79796 | 0.00130 | 0.79926 |
| H | 14 | 0.21689 | 0.00000 | 0.78114 | 0.00197 | 0.78311 |
| H | 15 | 0.21007 | 0.00000 | 0.78860 | 0.00132 | 0.78993 |
| C | 16 | −0.20245 | 1.99889 | 4.18565 | 0.01790 | 6.20245 |
| H | 17 | 0.19715 | 0.00000 | 0.80047 | 0.00238 | 0.80285 |
| C | 18 | −0.19551 | 1.99919 | 4.18152 | 0.01480 | 6.19551 |
| H | 19 | 0.18943 | 0.00000 | 0.80850 | 0.00208 | 0.81057 |
| C | 20 | −0.36151 | 1.99893 | 4.33351 | 0.02906 | 6.36151 |
| C | 21 | −0.19506 | 1.99933 | 4.18256 | 0.01317 | 6.19506 |
| H | 22 | 0.19161 | 0.00000 | 0.80668 | 0.00171 | 0.80839 |
| C | 23 | −0.24383 | 1.99889 | 4.20581 | 0.03913 | 6.24383 |
| C | 24 | −0.19708 | 1.99933 | 4.18432 | 0.01343 | 6.19708 |
| H | 25 | 0.19149 | 0.00000 | 0.80686 | 0.00166 | 0.80851 |

Summary of Natural Population Analysis:

| Atom | No | Charge | Core | Valence | Rydberg | Total |
|---|---|---|---|---|---|---|
| C | 26 | 0.03137 | 1.99899 | 3.94618 | 0.02346 | 5.96863 |
| C | 27 | −0.21664 | 1.99913 | 4.20149 | 0.01602 | 6.21664 |
| H | 28 | 0.19763 | 0.00000 | 0.80004 | 0.00233 | 0.80237 |
| C | 29 | −0.36260 | 1.99893 | 4.33489 | 0.02879 | 6.36260 |
| C | 30 | −0.53199 | 1.99929 | 4.51377 | 0.01892 | 6.53199 |
| H | 31 | 0.20509 | 0.00000 | 0.79210 | 0.00281 | 0.79491 |
| C | 32 | −0.17988 | 1.99894 | 4.16487 | 0.01608 | 6.17988 |
| H | 33 | 0.18683 | 0.00000 | 0.81093 | 0.00223 | 0.81317 |
| C | 34 | −0.19064 | 1.99931 | 4.17808 | 0.01325 | 6.19064 |
| H | 35 | 0.19093 | 0.00000 | 0.80734 | 0.00173 | 0.80907 |
| C | 36 | −0.52730 | 1.99926 | 4.51037 | 0.01768 | 6.52730 |
| H | 37 | 0.20537 | 0.00000 | 0.79253 | 0.00210 | 0.79463 |
| C | 38 | 0.03888 | 1.99897 | 3.93768 | 0.02447 | 5.96112 |
| C | 39 | −0.20266 | 1.99890 | 4.18569 | 0.01808 | 6.20266 |
| H | 40 | 0.19621 | 0.00000 | 0.80127 | 0.00252 | 0.80379 |
| C | 41 | −0.21185 | 1.99931 | 4.19886 | 0.01368 | 6.21185 |
| H | 42 | 0.19221 | 0.00000 | 0.80600 | 0.00180 | 0.80779 |
| C | 43 | −0.58951 | 1.99940 | 4.58192 | 0.00819 | 6.58951 |
| H | 44 | 0.20163 | 0.00000 | 0.79705 | 0.00133 | 0.79837 |
| H | 45 | 0.21463 | 0.00000 | 0.78340 | 0.00198 | 0.78537 |
| H | 46 | 0.21065 | 0.00000 | 0.78794 | 0.00140 | 0.78935 |
| C | 47 | −0.60288 | 1.99940 | 4.59489 | 0.00858 | 6.60288 |
| H | 48 | 0.20842 | 0.00000 | 0.78997 | 0.00161 | 0.79158 |
| H | 49 | 0.19819 | 0.00000 | 0.80052 | 0.00129 | 0.80181 |
| H | 50 | 0.20729 | 0.00000 | 0.79144 | 0.00127 | 0.79271 |
| C | 51 | −0.18450 | 1.99894 | 4.16936 | 0.01620 | 6.18450 |
| H | 52 | 0.18808 | 0.00000 | 0.80963 | 0.00229 | 0.81192 |
| C | 53 | −0.60314 | 1.99941 | 4.59520 | 0.00854 | 6.60314 |
| H | 54 | 0.20821 | 0.00000 | 0.79017 | 0.00162 | 0.79179 |
| H | 55 | 0.19684 | 0.00000 | 0.80188 | 0.00127 | 0.80316 |
| H | 56 | 0.20700 | 0.00000 | 0.79174 | 0.00126 | 0.79300 |
| C | 57 | −0.59043 | 1.99941 | 4.58309 | 0.00792 | 6.59043 |
| H | 58 | 0.20584 | 0.00000 | 0.79087 | 0.00329 | 0.79416 |
| H | 59 | 0.20060 | 0.00000 | 0.79807 | 0.00134 | 0.79940 |
| H | 60 | 0.19874 | 0.00000 | 0.79959 | 0.00167 | 0.80126 |
| C | 61 | −0.36574 | 1.99894 | 4.33721 | 0.02958 | 6.36574 |
| C | 62 | −0.59173 | 1.99941 | 4.58456 | 0.00776 | 6.59173 |
| H | 63 | 0.19847 | 0.00000 | 0.80017 | 0.00135 | 0.80153 |
| H | 64 | 0.21141 | 0.00000 | 0.78727 | 0.00132 | 0.78859 |
| H | 65 | 0.21350 | 0.00000 | 0.78420 | 0.00230 | 0.78650 |
| C | 66 | −0.58995 | 1.99940 | 4.58279 | 0.00775 | 6.58995 |
| H | 67 | 0.19510 | 0.00000 | 0.80351 | 0.00140 | 0.80490 |
| H | 68 | 0.21447 | 0.00000 | 0.78424 | 0.00129 | 0.78553 |
| H | 69 | 0.21245 | 0.00000 | 0.78575 | 0.00180 | 0.78755 |
| C | 70 | −0.52833 | 1.99925 | 4.51129 | 0.01779 | 6.52833 |
| H | 71 | 0.20886 | 0.00000 | 0.78893 | 0.00221 | 0.79114 |
| C | 72 | −0.53421 | 1.99929 | 4.51541 | 0.01950 | 6.53421 |
| H | 73 | 0.20462 | 0.00000 | 0.79260 | 0.00279 | 0.79538 |
| C | 74 | −0.59659 | 1.99940 | 4.58966 | 0.00753 | 6.59659 |
| H | 75 | 0.21373 | 0.00000 | 0.78432 | 0.00195 | 0.78627 |
| H | 76 | 0.20192 | 0.00000 | 0.79687 | 0.00121 | 0.79808 |
| H | 77 | 0.20178 | 0.00000 | 0.79689 | 0.00133 | 0.79822 |
| C | 78 | −0.53038 | 1.99926 | 4.51316 | 0.01796 | 6.53038 |
| H | 79 | 0.20219 | 0.00000 | 0.79557 | 0.00224 | 0.79781 |
| C | 80 | −0.04176 | 1.99917 | 4.03024 | 0.01235 | 6.04176 |
| H | 81 | 0.17980 | 0.00000 | 0.81822 | 0.00198 | 0.82020 |
| H | 82 | 0.18048 | 0.00000 | 0.81756 | 0.00195 | 0.81952 |
| C | 83 | −0.04055 | 1.99918 | 4.02912 | 0.01225 | 6.04055 |
| H | 84 | 0.18398 | 0.00000 | 0.81407 | 0.00195 | 0.81602 |
| H | 85 | 0.18176 | 0.00000 | 0.81610 | 0.00214 | 0.81824 |
| C | 86 | −0.60429 | 1.99941 | 4.59648 | 0.00840 | 6.60429 |
| H | 87 | 0.20382 | 0.00000 | 0.79463 | 0.00155 | 0.79618 |
| H | 88 | 0.19918 | 0.00000 | 0.79960 | 0.00122 | 0.80082 |
| H | 89 | 0.20902 | 0.00000 | 0.78966 | 0.00131 | 0.79098 |
| C | 90 | −0.21908 | 1.99933 | 4.20583 | 0.01391 | 6.21908 |
| H | 91 | 0.19181 | 0.00000 | 0.80641 | 0.00178 | 0.80819 |
| C | 92 | −0.53192 | 1.99929 | 4.51319 | 0.01944 | 6.53192 |
| H | 93 | 0.20485 | 0.00000 | 0.79225 | 0.00291 | 0.79515 |
| C | 94 | −0.04050 | 1.99917 | 4.02887 | 0.01245 | 6.04050 |
| H | 95 | 0.18419 | 0.00000 | 0.81373 | 0.00208 | 0.81581 |
| H | 96 | 0.17602 | 0.00000 | 0.82199 | 0.00198 | 0.82398 |
| C | 97 | −0.04141 | 1.99921 | 4.02880 | 0.01339 | 6.04141 |
| H | 98 | 0.18298 | 0.00000 | 0.81479 | 0.00223 | 0.81702 |
| H | 99 | 0.17782 | 0.00000 | 0.82014 | 0.00204 | 0.82218 |
| C | 100 | −0.59222 | 1.99940 | 4.58489 | 0.00793 | 6.59222 |

Summary of Natural Population Analysis:

| Atom | No  | Charge   | Core    | Valence | Rydberg | Total   |
|------|-----|----------|---------|---------|---------|---------|
| H    | 101 | 0.21333  | 0.00000 | 0.78348 | 0.00319 | 0.78667 |
| H    | 102 | 0.20373  | 0.00000 | 0.79499 | 0.00127 | 0.79627 |
| H    | 103 | 0.19554  | 0.00000 | 0.80292 | 0.00154 | 0.80446 |
| C    | 104 | −0.61128 | 1.99945 | 4.60495 | 0.00688 | 6.61128 |
| H    | 105 | 0.21744  | 0.00000 | 0.78076 | 0.00180 | 0.78256 |
| H    | 106 | 0.22131  | 0.00000 | 0.77775 | 0.00094 | 0.77869 |
| H    | 107 | 0.21682  | 0.00000 | 0.78151 | 0.00168 | 0.78318 |
| C    | 108 | −0.61590 | 1.99944 | 4.60973 | 0.00673 | 6.61590 |
| H    | 109 | 0.20825  | 0.00000 | 0.79001 | 0.00173 | 0.79175 |
| H    | 110 | 0.22330  | 0.00000 | 0.77583 | 0.00088 | 0.77670 |
| H    | 111 | 0.20956  | 0.00000 | 0.78844 | 0.00200 | 0.79044 |
| C    | 112 | −0.58856 | 1.99939 | 4.58096 | 0.00821 | 6.58856 |
| H    | 113 | 0.20075  | 0.00000 | 0.79802 | 0.00124 | 0.79925 |
| H    | 114 | 0.21848  | 0.00000 | 0.77936 | 0.00215 | 0.78152 |
| H    | 115 | 0.20985  | 0.00000 | 0.78888 | 0.00127 | 0.79015 |
| C    | 116 | −0.59188 | 1.99940 | 4.58480 | 0.00768 | 6.59188 |
| H    | 117 | 0.19375  | 0.00000 | 0.80484 | 0.00141 | 0.80625 |
| H    | 118 | 0.21584  | 0.00000 | 0.78280 | 0.00135 | 0.78416 |
| H    | 119 | 0.20764  | 0.00000 | 0.79076 | 0.00160 | 0.79236 |
| C    | 120 | −0.61677 | 1.99943 | 4.61060 | 0.00674 | 6.61677 |
| H    | 121 | 0.22032  | 0.00000 | 0.77814 | 0.00154 | 0.77968 |
| H    | 122 | 0.21640  | 0.00000 | 0.78267 | 0.00092 | 0.78360 |
| H    | 123 | 0.20455  | 0.00000 | 0.79327 | 0.00218 | 0.79545 |
| C    | 124 | −0.04114 | 1.99918 | 4.02940 | 0.01256 | 6.04114 |
| H    | 125 | 0.17691  | 0.00000 | 0.82114 | 0.00195 | 0.82309 |
| H    | 126 | 0.18667  | 0.00000 | 0.81131 | 0.00202 | 0.81333 |
| C    | 127 | −0.21780 | 1.99933 | 4.20443 | 0.01404 | 6.21780 |
| H    | 128 | 0.19017  | 0.00000 | 0.80811 | 0.00172 | 0.80983 |
| C    | 129 | −0.61559 | 1.99945 | 4.60971 | 0.00643 | 6.61559 |
| H    | 130 | 0.21392  | 0.00000 | 0.78443 | 0.00165 | 0.78608 |
| H    | 131 | 0.22119  | 0.00000 | 0.77791 | 0.00090 | 0.77881 |
| H    | 132 | 0.20221  | 0.00000 | 0.79625 | 0.00154 | 0.79779 |
| C    | 133 | −0.61285 | 1.99945 | 4.60617 | 0.00723 | 6.61285 |
| H    | 134 | 0.19711  | 0.00000 | 0.80130 | 0.00159 | 0.80289 |
| H    | 135 | 0.22545  | 0.00000 | 0.77350 | 0.00105 | 0.77455 |
| H    | 136 | 0.22507  | 0.00000 | 0.77309 | 0.00183 | 0.77493 |
| C    | 137 | −0.61910 | 1.99947 | 4.61242 | 0.00721 | 6.61910 |
| H    | 138 | 0.20434  | 0.00000 | 0.79398 | 0.00168 | 0.79566 |
| H    | 139 | 0.22460  | 0.00000 | 0.77445 | 0.00095 | 0.77540 |
| H    | 140 | 0.22981  | 0.00000 | 0.76837 | 0.00182 | 0.77019 |
| C    | 141 | −0.04266 | 1.99914 | 4.03108 | 0.01244 | 6.04266 |
| H    | 142 | 0.17873  | 0.00000 | 0.81929 | 0.00198 | 0.82127 |
| H    | 143 | 0.18493  | 0.00000 | 0.81298 | 0.00209 | 0.81507 |

Natural Bond Orbital Analysis for Bonds of Interest

(Occupancy) Bond orbital/Coefficients/Hybrids 1. (1.84620) BD (1)Fe1—P3
   (25.00%) 0.5000*Fe1 s(22.10%)p 2.97(65.54%) d 0.56(12.36%)
   f 0.00(0.01%)

| 0.0000  | 0.0000  | 0.0018  | −0.4700 | 0.0030  |
|---------|---------|---------|---------|---------|
| 0.0000  | −0.0006 | −0.1440 | 0.0154  | 0.0016  |
| −0.0079 | 0.0000  | 0.0003  | −0.4789 | 0.0132  |
| −0.0005 | −0.0004 | 0.0000  | 0.0014  | 0.6363  |
| −0.0072 | 0.0047  | 0.0020  | 0.0503  | 0.0003  |
| −0.0007 | −0.1079 | −0.0087 | 0.0016  | −0.1041 |
| 0.0224  | −0.0069 | −0.2673 | −0.0003 | −0.0053 |
| 0.1624  | −0.0056 | 0.0040  | −0.0011 | 0.0011  |
| −0.0075 | −0.0013 | −0.0018 | −0.0005 | −0.0016 |

(75.00%) 0.8660* P3 s(45.61%)p 1.19(54.37%)d 0.00(0.02%)

| 0.0000  | 0.0009  | 0.6748  | 0.0261  | 0.0044  |
|---------|---------|---------|---------|---------|
| −0.0013 | 0.0004  | 0.2963  | −0.0194 | 0.0014  |
| 0.0002  | 0.2694  | −0.0281 | 0.0033  | −0.0003 |
| −0.6165 | 0.0463  | 0.0044  | 0.0013  | −0.0073 |
| −0.0067 | −0.0023 | 0.0082  |         |         |

2. (1.84783) BD (1)Fe1—P4
   (24.66%) 0.4966*Fe1 s(22.28%)p 2.95(65.73%) d 0.54(11.98%)
   f 0.00(0.01%)

| 0.0000  | 0.0000  | 0.0012  | −0.4720 | 0.0029  |
|---------|---------|---------|---------|---------|
| 0.0000  | −0.0004 | 0.0875  | 0.0133  | 0.0038  |
| −0.0055 | 0.0000  | −0.0013 | −0.3277 | 0.0023  |
| −0.0026 | −0.0029 | 0.0000  | −0.0005 | −0.7360 |
| 0.0174  | 0.0047  | −0.0025 | 0.0104  | 0.0088  |
| −0.0022 | −0.0817 | 0.0103  | −0.0062 | 0.0726  |
| −0.0142 | 0.0036  | −0.2421 | −0.0118 | −0.0018 |
| 0.2199  | −0.0116 | 0.0064  | −0.0014 | 0.0006  |
| −0.0072 | −0.0012 | 0.0020  | −0.0015 | −0.0022 |

(75.34%) 0.8680* P4 s(46.11%)p 1.17(53.87%)d 0.00(0.02%)

| 0.0000  | 0.0008  | 0.6785  | 0.0271  | 0.0038 |
|---------|---------|---------|---------|--------|
| −0.0017 | 0.0003  | 0.1088  | −0.0037 | 0.0030 |
| 0.0002  | 0.4019  | −0.0288 | −0.0074 | 0.0004 |
| 0.6016  | −0.0503 | 0.0011  | 0.0019  | 0.0006 |
| 0.0097  | −0.0040 | 0.0062  |         |        |

3. (1.84905) BD (1)Fe1—P5
   (24.92%) 0.4992*Fe1 s(22.39%)p 2.91(65.15%)d 0.56(12.45%)
   f 0.00(0.01%)

| 0.0000  | 0.0000  | 0.0018  | −0.4732 | 0.0013  |
|---------|---------|---------|---------|---------|
| 0.0000  | −0.0002 | −0.0073 | 0.0149  | 0.0020  |
| −0.0063 | 0.0000  | 0.0010  | 0.8020  | −0.0182 |
| 0.0024  | 0.0032  | 0.0000  | −0.0012 | 0.0872  |
| −0.0052 | −0.0036 | −0.0012 | 0.0023  | −0.0101 |
| 0.0045  | −0.0803 | −0.0030 | −0.0003 | 0.0345  |
| −0.0077 | 0.0035  | −0.3346 | 0.0087  | −0.0083 |
| 0.0652  | 0.0176  | −0.0019 | −0.0011 | 0.0003  |
| −0.0076 | −0.0021 | 0.0012  | −0.0013 | −0.0024 |

(75.08%) 0.8665* P5 s(45.74%)p 1.19(54.24%)d 0.00(0.02%)

| 0.0000  | 0.0008  | 0.6758  | 0.0266  | 0.0043 |
|---------|---------|---------|---------|--------|
| −0.0014 | 0.0004  | 0.1620  | −0.0073 | 0.0026 |
| −0.0004 | −0.7133 | 0.0572  | 0.0020  | 0.0000 |
| 0.0627  | 0.0009  | −0.0065 | −0.0034 | 0.0000 |
| −0.0020 | −0.0112 | −0.0053 |         |        |

4. (1.93106) BD (1)Fe1—N8
   (20.42%) 0.4519*Fe1 s(18.42%)p 2.68(49.34%)d 1.75(32.18%)
   f 0.00(0.06%)

| 0.0000  | 0.0000  | 0.0014  | −0.4286 | −0.0217 |
|---------|---------|---------|---------|---------|
| 0.0000  | −0.0003 | 0.6896  | 0.0616  | −0.0002 |
| −0.0021 | 0.0000  | 0.0000  | −0.0237 | −0.0021 |
| 0.0002  | 0.0016  | 0.0000  | −0.0001 | 0.1161  |
| 0.0098  | 0.0012  | −0.0010 | −0.0345 | −0.0021 |
| −0.0003 | 0.1546  | 0.0061  | 0.0013  | −0.0024 |
| −0.0013 | 0.0002  | 0.4791  | 0.0198  | 0.0040  |
| −0.2581 | −0.0108 | −0.0023 | −0.0051 | −0.0130 |
| −0.0009 | 0.0078  | −0.0001 | 0.0185  | −0.0022 |

(79.58%) 0.8921* N8 s(64.45%)p 0.55(35.55%)d 0.00(0.00%)

| 0.0000  | 0.8016  | 0.0435  | −0.0028 | −0.0001 |
|---------|---------|---------|---------|---------|
| −0.5864 | 0.0458  | 0.0048  | 0.0212  | −0.0016 |
| −0.0002 | −0.0950 | 0.0043  | 0.0016  | −0.0001 |
| 0.0004  | 0.0000  | 0.0019  | −0.0009 |         |

5. (1.76371) BD (1)Fe1—C23
   (27.45%) 0.5240*Fe1 s(14.70%)p 3.43(50.36%)d 2.38(34.92%)
   f 0.00(0.03%)

| 0.0000  | 0.0000  | 0.0024  | −0.3833 | 0.0068  |
|---------|---------|---------|---------|---------|
| 0.0000  | −0.0017 | −0.6994 | −0.0290 | 0.0077  |
| −0.0040 | 0.0000  | 0.0001  | 0.0268  | 0.0008  |
| −0.0002 | −0.0014 | 0.0000  | −0.0002 | −0.1130 |
| −0.0047 | 0.0025  | 0.0005  | −0.0362 | 0.0015  |
| −0.0002 | 0.1614  | −0.0070 | 0.0025  | −0.0047 |
| −0.0002 | −0.0003 | 0.4992  | −0.0195 | 0.0072  |
| −0.2682 | 0.0103  | −0.0036 | −0.0120 | 0.0085  |
| −0.0020 | −0.0059 | 0.0005  | −0.0120 | 0.0006  |

(72.55%) 0.8517* C23 s(26.97%)p 2.71(73.03%)d 0.00(0.00%)

| 0.0007 | 0.5192  | 0.0058  | 0.0073  | 0.0001 |
|--------|---------|---------|---------|--------|
| 0.8427 | −0.0354 | −0.0055 | −0.0320 | 0.0006 |

| (Occupancy) Bond orbital/Coefficients/Hybrids | | | | |
|---|---|---|---|---|
| 0.0004 | 0.1334 | −0.0063 | −0.0012 | 0.0004 |
| −0.0009 | −0.0001 | | −0.0024 | 0.0012 |
| 1513. (0.04357) BD*(1)Fe1—P3 | | | | |
| (75.00%) 0.8660*Fe1 s(22.10%)p 2.97(65.54%)d 0.56(12.36%) | | | | |
| f 0.00(0.01%) | | | | |
| 0.0000 | 0.0000 | 0.0018 | −0.4700 | 0.0030 |
| 0.0000 | −0.0006 | −0.1440 | 0.0154 | 0.0016 |
| −0.0079 | 0.0000 | 0.0003 | −0.4789 | 0.0132 |
| −0.0005 | −0.0004 | 0.0000 | 0.0014 | 0.6363 |
| −0.0072 | 0.0047 | 0.0020 | 0.0503 | 0.0003 |
| −0.0007 | −0.1079 | −0.0087 | 0.0016 | −0.1041 |
| 0.0224 | −0.0069 | −0.2673 | −0.0003 | −0.0053 |
| 0.1624 | −0.0056 | 0.0040 | −0.0011 | 0.0011 |
| −0.0075 | −0.0013 | 0.0018 | −0.0005 | −0.0016 |
| (25.00%) −0.5000* P3 s(45.61%)p 1.19(54.37%)d 0.00(0.02%) | | | | |
| 0.0000 | 0.0009 | 0.6748 | 0.0261 | 0.0044 |
| −0.0013 | 0.0004 | 0.2963 | −0.0194 | 0.0014 |
| 0.0002 | 0.2694 | −0.0281 | 0.0033 | −0.0003 |
| −0.6165 | 0.0463 | 0.0044 | 0.0013 | −0.0073 |
| −0.0067 | −0.0023 | 0.0082 | | |
| 1514. (0.04400) BD*(1)Fe1—P4 | | | | |
| (75.34%) 0.8680*Fe 1 s(22.28%)p 2.95(65.73%)d 0.54(11.98%) | | | | |
| f 0.00(0.01%) | | | | |
| 0.0000 | 0.0000 | 0.0012 | −0.4720 | 0.0029 |
| 0.0000 | −0.0004 | 0.0875 | 0.0133 | 0.0038 |
| −0.0055 | 0.0000 | −0.0013 | −0.3277 | 0.0023 |
| −0.0026 | −0.0029 | 0.0000 | −0.0005 | −0.7360 |
| 0.0174 | 0.0047 | −0.0025 | 0.0104 | 0.0088 |
| −0.0022 | −0.0817 | 0.0103 | −0.0062 | 0.0726 |
| −0.0142 | 0.0036 | −0.2421 | −0.0118 | −0.0018 |
| 0.2199 | −0.0116 | 0.0064 | −0.0014 | 0.0006 |
| −0.0072 | −0.0012 | 0.0020 | −0.0015 | −0.0022 |
| (24.66%) −0.4966* P 4 s(46.11%)p 1.17(53.87%)d 0.00(0.02%) | | | | |
| 0.0000 | 0.0008 | 0.6785 | 0.0271 | 0.0038 |
| −0.0017 | 0.0003 | 0.1088 | −0.0037 | 0.0030 |
| 0.0002 | 0.4019 | −0.0288 | −0.0074 | 0.0004 |
| 0.6016 | −0.0503 | 0.0011 | 0.0019 | 0.0006 |
| 0.0097 | −0.0040 | 0.0062 | | |
| 1515. (0.04386) BD*(1)Fe 1 - P 5 | | | | |
| (75.08%) 0.8665*Fe1 s(22.39%)p 2.91(65.15%)d 0.56(12.45%) | | | | |
| f 0.00(0.01%) | | | | |
| 0.0000 | 0.0000 | 0.0018 | −0.4732 | 0.0013 |
| 0.0000 | −0.0002 | −0.0073 | 0.0149 | 0.0020 |
| −0.0063 | 0.0000 | 0.0010 | 0.8020 | −0.0182 |
| 0.0024 | 0.0032 | 0.0000 | −0.0012 | 0.0872 |
| −0.0052 | −0.0036 | −0.0012 | 0.0023 | −0.0101 |
| 0.0045 | −0.0803 | −0.0030 | −0.0003 | 0.0345 |
| −0.0077 | 0.0035 | −0.3346 | 0.0087 | −0.0083 |
| 0.0652 | 0.0176 | −0.0019 | −0.0011 | 0.0003 |
| −0.0076 | −0.0021 | 0.0012 | −0.0013 | −0.0024 |
| (24.92%) −0.4992* P5 s(45.74%)p 1.19(54.24%)d 0.00(0.02%) | | | | |
| 0.0000 | 0.0008 | 0.6758 | 0.0266 | 0.0043 |
| −0.0014 | 0.0004 | 0.1620 | −0.0073 | 0.0026 |
| −0.0004 | −0.7133 | 0.0572 | 0.0020 | 0.0000 |
| 0.0627 | 0.0009 | −0.0065 | −0.0034 | 0.0000 |
| −0.0020 | −0.0112 | −0.0053 | | |
| 1516. (0.08300) BD*(1)Fe1—N8 | | | | |
| (79.58%) 0.8921*Fe1 s(18.42%)p 2.68(49.34%)d 1.75(32.18%) | | | | |
| f 0.00(0.06%) | | | | |
| 0.0000 | 0.0000 | 0.0014 | −0.4286 | −0.0217 |
| 0.0000 | −0.0003 | 0.6896 | 0.0616 | −0.0002 |
| −0.0021 | 0.0000 | 0.0000 | −0.0237 | −0.0021 |
| 0.0002 | 0.0016 | 0.0000 | −0.0001 | 0.1161 |
| 0.0098 | 0.0012 | −0.0010 | −0.0345 | −0.0021 |
| −0.0003 | 0.1546 | 0.0061 | 0.0013 | −0.0024 |
| −0.0013 | 0.0002 | 0.4791 | 0.0198 | 0.0040 |
| −0.2581 | −0.0108 | −0.0023 | −0.0051 | −0.0130 |
| −0.0009 | 0.0078 | −0.0001 | 0.0185 | −0.0022 |
| (20.42%) −0.4519* N8 s(64.45%)p 0.55(35.55%)d 0.00(0.00%) | | | | |
| 0.0000 | 0.8016 | 0.0435 | −0.0028 | −0.0001 |
| −0.5864 | 0.0458 | 0.0048 | 0.0212 | −0.0016 |
| −0.0002 | −0.0950 | 0.0043 | 0.0016 | −0.0001 |
| 0.0004 | 0.0000 | 0.0019 | −0.0009 | |
| 1517. (0.09062) BD*(1)Fe1—C23 | | | | |
| (72.55%) 0.8517*Fe1 s(14.70%)p 3.43(50.36%)d 2.38(34.92%) | | | | |
| f 0.00(0.03%) | | | | |
| 0.0000 | 0.0000 | 0.0024 | −0.3833 | 0.0068 |
| 0.0000 | −0.0017 | −0.6994 | −0.0290 | 0.0077 |
| −0.0040 | 0.0000 | 0.0001 | 0.0268 | 0.0008 |
| −0.0002 | −0.0014 | 0.0000 | −0.0002 | −0.1130 |
| −0.0047 | 0.0025 | 0.0005 | −0.0362 | 0.0015 |
| −0.0002 | 0.1614 | −0.0070 | 0.0025 | −0.0047 |
| −0.0002 | −0.0003 | 0.4992 | −0.0195 | 0.0072 |
| −0.2682 | 0.0103 | −0.0036 | 0.0020 | 0.0085 |
| −0.0020 | −0.0059 | 0.0005 | −0.0120 | 0.0006 |
| (27.45%) −0.5240* C23 s(26.97%)p 2.71(73.03%)d 0.00(0.00%) | | | | |
| 0.0007 | 0.5192 | 0.0058 | 0.0073 | 0.0001 |
| 0.8427 | −0.0354 | −0.0055 | −0.0320 | 0.0006 |
| 0.0004 | 0.1334 | −0.0063 | −0.0012 | 0.0004 |
| −0.0009 | −0.0001 | | −0.0024 | 0.0012 |
| (0.03482) BD*(1) C11—C23 | | | | |
| (48.70%) 0.6978* C11 s(33.58%)p 1.98(66.38%)d 0.00(0.03%) | | | | |
| −0.0001 | −0.5792 | −0.0172 | −0.0008 | 0.0009 |
| −0.2099 | 0.0082 | −0.0022 | −0.6201 | 0.0243 |
| 0.0038 | −0.4842 | 0.0106 | 0.0047 | −0.0066 |
| −0.0035 | −0.0148 | 0.0080 | 0.0001 | |
| (51.30%) −0.7163* C23 s(24.80%)p 3.03(75.13%)d 0.00(0.07%) | | | | |
| 0.0002 | −0.4979 | 0.0073 | 0.0026 | 0.0001 |
| 0.2526 | 0.0037 | −0.0023 | 0.6602 | 0.0177 |
| 0.0084 | 0.5012 | 0.0072 | 0.0070 | −0.0160 |
| −0.0119 | −0.0162 | 0.0080 | −0.0005 | |
| 1537. (0.03133) BD*(1) C11—C39 | | | | |
| (49.58%) 0.7041* C11 s(33.03%)p 2.03(66.94%)d 0.00(0.02%) | | | | |
| 0.0002 | −0.5746 | 0.0136 | 0.0025 | −0.0007 |
| 0.7661 | 0.0163 | 0.0115 | 0.2861 | −0.0003 |
| −0.0004 | −0.0117 | −0.0095 | 0.0016 | −0.0089 |
| −0.0019 | 0.0018 | −0.0092 | 0.0076 | |
| (50.42%) −0.7101* C39 s(33.98%)p 1.94(65.94%)d 0.00(0.08%) | | | | |
| −0.0002 | −0.5829 | −0.0049 | −0.0014 | −0.7523 |
| 0.0055 | 0.0184 | −0.3044 | −0.0110 | 0.0071 |
| 0.0055 | −0.0137 | −0.0018 | −0.0173 | 0.0018 |
| −0.0100 | −0.0141 | 0.0134 | | |
| 1538. (0.31948) BD*(2) C11—C39 | | | | |
| (53.31%) 0.7301* C11 s(0.01%)p 1.00(99.94%)d 0.00(0.05%) | | | | |
| 0.0000 | −0.0091 | −0.0008 | 0.0005 | 0.0025 |
| −0.2612 | 0.0062 | −0.0044 | 0.6523 | −0.0040 |
| 0.0005 | −0.7110 | 0.0039 | −0.0054 | −0.0060 |
| 0.0132 | 0.0050 | 0.0137 | 0.0093 | |
| (46.69%) −0.6833* C39 s(0.00%)p 1.00(99.97%)d 0.00(0.02%) | | | | |
| −0.0001 | −0.0048 | 0.0023 | 0.0001 | −0.2638 |
| 0.0066 | 0.0017 | 0.6482 | −0.0144 | −0.0055 |
| −0.7138 | 0.0129 | 0.0081 | 0.0090 | −0.0090 |
| −0.0039 | −0.0043 | 0.0067 | | |
| 1558. (0.03658) BD*(1) C23—C26 | | | | |
| (51.30%) 0.7162* C 23 s(23.91%)p 3.18(76.01%)d 0.00(0.07%) | | | | |
| −0.0003 | 0.4890 | −0.0055 | −0.0027 | −0.0003 |
| −0.4236 | −0.0066 | 0.0002 | −0.0470 | 0.0005 |
| −0.0019 | 0.7603 | 0.0164 | 0.0102 | 0.0010 |
| −0.0242 | −0.0001 | 0.0069 | 0.0093 | |
| (48.70%) −0.6978* C26 s(32.91%)p 2.04(67.05%)d 0.00(0.03%) | | | | |
| 0.0002 | 0.5734 | 0.0183 | 0.0001 | −0.0007 |
| 0.3768 | −0.0128 | 0.0010 | 0.0404 | 0.0037 |
| −0.0022 | −0.7253 | 0.0264 | 0.0054 | −0.0006 |
| −0.0125 | −0.0013 | 0.0037 | 0.0127 | |

| (Occupancy) Bond orbital/Coefficients/Hybrids |
|---|

1559. (0.03587) BD*(1) C23—C38
 (51.26%) 0.7160* C23 s(24.27%)p 3.12(75.66%)d 0.00(0.07%)

| | | | | |
|---|---|---|---|---|
| −0.0003 | 0.4926 | −0.0058 | −0.0027 | 0.0002 |
| −0.2136 | −0.0013 | 0.0027 | 0.7478 | 0.0151 |
| 0.0099 | −0.3889 | −0.0133 | −0.0023 | −0.0168 |
| 0.0086 | −0.0151 | −0.0112 | −0.0028 | |

(48.74%) −0.6981* C38 s(33.14%)p 2.02(66.83%)d 0.00(0.03%)

| | | | | |
|---|---|---|---|---|
| 0.0002 | 0.5754 | 0.0159 | 0.0008 | −0.0006 |
| 0.1860 | −0.0064 | 0.0016 | −0.7162 | 0.0203 |
| 0.0055 | 0.3463 | −0.0171 | −0.0001 | −0.0052 |
| 0.0044 | −0.0119 | −0.0114 | −0.0037 | |

Second-Order Perturbation Analysis: Donor-Acceptor Interactions Involving the Fe—C a Bond:

Second Order Perturbation Theory Analysis of Fock Matrix in NBO Basis Threshold for printing: 0.50 kcal/mol

| Donor NBO (i) | Acceptor NBO (j) | E(2) kcal/mol | E(j)-E(i) a.u. | F(i, j) a.u. |
|---|---|---|---|---|
| 5. BD (1)Fe1—C23 | /263. RY*(1)Fe1 | 0.57 | 0.86 | 0.021 |
| 5. BD (1)Fe1—C23 | /266. RY*(4)Fe1 | 0.87 | 0.93 | 0.027 |
| 5. BD (1)Fe1—C23 | /300. RY*(2) P3 | 0.63 | 1.49 | 0.029 |
| 5. BD (1)Fe1—C23 | /303. RY*(5) P3 | 1.04 | 1.17 | 0.033 |
| 5. BD (1)Fe1—C23 | /305. RY*(7) P3 | 1.11 | 1.45 | 0.038 |
| 5. BD (1)Fe1—C23 | /315. RY*(3) P4 | 0.53 | 1.36 | 0.025 |
| 5. BD (1)Fe1—C23 | /317. RY*(5) P4 | 0.90 | 1.14 | 0.030 |
| 5. BD (1)Fe1—C23 | /319. RY*(7) P4 | 1.72 | 1.38 | 0.046 |
| 5. BD (1)Fe1—C23 | /328. RY*(2) P5 | 0.57 | 1.51 | 0.028 |
| 5. BD (1)Fe1—C23 | /329. RY*(3) P5 | 0.63 | 1.36 | 0.028 |
| 5. BD (1)Fe1—C23 | /331. RY*(5) P5 | 0.67 | 1.18 | 0.027 |
| 5. BD (1)Fe1—C23 | /333. RY*(7) P5 | 1.90 | 1.44 | 0.050 |
| 5. BD (1)Fe1—C23 | /371. RY*(3) N8 | 3.86 | 1.19 | 0.064 |
| 5. BD (1)Fe1—C23 | /378. RY*(10) N8 | 1.14 | 1.87 | 0.044 |
| 5. BD (1)Fe1—C23 | /412. RY*(2) C11 | 2.10 | 1.13 | 0.046 |
| 5. BD (1)Fe1—C23 | /432. RY*(8) C12 | 3.50 | 0.47 | 0.038 |
| 5. BD (1)Fe1—C23 | /434. RY*(10) C12 | 1.29 | 1.63 | 0.044 |
| 5. BD (1)Fe1—C23 | /453. RY*(5) H15 | 0.80 | 2.95 | 0.046 |
| 5. BD (1)Fe1—C23 | /496. RY*(6) C20 | 13.77 | 0.19 | 0.048 |
| 5. BD (1)Fe1—C23 | /512. RY*(8) C21 | 3.90 | 0.42 | 0.039 |
| 5. BD (1)Fe1—C23 | /513. RY*(9) C21 | 3.23 | 0.66 | 0.044 |
| 5. BD (1)Fe1—C23 | /524. RY*(1) C23 | 3.81 | 1.47 | 0.071 |
| 5. BD (1)Fe1—C23 | /531. RY*(8) C23 | 2.41 | 3.06 | 0.082 |
| 5. BD (1)Fe1—C23 | /545. RY*(8) C24 | 0.62 | 1.10 | 0.025 |
| 5. BD (1)Fe1—C23 | /548. RY*(11) C24 | 1.47 | 0.68 | 0.030 |
| 5. BD (1)Fe1—C23 | /569. RY*(13) C26 | 0.56 | 1.46 | 0.027 |
| 5. BD (1)Fe1—C23 | /584. RY*(14) C27 | 4.48 | 0.63 | 0.051 |
| 5. BD (1)Fe1—C23 | /588. RY*(4) H28 | 2.49 | 1.14 | 0.051 |
| 5. BD (1)Fe1—C23 | /615. RY*(12) C30 | 5.84 | 0.42 | 0.047 |
| 5. BD (1)Fe1—C23 | /631. RY*(9) C32 | 1.63 | 1.14 | 0.041 |
| 5. BD (1)Fe1—C23 | /652. RY*(12) C34 | 5.10 | 0.35 | 0.040 |
| 5. BD (1)Fe1—C23 | /676. RY*(3) H37 | 0.51 | 1.83 | 0.029 |
| 5. BD (1)Fe1—C23 | /677. RY*(4) H37 | 1.46 | 1.03 | 0.037 |
| 5. BD (1)Fe1—C23 | /700. RY*(8) C39 | 0.63 | 2.53 | 0.038 |
| 5. BD (1)Fe1—C23 | /735. RY*(6) C43 | 2.67 | 0.62 | 0.038 |
| 5. BD (1)Fe1—C23 | /736. RY*(7) C43 | 0.80 | 0.84 | 0.025 |
| 5. BD (1)Fe1—C23 | /739. RY*(10) C43 | 0.59 | 1.10 | 0.024 |
| 5. BD (1)Fe1—C23 | /743. RY*(14) C43 | 3.25 | 1.35 | 0.063 |
| 5. BD (1)Fe1—C23 | /754. RY*(1) H46 | 5.82 | 0.38 | 0.045 |
| 5. BD (1)Fe1—C23 | /757. RY*(4) H46 | 0.80 | 1.10 | 0.028 |
| 5. BD (1)Fe1—C23 | /764. RY*(6) C47 | 1.28 | 1.17 | 0.037 |
| 5. BD (1)Fe1—C23 | /776. RY*(4) H48 | 0.65 | 0.54 | 0.018 |
| 5. BD (1)Fe1—C23 | /785. RY*(3) H50 | 4.77 | 0.96 | 0.064 |
| 5. BD (1)Fe1—C23 | /794. RY*(7) C51 | 0.55 | 1.71 | 0.029 |
| 5. BD (1)Fe1—C23 | /795. RY*(8) C51 | 3.39 | 0.73 | 0.047 |
| 5. BD (1)Fe1—C23 | /804. RY*(4) H52 | 0.60 | 1.90 | 0.032 |
| 5. BD (1)Fe1—C23 | /808. RY*(5) C53 | 2.92 | 0.71 | 0.043 |
| 5. BD (1)Fe1—C23 | /822. RY*(3) H54 | 0.82 | 2.33 | 0.042 |
| 5. BD (1)Fe1—C23 | /827. RY*(3) H55 | 0.52 | 2.36 | 0.033 |
| 5. BD (1)Fe1—C23 | /833. RY*(4) H56 | 0.55 | 0.49 | 0.016 |
| 5. BD (1)Fe1—C23 | /846. RY*(12) C57 | 0.67 | 2.21 | 0.037 |

Second Order Perturbation Theory Analysis of Fock Matrix in NBO Basis Threshold for printing: 0.50 kcal/mol

| Donor NBO (i) | Acceptor NBO (j) | E(2) kcal/mol | E(j)-E(i) a.u. | F(i, j) a.u. |
|---|---|---|---|---|
| 5. BD (1)Fe1—C23 | /848. RY*(14) C57 | 7.14 | 0.79 | 0.071 |
| 5. BD (1)Fe1—C23 | /850. RY*(2) H58 | 1.26 | 0.70 | 0.028 |
| 5. BD (1)Fe1—C23 | /854. RY*(1) H59 | 1.34 | 0.76 | 0.030 |
| 5. BD (1)Fe1—C23 | /857. RY*(4) H59 | 3.54 | 0.54 | 0.041 |
| 5. BD (1)Fe1—C23 | /859. RY*(1) H60 | 0.65 | 0.91 | 0.023 |
| 5. BD (1)Fe1—C23 | /861. RY*(3) H60 | 1.22 | 1.97 | 0.047 |
| 5. BD (1)Fe1—C23 | /864. RY*(1) C61 | 0.88 | 1.33 | 0.032 |
| 5. BD (1)Fe1—C23 | /890. RY*(13) C62 | 0.72 | 1.59 | 0.032 |
| 5. BD (1)Fe1—C23 | /891. RY*(14) C62 | 0.55 | 1.73 | 0.029 |
| 5. BD (1)Fe1—C23 | /901. RY*(5) H64 | 3.15 | 1.83 | 0.072 |
| 5. BD (1)Fe1—C23 | /910. RY*(4) C66 | 2.18 | 0.96 | 0.044 |
| 5. BD (1)Fe1—C23 | /918. RY*(12) C66 | 2.46 | 1.24 | 0.053 |
| 5. BD (1)Fe1—C23 | /928. RY*(3) H68 | 13.25 | 0.43 | 0.071 |
| 5. BD (1)Fe1—C23 | /930. RY*(5) H68 | 0.91 | 2.71 | 0.047 |
| 5. BD (1)Fe1—C23 | /931. RY*(1) H69 | 1.12 | 0.98 | 0.032 |
| 5. BD (1)Fe1—C23 | /932. RY*(2) H69 | 10.78 | 0.55 | 0.074 |
| 5. BD (1)Fe1—C23 | /935. RY*(5) H69 | 1.12 | 2.62 | 0.051 |
| 5. BD (1)Fe1—C23 | /961. RY*(7) C72 | 0.76 | 0.74 | 0.023 |
| 5. BD (1)Fe1—C23 | /966. RY*(12) C72 | 19.18 | 0.24 | 0.065 |
| 5. BD (1)Fe1—C23 | /978. RY*(5) C74 | 1.79 | 0.86 | 0.037 |
| 5. BD (1)Fe1—C23 | /979. RY*(6) C74 | 5.12 | 0.75 | 0.059 |
| 5. BD (1)Fe1—C23 | /980. RY*(7) C74 | 1.45 | 0.87 | 0.034 |
| 5. BD (1)Fe1—C23 | /982. RY*(9) C74 | 4.59 | 0.92 | 0.062 |
| 5. BD (1)Fe1—C23 | /985. RY*(12) C74 | 2.97 | 1.37 | 0.061 |
| 5. BD (1)Fe1—C23 | /992. RY*(5) H75 | 1.19 | 2.22 | 0.049 |
| 5. BD (1)Fe1—C23 | /***. RY*(6) C78 | 3.08 | 1.03 | 0.054 |
| 5. BD (1)Fe1—C23 | /***. RY*(12) C78 | 0.96 | 1.33 | 0.034 |
| 5. BD (1)Fe1—C23 | /***. RY*(2) C86 | 1.36 | 0.77 | 0.031 |
| 5. BD (1)Fe1—C23 | /***. RY*(5) C86 | 1.23 | 0.97 | 0.033 |
| 5. BD (1)Fe1—C23 | /***. RY*(7) C86 | 0.81 | 1.27 | 0.030 |
| 5. BD (1)Fe1—C23 | /***. RY*(8) C86 | 0.51 | 0.98 | 0.021 |
| 5. BD (1)Fe1—C23 | /***. RY*(9) C86 | 1.16 | 1.40 | 0.038 |
| 5. BD (1)Fe1—C23 | /***. RY*(1) H89 | 0.54 | 0.92 | 0.021 |
| 5. BD (1)Fe1—C23 | /***. RY*(2) H89 | 9.27 | 0.67 | 0.075 |
| 5. BD (1)Fe1—C23 | /***. RY*(4) C90 | 10.95 | 0.31 | 0.055 |
| 5. BD (1)Fe1—C23 | /***. RY*(9) C90 | 0.77 | 0.85 | 0.024 |
| 5. BD (1)Fe1—C23 | /***. RY*(11) C90 | 0.73 | 0.75 | 0.022 |
| 5. BD (1)Fe1—C23 | /***. RY*(13) C92 | 1.62 | 0.85 | 0.035 |
| 5. BD (1)Fe1—C23 | /***. RY*(4) H102 | 1.02 | 0.67 | 0.025 |
| 5. BD (1)Fe1—C23 | /***. RY*(5) H103 | 0.88 | 2.79 | 0.047 |
| 5. BD (1)Fe1—C23 | /***. RY*(4) C112 | 2.27 | 0.90 | 0.043 |
| 5. BD (1)Fe1—C23 | /***. RY*(6) C112 | 2.37 | 0.65 | 0.037 |
| 5. BD (1)Fe1—C23 | /***. RY*(7) C112 | 2.49 | 0.74 | 0.041 |
| 5. BD (1)Fe1—C23 | /***. RY*(8) C112 | 0.58 | 1.91 | 0.032 |
| 5. BD (1)Fe1—C23 | /***. RY*(4) H113 | 2.34 | 0.39 | 0.029 |
| 5. BD (1)Fe1—C23 | /***. RY*(6) C116 | 4.87 | 0.49 | 0.047 |
| 5. BD (1)Fe1—C23 | /***. RY*(7) C116 | 10.17 | 0.31 | 0.053 |
| 5. BD (1)Fe1—C23 | /***. RY*(4) H117 | 2.79 | 0.41 | 0.032 |
| 5. BD (1)Fe1—C23 | /***. RY*(1) H119 | 0.79 | 0.89 | 0.025 |
| 5. BD (1)Fe1—C23 | /***. RY*(4) H119 | 1.65 | 0.92 | 0.037 |
| 5. BD (1)Fe1—C23 | /***. RY*(4) C127 | 4.63 | 0.83 | 0.059 |
| 5. BD (1)Fe1—C23 | /***. RY*(9) H128 | 3.11 | 1.36 | 0.062 |
| 5. BD (1)Fe1—C23 | /***. BD*(1)Fe1—P3 | 7.31 | 0.66 | 0.065 |
| 5. BD (1)Fe1—C23 | /***. BD*(1)Fe1—P4 | 6.04 | 0.64 | 0.058 |
| 5. BD (1)Fe1—C23 | /***. BD*(1)Fe1—P5 | 7.73 | 0.66 | 0.067 |
| 5. BD (1)Fe1—C23 | /***. BD*(1)Fe1—N8 | 8.40 | 0.63 | 0.068 |
| 5. BD (1)Fe1—C23 | /***. BD*(1)Fe1—C23 | 4.92 | 0.55 | 0.048 |
| 5. BD (1)Fe1—C23 | /***. BD*(1) P3—C20 | 2.43 | 0.53 | 0.034 |
| 5. BD (1)Fe1—C23 | /***. BD*(1) P3—C30 | 3.29 | 0.49 | 0.037 |
| 5. BD (1)Fe1—C23 | /***. BD*(1) P3—C36 | 0.77 | 0.47 | 0.018 |
| 5. BD (1)Fe1—C23 | /***. BD*(1) P4—C61 | 2.52 | 0.53 | 0.034 |
| 5. BD (1)Fe1—C23 | /***. BD*(1) P4—C72 | 3.78 | 0.48 | 0.040 |
| 5. BD (1)Fe1—C23 | /***. BD*(1) P4—C78 | 0.93 | 0.47 | 0.019 |
| 5. BD (1)Fe1—C23 | /***. BD*(1) P5—C29 | 2.49 | 0.53 | 0.034 |
| 5. BD (1)Fe1—C23 | /***. BD*(1) P5—C70 | 0.95 | 0.47 | 0.020 |
| 5. BD (1)Fe1—C23 | /***. BD*(1) P5—C92 | 3.17 | 0.48 | 0.036 |
| 5. BD (1)Fe1—C23 | /***. BD*(1) C11—C39 | 6.70 | 0.86 | 0.071 |
| 5. BD (1)Fe1—C23 | /***. BD*(2) C11—C39 | 1.46 | 0.31 | 0.019 |
| 5. BD (1)Fe1—C23 | /***. BD*(1) C20—C26 | 5.95 | 0.43 | 0.048 |
| 5. BD (1)Fe1—C23 | /***. BD*(1) C23—C26 | 1.21 | 0.68 | 0.027 |
| 5. BD (1)Fe1—C23 | /***. BD*(1) C23—C38 | 4.61 | 0.55 | 0.048 |
| 5. BD (1)Fe1—C23 | /***. BD*(1) C27—C38 | 5.99 | 0.86 | 0.068 |

Second Order Perturbation Theory Analysis of Fock Matrix in NBO Basis Threshold for printing: 0.50 kcal/mol

| Donor NBO (i) | Acceptor NBO (j) | E(2) kcal/ mol | E(j)- E(i) a.u. | F(i, j) a.u. |
|---|---|---|---|---|
| 5. BD (1)Fe1—C23 | /***. BD*(2) C27—C38 | 2.45 | 0.32 | 0.026 |
| 5. BD (1)Fe1—C23 | /***. BD*(1) C66—H67 | 9.18 | 0.27 | 0.047 |
| 5. BD (1)Fe1—C23 | /***. BD*(1) C66—C72 | 2.11 | 0.49 | 0.031 |
| 5. BD (1)Fe1—C23 | /***. BD*(1) C74—H75 | 2.73 | 0.68 | 0.041 |
| 5. BD (1)Fe1—C23 | /***. BD*(1) C112—H113 | 0.68 | 0.82 | 0.022 |
| 5. BD (1)Fe1—C23 | /***. BD*(1) C116—H117 | 3.29 | 0.51 | 0.039 |

ADDITIONAL REFERENCES

[1] Kliegl, A. *Ber. Deutsch. Chem. Ges.* 1908, 40, 4937-42.
[2] Watt, G. W.; Chrisp, J. D. *Anal. Chem.* 1952, 24, 2006.

EXAMPLE 3

Conversion of Fe—NH$_2$ to Fe—N$_2$ with Release of NH$_3$

Tris(phosphine)borane ligated Fe(I) centers featuring N$_2$H$_4$, NH$_3$, NH$_2$, and OH ligands are described herein. The conversion of Fe—NH$_2$ to Fe—NH$_3^+$ by addition of acid, and subsequent reductive release of NH$_3$ to generate Fe—N$_2$, is demonstrated. This sequence models the final steps of proposed Fe-mediated nitrogen fixation pathways. The five-coordinate trigonal bipyramidal complexes described are unusual in that they adopt S=3/2 ground states and are prepared from a four-coordinate, S=3/2 trigonal pyramidal precursor.

Due the structural and mechanistic complexity of biological nitrogen fixation[1] a variety of mechanisms have been proposed that invoke either Mo or Fe as the likely active site for N$_2$ binding and reduction. Fe—NH$_2$ is an intermediate common to both limiting mechanisms (i.e., distal vs. alternating) being considered for Fe-mediated N$_2$ fixation scenarios at the FeMo-cofactor.[2,3] Such a species may form either via reductive protonation of the nitride intermediate of a distal scheme (i.e., Fe(N)→Fe(NH)→Fe(NH$_2$)→Fe (NH$_3$)), or by reductive protonation of a hydrazine intermediate of an alternating scheme (i.e., Fe(NH$_2$—NH$_2$)→Fe (NH$_2$)+NH$_3$). In the latter context, detection of an EPR active Fe—NH$_2$ or possibly Fe—NH$_3$ common intermediate has been proposed under reducing conditions at the FeMo-cofactor from substrates including N$_2$, N$_2$H$_4$, and MeN=NH.[3a]

One key to realizing a catalytic cycle in either limiting scenario concerns the regeneration of Fe—N$_2$ from Fe—NH$_2$ with concurrent release of NH$_3$.[4] While there have been recent synthetic reports demonstrating NH$_3$ generation from Fe(N) nitride model complexes, these studies have not provided information about the plausible downstream Fe(NH$_x$) (X=1, 2, 3) intermediates en route to NH$_3$ release, nor have these systems illustrated the feasibility of regeneration of Fe—N$_2$.[5] Herein we describe a terminal, S=3/2 Fe—NH$_2$ complex for which the stepwise conversion to Fe—NH$_3$, and then to Fe—N$_2$ along with concomitant release of NH$_3$, is demonstrated (eqns 1 and 2).

  (1)

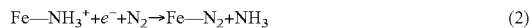  (2)

Addition of methyllithium to (TPB)FeBr[6] affords the corresponding methyl complex (TPB)FeMe (1) in high yield (Scheme 1). Protonation of 1 by HBAr$^F_4$.2Et$_2$O (BAr$^F_4{}^-$=B(3,5-C$_6$H$_3$(CF$_3$)$_2$)$_4{}^-$) in a cold ethereal solution releases methane to yield [(TPB)Fe][BAr$^F_4$] (2) which serves as a useful synthon with a vacant coordination site.

SCHEME 1

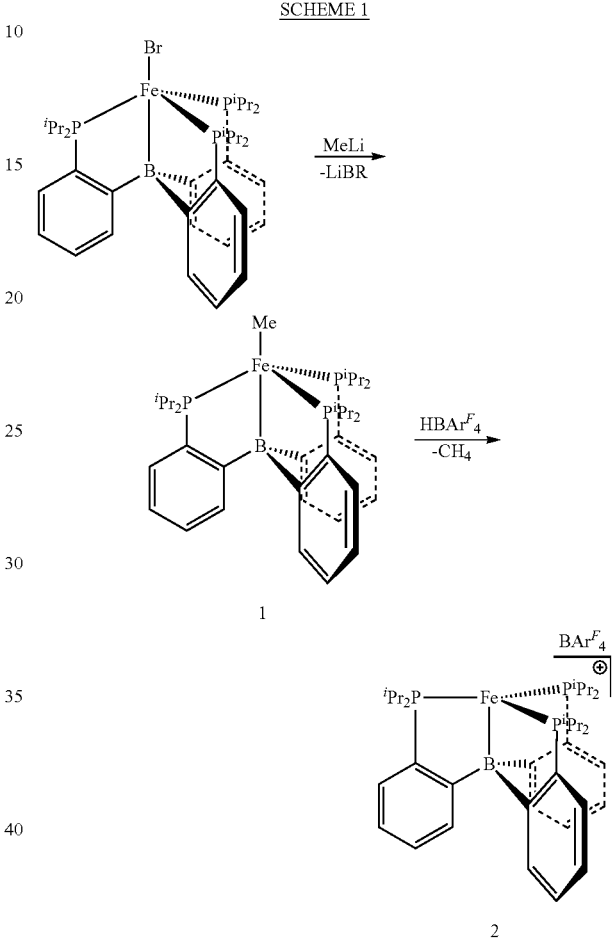

Figure 52:
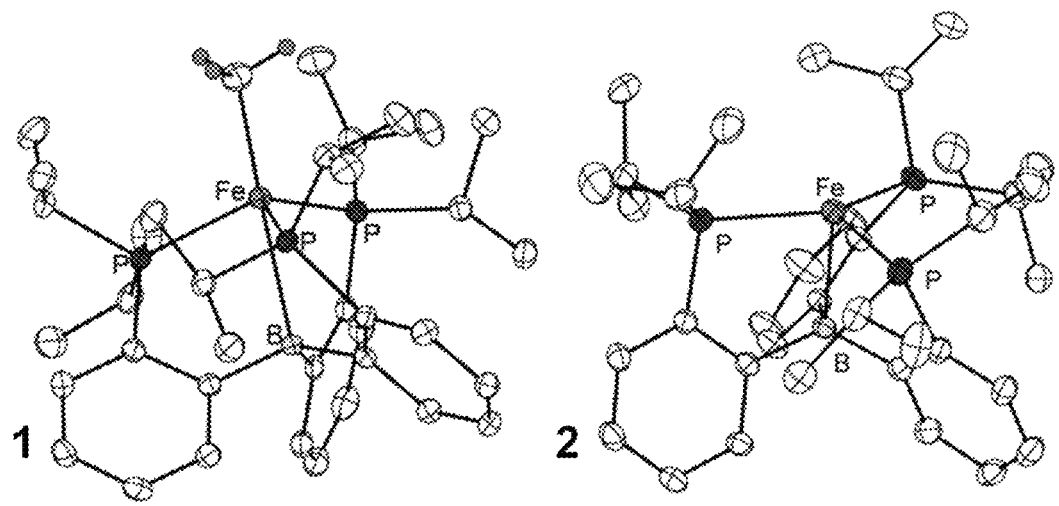
FIG. 52. X-Ray Diffraction (XRD) structures of complexes 1 (A) and 2 (B) with hydrogen atoms and counterion (for B) omitted for clarity. See Table 24 for selected bond lengths and angles.

XRD data were obtained for 1 and 2 (FIG. 52). The geometry of 1 is pseudo trigonal bipyramidal about Fe with an Fe—C bond length of 2.083(10) Å and an Fe—B bond length of 2.522 (2) Å. In the solid state 2 possesses a four-coordinate distorted trigonal pyramidal geometry with no close contacts in the apical site trans to boron, making this complex coordinatively unsaturated. Additionally, there is one wide P—Fe—P angle of 136°. The origin of this large angle is not clear, but suggests increased backbonding from a relatively electron rich Fe center into the phosphine ligands that would arise from this distortion.

The Fe—B distance in 2 (2.217(2) Å) is markedly shorter than that in (TPB)FeBr (2.459(5) Å), which is noteworthy because one might expect the loss of an anionic σ-donor ligand to reduce the Lewis basicity of the metal and thus weaken the Fe—B bond. For example, the Au—B distance in (TPB)AuCl (2.318 Å) lengthens upon chloride abstraction to 2.448 Å in [(TPB)Au]$^+$.[7] To explain this difference we note that the boron center in four-coordinate 2 is less pyramidalized (Σ(C—B—C)=347.3°) than that in five-coordinate (TPB)FeBr (Σ(C—B—C)=341.2°), pointing to a weak interaction despite the short distance. These observations suggest that the geometry of 2 might be best understood as derived from a planar three-coordinate Fe(I) center distorted towards a T-shaped geometry,[8] the unusually short Fe—B distance being due largely to the constraints imposed by the ligand cage structure. This interpretation is consistent with a computational model study: the DFT (B3LYP/6-31 G(d)) optimized geometry of the hypothetical complex [(Me$_2$PhP)$_3$Fe]$^+$ exhibits a planar geometry with P—Fe—P angles of 134.8°, 113.1°, and 111.7°, very close to those measured for [(TPB)Fe]$^+$ (137.5°, 113.2°, 109.1°).

When considering the bonding of the (Fe—B)$^7$ subunit of 2 to estimate the best oxidation state and valence assignment, two limiting scenarios present themselves: Fe(III)/B(I) and Fe(I)/B(III). The structural data and computations for 2 are suggestive of a weak Fe—B interaction and indicate that this species is better understood to be Fe(I)/B(III) rather than Fe(III)/B(I). Calculations indicate that a small amount of spin density resides on the B-atom of 2 (SI) and suggest some contribution from an Fe(II)/B(II) resonance form is also relevant. The rest of the complexes 3-6 presented herein possess significantly longer, and presumably weaker, Fe—B interactions (vide infra) and are hence also better classified as Fe(I) species. Additional spectroscopic studies (e.g., XAS and Mössbauer) will help to better map the Fe—B bonding interaction across the variable Fe—B distances and also the spin states of the complexes. These studies would thereby help to determine the value and limitation of classically derived oxidation/valence assignments for boratranes of these types.[9]

TABLE 24

Selected Metrics for Complexes 1-6

| | Fe—X (Å) | Fe—B (Å) | Avg. Fe—P (Å) | Σ P—Fe—P | Σ C—B—C |
|---|---|---|---|---|---|
| 1 | 2.083 (10) | 2.523 (2) | 2.40 | 339° | 341° |
| 2 | — | 2.217 (2) | 2.38 | 359° | 347° |
| 3 | 2.205 (2) | 2.392 (2) | 2.44 | 350° | 339° |
| 4 | 2.280 (3) | 2.433 (3) | 2.44 | 349° | 341° |
| 5 | 1.918 (3) | 2.449 (4) | 2.39 | 343° | 339° |
| 6 | 1.8916 (7) | 2.4438 (9) | 2.39 | 348° | 337° |

Solutions of 2 are orange in Et$_2$O and pale yellow-green in THF. Titration of THF into an ethereal solution of 2 results in a distinct change in the UV-vis spectrum consistent with weak THF binding. Addition of an excess of N$_2$H$_4$ to an ethereal solution of 2 results in a slight lightening of the orange color of the solution to afford [(TPB)Fe(N$_2$H$_4$)][BAr$^F_4$] (3) in 89% yield. Complex 3 shows a paramagnetically shifted $^1$H NMR spectrum indicative of an S=3/2 Fe center that is corroborated by a room temperature solution magnetic moment, $\mu_{eff}$, of 3.5 $\mu_B$. Crystals of 3 were obtained and XRD analysis (FIG. 53A) indicates a distorted trigonal bipyramidal geometry. The Fe—N distance of 2.205(2) Å is unusually long (2.14 Å is the average quaternary N—Fe distance in the Cambridge Structural Database) reflecting its unusual quartet spin state.

SCHEME 2

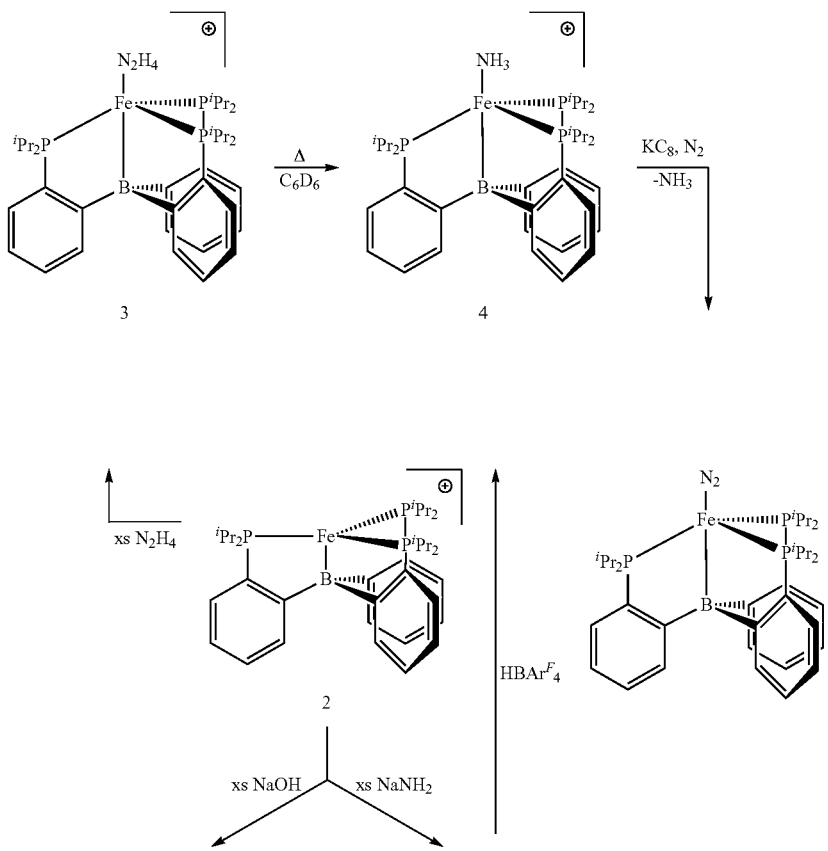

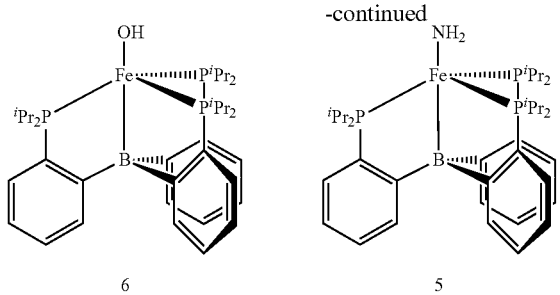

6    5

Figure 53:
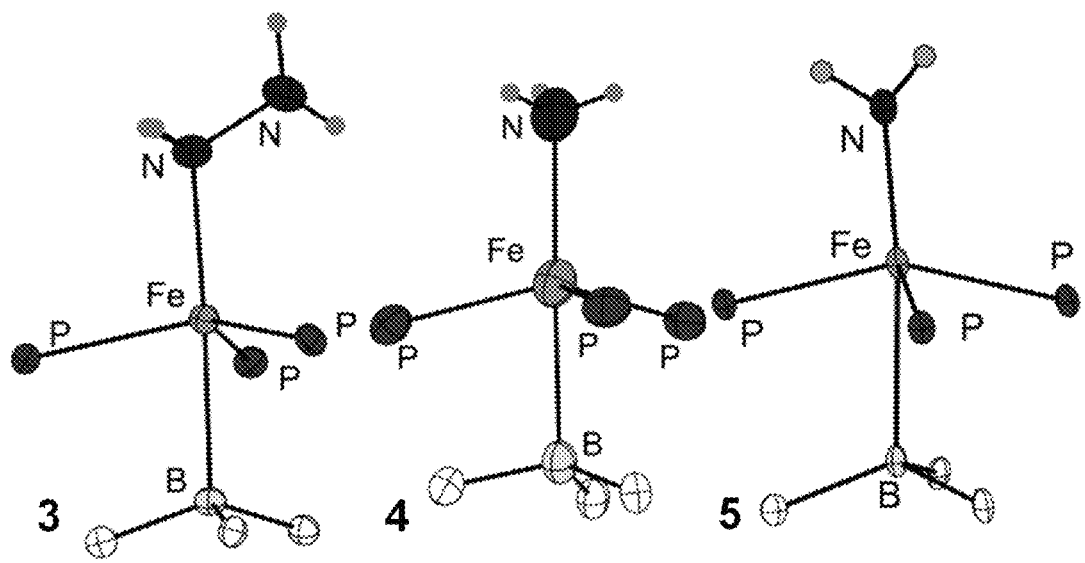
FIG. 53. XRD structures of the cores of complexes 3 (A), 4 (B), and 5 (C). See Table 24 for selected distances and angles.

Complex 3 is stable to vacuum, but solutions decompose cleanly at room temperature over hours to form the cationic ammonia complex [(TPB)Fe(NH$_3$)][BAr$^F_4$], 4, which was assigned by comparison of its $^1$H NMR spectrum with an independently prepared sample formed by the addition of NH$_3$ to the cation 2. Analysis of additional degradation products shows only NH$_3$ and trace H$_2$ (SI). The assignment of 4 as an ammonia adduct was confirmed by XRD analysis (FIG. 53B). Like 3, complex 4 shows a long Fe—N distance of 2.280(3) Å in the solid state. The complexes 2, 3 and 4 are unusual by virtue of their S=3/2 spin states and underscore the utility of local 3-fold symmetry with respect to stabilizing high spin states at iron, even in the presence of strong-field phosphine ligands.

Addition of NaNH$_2$ to the cation 2 affords the terminal amide, (TPB)Fe—NH$_2$ (5) in ca. 85% non-isolated yield by $^1$H NMR integration. The XRD structure of 5 (FIG. 53C) shows an overall geometry similar to that observed in 1, 3, and 4. Of interest is the short Fe—N distance of 1.918(3) Å by comparison to 4 (2.280(3) Å). The amide hydrogens were located in the difference map and indicate a nearly planar geometry about N (with the sum of the angles around N being 355°).

Figure 54:
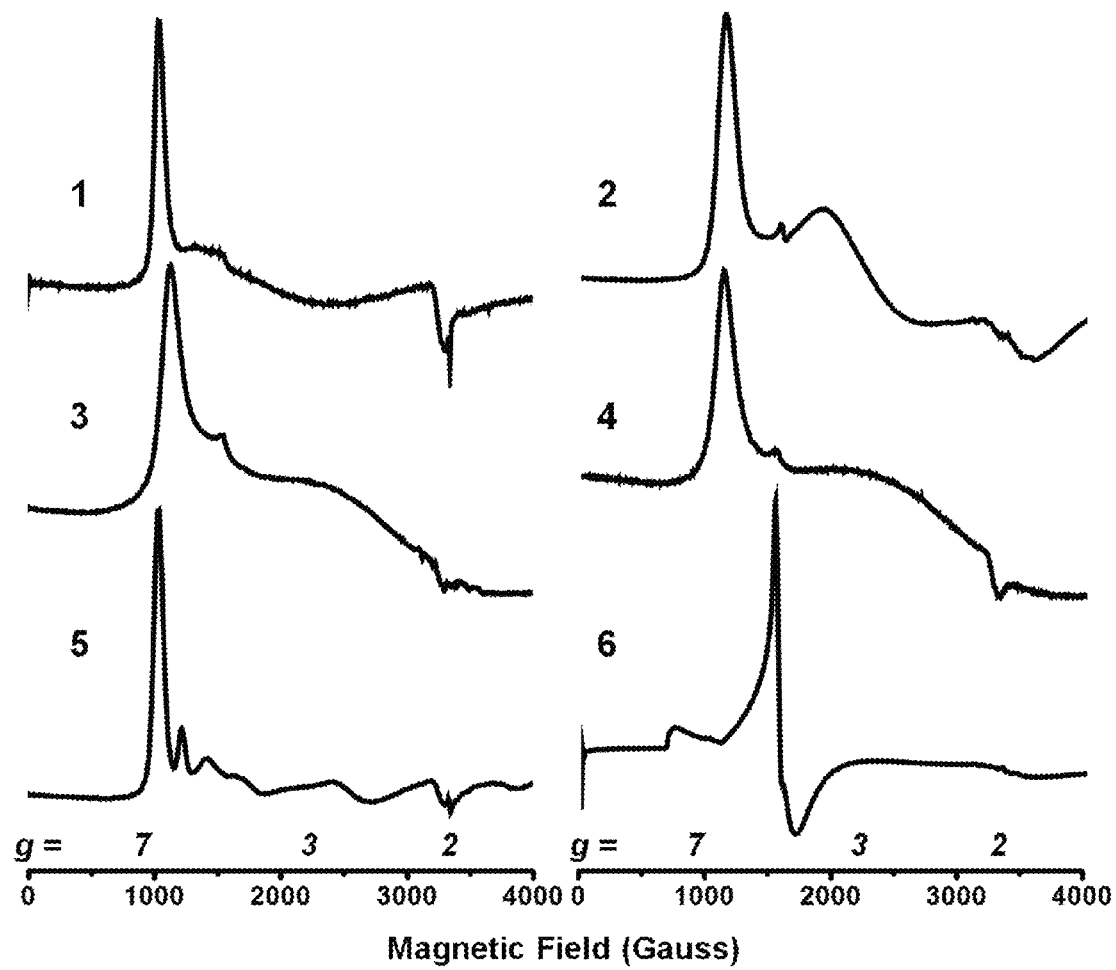
FIG. 54. X-Band EPR spectra for complexes 1-6. Conditions for 1: Toluene, 8 K; 2: 2:1 Toluene:$Et_2O$, 10 K 3: 2-MeTHF, 10 K; 4: 2-MeTHF, 10 K; 5: 2-MeTHF, 10 K; 6: Toluene, 10 K.
Figure 55:
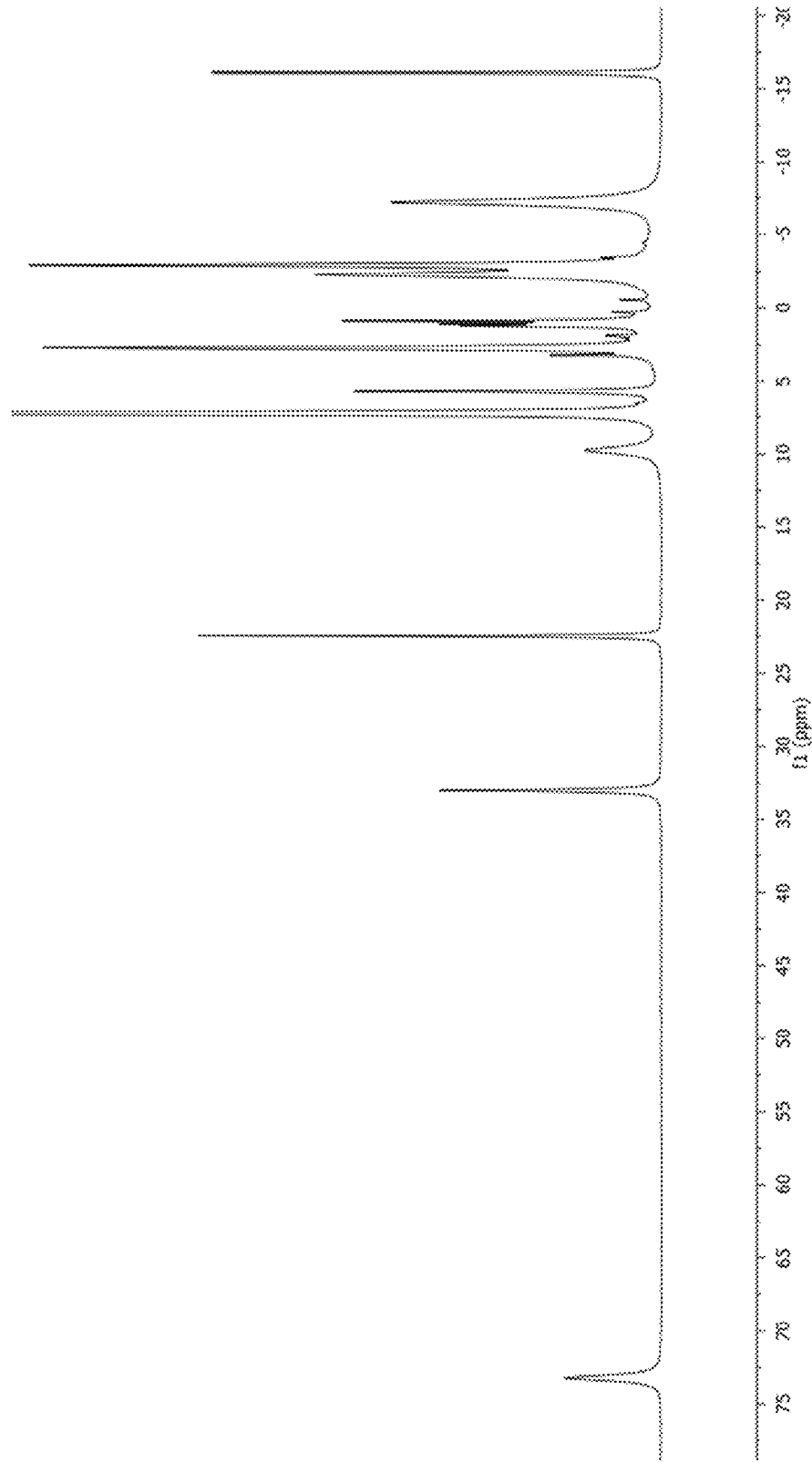
FIG. 55. $^1H$ NMR Spectrum of (TPB)FeMe (1).
Figure 56:
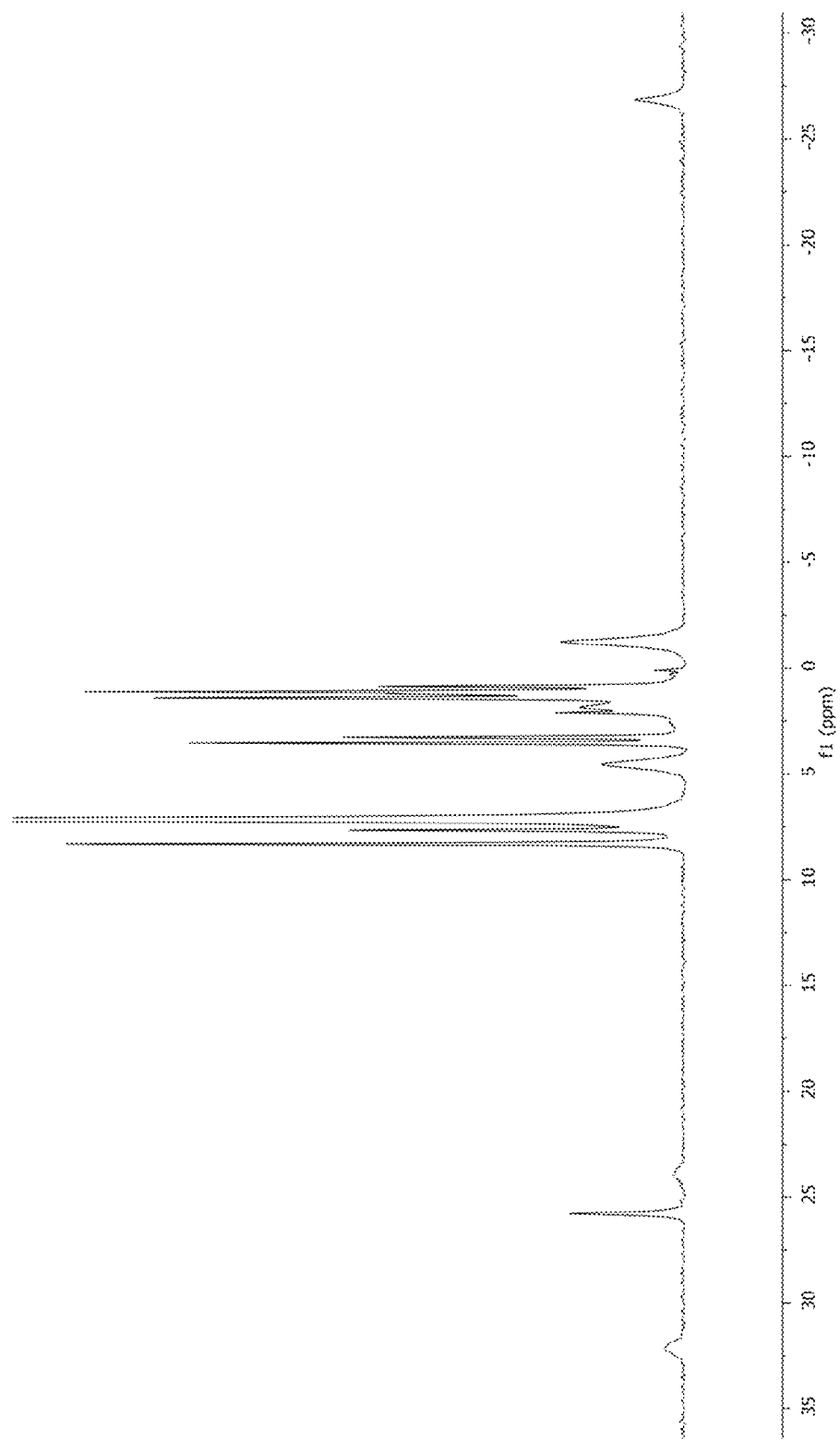
FIG. 56. $^1H$ NMR Spectrum of $[(TPB)Fe][BAr^F_4]$ (2).
Figure 57:
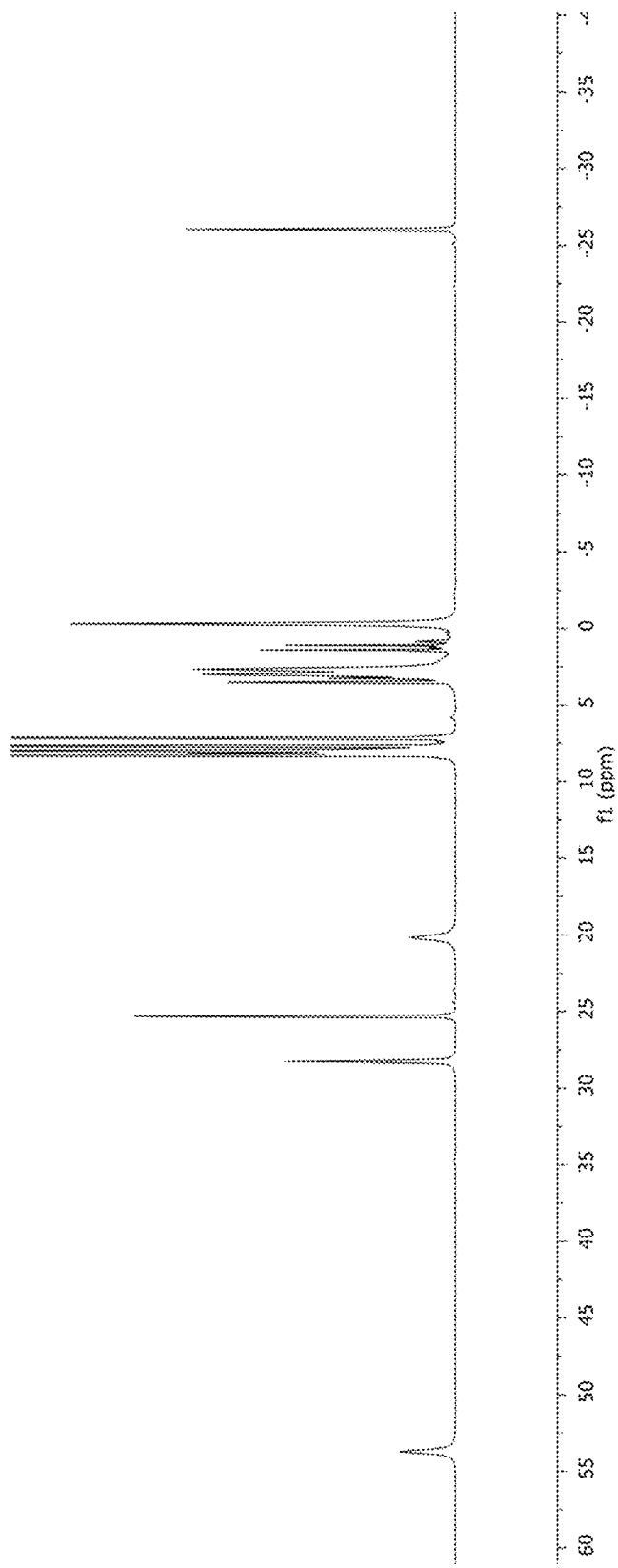
FIG. 57. $^1H$ NMR Spectrum of $[(TPB)Fe(N_2H_4)][BAr^F_4]$ (3).
Figure 58:
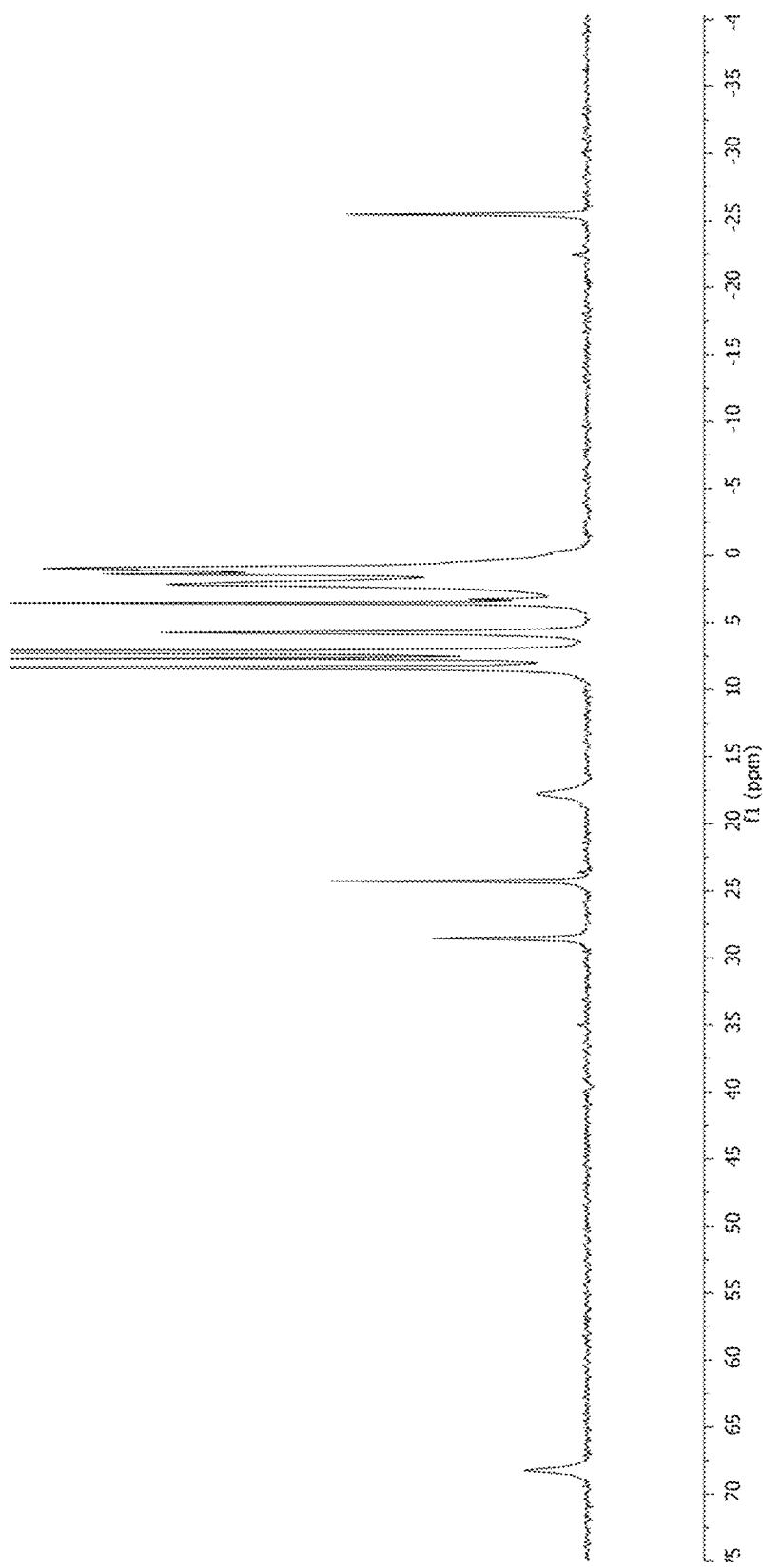
FIG. 58. $^1H$ NMR Spectrum of $[(TPB)Fe(NH_3)][BAr^F_4]$ (4).
Figure 59:
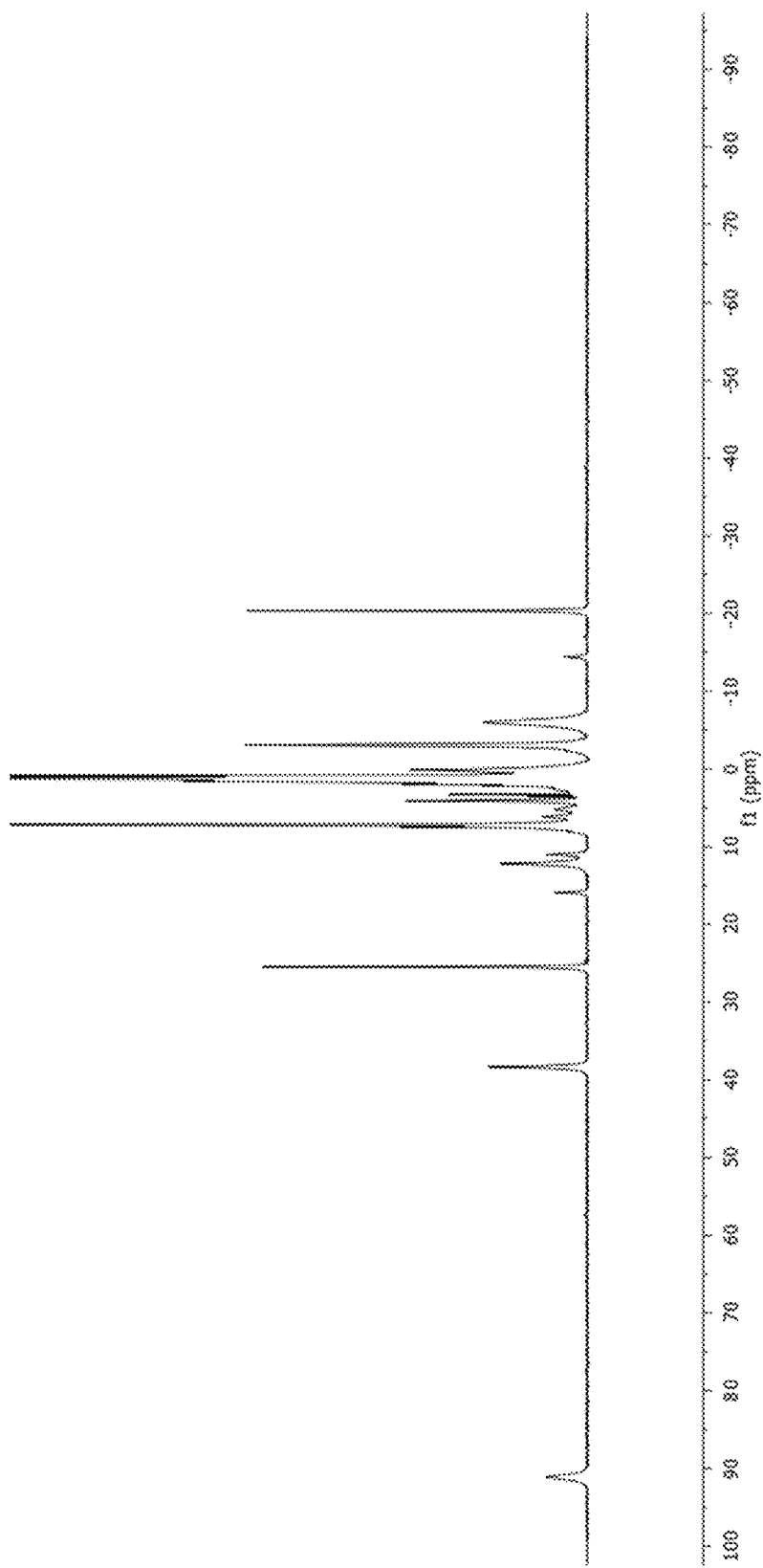
FIG. 59. $^1H$ NMR Spectrum of $(TPB)FeNH_2$ (5).
Figure 60:
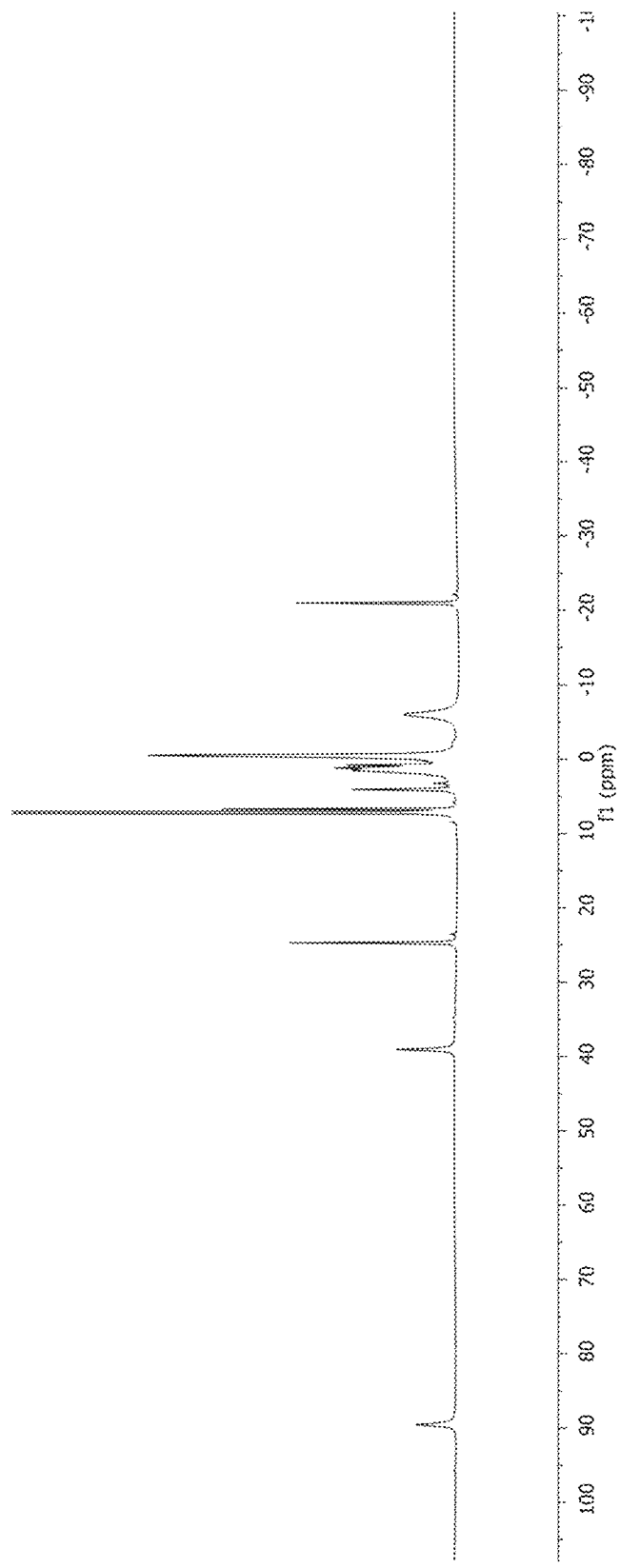
FIG. 60. $^1H$ NMR Spectrum of (TPB)FeOH (6).
Figure 61:
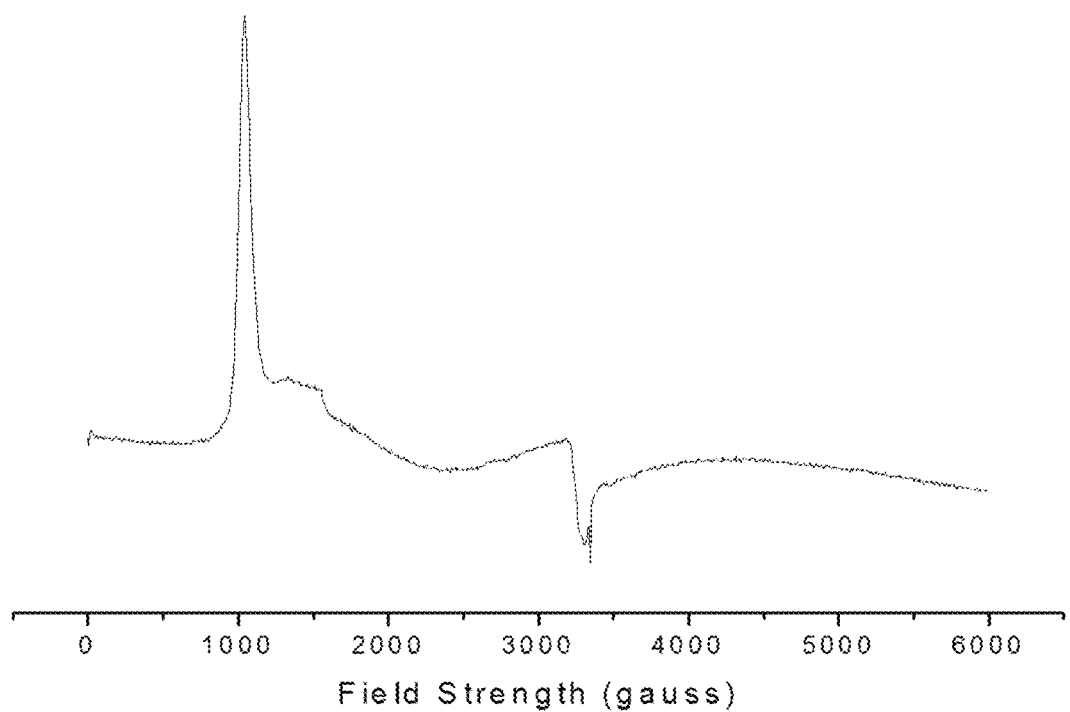
FIG. 61. 10 K EPR Spectrum of (TPB)FeMe (1).
Figure 62:
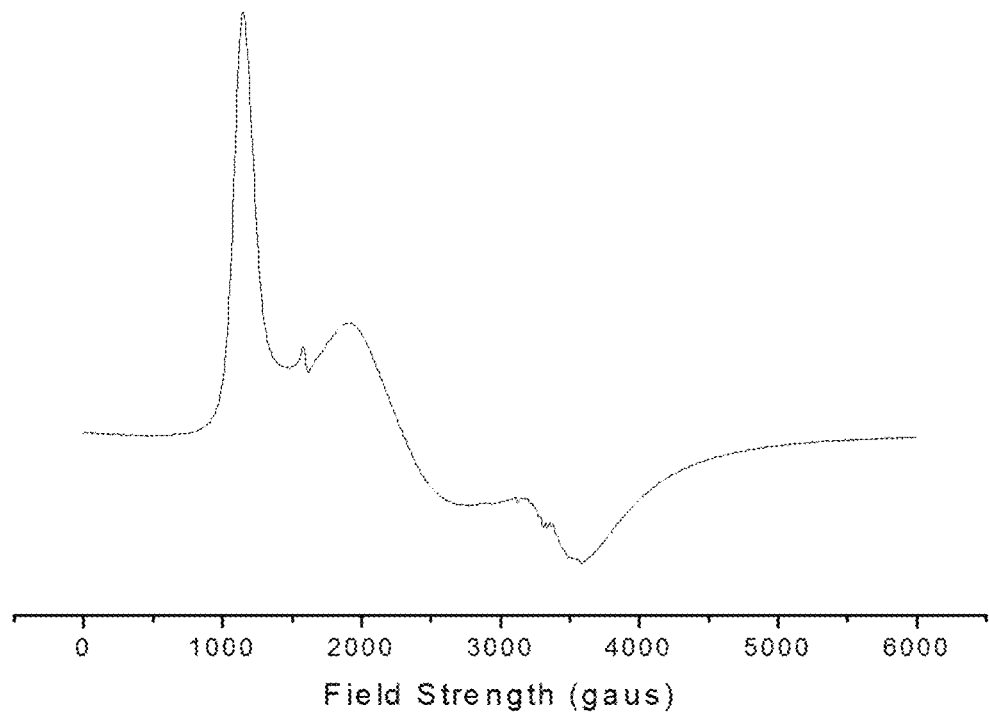
FIG. 62. 10 K EPR Spectrum of $[(TPB)Fe][BAr^F_4]$ (2).
Figure 63:
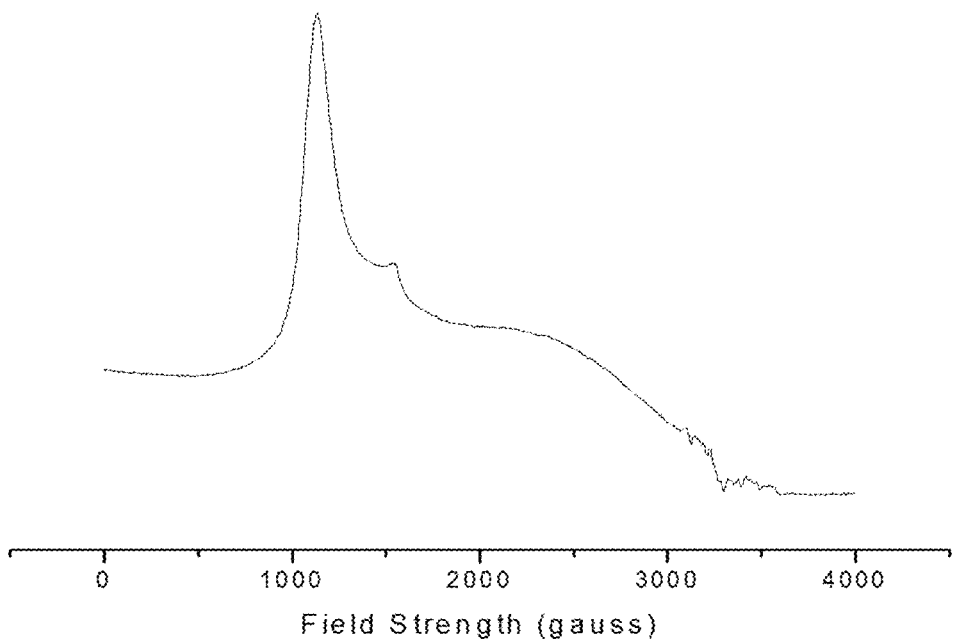
FIG. 63. 10 K EPR Spectrum of $[(TPB)Fe(N_2H_4)][BAr^F_4]$ (3).
Figure 64:
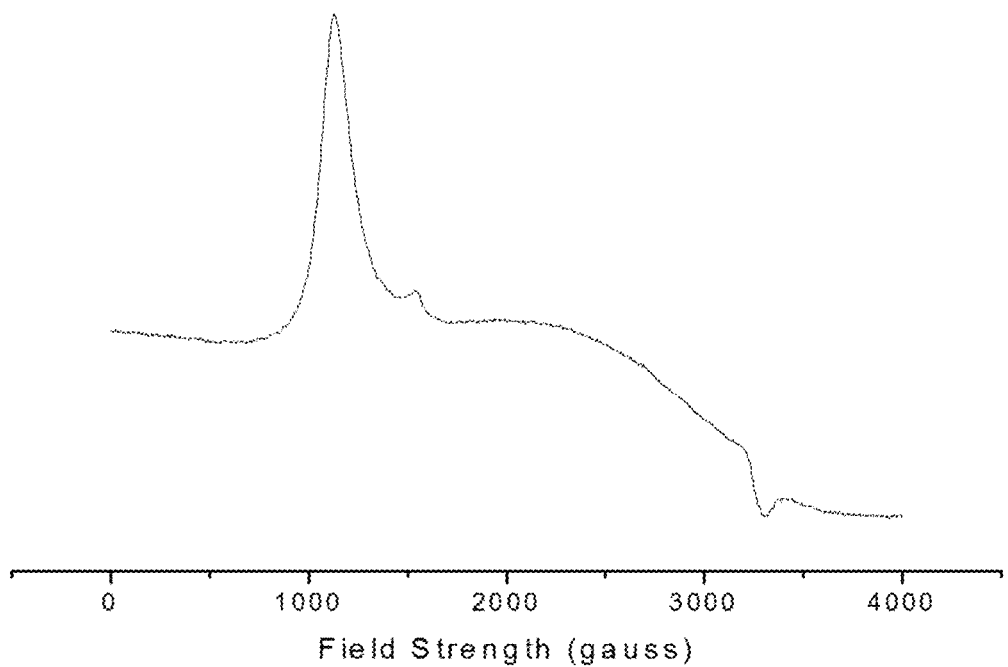
FIG. 64. 10 K EPR Spectrum of $[(TPB)Fe(NH_3)][BAr^F_4]$ (4).
Figure 65:
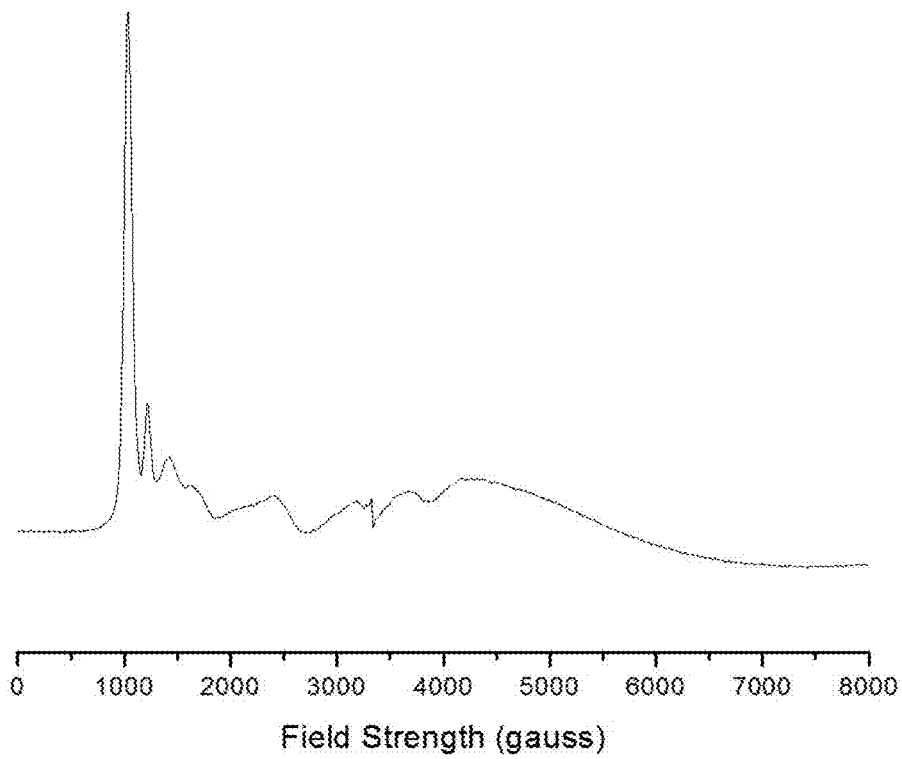
FIG. 65. 10 K EPR Spectrum of $(TPB)FeNH_2$ (5).
Figure 66:
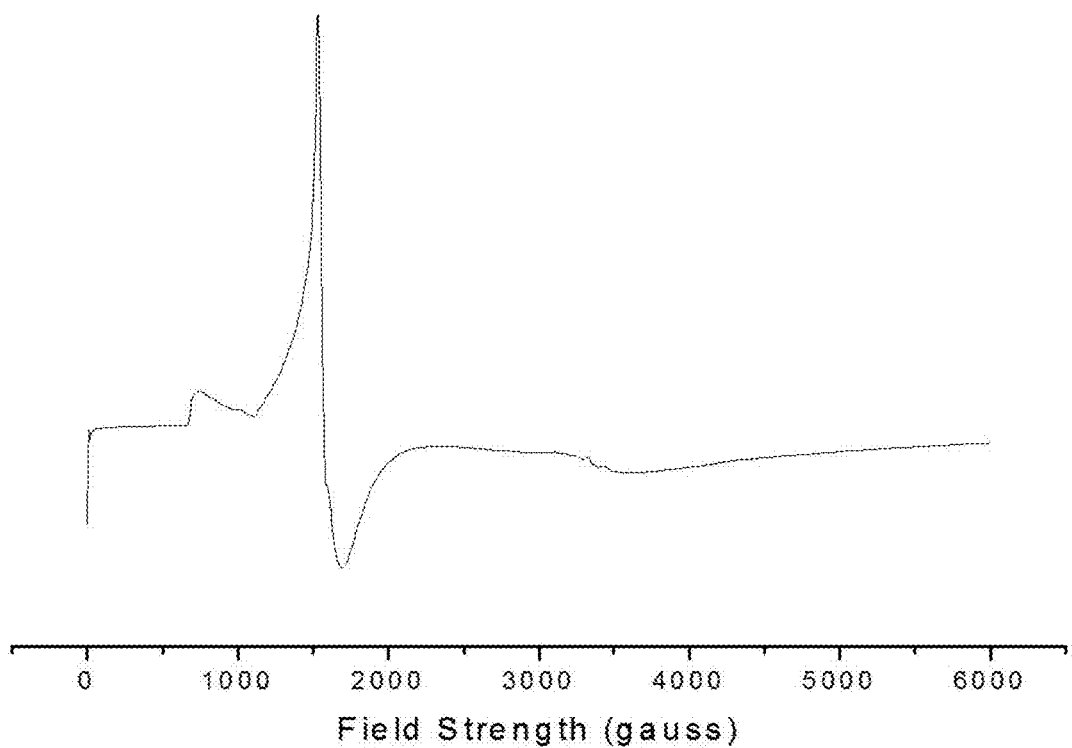
FIG. 66. 10 K EPR Spectrum of (TPB)FeOH (6).
Figure 67:
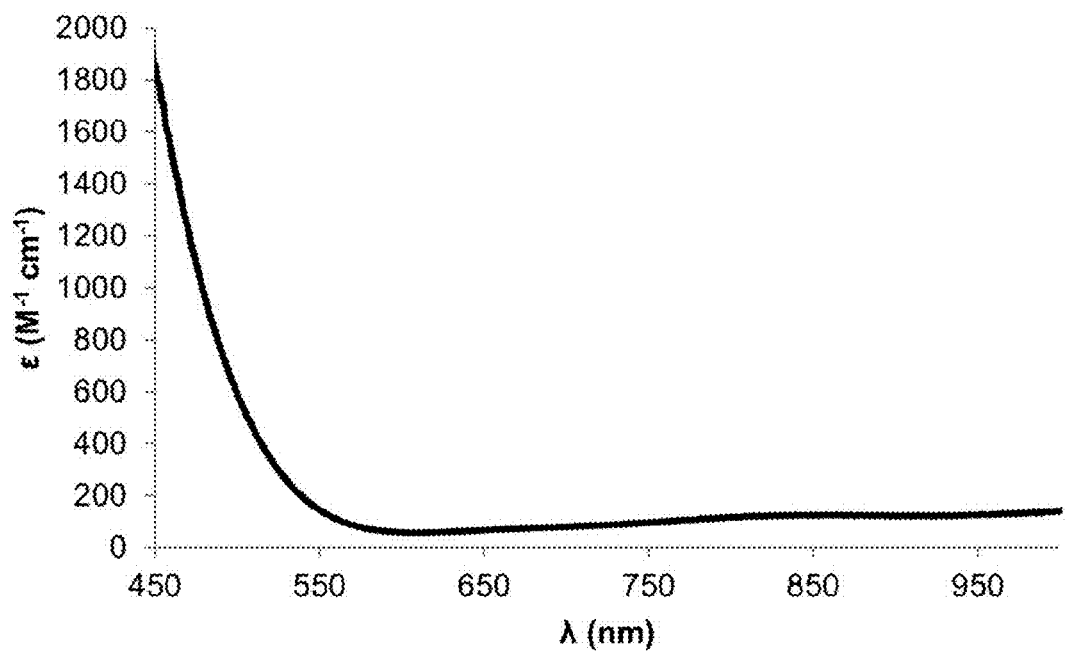
FIG. 67. UV-Vis Spectrum of (TPB)FeMe (1).
Figure 68:
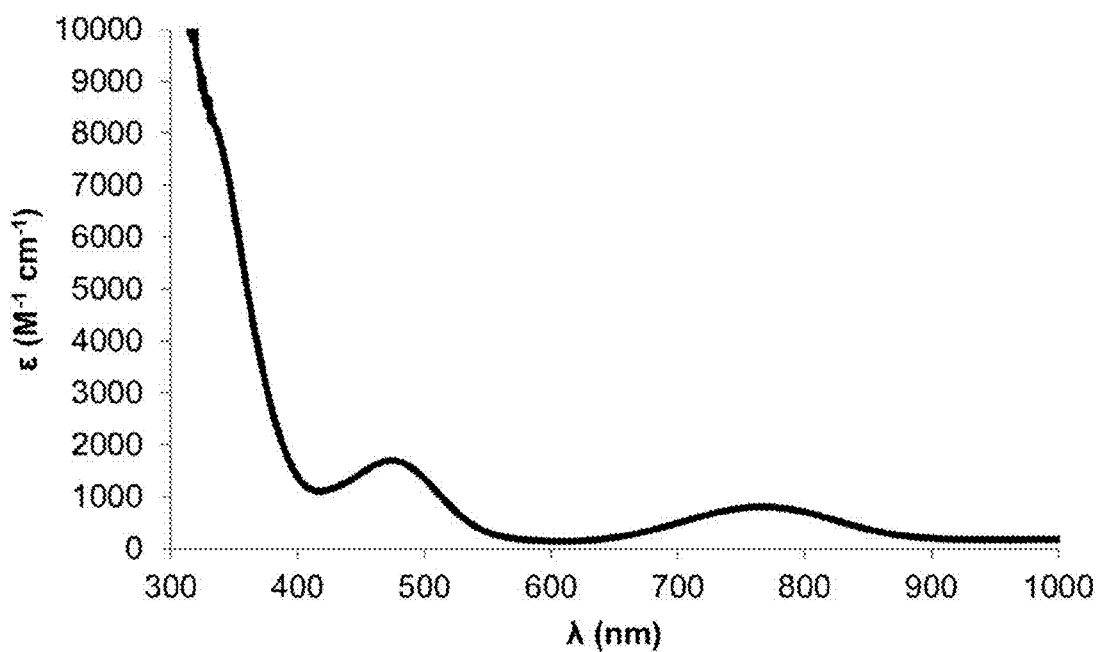
FIG. 68. UV-Vis Spectrum of $[(TPB)Fe][BAr^F_4]$ (2).
Figure 69:
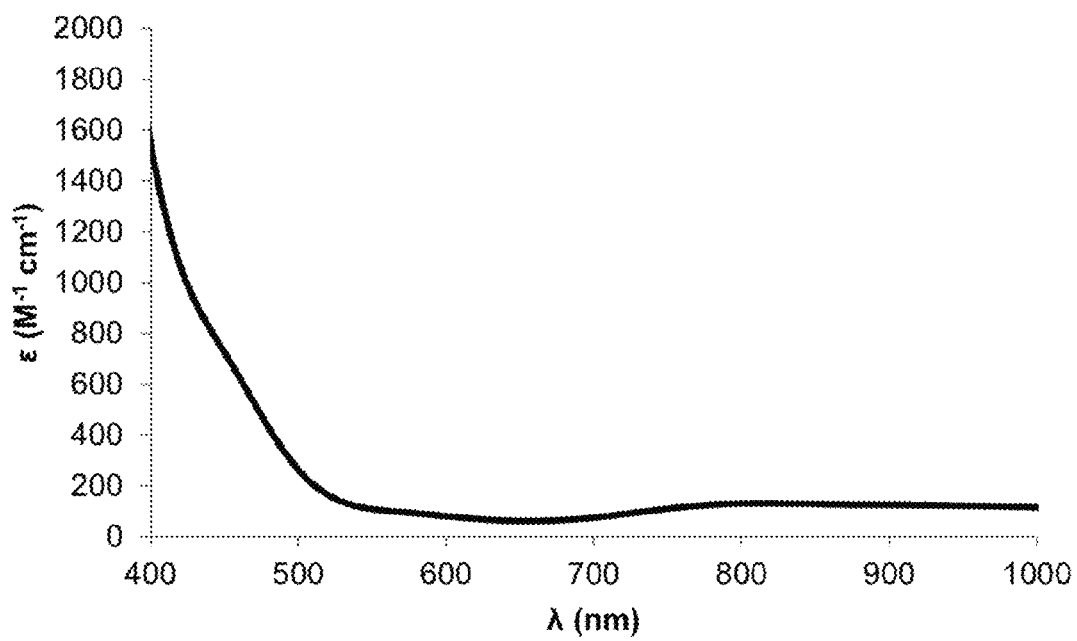
FIG. 69. UV-Vis Spectrum of $[(TPB)Fe(N_2H_4)][BAr^F_4]$ (3).
Figure 70:
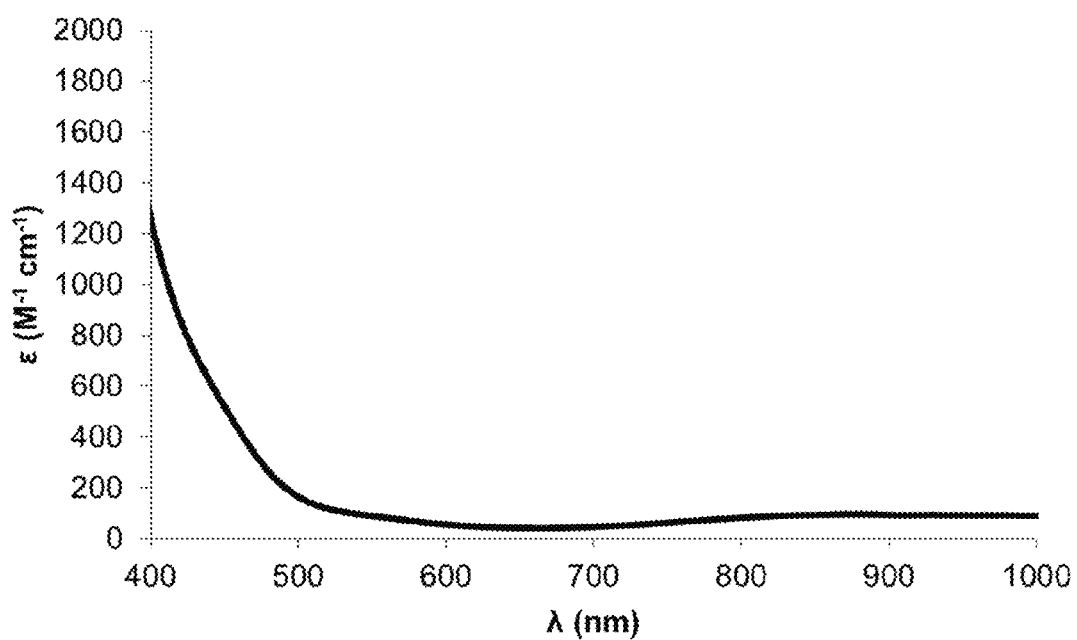
FIG. 70. UV-Vis Spectrum of $[(TPB)Fe(NH_3)][BAr^F_4]$ (4).
Figure 71:
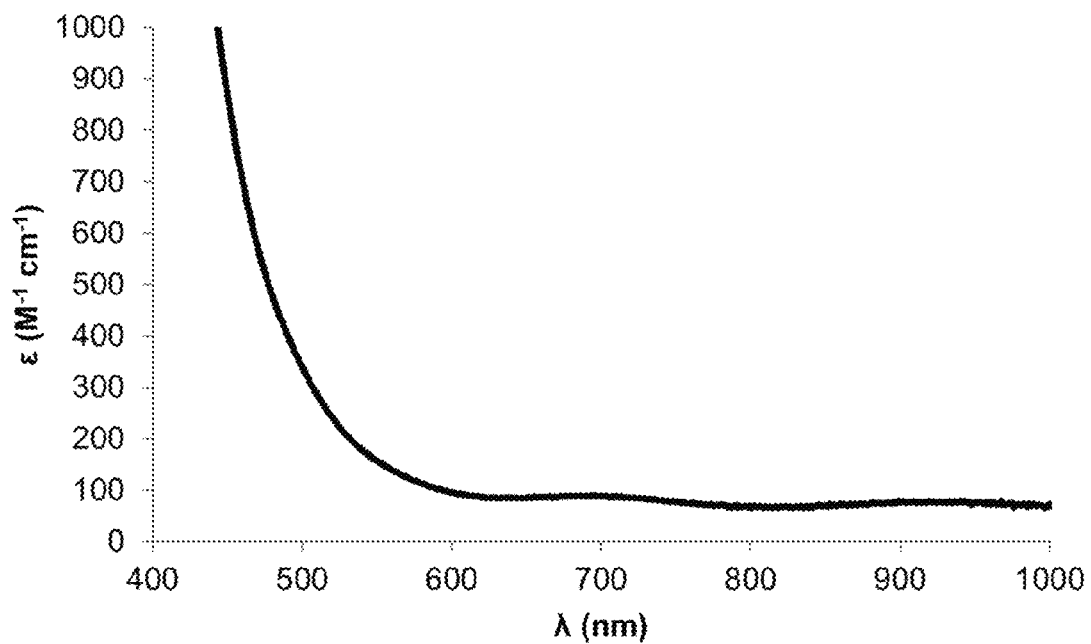
FIG. 71. UV-Vis Spectrum of $(TPB)FeNH_2$ (5).
Figure 72:
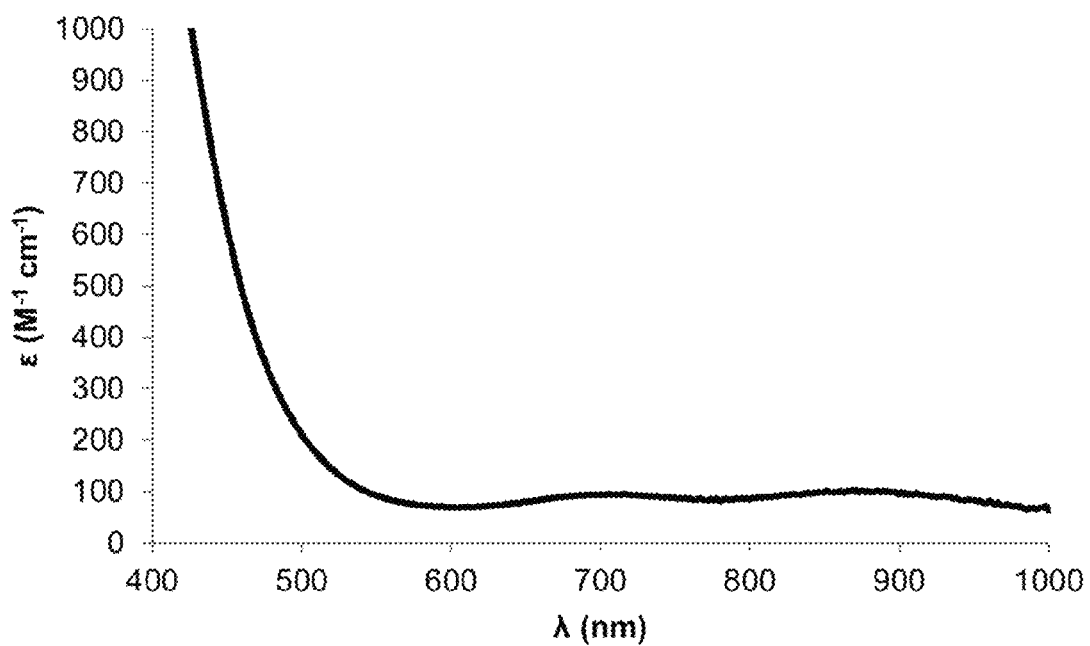
FIG. 72. UV-Vis Spectrum of (TPB)FeOH (6).
Figure 73:
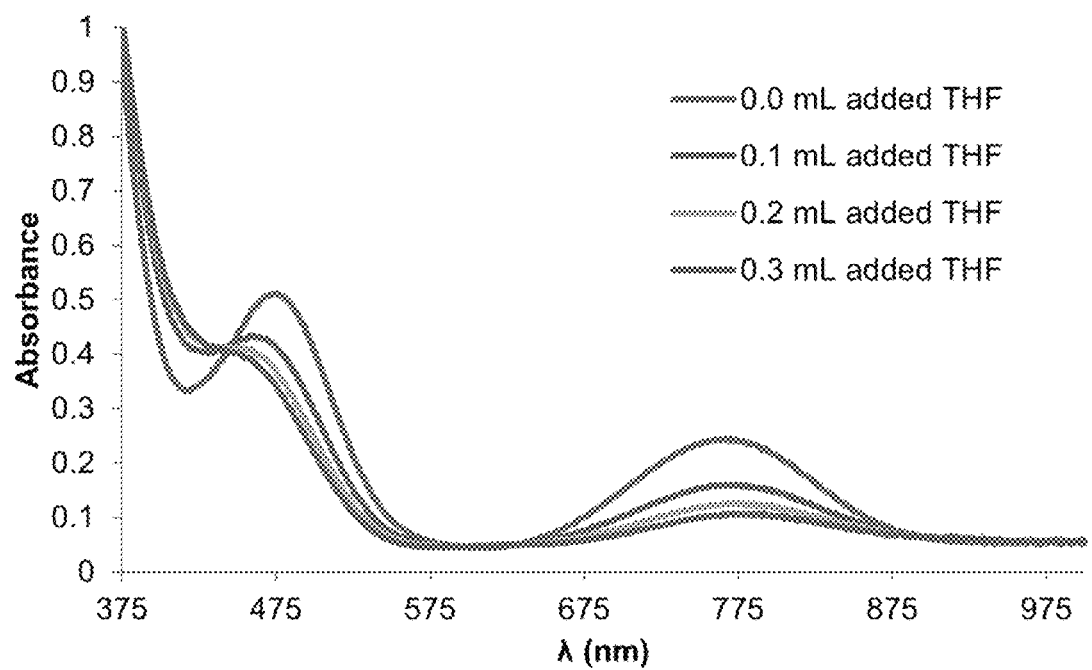
FIG. 73. Titration of THF into an ethereal solution of 2.
Figure 74:
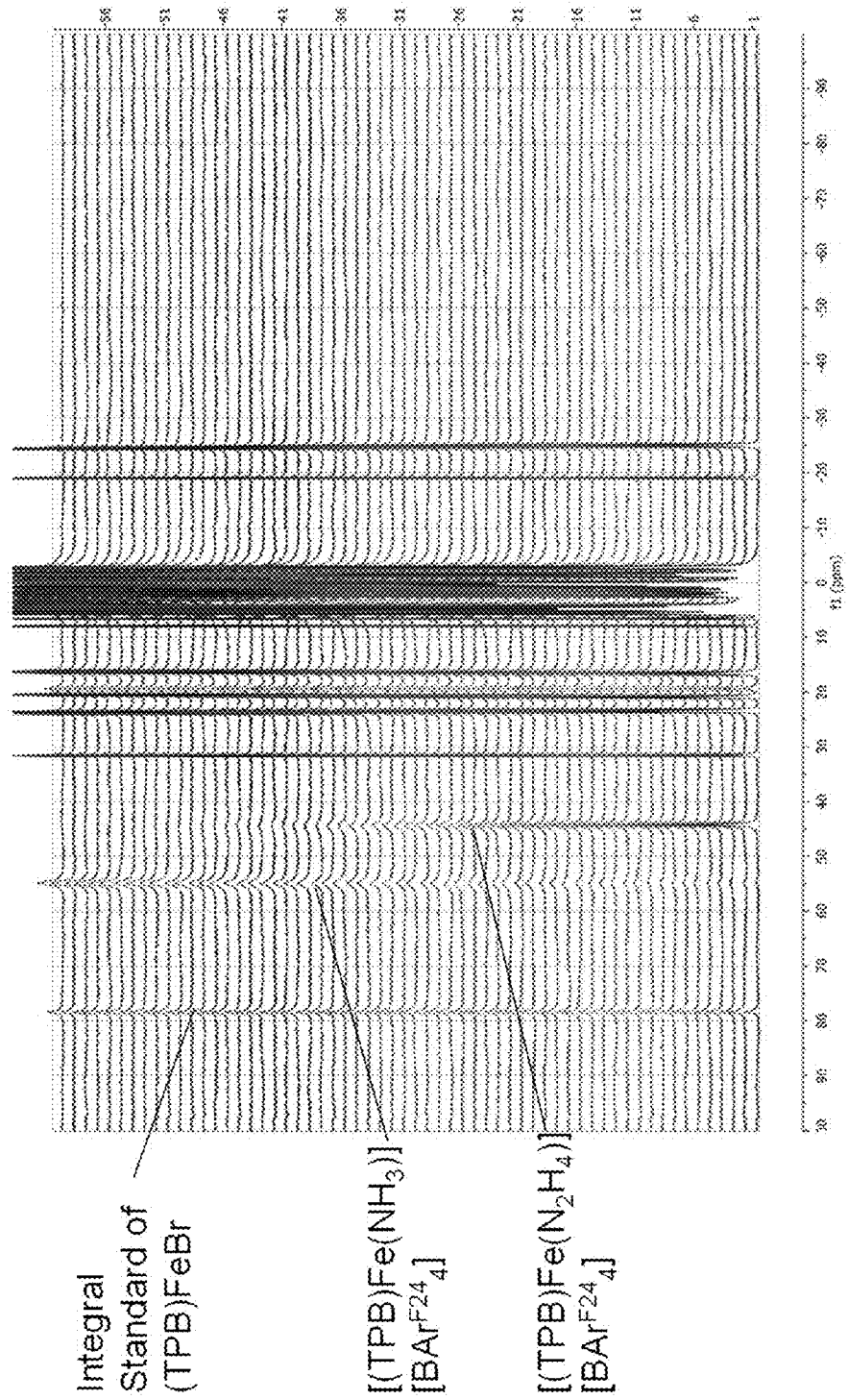
FIG. 74. NMR traces of the monitored decomposition of 3 to 4.
Figure 75:
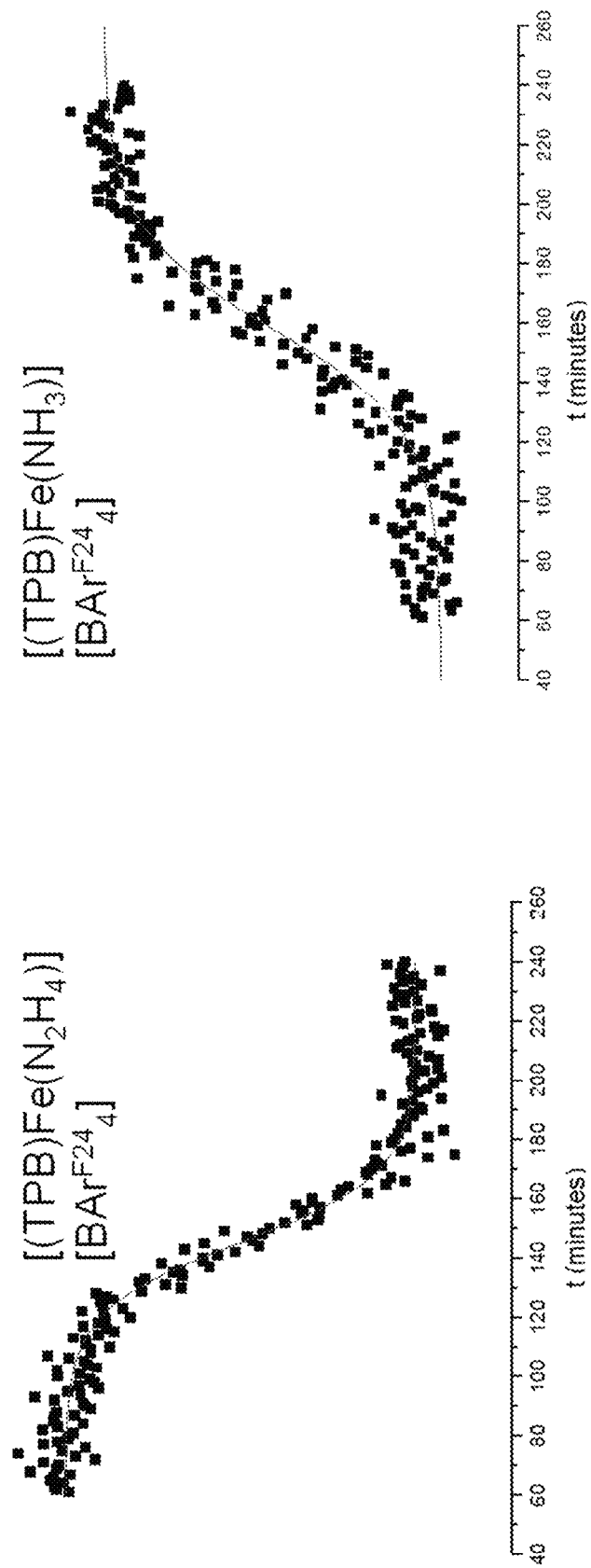
FIG. 75. Kinetic plots of the monitored decomposition of 3 to 4.
Figure 76:
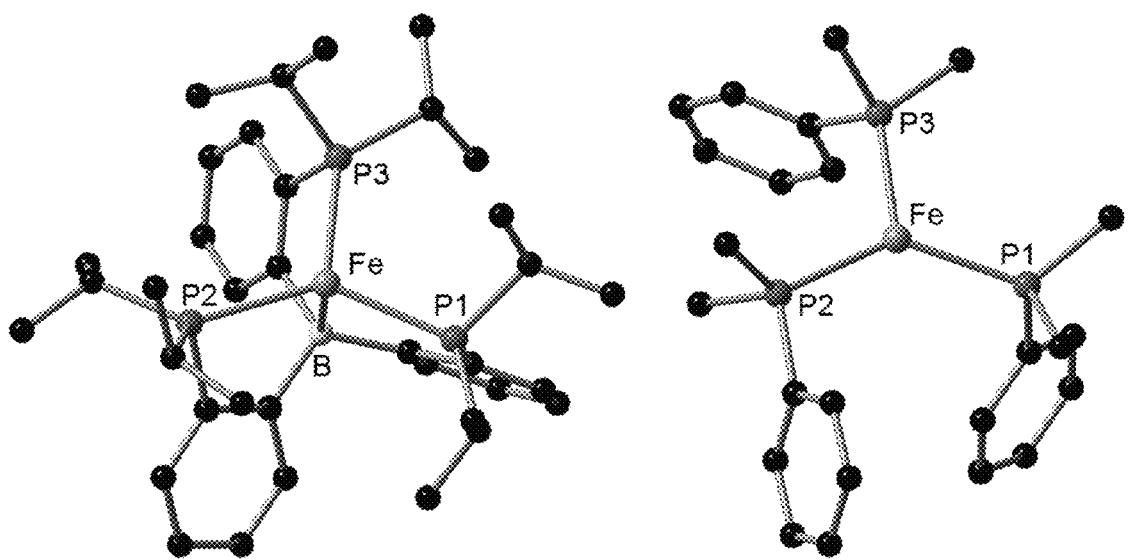
FIG. 76. Geometries of [(TPB)Fe]$^+$ and [(Me$_2$PhP)$_3$Fe]$^+$ optimized at the B3LYP/6-31 G(d) level.
Figure 77:
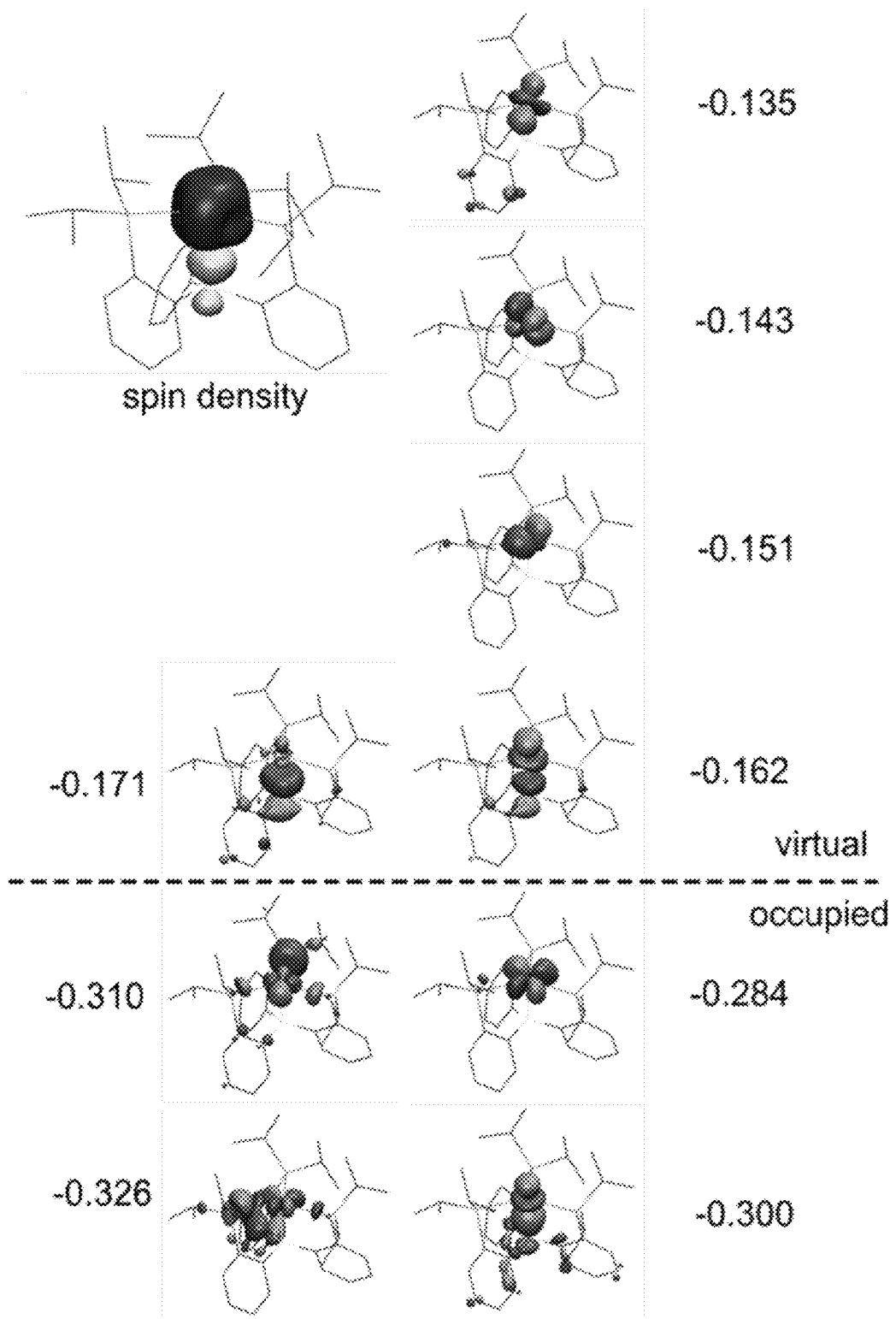
FIG. 77. MO and spin density diagram of [(TPB)Fe]$^+$ optimized at the B3LYP/6-31 G(d) level.
Figure 78:
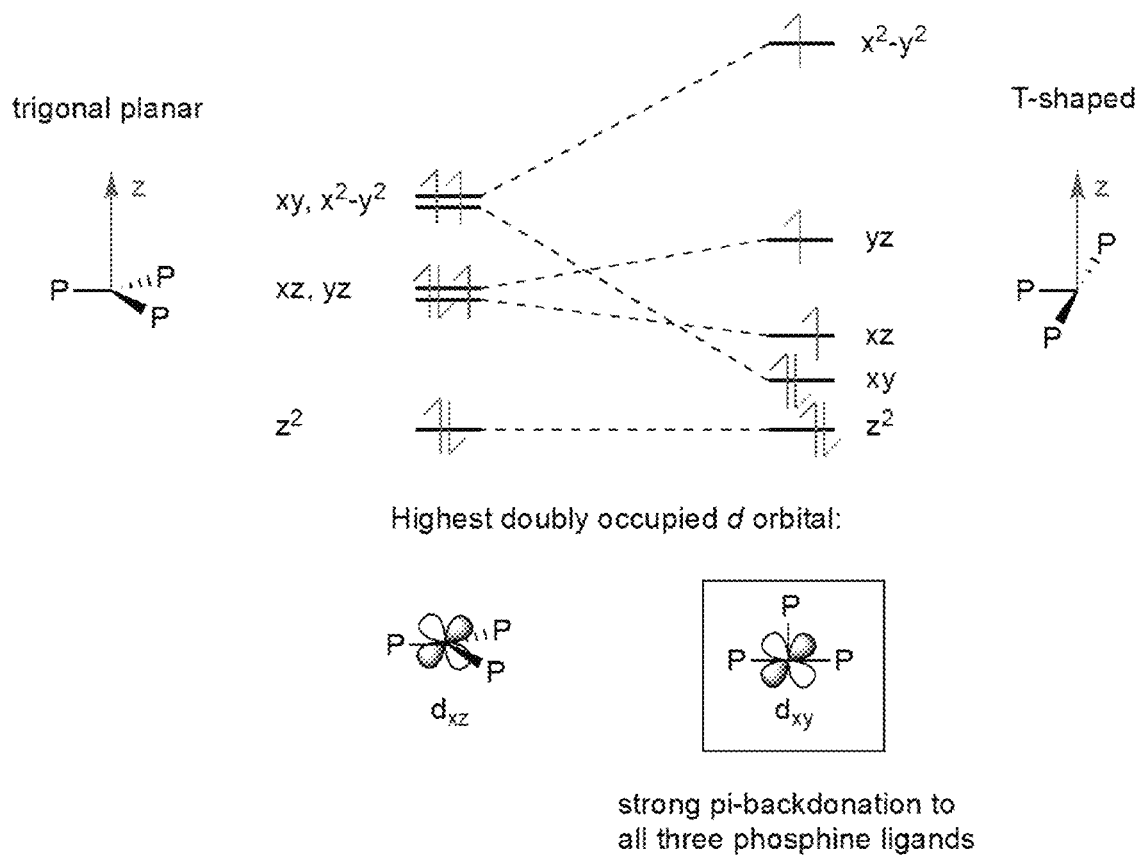
FIG. 78. MO diagram offering a tentative explanation for the T-shaped distortion of 2.
Figure 80:
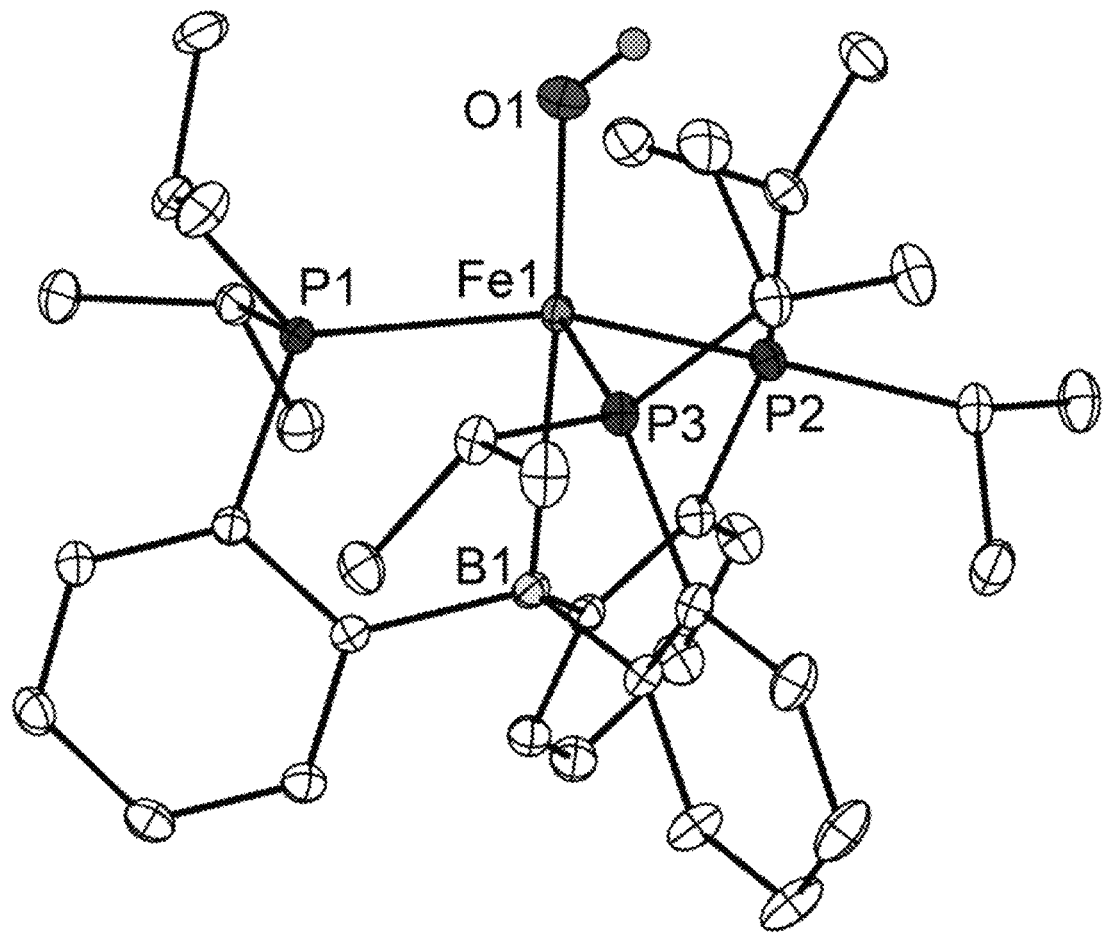
FIG. 80. Crystal Structure for (TPB)FeOH (6).

While the XRD data set of 5 is of high quality, we were concerned about the difficulty in distinguishing an Fe—NH$_2$ group from a potentially disordered Fe—OH moiety. We therefore independently characterized the hydroxo complex, (TPB)Fe—OH (6) (Scheme 2), which possesses a geometry similar to that observed in 5 with an Fe—B distance of 2.4438(9) Å and an Fe—O distance of 1.8916(7) Å. Despite the structural similarity between 5 and 6, different spectral signatures in both their $^1$H NMR and EPR (FIG. 54) spectra allow for facile distinction between them. Like 2, 3, and 4, both 5 and 6 are S=3/2.

Low-temperature EPR data (FIG. 54) have been obtained on complexes 1-6. All complexes show features shifted to large g-values consistent with quartet Fe species.[10] This assignment is verified by the solution magnetic moments obtained for these complexes. Variable temperature solid-state SQUID magnetic data for complexes 2-5 (SI) also establish quartet spin state assignments and display no evidence for spin-crossover phenomena. These data show a drop in magnetic moment in the range 50-70 K for all compounds studied. We propose that this effect is due to a large zero-field splitting in these species, which is consistent with Fe centers in related geometries.[11] Simulations with zero-field splitting of 10-20 cm$^{-1}$ provide reasonable fits to the data.

Parent amide complexes of first row transition metals are rare.[12] Noteworthy precedent for related terminal M-NH$_2$ species includes two square planar nickel complexes[12a,d] and one octahedral and diamagnetic iron complex, (dmpe)$_2$Fe(H)NH$_2$.[12e] In addition to their different coordination numbers, geometries, and spin-states, (dmpe)$_2$Fe(H)(NH$_2$) and 5 show a distinct difference at the Fe—NH$_2$ subunit. Six-coordinate (dmpe)$_2$Fe(H)(NH$_2$) is an 18-electron species without π-donation from the amide ligand, which is pyramidalized as a result. By contrast, five-coordinate 5 accommodates π-bonding from the amide. This is borne out in its much shorter Fe—N distance (1.918(3) Å for 5 vs 2.068 Å for (dmpe)$_2$Fe(H)(NH$_2$)), and also its comparative planarity (the sum of the angles around N is 355° for 5 vs 325° for (dmpe)$_2$Fe(H)(NH$_2$)).

The terminal amide 5 was then analyzed to determine its suitability as a precursor to the N$_2$ complex (TPB)Fe(N$_2$) via release of NH$_3$ and to examine the reduction/protonation vs protonation/reduction sequences as a means of effecting overall H-atom transfer to the Fe—NH$_2$ unit. Attempts to carry out the one-electron reduction of 5 were not informative. For example, electrochemical studies of 5 in THF fails to show any reversible reduction waves, but the addition of harsh reductants (e.g., tBuLi) to 5 shows small amounts of (TPB)Fe(N$_2$) in the product profile. A more tractable conversion sequence utilizes protonation followed by chemical reduction. Thus, the addition of HBAr$^F_4$.2Et$_2$O to 5 at low temperature (−35° C.) rapidly generates the cationic ammonia adduct 4. The conversion is quantitative as determined by $^1$H NMR spectroscopy, and 4 can be isolated in ca. 90% yield from the solution. Subsequent exposure of 4 to one equiv of KC$_8$ under an atmosphere of N$_2$ releases NH$_3$ and generates the (TPB)FeN$_2$ complex in similarly high yield.

In summary, an unusual series of S=3/2 iron complexes featuring terminally bonded N$_2$H$_4$, NH$_3$, NH$_2$, and OH functionalities has been thoroughly characterized. These complexes are supported by a tris(phosphine)borane ligand and are best described as Fe(I) species that feature weak Fe—B bonding, though other resonance contributions to the bonding scheme warrant additional consideration. The Fe—NH$_2$ species faithfully models the reductive replacement of the terminal NH$_2$ group by N$_2$ with concomitant release of NH$_3$, lending credence to such a pathway as mechanistically viable in Fe-mediated N$_2$ reduction schemes. Because spectroscopic detection of a common Fe—NH$_2$ or Fe—NH$_3$ intermediate under reductive turnover of the FeMo-cofactor has been recently proposed,[3] EPR active model complexes of the types described here should prove useful for comparative purposes.

REFERENCES 1. (a) Einsle, O.; Tezcan, F. A.; Andrade, S. L. A.; Schmid, B.; Yoshida, M.; Howard, J. B.; Rees, D. C. *Science* 2002, 297, 1696-1700; (b) Spatzal, T.; Aksoyoglu, M.; Zhang, L. M.; Andrade, S. L. A.; Schleicher, E.; Weber, S.; Rees, D. C.; Einsle, O. *Science* 2011, 334, 940-940.

2. (a) Crossland, J. L.; Tyler, D. R. *Coord. Chem. Rev.* 2010, 254, 1883-1894; (b) Field, L. D.; Li, H. L.; Dalgarno, S. J.; Turner, P. *Chem. Commun.* 2008, 1680-1682; (c) Hazari, N. *Chem. Soc. Rev.* 2010, 39, 4044-4056; (d) Vela, J.; Stoian, S.; Flaschenriem, C. J.; Münck, E.; Holland, P. L. *J. Am. Chem. Soc.* 2004, 126, 4522-4523.

3. (a) Lukoyanov, D.; Dikanov, S. A.; Yang, Z.-Y.; Barney, B. M.; Samoilova, R. I.; Narasimhulu, K. V.; Dean, D. R.; Seefeldt, L. C.; Hoffman, B. M. *J. Am. Chem. Soc.* 2011, 133, 11655-11664; (b) Seefeldt, L. C.; Hoffman, B. M.; Dean, D. R. *Annu. Rev. Biochem.* 2009, 78, 701-722.

4. Lee, Y.; Mankad, N. P.; Peters, J. C. *Nat. Chem.* 2010, 2, 558-565

5. (a) Betley, T. A.; Peters, J. C. *J. Am. Chem. Soc.* 2004, 126, 6252-6254; (b) Scepaniak, J. J.; Fulton, M. D.; Bontchev, R. P.; Duesler, E. N.; Kirk, M. L.; Smith, J. M. *J. Am. Chem. Soc.* 2008, 130, 10515-10517; (c) Scepaniak, J. J.; Vogel, C. S.; Khusniyarov, M. M.; Heinemann, F. W.; Meyer, K.; Smith, J. M. *Science* 2011, 331, 1049-1052; (d) Scepaniak, J. J.; Young, J. A.; Bontchev, R. P.; Smith, J. M. *Angew. Chem., Int. Ed.* 2009, 48, 3158-3160.

6. Moret, M.-E.; Peters, J. C. *Angew. Chem., Int. Ed.* 2011, 50, 2063-2067.

7. Sircoglou, M.; Bontemps, S.; Bouhadir, G.; Saffon, N.; Miqueu, K.; Gu, W.; Mercy, M.; Chen, C.-H.; Foxman, B. M.; Maron, L.; Ozerov, O. V.; Bourissou, D. *J. Am. Chem. Soc.* 2008, 130, 16729-16738.

8. A stable T-shaped, three-coordinate Fe(I) is known: Ingleson, M. J.; Fullmer, B. C.; Buschhorn, D. T.; Fan, H.; Pink, M.; Huffman, J. C.; Caulton, K. G. *Inorg. Chem.* 2008, 47, 407-409.

9. (a) Amgoune, A.; Bourissou, D. *Chem. Comm.* 2011, 47, 859-871. (b) Hill, A. F.; Owen, G. R.; White, A. J. P.; Williams, D. J. *Angew. Chem., Int. Ed.* 1999, 38, 2759-2761. (c) Pang, K.; Quan, S. M.; Parkin, G. *Chem. Comm.* 2006, 5015-5017.

10. Stoian, S. A.; Yu, Y.; Smith, J. M.; Holland, P. L.; Bominaar, E. L.; Munck, E. *Inorg. Chem.* 2005, 44, 4915-4922.

11. Harman, W. H.; Harris, T. D.; Freedman, D. E.; Fong, H.; Chang, A.; Rinehart, J. D.; Ozarowski, A.; Sougrati, M. T.; Grandjean, F.; Long, G. J.; Long, J. R.; Chang, C. J. *J. Am. Chem. Soc.* 2010, 132, 18115-18126.

12. (a) Adhikari, D.; Mossin, S.; Basuli, F.; Dible, B. R.; Chipara, M.; Fan, H.; Huffman, J. C.; Meyer, K.; Mindiola, D. J. *Inorg. Chem.* 2008, 47, 10479-10490; (b) Brady, E.; Telford, J. R.; Mitchell, G.; Lukens, W. *Acta Cryst. C* 1995, 51, 558-560. (c) Redshaw, C.; Wilkinson, G.; Hussain-Bates, B.; Hursthouse, M. B. *J. Chem. Soc. Dalton,* 1992, 1803-1811; (d) Campora, J.; Palma, P.; del Rio, D.; Conejo, M. M.; Alvarez, E. *Organometallics* 2004, 23, 5653-5655; (e) Fox, D. J.; Bergman, R. G. *J. Am. Chem. Soc.* 2003, 125, 8984-8985; (f) Sofield, C. D.; Walter, M. D.; Andersen, R. A. *Acta Cryst. C* 2004, 60, 465-466.

General Considerations

Unless otherwise noted, all compounds were prepared by literature procedures or purchased from commercial sources. All manipulations were carried out under a dinitrogen atmosphere by utilizing standard glovebox or schlenk techniques. Solvents were dried and de-oxygenated by an argon sparge followed by passage through an activated alumina column purchased from S.G. Waters Company. All non-halogenated solvents were tested with a standard sodium-benzophenone ketyl solution to ensure the absence of oxygen and water.

NMR

NMR measurements were obtained on Varian 300, 400, or 500 MHz spectrometers. Deuterated solvents for these measurements were obtained from Cambridge Isotope Laboratories and were dried and degassed prior to use. All $^1$H spectra were referenced to residual solvent peaks and all $^{31}$P spectra were referenced to an external $H_3PO_4$ standard.

EPR

EPR X-band spectra were obtained on a Bruker EMX spectrometer with the aid of Bruker Win-EPR software suite version 3.0. The spectrometer was equipped with a rectangular cavity which operated in the $TE_{102}$ mode. Temperature control was achieved with the use of an Oxford continuous-flow helium cryostat (temperature range 3.6-300 K). All spectra were recorded at 9.37 GHz with a microwave power of 20 mW, a modulation amplitude of 4 G, and a modulation frequency of 100 kHz.

X-Ray Crystallography

Data was obtained at low temperatures on a Siemens or Bruker Platform three-circle diffractometer coupled to a Bruker-AXS Smart Apex CCD detector with graphite-monochromated Mo Kα radiation ($\lambda$=0.71073), performing φ-and ω-scans. Data for complex 4 was collected on with synchrotron radiation at the Stanford Synchrotron Radiation Laboratory (SSRL) beam line 12-2 at 17 keV using a single phi axis and recorded on a Dectris Pilatus 6M. The images were processed using XDS[1] and further workup of the data was analogous to the other datasets. All structures were solved by standard direct or Patterson methods and refined against $F^2$ using the SHELX program package.[2,3,4] All atoms, with the exception of hydrogens, have been anisotropically refined. The hydrogen atoms bonded to atoms of interest, namely N or O, have been located in the difference map and refined semi-freely. All other hydrogen atoms were included via a standard riding model.

In the structure of complex 1 a minor component of (TPB)FeCl was found in the difference map and modeled as disorder. Additional disorder of the $BAr^F_4$ counterion was found in complex 4. This disorder was modeled as a rotational disorder of the $CF_3$ groups on one of the phenyl rings, but some of the resulting F ellipsoids still display significantly prolate shapes. We feel that the shape of these ellipsoids accurately describes the actual electron density due to the rotational disorder.

Magnetic Measurements.

Data was obtained using a Quantum Designs SQUID magnetometer running MPMSR2 software (Magnetic Property Measurement System Revision 2) at a field strength of 50000 G. Complexes were massed and then suspended in eicosane wax. Samples were then inserted into the magnetometer in plastic straws sealed under nitrogen with gelatin capsules. Loaded samples were centered within the magnetometer using the DC centering scan at 35 K. Data were acquired at 20-30 K (one data point every 2 K), and 30-300 K (one data point every 10 K). The magnetic susceptibility was adjusted for diamagnetic contributions using the constitutive corrections of Pascal's constants as well as a diamagnetic correction for the eicosane and capsule. Data workup, including simulations, was performed in the JulX software package.[5] Complex 5 displayed a lower than expected magnetic moment. NMR analysis of the sample indicated the presence of ~15% 12-crown-4, present as a result of the protocol for generation of the complex, where it is used to aid for removal of $NaBAr^F_4$. Accounting for this impurity leads to a magnetic moment consistent with the other samples.

Computational Methods

Geometry optimizations were performed using the Gaussian03 package.[6] The B3LYP exchange-correlation functional was employed with a 6-31G(d) basis set. The GDIIS algorithm was used. A full frequency calculation was performed on each structure to establish true minima. A model for the initial geometry of complex 2 used the crystallographically determined coordinates as a starting point for subsequent minimization. Atoms were then stripped away from this structure to reveal a $Fe(PMe_2Ph)_3^+$ as the starting point to determine the theoretical structure of $Fe(PMe_2Ph)_3+$ by another minimization. Structural models and orbital/spin density pictures were generated from Gaussview 03.

Synthesis of (TPB)FeMe, 1

(TPB)FeBr (0.400 g, 0.55 mmol) was dissolved in 15 mL of ether and cooled to −35° C. To this stirred solution was added a 1.6 M solution of MeLi in ether (0.620 mL, 0.99 mmol). After addition the solution was allowed to warm to room temperature and was stirred for an additional hour over which time the solution changed in color from a dark brown to a deep orange red. After this time, volatiles were removed and the remaining solids were extracted with 3 mL of benzene three times. Lyophilization of benzene resulted in a dark orange powder which was washed with 5 mL of cold pentane to yield (TPB)FeMe (0.352 g, 97%). X-ray quality crystals were grown from slow evaporation of a concentrated pentane solution of 1. $^1$H NMR ($C_6D_6$, δ): 74.48 (br s), 33.25 (s), 22.52 (s), 9.31 (br s), 5.73 (s), 2.65 (s), −2.33 (br s), −2.80 (s), −7.49 (br s), −16.33 (s). UV-Vis (THF) $\lambda_{max}$, nm (ε, $M^{-1}$ $cm^{-1}$): 840 (120). Anal. Calc. for $C_{37}H_{57}BFeP_3$: C, 67.19; H, 8.69. Found: C, 67.26; H, 8.59. Solution magnetic moment ($C_6D_6$): 3.9 $\mu_B$.

Synthesis of [(TPB)Fe][BAr$^F_4$] 2

A dark orange solution of 1 (0.037 g, 0.06 mmol) in 5 mL of $Et_2O$ was cooled to −35° C. Once cooled, the solution was stirred while a similarly cooled solution of $HBAr^F_4.2Et_2O^7$ in 5 mL of $Et_2O$ was added dropwise over 5 min. After the addition, the solution was stirred at room temperature for an additional hour before being concentrated down to 1 mL. This solution was layered with 1 mL of pentane and cooled to −35° C. for 2 days upon which time dark orange crystals of [(TPB)Fe][BAr$^F_4$] had formed (0.082 g, 97%). $^1$H NMR ($C_6D_6$/THF-$d_8$, δ): 32.15 (br s), 25.78 (s), 23.99 (br s), 8.93 (br s), 8.27 (s, BAr$^F_4$), 4.55 (br s), 1.84 (br s), −1.24 (br s), −28.05 (s). UV-Vis ($Et_2O$) $\lambda_{max}$, nm (ε, $M^{-1}$ $cm^{-1}$): 475 (1700), 765 (800). Anal. Calc. for $C_{68}H_{66}B_2F_{24}FeP_3$: C, 54.10; H, 4.41. Found: C, 53.93; H, 4.53.

Synthesis of [(TPB)Fe(N$_2$H$_4$)][BAr$^F_4$], 3

2 (0.356 g, 0.24 mmol) was dissolved in 10 mL in $Et_2O$ and stirred. To this was added $N_2H_4$ (0.076 mL, 2.36 mmol) in one portion. Upon addition, the solution lightened slightly in color to a brown-orange. The solution was allowed to stir for 15 min before the solution was concentrated to 5 mL and layered with 5 mL of pentane. After 2 days at −35° C., dark orange crystals of [(TPB)Fe(N$_2$H$_4$)][BAr$^F_4$] had formed (0.324 g, 89%). $^1$H NMR ($C_6D_6$/THF-$d_8$, δ): 53.72 (br s), 28.26 (s), 25.32 (s), 20.18 (br s), 8.28 (s, BAr$^F_4$) 7.67 (s, BAr$^F_4$), 8.14 (br s), 7.96 (br s), 3.00 (br s), 2.67 (br s), 0.30 (br s), −26.06 (s). UV-Vis (THF) $\lambda_{max}$, nm (ε, $M^{-1}$ $cm^{-1}$): 800 (140). Anal. Calc. for $C_{68}H_{70}B_2F_{24}FeN_2P_3$: C, 52.98; H, 4.58; N, 1.82. Found: C, 53.03; H, 4.63; N, 1.70. Solution magnetic moment (THF-$d^8$): 3.46 $\mu_B$.

Synthesis of [(TPB)Fe(NH$_3$)][BAr$^F_4$], 4

A solution of 3 (0.308 g, 0.20 mmol) in 10 mL of 1:6 THF:Benzene was rapidly stirred at RT for 12 h. After this time, the volatiles were removed in vacuo and the residue was taken up in $Et_2O$, filtered, and layered with pentane before being cooled to −35°. After 2 days, dark orange-red crystals of [(TPB)Fe(NH$_3$)][BAr$^F_4$] had formed (0.264 g, 87%). $^1$H NMR ($C_6D_6$/THF-$d^8$, δ): 68.22 (br s), 28.55 (s), 24.28 (s), 17.81 (br s), 8.34 (s, BAr$^F_4$), 7.68 (s, BAr$^F_4$), 5.74 (br s), 3.53 (s), 2.15 (br s), 1.22 (br s), −25.48 (s). UV-Vis (THF) $\lambda_{max}$, nm (ε, $M^{-1}$ $cm^{-1}$): 871 (50). IR (KBr, cm-1): 3381 (v[NH]) Anal. Calc. for $C_{68}H_{69}B_2F_{24}FeNP_3$: C, 54.24; H, 4.55; N, 0.92. Found: C, 53.47; H, 4.72; N, 0.94. Solution magnetic moment (THF-$d_8$): 3.63 $\mu_B$.

Synthesis of (TPB)FeNH$_2$, 5

A solution of 2 (0.300 g, 0.20 mmol) in 5 mL of $Et_2O$ was stirred over powdered NaNH$_2$ (0.077 g, 1.99 mmol) for 1.5 h at room temperature. Over this time, the solution darkened from orange to a dark brown. Volatiles were removed and the remaining residue was extracted with 40 mL of pentane to yield a pale orange solution. To this solution was added 12-crown-4 (0.070 g, 0.40 mmol) to aid in the removal of NaBAr$^F_4$, and solids began to precipitate. The solution was allowed to stand for 1 h before filtration. Removal of solvent for 3 h at 70° C. resulted in (TPB)FeNH$_2$ as a dark orange powder (0.060 g, 0.09 mmol, 46%). Crystals suitable for X-ray diffraction were grown from slow evaporation of a concentrated ethereal solution. Due to the presence of a small amount of 12-crown-4 that had similar solubility properties to the product, satisfactory combustion analysis was not obtained for 5. $^1$H NMR ($C_6D_6$, δ): 91.12 (br s), 38.21 (s), 25.42 (s), 4.12 (br s), 1.55 (br s), 0.21 (br s), −3.04 (br s), −5.93 (br s), −20.19(s). UV-Vis (THF) $\lambda_{max}$, nm (ε, $M^{-1}$ $cm^{-1}$): 700 (90), 930 (80). Solution magnetic moment ($C_6D_6$): 4.05 $\mu_B$. We also wish to note that trace amounts (<3%) of the neutral complex (TPB)Fe(N$_2$) are typically detected by NMR spectroscopy in preparations of 5. (TPB)Fe(N$_2$) and 5 also have similar solubility properties.

Synthesis of (TPB)FeOH, 6

2 (0.80 g, 0.05 mmol) was dissolved in 5 mL of $Et_2O$ and stirred over NaOH (0.063 g, 1.6 mmol) at room temperature for 2 h during which the color of the solution darkened to a deep brown. Volatiles were removed from the solution and the resulting solids were extracted with pentane to yield Synthesis of (TPB)FeOH (0.027, 77%) as a brown powder. Crystals suitable for X-Ray diffraction were grown by a slow evaporation of a concentrated $Et_2O$ solution. $^1$H NMR ($C_6D_6$, δ): 89.55 (br s), 39.07 (s), 24.70 (s), 6.71 (s), 4.08 (s), 1.55 (s), −0.52 (br s), −6.00 (br s), −21.02 (s). UV-Vis (THF) $\lambda_{max}$, nm (ε, $M^{-1}$ $cm^{-1}$): 870 (230), 700 (218). Anal. Calc. for $C_{36}H_{55}BFeOP_3$: C, 65.18; H, 8.36; N, 0. Found: C, 65.15; H, 8.28; N, none found. Solution magnetic moment ($C_6D_6$): 4.12 $\mu_B$.

Protonation of 5

A 20 mL scintillation vial was charged with 5 (0.005 g, 0.007 mmol) and HBAr$^F_4$.2Et$_2$O (0.008 g, 0.007 mmol) and cooled to −35° C. 2 mL of similarly cooled $Et_2O$ was added to the mixture and the color of the solution lightened rapidly. The solution was allowed to warm to room temperature over 30 minutes before volatiles were removed to yield 4 (0.010 g, 0.006 mmol, 91%). The identity of the product was determined via $^1$H NMR which was identical to that observed for 4.

Reduction of 4

A 20 mL scintillation vial was charged with 4 (0.025 g, 0.016 mmol) and KC$_8$ (0.0024 g, 0.018 mmol). 2 mL of $Et_2O$ were added and the resulting dark suspension was allowed to stir for 2 h at RT. After this time, the solution was filtered and volatiles were removed to yield (TPB)Fe(N$_2$) as a brown solid. The identity of the product was determined via $^1$H NMR which was identical to the reported values for (TPB)Fe(N$_2$).

Monitored Conversion of 3 to 4

3 (0.020 g, 0.013 mmol) was dissolved in a 6:1 mixture of $C_6D_6$:THF-$d_8$. The resulting solution was transferred to an NMR tube equipped with a capillary containing a solution of (TPB)FeBr in a 6:1 mixture of $C_6D_6$:THF-$d_8$ as an internal standard. This NMR tube was sealed with a J-Young valve and was placed into a 500 MHz spectrometer which had been preheated to 60° C. The reaction was monitored via single scans every minute for 4 hours during which time complete and clean conversion from 3 to 4 was observed. After the reaction was complete, an aliquot of the headspace was analyzed by GC for the presence of $H_2$. After this, volatiles were vacuum transferred onto a solution of HCl in THF. After this, volatiles were removed and the resulting solids were diluted with water to appropriate volumes to test for the presence of $NH_3$ via the indophenol test,[8] or $N_2H_4$ with p-dimethylaminobenzaldehyde.[9] The relative amounts of products are compiled in Table 25 of this document.

Optimized coordinates [Å] for [(TPB)Fe]$^+$:

| | | | |
|---|---|---|---|
| Fe | 0.00415000 | −0.16241600 | −0.77675900 |
| P | −2.16349100 | −1.24719000 | −0.66738800 |
| P | 2.39121900 | −0.83777200 | −0.74771500 |
| P | −0.31345400 | 2.27645200 | −0.74537300 |
| C | 2.09021700 | −1.73435800 | 0.82972400 |
| C | 4.02952400 | 1.02631900 | 0.64266200 |
| H | 3.98567100 | 0.45071500 | 1.57275400 |
| H | 3.19104000 | 1.72365500 | 0.64140500 |
| H | 4.95767100 | 1.60939200 | 0.65520800 |
| C | −2.51735800 | −0.85749000 | 1.09566800 |
| C | −2.75787900 | 2.84164700 | 0.59302900 |
| H | −2.24972100 | 3.20855200 | 1.49066600 |
| H | −2.90111300 | 1.76680700 | 0.71127400 |
| H | −3.74621500 | 3.31410800 | 0.55282800 |
| C | 0.96713000 | −1.34366200 | 1.61726000 |
| C | 0.68267900 | 1.41376900 | 1.69824000 |
| C | −3.77585900 | −1.11913600 | 1.66212900 |
| H | −4.53614800 | −1.64204200 | 1.09100300 |
| C | −1.50541500 | −0.21277600 | 1.85301900 |
| C | −1.85207300 | 0.20954700 | 3.15263700 |
| H | −1.11562400 | 0.74145000 | 3.74897600 |
| C | 0.63534800 | 3.23145700 | −2.06275600 |
| H | 0.57728600 | 4.28918000 | −1.78194000 |
| C | 1.88147700 | 2.83955400 | 3.29296500 |
| H | 2.40769300 | 2.94283300 | 4.23815900 |
| C | 0.69310600 | −2.13340400 | 2.75608400 |
| H | −0.16599700 | −1.88793000 | 3.37259400 |
| C | 4.03129200 | 0.10104900 | −0.58072200 |
| H | 4.06604600 | 0.72216800 | −1.48419000 |
| C | 1.38189800 | 1.59489600 | 2.90786900 |
| H | 1.54195100 | 0.73989400 | 3.56048800 |
| B | 0.03447200 | −0.03107800 | 1.40854000 |
| C | 5.27977700 | −0.79677000 | −0.55921200 |
| H | 6.17024200 | −0.16055800 | −0.49330400 |
| H | 5.38965200 | −1.41148800 | −1.45674600 |
| H | 5.28761200 | −1.45308000 | 0.31716600 |
| C | 1.72157800 | 3.94568000 | 2.45737900 |
| H | 2.12008100 | 4.91463800 | 2.74408600 |
| C | 1.05459100 | 3.79624400 | 1.24157800 |
| H | 0.95646000 | 4.65573100 | 0.58420600 |
| C | 2.77223500 | −2.14130600 | −2.05044100 |
| H | 3.66239200 | −2.68641700 | −1.71685100 |
| C | −4.07155500 | −0.72325700 | 2.96514500 |
| H | −5.04800100 | −0.93619400 | 3.39051300 |
| C | −3.10700900 | −0.04189100 | 3.70690700 |
| H | −3.32936500 | 0.29181200 | 4.71691400 |
| C | 2.87573800 | −2.83838200 | 1.19803000 |
| H | 3.71142600 | −3.14386600 | 0.57548300 |
| C | −1.96911100 | 3.20280400 | −0.67407900 |
| H | −2.51737400 | 2.81757600 | −1.54509900 |
| C | 1.62859600 | −3.14880400 | −2.20719100 |
| H | 0.71343900 | −2.65749200 | −2.56047300 |
| H | 1.40294400 | −3.66587600 | −1.27050000 |
| H | 1.89809900 | −3.90564800 | −2.95299300 |
| C | 1.49436100 | −3.21131000 | 3.13086000 |
| H | 1.25256900 | −3.77768600 | 4.02619200 |
| C | 2.11687300 | 2.84858500 | −2.14500700 |
| H | 2.24202800 | 1.80944900 | −2.46700100 |
| H | 2.62947700 | 2.97816400 | −1.18584400 |
| H | 2.61717700 | 3.48566700 | −2.88385400 |
| C | −2.49731300 | −3.09116600 | −0.81402900 |
| H | −3.54555800 | −3.21968300 | −0.51323400 |
| C | 2.59216700 | −3.56984800 | 2.34988300 |
| H | 3.21486600 | −4.41610400 | 2.62556400 |
| C | −1.61976400 | −3.87498400 | 0.17378600 |
| H | −1.85554000 | −4.94310500 | 0.10319500 |
| H | −1.78498100 | −3.56065100 | 1.20749500 |
| H | −0.55428900 | −3.75363600 | −0.04648600 |
| C | 0.53094900 | 2.55057600 | 0.86165400 |
| C | −1.86943800 | 4.73224900 | −0.80367000 |
| H | −2.87736400 | 5.16043800 | −0.75057800 |
| H | −1.42999600 | 5.06125000 | −1.74899100 |
| H | −1.29175300 | 5.16729800 | 0.01900400 |
| C | −2.95949200 | −0.11225400 | −3.13193300 |
| H | −2.81329100 | −1.04459900 | −3.68700100 |
| H | −2.00927500 | 0.43395300 | −3.13573300 |
| H | −3.68632300 | 0.48853300 | −3.69112200 |
| C | −3.47778300 | −0.36144900 | −1.70257400 |
| H | −3.55367100 | 0.61070400 | −1.20046300 |
| C | −2.34128800 | −3.61958100 | −2.24860700 |
| H | −1.32591600 | −3.46834000 | −2.62965700 |
| H | −3.03896300 | −3.15266000 | −2.94927700 |
| H | −2.53763200 | −4.69785800 | −2.26329900 |
| C | −0.04759800 | 3.05060900 | −3.43027100 |
| H | −1.09647000 | 3.36299400 | −3.42897900 |
| H | −0.00706500 | 2.00371300 | −3.75748600 |
| C | 3.08823800 | −1.45897600 | −3.39314100 |
| H | 3.31866300 | −2.21799600 | −4.14966000 |
| H | 3.94741000 | −0.78399700 | −3.33422400 |
| H | 2.22923900 | −0.88166100 | −3.75845100 |
| C | −4.87834200 | −0.99390800 | −1.73157800 |
| H | −5.54599600 | −0.36236200 | −2.32962300 |
| H | −4.87513300 | −1.98675200 | −2.19255400 |
| H | −5.32164500 | −1.07767600 | −0.73669900 |
| H | 0.47189800 | 3.64859800 | −4.18772700 |

Optimized Coordinates [Å] for [(Me$_2$PhP)$_3$Fe]$^+$:

| | | | |
|---|---|---|---|
| Fe | 0.15864700 | −0.18495700 | −0.99760500 |
| P | −0.96396300 | 1.83613500 | −1.46879900 |
| P | −0.45971000 | −2.22271000 | −0.05600500 |
| P | 2.48332300 | −0.04211700 | −1.31271800 |
| C | −2.26951200 | −2.22907300 | 0.27519800 |
| C | −1.24228800 | 2.66879600 | 0.14383800 |
| C | −2.79182200 | −2.06800000 | 1.56749900 |
| C | 4.03948300 | −1.45884400 | 0.61288100 |
| C | −0.64552100 | 3.89539800 | 0.47185600 |
| H | −0.02266300 | 4.41711100 | −0.24807900 |
| C | −2.04536400 | 2.02460300 | 1.10222300 |
| C | −2.25786700 | 2.60533100 | 2.35188400 |
| H | −2.89062600 | 2.10308200 | 3.07801800 |
| C | 3.22714900 | −1.29680000 | −2.44619800 |
| H | 4.32141000 | −1.26188800 | −2.43248400 |
| C | 4.38348500 | −0.67980900 | 2.87994900 |
| H | 4.81234400 | −0.82007700 | 3.86773800 |
| C | −4.17301300 | −2.01522100 | 1.77110700 |
| H | −4.56274900 | −1.90088900 | 2.77861400 |
| C | 0.31804700 | −2.68760000 | 1.54990900 |
| H | 1.38960600 | −2.83560300 | 1.38660000 |
| C | 4.58514700 | −1.63819900 | 1.88602900 |
| H | 5.17639900 | −2.52519600 | 2.09670500 |
| C | 3.63159400 | 0.46273300 | 2.59776700 |
| H | 3.47437400 | 1.21562800 | 3.36480600 |
| C | 3.08377800 | 0.64390800 | 1.32807100 |
| H | 2.50486800 | 1.54243900 | 1.12392600 |
| C | −0.21389600 | −3.73662900 | −1.09026300 |
| H | −0.63896300 | −4.62100300 | −0.60524200 |
| C | −0.85762300 | 4.47065600 | 1.72657200 |
| H | −0.39598100 | 5.42490200 | 1.96403800 |
| C | −1.66358000 | 3.82933600 | 2.66729400 |
| H | −1.83040700 | 4.28140300 | 3.64050500 |
| C | −3.16079100 | −2.32427200 | −0.80796000 |
| H | −2.78261000 | −2.44971700 | −1.82004800 |

-continued

| | | | |
|---|---|---|---|
| C | 3.28247400 | 1.51522500 | -1.91488900 |
| H | 2.90698900 | 1.75077900 | -2.91604500 |
| C | -5.04871600 | -2.11906600 | 0.69010800 |
| H | -6.12191000 | -2.08279500 | 0.85179800 |
| C | -2.66656800 | 1.64342000 | -2.16885400 |
| H | -3.18590300 | 2.60610400 | -2.21168900 |
| C | -4.53907500 | -2.27482500 | -0.60131300 |
| H | -5.21468500 | -2.36443900 | -1.44718900 |
| C | 3.28537900 | -0.31297600 | 0.31747500 |
| C | -0.23933400 | 3.11974200 | -2.57722600 |
| H | 0.77356200 | 3.37847300 | -2.25945300 |
| H | 2.88637400 | -1.08677000 | -3.46523900 |
| H | 2.89836600 | -2.30593900 | -2.18218500 |
| H | 3.02794700 | 2.34344400 | -1.24739500 |
| H | 4.37260400 | 1.42000600 | -1.95477900 |
| H | 0.85730500 | -3.89883800 | -1.24746400 |
| H | -0.68525200 | -3.61962900 | -2.06920800 |
| H | -0.11632500 | -3.60480000 | 1.96078100 |
| H | 0.20638200 | -1.87762100 | 2.27591300 |
| H | -0.85392700 | 4.02578200 | -2.60403500 |
| H | -0.18044400 | 2.70383300 | -3.58796700 |
| H | -3.25191000 | 0.95080000 | -1.55774000 |
| H | -2.59769400 | 1.23085800 | -3.18107000 |
| H | -2.51936000 | 1.07248800 | 0.87329200 |
| H | 4.21949800 | -2.21267100 | -0.14752200 |
| H | -2.13022700 | -1.99363600 | 2.42490400 |

Mulliken Atomic Spin Densities for 2

| | | |
|---|---|---|
| 1 | Fe | 3.253912 |
| 2 | P | -0.027171 |
| 3 | P | -0.010617 |
| 4 | P | -0.015937 |
| 5 | C | -0.004907 |
| 6 | C | 0.000171 |
| 7 | H | 0.000020 |
| 8 | H | 0.000301 |
| 9 | H | 0.000144 |
| 10 | C | -0.002614 |
| 11 | C | 0.000097 |
| 12 | H | -0.000011 |
| 13 | H | 0.000408 |
| 14 | H | -0.000066 |
| 15 | C | 0.031834 |
| 16 | C | 0.029533 |
| 17 | C | 0.003234 |
| 18 | H | -0.000001 |
| 19 | C | 0.031179 |
| 20 | C | -0.010984 |
| 21 | H | 0.000534 |
| 22 | C | 0.001306 |
| 23 | H | 0.000886 |
| 24 | C | 0.002732 |
| 25 | H | -0.000716 |
| 26 | C | -0.010913 |
| 27 | H | 0.000375 |
| 28 | C | -0.001689 |
| 29 | H | 0.000232 |
| 30 | C | -0.010241 |
| 31 | H | 0.000537 |
| 32 | B | -0.267025 |
| 33 | C | -0.000540 |
| 34 | H | -0.000389 |
| 35 | H | 0.000017 |
| 36 | H | 0.000034 |
| 37 | C | -0.004817 |
| 38 | H | 0.000268 |
| 39 | C | 0.002585 |
| 40 | H | 0.000043 |
| 41 | C | 0.007248 |
| 42 | H | -0.000019 |
| 43 | C | -0.006843 |
| 44 | H | 0.000321 |
| 45 | C | 0.003235 |
| 46 | H | -0.000697 |
| 47 | C | 0.005544 |
| 48 | H | -0.000087 |
| 49 | C | -0.001772 |
| 50 | H | 0.000308 |
| 51 | C | 0.002233 |
| 52 | H | -0.001672 |
| 53 | H | -0.000551 |
| 54 | H | 0.000270 |
| 55 | C | 0.006515 |
| 56 | H | -0.000827 |
| 57 | C | -0.000211 |
| 58 | H | 0.000126 |
| 59 | H | 0.000133 |
| 60 | H | -0.000055 |
| 61 | C | 0.009143 |
| 62 | H | 0.000978 |
| 63 | C | -0.007547 |
| 64 | H | 0.000405 |
| 65 | C | -0.000028 |
| 66 | H | 0.000024 |
| 67 | H | -0.000020 |
| 68 | H | -0.001178 |
| 69 | C | -0.002002 |
| 70 | C | 0.000981 |
| 71 | H | 0.000333 |
| 72 | H | -0.000026 |
| 73 | H | -0.000056 |
| 74 | C | 0.001914 |
| 75 | H | -0.000172 |
| 76 | H | -0.000830 |
| 77 | H | 0.000312 |
| 78 | C | -0.004719 |
| 79 | H | 0.000585 |
| 80 | C | -0.000384 |
| 81 | H | -0.000422 |
| 82 | H | -0.000009 |
| 83 | H | -0.000029 |
| 84 | C | 0.000389 |
| 85 | H | -0.000118 |
| 86 | H | -0.000747 |
| 87 | C | -0.000078 |
| 88 | H | 0.000160 |
| 89 | H | 0.000030 |
| 90 | H | -0.000011 |
| 91 | C | -0.001228 |
| 92 | H | -0.000593 |
| 93 | H | 0.000076 |
| 94 | H | 0.000043 |
| 95 | H | -0.000115 |

Sum of Mulliken spin densities=3.00000

Simulation Parameters

| Compound | S | g | D (cm$^{-1}$) |
|---|---|---|---|
| [TPB$^{iPr}$Fe][BAr$^F_4$] | 3/2 | 2.009 | 13.933 |
| [TPB$^{iPr}$Fe(N$_2$H$_4$)][BAr$^F_4$] | 3/2 | 2.031 | 19.937 |
| [TPB$^{iPr}$Fe(NH$_3$)][BAr$^F_4$] | 3/2 | 2.044 | 12.162 |
| (TPB$^{iPr}$)Fe(NH$_2$) | 3/2 | 2.000 | 11.348 |

TABLE 25

Product quantification for the decomposition of 3 to 4

| Run | Equiv H$_2$ | Equiv N$_2$H$_4$ | Equiv NH$_3$ |
|---|---|---|---|
| 1 | 0.01 | None det. | 0.09 |
| 2 | 0.009 | None det. | 0.12 |
| 3 | None det. | None det. | 0.14 |

TABLE 26

Crystal data and structure refinement for (TPB)FeMe (1)

| | |
|---|---|
| Identification code | jsa200m |
| Empirical formula | C37 H57 B Cl Fe P3 |
| Formula weight | 696.85 |
| Temperature | 293(2)K |
| Wavelength | 0.71073 Å |
| Crystal system | Triclinic |
| Space group | P-1 |
| Unit cell dimensions | a = 10.9554(3) Å, α = 91.4010(10)°. |
| | b = 11.5075(3) Å, β = 95.4060(10)°. |
| | c = 15.9312(4) Å, γ = 117.8130(10)°. |
| Volume | 1763.16(8) Å$^3$ |
| Z | 2 |
| Density (calculated) | 1.313 Mg/m$^3$ |
| Absorption coefficient | 0.665 mm$^{-1}$ |
| F(000) | 744 |
| Crystal size | .456 × .304 × .209 mm$^3$ |
| Theta range for data collection | 1.29 to 27.10°. |
| Index ranges | −14 <= h <= 14, −14 <= k <= 14, −20 <= l <= 20 |
| Reflections collected | 36496 |
| Independent reflections | 7758 [R(int) = 0.0311] |
| Completeness to theta = 27.10° | 99.8% |
| Refinement method | Full-matrix least-squares on F$^2$ |
| Data/restraints/parameters | 7758/338/402 |
| Goodness-of-fit on F$^2$ | 1.086 |
| Final R indices [I > 2sigma(I)] | R1 = 0.0321, wR2 = 0.0813 |
| R indices (all data) | R1 = 0.0371, wR2 = 0.0860 |
| Largest diff. peak and hole | 0.890 and −0.305 e·Å$^{-3}$ |

TABLE 27

Crystal data and structure refinement for [(TPB)Fe][BAr$^F_4$] (2)

| | |
|---|---|
| Identification code | mem130 |
| Empirical formula | C68 H66 B2 F24 Fe N0 P3 Si0 |
| Formula weight | 1509.59 |
| Temperature | 100(2)K |
| Wavelength | 0.71073 Å |
| Crystal system | Orthorhombic |
| Space group | Pbca |
| Unit cell dimensions | a = 26.4056(9) Å, α = 90°. |
| | b = 19.7833(7) Å, β = 90°. |
| | c = 26.4402(9) Å, γ = 90°. |
| Volume | 13812.1(8) Å$^3$ |
| Z | 8 |
| Density (calculated) | 1.452 Mg/m$^3$ |
| Absorption coefficient | 0.393 mm$^{-1}$ |
| F(000) | 6168 |
| Crystal size | 0.32 × 0.30 × 0.26 mm$^3$ |
| Theta range for data collection | 1.85 to 33.73°. |
| Index ranges | −35 <= h <= 41, −30 <= k <= 30, −41 <= l <= 41 |
| Reflections collected | 379408 |
| Independent reflections | 27590 [R(int) = 0.0500] |
| Completeness to theta = 33.73° | 100.0% |
| Absorption correction | Semi-empirical from equivalents |
| Max. and min. transmission | 0.9046 and 0.8844 |
| Refinement method | Full-matrix least-squares on F$^2$ |
| Data/restraints/parameters | 27590/18/951 |
| Goodness-of-fit on F$^2$ | 1.062 |
| Final R indices [I > 2sigma(I)] | R1 = 0.0496, wR2 = 0.1239 |
| R indices (all data) | R1 = 0.0744, wR2 = 0.1400 |
| Largest diff. peak and hole | 0.740 and −0.532 e·Å$^{-3}$ |

TABLE 28

Crystal data and structure refinement for [(TPB)Fe(N$_2$H$_4$)][BAr$^F_4$] (3)

| | |
|---|---|
| Identification code | jsa19_0m |
| Empirical formula | C78 H68 B2 F24 Fe N2 P3 |
| Formula weight | 1659.72 |
| Temperature | 296(2)K |
| Wavelength | 0.71073 Å |
| Crystal system | Orthorhombic |
| Space group | Pbca |
| Unit cell dimensions | a = 20.0031(7) Å, α = 90°. |
| | b = 25.7862(8) Å, β = 90°. |
| | c = 26.6970(8) Å, γ = 90°. |
| Volume | 13770.4(8) Å$^3$ |
| Z | 8 |
| Density (calculated) | 1.601 Mg/m$^3$ |
| Absorption coefficient | 0.404 mm$^{-1}$ |
| F(000) | 6776 |
| Crystal size | 0.46 × 0.26 × 0.15 mm$^3$ |
| Theta range for data collection | 2.00 to 32.59°. |
| Index ranges | −30 <= h <= 30, −39 <= k <= 39, −40 <= l <= 40 |
| Reflections collected | 347031 |
| Independent reflections | 25087 [R(int) = 0.0696] |
| Completeness to theta = 32.59° | 99.9% |
| Max. and min. transmission | 0.9419 and 0.8361 |
| Refinement method | Full-matrix least-squares on F$^2$ |
| Data/restraints/parameters | 25087/971/981 |
| Goodness-of-fit on F$^2$ | 0.937 |
| Final R indices [I > 2sigma(I)] | R1 = 0.0531, wR2 = 0.1373 |
| R indices (all data) | R1 = 0.0872, wR2 = 0.1681 |
| Largest diff. peak and hole | 1.295 and −0.755 e·Å$^{-3}$ |

TABLE 29

Crystal data and structure refinement for [(TPB)Fe(NH$_3$)][BAr$^F_4$] (4)

| | |
|---|---|
| Identification code | xds_ascii |
| Empirical formula | C68 H80 B4 F24 Fe N2 O2 P3 |
| Formula weight | 1605.34 |
| Temperature | 293(2)K |
| Wavelength | 0.71073 Å |
| Crystal system | Orthorhombic |
| Space group | Pbca |
| Unit cell dimensions | a = 19.846(4) Å, α = 90°. |
| | b = 25.821(5) Å, β = 90°. |
| | c = 26.862(5) Å, γ = 90°. |
| Volume | 13765(5) Å3 |
| Z | 8 |
| Density (calculated) | 1.549 Mg/m$^3$ |
| Absorption coefficient | 0.402 mm$^{-1}$ |
| F(000) | 6600 |
| Crystal size | .25 × .15 × .15 mm$^3$ |
| Theta range for data collection | 1.50 to 25.18°. |
| Index ranges | −23 <= h <= 23, −30 <= k <= 30, −32 <= l <= 32 |
| Reflections collected | 155016 |
| Independent reflections | 12232 [R(int) = 0.0175] |
| Completeness to theta = 25.18° | 99.0% |
| Refinement method | Full-matrix least-squares on F$^2$ |
| Data/restraints/parameters | 12232/972/961 |
| Goodness-of-fit on F$^2$ | 1.041 |
| Final R indices [I > 2sigma(I)] | R1 = 0.0606, wR2 = 0.1680 |
| R indices (all data) | R1 = 0.0620, wR2 = 0.1692 |
| Largest diff. peak and hole | 1.741 and −1.346 e·Å$^{-3}$ |

TABLE 30

Crystal data and structure refinement for (TPB)FeNH$_2$ (5)

| | |
|---|---|
| Identification code | jsa23_0m |
| Empirical formula | C36 H56 B Fe N P3 |
| Formula weight | 662.39 |
| Temperature | 100(2)K |
| Wavelength | 0.71073 Å |
| Crystal system | Triclinic |
| Space group | P-1 |
| Unit cell dimensions | a = 10.9229(9) Å   α = 77.268(7)°. |
| | b = 11.2493(13) Å   β = 84.862(5)°. |
| | c = 16.5084(15) Å   γ = 61.117(4)°. |
| Volume | 1732.1(3) Å$^3$ |
| Z | 2 |
| Density (calculated) | 1.483 Mg/m$^3$ |
| Absorption coefficient | 0.615 mm$^{-1}$ |
| F(000) | 812 |
| Crystal size | 0.23 × 0.15 × 0.15 mm$^3$ |
| Theta range for data collection | 2.11 to 28.28°. |
| Index ranges | −14 <= h <= 14, −14 <= k <= 14, −22 <= l <= 22 |
| Reflections collected | 52847 |
| Independent reflections | 8561 [R(int) = 0.0706] |
| Completeness to theta = 28.28° | 99.7% |
| Max. and min. transmission | 0.9134 and 0.8715 |
| Refinement method | Full-matrix least-squares on F$^2$ |
| Data/restraints/parameters | 8561/2/382 |
| Goodness-of-fit on F$^2$ | 1.120 |
| Final R indices [I > 2sigma(I)] | R1 = 0.0545, wR2 = 0.1236 |
| R indices (all data) | R1 = 0.0810, wR2 = 0.1324 |
| Largest diff. peak and hole | 1.541 and −0.646 e·Å$^{-3}$ |

TABLE 31

Crystal data and structure refinement for (TPB)FeOH (6)

| | |
|---|---|
| Identification code | jsa21_0m |
| Empirical formula | C36 H56 B Fe N O P3 |
| Formula weight | 678.39 |
| Temperature | 100(2)K |
| Wavelength | 0.71073 Å |
| Crystal system | Triclinic |
| Space group | P-1 |
| Unit cell dimensions | a = 10.9554(4) Å   α = 77.466(2)°. |
| | b = 11.3311(4) Å   β = 78.105(2)°. |
| | c = 16.6454(7) Å   γ = 61.338(2)°. |
| Volume | 1757.30(12) Å$^3$ |
| Z | 2 |
| Density (calculated) | 1.282 Mg/m$^3$ |
| Absorption coefficient | 0.595 mm$^{-1}$ |
| F(000) | 726 |
| Crystal size | 10.00 × 0.29 × 0.17 mm$^3$ |
| Theta range for data collection | 2.07 to 37.78°. |
| Index ranges | −18 <= h <= 17, −19 <= k <= 19, −28 <= l <= 28 |
| Reflections collected | 142106 |
| Independent reflections | 18846 [R(int) = 0.0433] |
| Completeness to theta = 37.78° | 100.0% |
| Max. and min. transmission | 0.9056 and 0.0661 |
| Refinement method | Full-matrix least-squares on F$^2$ |
| Data/restraints/parameters | 18846/1/382 |
| Goodness-of-fit on F$^2$ | 1.024 |
| Final R indices [I > 2sigma(I)] | R1 = 0.0316, wR2 = 0.0745 |
| R indices (all data) | R1 = 0.0477, wR2 = 0.0810 |
| Largest diff. peak and hole | 0.810 and −0.493 e·Å$^{-3}$ |

ADDITIONAL REFERENCES

[1] W. Kabsch, *J. Appl. Cryst.* 1993, 26, 795.
[2] Sheldrick, G. M. *Acta Cryst.* 1990, A46, 467.
[3] Sheldrick, G. M. *Acta Cryst.* 2004, A64, 112.
[4] Müller, P. Crystallography Reviews 2009, 15, 57.
[5] http://ewww.mpi-muelheim.mpg.de/baciloginsibill/julX_en.php
[6] Gaussian 03, Revision E.01, M. J. Frisch, G. W. Trucks, H. B. Schlegel, G. E. Scuseria, M. A. Robb, J. R. Cheeseman, J. A. Montgomery, Jr., T. Vreven, K. N. Kudin, J. C. Burant, J. M. Millam, S. S. Iyengar, J. Tomasi, V. Barone, B. Mennucci, M. Cossi, G. Scalmani, N. Rega, G. A. Petersson, H. Nakatsuji, M. Hada, M. Ehara, K. Toyota, R. Fukuda, J. Hasegawa, M. Ishida, T. Nakajima, Y. Honda, O. Kitao, H. Nakai, M. Klene, X. Li, J. E. Knox, H. P. Hratchian, J. B. Cross, V. Bakken, C. Adamo, J. Jaramillo, R. Gomperts, R. E. Stratmann, O. Yazyev, A. J. Austin, R. Cammi, C. Pomelli, J. W. Ochterski, P. Y. Ayala, K. Morokuma, G. A. Voth, P. Salvador, J. J. Dannenberg, V. G. Zakrzewski, S. Dapprich, A. D. Daniels, M. C. Strain, O. Farkas, D. K. Malick, A. D. Rabuck, K. Raghavachari, J. B. Foresman, J. V. Ortiz, Q. Cui, A. G. Baboul, S. Clifford, J. Cioslowski, B. B. Stefanov, G. Liu, A. Liashenko, P. Piskorz, I. Komaromi, R. L. Martin, D. J. Fox, T. Keith, M. A. Al-Laham, C. Y. Peng, A. Nanayakkara, M. Challacombe, P. M. W. Gill, B. Johnson, W. Chen, M. W. Wong, C. Gonzalez, and J. A. Pople, Gaussian, Inc., Wallingford Conn., 2004.
[7] Brookhart, M.; Grant, B.; Volpe, A. F. *Organometallics* 1992, 11, 3920-3922.
[8] Weatherburn, M. W. *Anal. Chem.* 1967, 39, 971-974.
[9] Watt, G. W.; Chrisp, J. D. *Anal. Chem.* 1952, 24, 2006-2008.

EXAMPLE 4

Comparative Activity of Phosphine Fe Complexes for Nitrogen Fixation

Three new Fe—N$_2^-$ complexes supported by (o-Cy$_2$P(C$_6$H$_4$))$_3$B (TPB$^{Cy}$), (o-Ph$_2$P(C$_6$H$_4$))$_3$B (TPB$^{Ph}$), and (o-iPr$_2$P(C$_6$H$_4$))$_2$BPh (DPB) have been synthesized and characterized. These complexes, along with the halide complex (TPB$^{iPr}$)FeCl and the complexes [(PhBP$^{iPr}$$_3$)Fe(N$_2$)][MgCl(THF)$_2$] and (Cy$_2$P(C$_2$H$_4$))$_3$PFe(N$_2$) have been subjected to conditions to probe their efficacy for the reduction of N$_2$ to NH$_3$. With the exception of (PCy$_2$(C$_2$H$_4$))$_3$PFeN$_2$ all complexes evolve substantial quantities of NH$_3$ under the same conditions and [(TPB$^{Cy}$)Fe(N$_2$)][Na(12-C-4)$_2$], [(TPB$^{Ph}$)Fe(N$_2$)][Na(12-C-4)$_2$], and (TPB)FeCl are effective pre-catalysts for the reduction of N$_2$ to NH$_3$. Additionally, variations on reaction conditions with the catalyst system, [(TPB$^{iPr}$)Fe(N$_2$)][Na(12-C-4)$_2$], have been investigated. These findings further support the agency of a molecular species within the catalytic cycle and offer insights into structural features and reaction conditions that enable catalytic turnover.

Introduction

Nitrogen fixation to NH$_3$ is a critical component of the global nitrogen cycle.[1] This process is mediated by humans via the Haber-Bosch process wherein N$_2$ and H$_2$ are pressurized and heated over an Fe-based catalyst to produce NH$_3$ on a massive scale.[2] Biologically, N$_2$ can be reduced to NH$_3$ by diazotrophs at cofactors that are rich in Fe and S but that can additionally feature Mo or V.[3] Due to the importance of N$_2$ fixation, there has been considerable attention devoted to understanding the mechanism of this biological process.[4] Molecular systems for the reduction of N$_2$ to NH$_3$ have traditionally focused on Mo centers due to the early work of Chatt and Hidai on these systems as well as the presence of Mo in the most thoroughly studied FeMo-cofactor.[5,6] Indeed, the first well-defined molecular system competent for the reduction of $N_2$ to $NH_3$ at room temperature and pressure featured the tri-amido amine Mo systems of Schrock and co-workers[7,8] while more recently Nishibayashi and co-workers have reported only the second such catalytic system featuring a phosphine supported Mo system.[9]

Our lab[10,11,12,13] and others[14,15,16] have alternately been interested in Fe-mediated $N_2$ reduction, motivated by spectroscopic and biological studies that suggest that Fe is the site of $N_2$ reduction to $NH_3$ in nitrogenases.[17,18] Indeed, it has been shown that molecular Fe species can split $N_2$ into two nitride units which can release nearly stoichiometric amounts of $NH_3$ upon acidification or hydrogenation and that simple Fe precursors can catalytically generate $N(TMS)_3$ with strong reducing agents and TMSCl.[13,20] With the hypothesis that a single Fe center may be the site of $N_2$ reduction, we sought to synthesize three-fold symmetric Fe complexes capable of supporting a variety of nitrogenous ligands that could form en-route to $NH_3$ formation. Specifically, the utility of tris-phosphine borane supported Fe centers for the binding of $N_xH_y$ ligands and the functionalization of $N_2$ suggest that such a single-site hypothesis bears merit.[21,22,23] This summed research has recently culminated in the realization of an Fe based system for the catalytic reduction of $N_2$ to $NH_3$.[24] When mixed with 48 equivalents of $HBAr^F_4$ ($BAr^F_4{}^- = (3,5\text{-}(CF_3)_2C_6H_3)_4B^-$) and $KC_8$ at $-78°$ C. in $Et_2O$, the tris-phosphine borane supported $[(TPB^{iPr})Fe(N_2)][Na(12\text{-}C\text{-}4)_2]$ ($TPB^{iPr} = (o\text{-}iPr_2P(C_6H_4))_3B$, 12-C-4 = 12-crown-4) forms 7 eq. of $NH_3$ per Fe center (Scheme 1).

Scheme 1. Catalytic reduction of $N_2$ to $NH_3$ by $[(TPB^{iPr})Fe(N_2)][Na(12\text{-}C\text{-}4)_2]$.

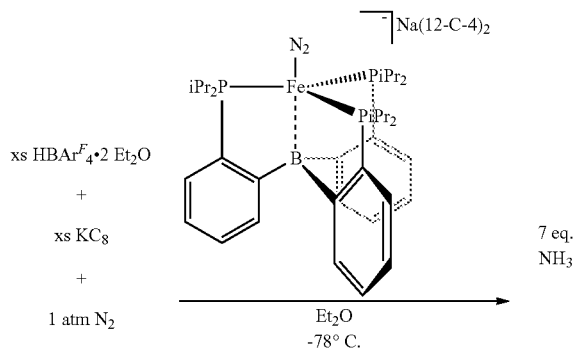

Figure 81:
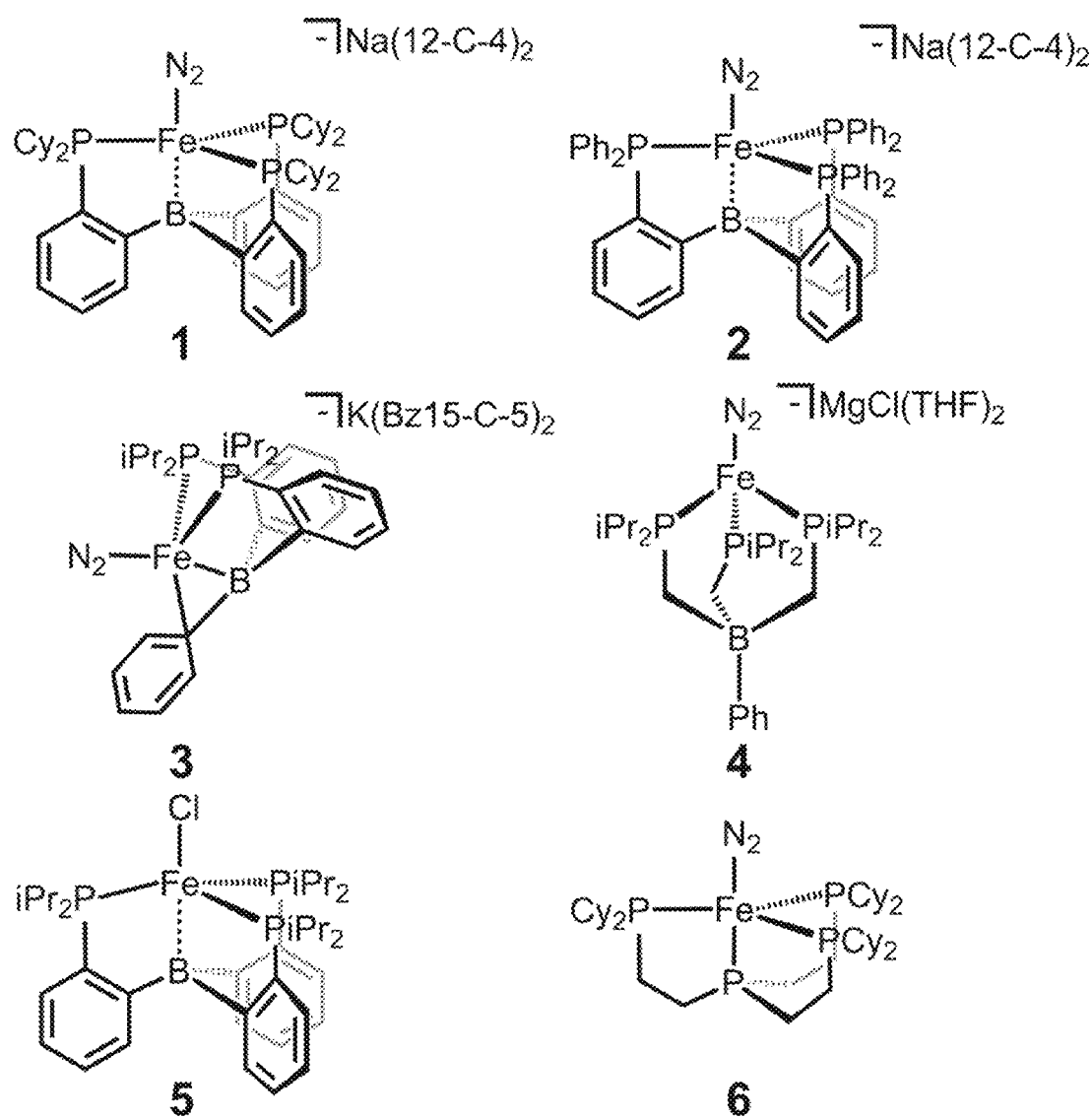
FIG. 81. Complexes synthesized and studied towards N$_2$ reduction in this work.

Motivated by this result, we report the preparation of three new phosphine supported Fe complexes analogous to $[(TPB^{iPr})Fe(N_2)][Na(12\text{-}C\text{-}4)_2]$: $[(TPB^{Cy})Fe(N_2)][Na(12\text{-}C\text{-}4)_2]$ (1), $[(TPB^{Ph})Fe(N_2)][Na(12\text{-}C\text{-}4)_2]$ (2), and $[(DPB)Fe(N_2)]$ $[K(Bz15\text{-}C\text{-}5)_2]$ (3) (FIG. 81) and subject these complexes to the standard catalytic conditions used for $[(TPB^{iPr})Fe(N_2)][Na(12\text{-}C\text{-}4)_2]$. For comparison the tris-phospine borate complex $[(PhBP^{iPr}{}_3)Fe(N_2)][MgCl(THF)_2]$ (4) has also been examined.[25] A new halide complex $(TPB)FeCl$ (5) has also been synthesized and examined for catalysis to test the effect of $Cl^-$ on turnover. Finally, the known tetra-phosphine complex $(Cy_2P(C_2H_4))_3PFe(N_2)$ (6) has been independently synthesized and has also been subjected to the catalytic conditions.[26] Empirically, of the complexes studied, only species with flexible Fe—B interactions produce super-stoichiometric quantites of $NH_3$ with $[(TPB^{Cy})Fe(N_2)][Na(12\text{-}C\text{-}4)_2]$, $[(TPB^{Ph})Fe(N_2)][Na(12\text{-}C\text{-}4)_2]$, and $(TPB^{iPr})FeCl$ serving as pre-catalysts with 3.20, 2.20, and 3.16 equivalents of $NH_3$ per Fe produced respectively. While these systems are not as efficient as the parent $[(TPB^{iPr})Fe(N_2)][Na(12\text{-}C\text{-}4)_2]$, they nevertheless demonstrate that the ligand field supplied by the TPB ligands is beneficial for catalytic turnover. In addition to these studies, further variations on the catalytic conditions for $[(TPB^{iPr})Fe(N_2)][Na(12\text{-}C\text{-}4)_2]$ such as temperature, acid, reductant, and solvent have been studied and suggest additional factors that may be crucial for catalytic turnover.

Results and Discussion

Ligand Synthesis: With the desire of investigating the structural features that enable catalysis, we targeted several variations on the $TPB^{iPr}$ ligand scaffold. To probe the steric effects of the ligand scaffold we envisaged a cyclohexyl based $TPB^{Cy}$ scaffold that would closely mimic the electronics of the $TPB^{iPr}$ system while providing additional steric bulk. The $TPB^{Ph}$ ligand also seemed like an obvious variation on $TPB^{iPr}$ to test the effect of weaker phosphine donors.[28] Finally, our lab recently reported the synthesis of Fe complexes of $PhB(o\text{-}iPr_2P(C_6H_4)_2$ (DPB).[29,30,31] This DPB ligand ligates the Fe center through two phosphine donors and replaces one phosphine donor with an interaction through a BPh unit. The DPB scaffold hence provides a larger variation on the TPB scaffold than the simple change in phosphine substituent.

The preparation of $TPB^{Ph}$ has already been reported[27] and the synthesis of $TPB^{Cy}$ (7) involves the lithiation of o-Br$(C_6H_4)PCy_2$ and subsequent reaction with ⅓ equivalents of $BCl_3$ analogously to the preparation of $TPB^{iPr}$.[32] Metallation of the appropriate tris-phosphine ligands also proceeds in an analogous manner to that reported for $(TPB^{iPr})FeBr^{21}$ (Scheme 2) to yield the halides 5, $(TBP^{Cy})FeCl$ (8), and $(TPB^{Ph})FeCl$ (9) which are brown solids and all possess $S=3/2$ spin states as judged from their solution magnetic moments of $\mu_{eff}=3.8\text{-}4.0\ \mu_B$. Reduction of 8 with an excess of Na/Hg amalgam followed by addition of 12-C-4 results in formation of 1 as a dark red $S=½$ complex with an N—N stretch at 1901 $cm^{-1}$, very close to the reported value for $[(TPB^{iPr})Fe(N_2)][Na(12\text{-}C\text{-}4)_2]$ (1905 $cm^{-1}$) suggesting that the $N_2$ molecule is similarly activated in both of these complexes.

Scheme 2: Synthesis of complexes 1,2,3,5,8,9, and 10.

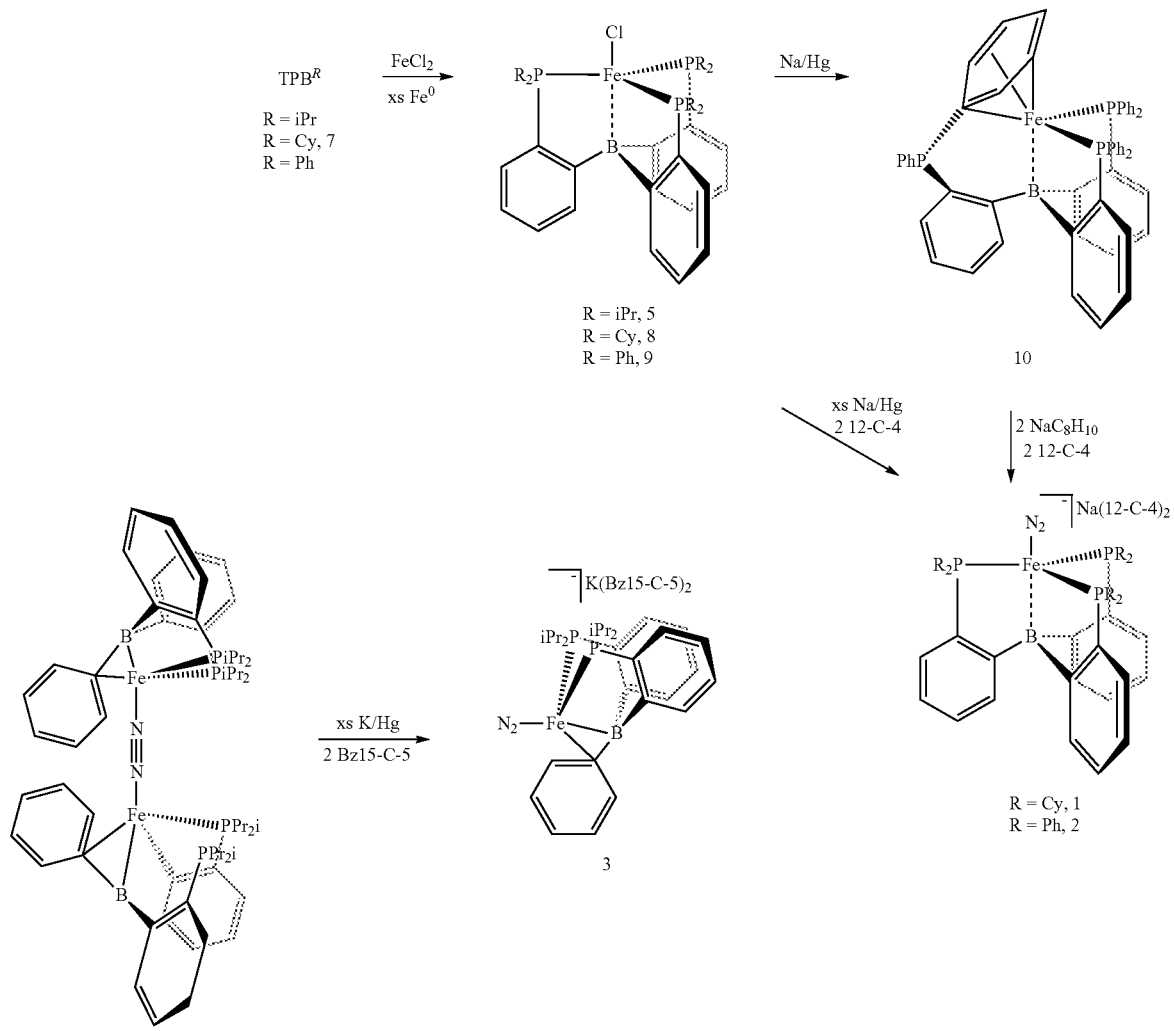

Reduction of phenyl substituted 9 with one equivalent of Na/Hg does not result in the uptake of $N_2$ as is observed in the alkyl systems. Alternately, a diamagnetic species is obtained with $^1H$ NMR resonances shifted into the olefinic region. These shifted peaks suggest the possibility of an $\eta^6$ coordinated aryl ring and the crystal structure (vide infra) confirms that one phosphine ligand has dissociated and one of the phenyl groups attached to the phosphine is now coordinated to the Fe center to give the bis-phosphino borane aryl complex $(TPB^{Ph})Fe$ 10. Further reduction of 10 with $NaC_{10}H_8$ and addition of 12-C-4 enables isolation of the $N_2$ adduct 2 as a red solid. Complex 2 similarly displays a strong N—N stretching vibration in the IR at 1988 $cm^{-1}$ which occurs at substantially higher energy than that found in 1 or $[(TPB^{iPr})Fe(N_2)][Na(12\text{-}C\text{-}4)_2]$ reflecting the weaker donor ability of the tri-aryl phosphine donors. Finally, reduction of the $[(DPB)Fe]_2(\mu\text{-}1,2\text{-}N_2)$ with an excess of K/Hg amalgam followed by addition of Bz15-C-5 (Bz15-C-5=benzo-15-crown-5) results in dark red 3. The N—N stretch for complex 3 is observed at 1935 $cm^{-1}$ suggesting that the DPB scaffold still results in a strongly activated $N_2$ despite the loss of one phosphine donor.

Figure 82:
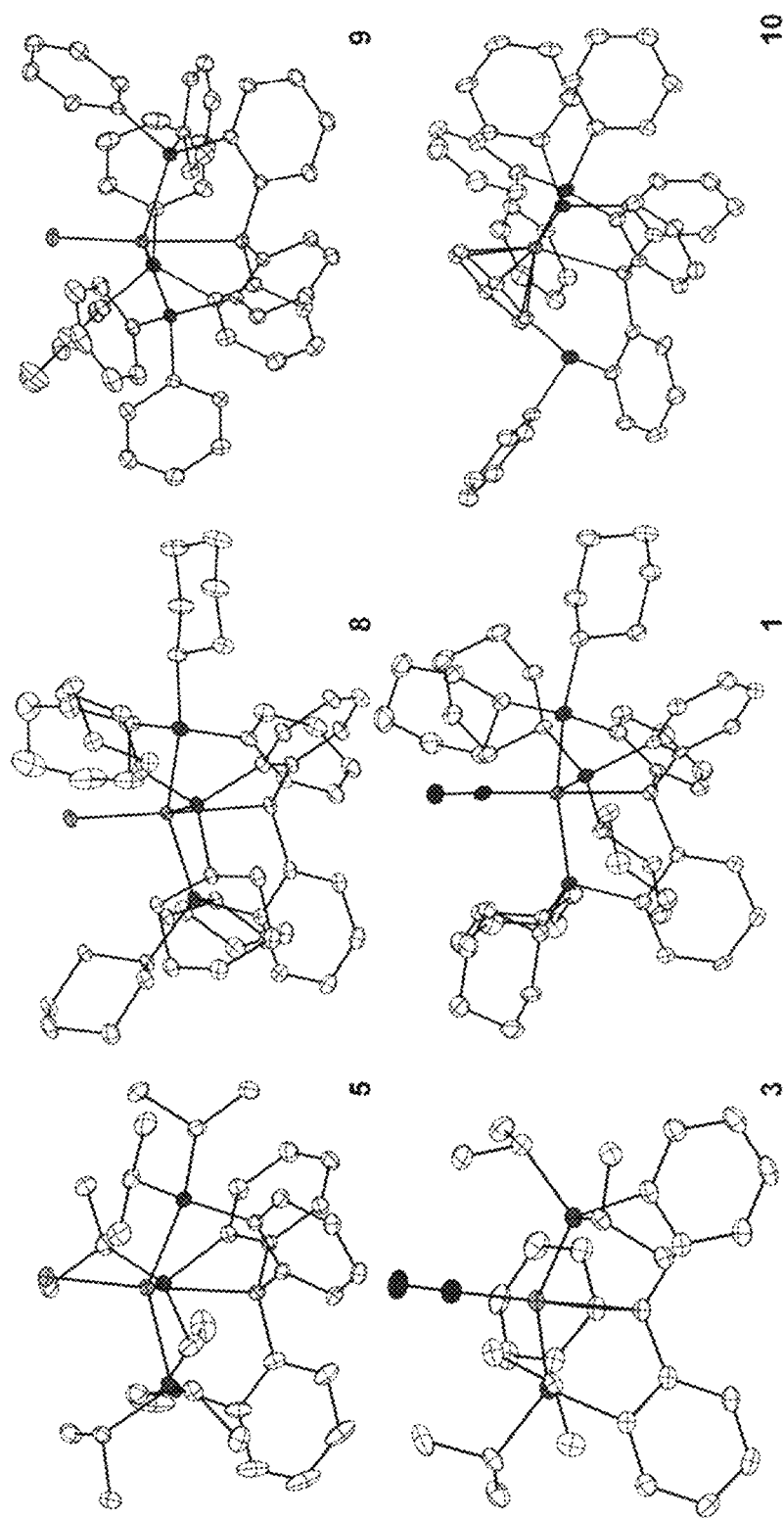
FIG. 82. XRD structures of complexes 1 (E), 3 (D), 5 (A), 8 (B), 9 (C), and 10 (F) with ellipsoids at 50% and hydrogens and counterions omitted for clarity. Fe atoms are shown in orange, P in purple, B in tan, Cl in green, and N in blue. See Table 32 for bonding metrics.

Structural Characterization: Complexes 1, 3, 5, 8, 9, and 10 have been crystallographically characterized and their structures are depicted in FIG. 82. The halide complexes 5, 8, and 9 display relatively similar geometries about Fe with relatively long Fe—P bonds consistent with other examples of formally $Fe^I$ S=3/2 Fe centers from related complexes (Table 32).[21,23] A trend in increasing Fe—P distances is observed upon moving from complex 9 to 5 to 8 potentially arising from the increased steric demands from the substituents on phosphorus (Table 32). The Fe—B distance in these halide complexes is also longer than the sum of the covalent radii of Fe and B (2.36 Å) likely indicating a minimal interaction between Fe and B. The geometry about Fe, consistent with the long Fe—B distance, can best be described as pseudo-trigonal bipyramidal with a strong distortion towards tetrahedral as indicated by $\tau_4$ values of <0.5 for all of the halide complexes.

The assignment of 10 as an $\eta^6$ aryl adduct was confirmed by its XRD structure which shows the Fe interacting with a phenyl ring and one phosphine ligand dissociated from Fe (Fe—P >3.5 Å). The Fe—C distances all range from 2.095(3) Å to 2.172(3) Å with the ipso carbon being the closest and an overall Fe-centroid distance of 1.595 Å. The other two Fe—P distances are substantially shorter than those observed in the halide complexes, reflecting the diamagnetism of 10 (Table 32). Despite the other short Fe ligand bonds, the Fe—B distance of 2.457(4) Å remains long. The ΣC—B—C in 10, however, shows a value of 334° compared with an average of 341° in complexes 5, 8, and 9, indicating that the B is more pyramidalized in 10 and suggesting that there is more donation into the vacant p orbital on B in this complex than in the halide complexes despite the long bond distance observed.

Although crystals of 2 suitable for XRD analysis could not be obtained, both complexes 1 and 3 were crystallographically characterized. Complex 3 shows a pseudo tetrahedral geometry about Fe, consistent with other complexes of DPB,[30] and displays a strong Fe—$C_{ipso}$ interaction of 2.055(2) Å. In addition to the short Fe—$C_{ipso}$ there is a moderately shortened Fe—$C_{ortho}$ distance of 2.326(2) Å. The Fe—B distance of 2.246(2) Å 3 is also short when compared with other DPB complexes of Fe. All of these bond metrics point to a strong interaction between the electron rich Fe center and the BCC unit in 3, and this conclusion is supported by bond alteration in the bound Ph ring with two short C—C distances of 1.378(3) Å and 1.385(3) Å with the remainder of the C—C distances >1.408 Å. Finally, the Fe—N distance of 1.792(2) Å and the N—N distance of 1.135(3) Å can be compared with the analogous distances from [(TPB$^{iPr}$)Fe(N$_2$)][Na(12-C-4)$_2$] of 1.781(2) and 1.144(3) Å respectively suggesting a slightly weaker, but still significant, degree of N$_2$ activation, consistent with the vibrational data for these complexes.

Complex 1 looks quite similar to [(TPB$^{iPr}$)Fe(N$_2$)][Na(12-C-4)$_2$] in overall structure as both complexes have pseudo-trigonal bipyramidal geometries with $\tau_4$ values of 0.60 and 0.61 respectively. Both complexes possess one large P—Fe—P angle which is 136.21(3)° in 1 and 134.99(3)° in [(TPB$^{iPr}$)Fe(N$_2$)][Na(12-C-4)$_2$]. Unlike the corresponding halide complexes 8 and 5 which show longer Fe—P distances on average with cyclohexyl substituents, 1 displays very similar average Fe—P distances to [(TPB$^{iPr}$)Fe(N$_2$)][Na(12-C-4)$_2$] with values of 2.254 and 2.251 Å respectively. The Fe—B distance is also essentially identical in both 1 and [(TPB$^{iPr}$)Fe(N$_2$)][Na(12-C-4)$_2$] with a value of 2.292(3) Å in both complexes. Finally, 1 has an Fe—N distance of 1.792(3) Å and a N—N distance of 1.143(4) Å, very close to the values observed in [(TPB$^{iPr}$)Fe(N$_2$)][Na(12-C-4)$_2$] and consistent with their similar vibrational features.

Catalytic Nitrogen Reduction Studies: With the above-mentioned complexes isolated and characterized, comparative studies of their efficacy as pre-catalysts were undertaken. Specifically targeted were complexes 1, 2, 3, and 5 as well as the phosphine N$_2$ complexes 4 and 6. The results from these studies are summarized in Table 33. While none of the investigated catalysts outperform the original [(TPB$^{iPr}$)Fe(N$_2$)][Na(12-C-4)$_2$] system (7 eq. NH$_3$/Fe), several trends relevant to catalysis become apparent. Most notably, certain complexes are competent for catalytic N$_2$ reduction within this study, that is complexes that can on average produce >2 eq. NH$_3$/Fe, bear a great deal of structural similarity to [(TPB$^{iPr}$)Fe(N$_2$)][Na(12-C-4)$_2$]. Specifically, of the new complexes, 1 differs from [(TPB$^{iPr}$)Fe(N$_2$)][Na(12-C-4)$_2$] only in a slightly larger steric profile on the phosphine substituents. This is manifested in the similar $v_{NN}$ frequencies and bond metrics for these two species. It is therefore not surprising that 1 also serves as a catalyst for N$_2$ reduction. Complex 2 also serves as a pre-catalyst for N$_2$ reduction under these standard conditions. While the Ph substituted ligand scaffold has substantially different electronic properties that the iPr or Cy systems, the fact that it can still mediate catalysis suggests that the tris-phosphine borane ligand set common to all three catalysts is important to enable catalysis. Furthermore, the absence of an observable Fe(0) N$_2$ complex in the Ph system might suggest that such a species is not required for catalysis, perhaps in the iPr or Cy systems as well.

TABLE 32

Selected bond lengths (Å) and T$_4$ values for complexes 1, 3, 5, 8, 9, and 10. Note that the values reported for 8 are the average of four molecules in the unit cell.

| Complex | Fe-X | Fe-B | Fe-P1 | Fe-P2 | Fe-P3 | T$_4$ |
|---|---|---|---|---|---|---|
| 1 | 1.792(3) | 2.292(3) | 2.3157(9) | 2.2228(9) | 2.2219(9) | 0.60 |
| 3 | 1.792(2) | 2.246(2) | 2.2265(7) | 2.2179(7) | — | — |
| 5 | 2.2751(3) | 2.4593(9) | 2.4314(3) | 2.4063(3) | 2.3792(3) | 0.32 |
| 8 | 2.296 | 2.429 | 2.456 | 2.419 | 2.390 | 0.39 |
| 9 | 2.2712(4) | 2.5418(16) | 2.3622(4) | 2.3451(4) | 2.3325(4) | 0.33 |
| 10 | — | 2.457(4) | 2.2466(10) | 2.1846(9) | — | — |

TABLE 33

N$_2$ reduction with phosphine Fe complexes. All data shown as an average of at least 3 runs (see SI) using the conditions described in the experimental section.

| Entry | Complex | NH$_3$ eq./Fe |
|---|---|---|
| 1 | [(TPB$^{Cy}$)Fe(N$_2$)][Na(12-C-4)$_2$] | 3.20 |
| 2 | [(TPB$^{Ph}$)Fe(N$_2$)][Na(12-C-4)$_2$] | 2.20 |
| 3 | [(DPB)Fe(N$_2$)][K(Bz15-C-5)$_2$] | 1.72 |
| 4 | [(PhPB$^{iPr}$$_3$)Fe(N$_2$)][MgCl(THF)$_2$] | 1.19 |
| 5 | (TPB$^{iPr}$)FeCl | 3.16 |
| 6 | (C$_2$H$_4$PCy$_2$)$_3$PFe(N$_2$) | 0.66 |

In contrast to the TPB based complexes, DPB based 3 does not produce >2 eq. of NH$_3$/Fe on average. Even though 3 activates N$_2$ more strongly than 2, the fact that it produces less NH$_3$ again suggests the importance of the tris-phosphine borane scaffold. Additionally, one might expect for the DPB scaffold to be more labile than the TPB scaffold due to the weaker coordinating ability of the BPh unit. If the catalysis is mediated by a molecular species, this lability may compromise the stability of the species towards decomposition. The fact that 3 performs more poorly than 1 or 2 suggests that such a pathway is not beneficial for catalysis, circumstantially supporting the agency of a molecular species versus some heterogeneous species derived from decomposition.

It has already been noted that switching the apical atom of the tris-phosphine scaffold from B to Si results in loss of catalytic activity, putatively due to the loss of the flexible Fe—B interaction.[24] Similarly, when the B atom is tied back as a borate in complex 4, a sub-stoichiometric amount of $NH_3$ which is again consistent with the empirical observation of a need for a hemi-labile interaction between the Fe and the apical B. Interestingly, in complex 6 there exists, in principle, the possibility of a hemi-labile interaction with the apical P atom of the ligand scaffold. The low yields of $NH_3$ for this system when compared with the other entries in Table 33 suggest that if any flexibility of the Fe—P bond exists, it does not enable catalysis in this system. Finally, the halide complex 5 was subjected to the standard catalytic conditions to probe the effect of chloride ion on catalysis. While diminished, the fact that complex 5 is a competent pre-catalyst suggests that any adventitious chloride contaminants, potentially arising from the $HBAr^F_4$ acid, may hinder catalysis, but should not terminate a catalytic cycle.

The recent report of a C anchored complex, $(CP^{iPr}_3)FeN_2^-$,[33] deserves special mention in this context, as this complex appears to have more limited flexibility in the Fe—C bond when compared to the TPB scaffold yet still displays substantial catalytic activity. More studies will be required to provide a satisfying explanation for this observation, but possibilities include the requirement of a light atom in the backbone of the ligand for catalytic turnover or access to a different mechanism of reduction in the C based system.

TABLE 34

Variations on the standard catalytic conditions with $[(TPB^{iPr})Fe(N_2)]$ $[Na(12\text{-}C\text{-}4)_2]$ as pre-catalyst. Note that all reported values are an average of at least 2 runs (See SI). (a) Results in reference 24. (b) 10% Na by weight.

| Entry | Variation | $NH_3$ eq./Fe |
|---|---|---|
| | Solvent | |
| 1 | $iPr_2O$ | 6.53 |
| 2 | DME | 3.70 |
| 3 | $Bu_2O$ | 3.16 |
| 4 | Toluene | 0.78 |
| 5 | 1:6 $Et_2O$:Toluene | 3.12 |
| | Reductant | |
| 6[a] | $Cp^*_2Co$ | 0.6 |
| 7[a] | $Cp^*_2Cr$ | <0.2 |
| 8[a] | K metal | 0.4 |
| 9[b] | Na/Hg | 2.08 |
| 10 | $NaC_{10}H_8$ | 1.00 |
| 11 | $MgC_{14}H_{10}$ | 0.28 |
| | Acid | |
| 12[a] | HOTf | 0.4 |
| 13[a] | HCl | <0.1 |
| 14[a] | $[Lutidinium][BAr^F_4]$ | <0.1 |
| 15 | [2,6-dimethylanilinium][OTf] | 2.1 |
| 16 | $[2,6\text{-dimethylanilinium}][BAr^F_4]$ | 2.9 |
| | Temperature | |
| 17 | −110° C. | 5.40 |
| 18[a] | 25° C. | 1.33 |

Several additional experiments were performed in an effort to further explore the reaction space for catalysis. Table 34 lists variations on solvent, reductant, acid, and temperature. While none of these conditions led to an improvement in catalysis, they do reveal some of the trends in conditions that enable catalytic turnover. As one can gather from entries 1-5, the solvent scope for catalysis is limited to relatively non-polar ethereal solvents. Unsurprisingly, $iPr_2O$ serves equally well as $Et_2O$ in the reaction, but moving to a more polar solvent in DME results in a substantial drop in $NH_3$ yield, likely due enhanced reactivity between the reductant and acid. Furthermore, the presence of some ethereal solvent is important, likely due to the need to dissolve the $HBAr^F_4$ acid, as is evidenced by the low yields of $NH_3$ in toluene (entry 4), compared with much higher yields when even a small amount of $Et_2O$ is included in the reaction mixture (entry 5). The lower yield of $NH_3$ in $Bu_2O$ is likely similarly explained by lowered solubility of $HBAr^F_4$.

Aside from solvent, the reaction in some embodiments is sensitive to the choice of reductant. Although other evidence supports the presence of a molecular catalyst, some sort of graphite bound complex as the catalytically active species cannot be ruled out. Entry 6 illustrates that Na/Hg is also competent for catalysis, albeit only nominally, suggesting that graphite is not an essential component of the reaction mixture. The strong homogeneous reductant $NaC_{10}H_8$ yielded substantial, but not catalytic, quantities of $NH_3$ and $MgC_{14}H_{10}$ provided relatively low yields of $NH_3$. The lower yields of $NH_3$ with the homogeneous reductants $Cp^*_2Co$ and $Cp^*_2Cr$ may be due to their more positive potentials relative to the other reductants canvassed. These more positive potentials should not allow for formation of $[(TPB^{iPr})Fe(N_2)][Na(12\text{-}C\text{-}4)_2]$ and the lowered efficacy of these reductants perhaps indicates the need to form $[(TPB^{iPr})Fe(N_2)][Na(12\text{-}C\text{-}4)_2]$ under turnover.

Various acids have also been investigated for their efficacy in promoting turnover (Table 34, entries 12-16). While $HBAr^F_4 \cdot 2\ Et_2O$ is a strong acid and functions well for turnover, other strong acids in HOTf and HCl result in lower yields of $NH_3$. The acid used by both Schrock and Nishibayashi, $[Lutidinium][BAr^F_4]$, also does not result in catalytic turnover, but switching to other nitrogen based acids in [2,6-dimethylanilinium][OTf] or $[2,6\text{-dimethylanilinium}][BAr^F_4]$ does result in catalytic $NH_3$ formation. This result is somewhat surprising, as the pKa values for these acids are comparable with [Lutidinium] having a $pK_a$ of 6.77 and [2,6-dimethylanilinium] having a $pK_a$ of 3.95.[34,35] The cause of the disparate reactivity between these two acids is not clear, but the stark difference may indicate a required $pK_a$ for turnover that is bracketed by the values for the two acids in question.

Finally, while the initial reaction screening was carried out at −78° C., we desired to further test the dependence of turnover on temperature. Previously, we had reported that catalytic runs at room temperature resulted in significantly lowered yields of $NH_3$ (entry 18).[24] In contrast, we wanted to determine whether the catalysis was compatible with even lower temperatures. Interestingly, the turnover is still viable at temperatures as low as −110° C. (entry 10). Although we cannot exclude the possibility that reaction in this case only occurred upon warming in these runs, the conversion of the bronze color of $KC_8$ to black graphite in the cold reaction mixture suggests reaction at these temperatures may be occurring. Furthermore, attempts to quench the reaction at −78° C. with either [TBA][CN] or t-BuNC still resulted in the formation of 3.50 and 1.67 equivalents of $NH_3$ respectively. The lowered activity suggests that quenching is occuring, but that some catalysis had already occurred at low temperature. These results are also consistent with catalytic activity at very low temperatures.

CONCLUSIONS

These combined studies varying both the pre-catalyst and the reaction conditions for the Fe-mediated reduction of $N_2$ to $NH_3$ provide several key insights on the catalysis. Firstly, all evidence still supports the agency of a molecular species. The results are generally consistent with a molecular species as the active catalyst. Furthermore, the flexible Fe—B linkage in the TPB scaffold is empirically important for catalysis. Although other ligand scaffolds with light atoms in the axial position are viable for turnover, it is unclear whether a differing mechanism enables catalysis in this system. Additionally, turnover is unsurprisingly sensitive to the exact ligand set employed as well as the reaction conditions. While all of the conditions surveyed showed a decrease in catalytic activity relative to our original report, several variations on the reaction conditions did preserve catalytic activity, providing motivation that alternate conditions to improve the catalysis may be available. Indeed, even slight steric variation in the ligand set or in the choice of solvent seems to have a significant impact on the catalysis. Taken together, the studies presented here delineate the conditions and structures that are required for catalytic turnover.

Experimental

General Considerations. Unless otherwise noted, all compounds were purchased from commercial sources and used without further purification. Complexes $4^{25}$ and $6^{26}$ as well as $[(TPB^{iPr})Fe(N_2)][Na(12-C-4)_2]$,[21] $[(DPB)Fe]_2(\mu-1,2-N_2)$,[30] $MgC_{14}H_{10}$, $TPB^{iPr}$,[32] $TPB^{Ph}$,[27] $2-Cy_2PC_6H_4Br$,[36] and $HBAr^F_4 \cdot 2 Et_2O$[37] were prepared according to literature procedures. All manipulations were carried out under an $N_2$ atmosphere utilizing standard glovebox or Schlenk techniques. Solvents were dried and de-oxygenated by an argon sparge followed by passage through an activated alumina column purchased from S.G. Waters Company. Solvents for catalytic runs were additionally stirred for more than 2 hours over Na/K alloy then filtered prior to use.

IR spectra were obtained via KBr pellets on a Bio-Rad Excalibur FTS 3000 spectrometer using Varian Resolutions Pro software set at 4 cm$^{-1}$ resolution. Alternately, IR spectra were obtained on a Bruker Alpha ATR spectrometer on solid samples. NMR measurements were obtained on Varian 300 MHz or 500 MHz spectrometers. Deuterated solvents for these measurements were obtained from Cambridge Isotope Laboratories and were dried and degassed prior to use. All $^1H$ NMR spectra were referenced to residual solvent peaks while $^{31}P$ NMR measurements were referenced to an external standard of $H_3PO_4$ and $^{11}B$ NMR spectra were referenced to an external standard of $Et_2O \cdot BF_3$. UV-Visible spectra were taken on a Cary 50 spectrometer from 1100 nm to 200 nm in the fast scan mode. Samples were prepared in a 1 cm path length quartz cuvette. All samples had a blank sample background subtraction applied.

XRD data was obtained at low temperatures on a Siemens or Bruker Platform three-circle diffractometer coupled to a Bruker-AXS Smart Apex CCD detector with graphite-monochromated Mo Kα radiation (λ=0.71073), performing φ-and ω-scans. Data for complex 4 was collected on with synchrotron radiation at the Stanford Synchrotron Radiation Laboratory (SSRL) beam line 12-2 at 17 keV using a single phi axis and recorded on a Dectris Pilatus 6M. The images were processed using XDS[38] and further workup of the data was analogous to the other datasets. All structures were solved by standard direct or Patterson methods and refined against $F^2$ using the SHELX program package.[39,40,41] All atoms, with the exception of hydrogens, have been anisotropically refined. The hydrogen atoms bonded to atoms of interest, namely N or O, have been located in the difference map and refined semi-freely. All other hydrogen atoms were included via a standard riding model.

Catalytic runs and $NH_3$ quantification were performed in a manner identically to that previously reported.[24] Ammonia quantification was also performed as previously described.[42] The only exception being that a large excess of reductant was used in Na/Hg (10% by weight) runs (0.280 g, 0.140 mmol). Procedural details and results for all catalytic runs can be found infra.

$TPB^{Cy}$, 7. A schlenk tube with a stir bar was filled with a solution of 2-dicyclohexylphosphinebromobenzene (1.000 g, 2.830 mmol) in toluene (10 mL) and sealed. The schlenk tube was then hooked up to a schlenk line under a stream of $N_2$ and the Teflon stopper of the schlenk tube was replaced with a rubber septum. The reaction vessel was then cooled to −78° C. A 1.6 M solution of n-BuLi in hexane (1.77 mL, 2.830 mmol) was then slowly added via syringe. The resulting solution turned slightly orange while stirring for 15 min at −78° C. The solution was then warmed to ambient temperature and stirred for an additional hour before being cooled back to −78° C. At this time a 1 M solution of $BCl_3$ in heptane (0.92 mL, 0.920 mmol) was added to the stirring reaction vessel. The pale orange color of the solution lightened slightly upon addition of the $BCl_3$. The septa was exchanged with a Teflon stopcock and the solution was allowed to stir at −78° C. for 1 hour before being warmed to room temperature and stirred for an additional 2 hours during which time a brown color developed in the solution. The mixture was then heated to 90° C. for 16 hours during which time the brown color lightened to orange and solids precipitated. Solvent was removed in vacuo and the remaining waxy solid was extracted 3× with $Et_2O$ (10 mL) and filtered. The remaining pale orange solution was concentrated to half volume and cooled to −35° C. for 16 hours which resulted in the formation of white crystals of the title compound (0.426 g, 0.513 mmol, 55%). $^1H$ NMR ($C_6D_6$, δ): 8.30 (br s, 4H), 7.46 (br s, 4H), 7.24 (br s, 2H), 7.18 (m, 2H), 1.93 (br m, 12H), 1.71 (br m, 12H), 1.63 (br s, 12H), 1.36 (br s, 8H), 1.17 (br m, 22H). $^{31}P\{^1H\}$ NMR ($C_6D_6$, δ): −2.54 (br s). $^{11}B\{^1H\}$ NMR ($C_6D_6$, δ): 25.68 (vbr s). $^{13}C\{^1H\}$ NMR ($C_6D_6$, δ): 159.69 (br s), 136.12 (br s), 131.97 (s), 127.30 (s), 35.83 (s), 31.29 (br s), 30.27 (s), 27.86 (d, J=20 Hz), 27.01 (s).

$(TPB^{iPr})FeCl$, 5. A mixture of $FeCl_2$ (0.087 g, 0.69 mmol), $TPB^{iPr}$ (0.400 g, 0.69 mmol), Fe powder (0.415 g, 7.40 mmol), and THF (20 mL) was heated to 90° C. in a sealed schlenk tube under vigorous stirring for 3 days, during which time the color of the liquid phase turned from pale yellow to brown. The solids were removed from the mixture by filtration, and the solvent was removed in vacuo. The brown residue was then triturated then extracted with pentane (200 mL) and filtered through celite to give a brown solution. Solvent evaporation in vacuo afforded the product as a greenish brown powder (0.422 g, 90%). An analytically pure sample was obtained by slow concentration of a saturated pentane solution. Crystals suitable for XRD analysis were obtained upon cooling a saturated solution of 5 in pentane to −35° C. $^1H$ NMR ($C_6D_6$, δ): 96.93 (br s), 35.00 (s), 23.59 (s), 9.77 (br s), 5.76 (s), 1.89 (br s), 1.62 (sh), −0.24 (s), −2.22 (br s), −22.39 (s). UV-vis (THF, nm $\{cm^{-1}M^{-1}\}$): 280 $\{2.0 \cdot 10^4\}$, 320 $\{sh\}$, 560 $\{sh\}$, 790 $\{150\}$, 960 {190}. $\mu_{eff}$($C_6D_6$, Evans method, 20° C.): 4.0 $\mu_B$. Anal. calcd. for $C_{36}H_{54}BClFeP_3$: C, 63.41; H, 7.98; found: C, 63.16; H, 7.72.

(TBP$^{Cy}$)FeCl, 8. A mixture of $FeCl_2$ (0.076 g, 0.60 mmol), 7 (0.500 g, 0.60 mmol), Fe powder (0.333 g, 6.02 mmol), and THF (10 mL) was heated to 90° C. in a sealed schlenk tube under vigorous stirring for 3 days, during which time the color of the liquid phase turned from pale yellow to brown. The solids were removed from the mixture by filtration, and the solvent was removed in vacuo. The brown residue was then triturated then extracted with pentane (200 mL) and filtered through celite to give a brown solution. Solvent evaporation in vacuo afforded the product as a greenish brown powder (0.460 g, 83%). An analytically pure sample and crystals suitable for XRD analysis were obtained by slow concentration of a saturated pentane solution. $^1$H NMR ($C_6D_6$, δ): 81.75 (br s), 36.12 (s), 25.66 (s), 17.65 (br s), 5.01 (s), 3.77 (br s), 1.85 (s), 1.56 (br s), 0.14 (s), −0.13 (s), −0.58 (s), −0.74 (sh), −1.54 (s), −1.97 (br s), −3.87 (br s), −5.92 (br s), −7.12 (br s), −23.01 (s). UV-vis (THF, nm {$cm^{-1}$ $M^{-1}$}): 560 {130}, 750 {100}, 950 {150}. $\mu_{eff}$ ($C_6D_6$, Evans method, 20° C.): 3.8 $\mu_B$, Anal. calcd. for $C_{54}H_{78}BClFeP_3$: C, 70.33; H, 8.52; found: C, 70.45; H, 8.49.

(TPB$^{Ph}$)FeCl, 9. A Schlenk tube was charged with TPB$^{Ph}$ (0.923 g, 1.240 mmol), $FeCl_2$ (0.198 g, 1.560 mmol) and Fe powder (0.176 g, 3.160 mmol) and THF (50 mL). The reaction was stirred vigorously for 3 days at 70° C., during which time the slurry turned dark brown. The mixture was filtered through celite to remove the excess iron powder and the volatiles removed in vacuo. The residual solids were triturated with toluene, slurried in $CH_2Cl_2$ and filtered to collect a dark brown powder (0.841 g, 76%). Crystals suitable for X-ray analysis were grown by slow concentration of a $C_6H_6$ solution. $^1$H NMR ($d_8$-THF, δ): 34.23, 23.92, 9.90, 7.30, 4.73, 2.31, −23.84. $\mu_{eff}$ ($d_8$-THF, Evans method, 25° C.): 4.0 $\mu_B$. We were unable to obtain satisfactory elemental analysis.

(TPB$^{Ph}$)Fe, 10. Sodium (0.003 g, 0.148 mmol) and mercury (0.500 g) were stirred vigorously with $C_6H_6$ (1 mL). A slurry of (TPB$^{Ph}$)FeCl (0.095 g, 0.107 mmol) in $C_6H_6$ (10 mL) was added and the reaction mixture stirred for 6 hours at room temperature. The resulting dark red mixture was filtered and lyophilized (0.080 g, 88%). Crystals suitable for X-ray analysis were grown by vapor diffusion of diethyl ether into a concentrated THF solution at −35° C. $^1$H NMR ($C_6D_6$, δ): 8.38 (t, J=8.4 Hz, 2H), 7.94 (d, J=7.4 Hz, 1H), 7.85 (t, J=7.3 Hz, 2H), 7.59 (ddt, J=9.6, 7.3, 3.1 Hz, 4H), 7.41 (d, J=7.5 Hz, 1H), 7.31-7.17 (m, 6H), 7.09-6.79 (m, 12H), 6.73 (dd, J=4.4, 2.6 Hz, 3H), 6.60 (t, J=8.6 Hz, 2H), 6.54-6.42 (m, 2H), 6.33-6.15 (m, 2H), 6.04 (t, J=5.9 Hz, 1H), 4.42 (q, J=6.7 Hz, 1H), 4.16 (q, J=5.6 Hz, 1H), 3.89 (d, J=6.1 Hz, 1H), 3.62 (q, J=6.6 Hz, 1H). $^{13}$C{$^1$H} NMR ($C_6D_6$, δ): 160.5 (s), 145.7 (d, J=7.0 Hz), 144.1 (s), 143.8 (s), 142.9 (s), 142.5 (s), 141.9 (s), 141.5 (s), 140.9 (s), 140.6 (s), 139.8 (s), 139.7 (s), 137.7 (s), 137.4 (s), 136.0 (d, J=10.8 Hz), 135.6 (s), 135.2 (m), 134.8 (s), 134.6 (s), 132.9 (m), 132.3 (d, J=8.7 Hz), 132.0 (d, J=7.3 Hz), 130.9 (m), 129.2 (s), 129.0 (s), 128.7 (s), 126.9 (m), 126.3 (d, J=8.7 Hz), 125.9 (s), 124.3 (s), 123.8 (d, J=6.6 Hz), 123.6 (d, J=6.5 Hz), 109.2 (d, J=15.7 Hz), 94.0 (d, J=14.3 Hz), 88.6 (s), 87.0 (s), 85.8 (s), 85.5 (m). $^{31}$P{$^1$H} NMR ($C_6D_6$, δ): 85.65 (d, J=81.8 Hz), 69.65 (d, J=82.2 Hz), −12.92 (s). $^{11}$B{$^1$H} ($C_6D_6$, δ): 15.9. Anal. calcd. for $C_{54}H_{42}BFeP_3$: C, 76.26; H, 4.98. Found: C, 76.69; H, 5.59.

[(TPB$^{Cy}$)Fe($N_2$)][Na(12-C-4)$_2$], 1. Sodium (0.030 g, 1.304 mmol) and mercury (1.0 g) were mixed in a vial with a stir bar. Complex 8 (0.137 g, 0.150 mmol) was dissolved in THF (10 mL) and added to the freshly prepared Na/Hg amalgam. The resulting mixture was vigorously stirred for 1 hour during which time the color of the solution changed from dark brown to a deep red. The solution was then filtered through celite and volatiles were removed in vacuo to yield a red residue. This residue was taken up in $Et_2O$ (10 mL) and again filtered through celite to provide a dark red solution. 12-C-4 (0.052 g, 0.297 mmol) was added and the resulting solution was allowed to sit over which time the product precipitated as red crystals. $^1$H NMR (THF-$d_8$, δ): 18.48 (vbr s), 12.50 (br s), 10.02 (s), 7.97 (vbr s), 7.04 (br s), 5.90 (br s), 5.51 (br s), 4.22 (br s), 3.79 (s, [Na(12-C-4)$_2$]), 2.12 (br s), 1.65 (br s), 1.50 (br s), 0.96 (vbr s), 0.56 (br s), 0.30 (br s), 0.06 (br s), −1.11 (vbr, s), −3.71 (vbr s). IR (ATR, solid): $v_{NN}$=1905 $cm^{-1}$. UV-vis (THF, nm {$cm^{-1}$ $M^{-1}$}): 500 {sh}, 850 {40}. $\mu_{eff}$(THF-$d_8$, Evans method, 20° C.): 1.6 $\mu_B$. Anal. calcd. for $C_{70}H_{110}BFeN_2NaO_8P_3$: C, 65.16; H, 8.59; N, 2.17; found: C, 64.89; H, 8.57; N, 2.21.

[(TPB$^{Ph}$)Fe($N_2$)][Na(12-C-4)$_2$], 2. Naphthalene (0.005 g, 0.039 mmol) was weighed into a vial with Na (0.01 g, 0.435 mmol), THF (2 mL) and a stir bar. The resulting mixture was then vigorously stirred for 2 hours over which time the liquid phase became dark green. The resulting solution of $NaC_{10}H_8$ was then filtered through a glass fiber filter paper into a −35° C. solution of 10 (0.030 g, 0.035 mmol) in THF (2 mL) which rapidly changed color from orange to dark red. The resulting solution was stirred for an additional 10 minutes before volatiles were removed. The dark red residue was washed 3× with pentane (2 mL) and then extracted into $Et_2O$ (10 mL) and filtered through celite. The resulting red solution was then treated with 12-C-4 (0.013 g, 0.074 mmol) and a fine red powder immediately precipitated. The mixture was allowed to stand for 1 hour before the supernatant was decanted and the resulting red solids were washed 3× with $Et_2O$ (2 mL) to yield the title compound as a red powder (0.029 g, 66%). $^1$H NMR (THF-$d_8$, δ): 11.61 (br s), 9.75 (br s), 8.66 (s), 8.42 (s), 6.96 (vbr s), 6.03 (br s), 3.66 (s, [Na(12-C-4)$_2$]), 0.35 (vbr s), −0.07 (s), −0.80 (vbr s). IR (ATR, solid): vNN=1988 $cm^{-1}$. UV-vis (THF, nm {$cm^{-1}$ $M^{-1}$}): 500 {sh}. $\mu_{eff}$ (THF-$d_8$, Evans method, 20° C.): 1.7 $\mu_B$. Complex 2 is unstable to prolonged vacuum which precluded satisfactory combustion analysis.

[(DPB)Fe($N_2$)][K(Bz15-C-5)$_2$], 3. A solution of [(DPB)Fe]$_2$(μ-1,2-$N_2$) (0.025 g, 0.023 mmol) and K/Hg amalgam (1 g, 1% K by weight) in THF (1 mL) was stirred at RT for 4 hr. The dark red solution was decanted and filtered through glass fiber filter paper onto solid Bz15-C-5 (0.026 g, 0.098 mmol). Solvent was removed in vacuo and the resulting solids were washed 3× with $Et_2O$ (1 mL) and $C_6H_6$ (3×1 mL) to give dark solids of 3 (0.048 g, 0.042 mmol, 90%). Single crystals were grown by layering a THF solution with $Et_2O$ and pentane. $^1$H NMR (THF-$d_8$, δ) 14.50, 12.05, 6.86 (C), 6.73 (C), 3.85 (C), 3.72 (C), 2.80, 1.01, −2.72, −4.78. IR (ATR, thin film); $v_{NN}$=1935 $cm^{-1}$. Anal. calcd. for $C_{58}H_{81}BFeKN_2O_{10}P_2$: C, 61.43; H, 7.20; N, 2.47; found: C, 60.09; H, 7.33; N, 1.71.

[2,6-dimethylanilinium][OTf]. 2,6-dimethylaniline (0.500 g, 4.1 mmol) was dissolved in pentane (10 mL). This solution was then cooled to −35° C. before HOTf (0.619 g, 4.1 mmol) was added to the solution with stirring. Upon addition of HOTf, white precipitate formed, and the resulting suspension was allowed to warm to RT and was stirred for 1 hour. After this time, the solids were allowed to settle before the supernatant was decanted off. The solids were then dried under vacuum and subsequently washed 3× with pentane (5 mL) and 3× with $Et_2O$ (5 mL) to yield the title compound as a white powder (0.894 g, 3.30 mmol, 80%). $^1$H NMR (10:1 CDCl$_3$:DMSO-d$_6$, δ) 7.06 (vbr s), 6.84 (m, 3H), 2.14 (s, 6H). $^{13}$C NMR (10:1 CDCl$_3$:DMSO-d$_6$, δ) 131.6 (s), 129.1 (s), 128.2 (s), 128.0 (s), 17.5 (s). Anal. calcd. for C$_9$H$_{12}$F$_3$NO$_3$S: C, 39.85; H, 4.46; N, 5.16; found: C, 39.84; H, 4.37; N, 4.90.

[2,6-dimethylanilinium][BAr$^F_4$].1 Et$_2$O. 2,6-dimethylaniline (0.036 g, 0.296 mmol) was dissolved in Et$_2$O (3 mL). To this was added a solution of HBAr$^F_4$.2 Et$_2$O (0.300 g, 0.296 mmol) in Et$_2$O (3 mL) and the resulting clear solution was allowed to stir for 1 hour. After this time, the solution was concentrated to 3 mL and layered with pentane (3 mL) and cooled to −35° C. for 3 days, over which time white crystals of the product formed (0.200 g, 0.182 mmol, 62%). $^1$H NMR (10:1 CDCl$_3$:DMSO-d$_6$, δ) 7.65 (s, 8H), 7.5 (vbr s, 3H), 7.48 (s, 4H), 7.11 (m, 1H), 7.04 (m, 2H), 3.43 (q, J=7 Hz, 4H), 2.30 (s, 6H), 1.15 (t, J=7 Hz, 6H). $^{13}$C NMR (10:1 CDCl$_3$: DMSO-d$_6$, δ) 161.5 (q), 134.5 (s), 131.1 (s), 129.4 (s), 128.6 (m), 125.7 (s), 123.0 (s), 120.2 (s), 117.3 (s), 65.6 (s), 17.5 (s), 15.0 (s). Anal. calcd. for C$_{44}$H$_{34}$BF$_{24}$NO: C, 49.88; H, 3.23; N, 1.32; found: C, 49.77; H, 3.03; N, 1.24.

REFERENCES

1 Smil, V. *Enriching the Earth*; MIT Press: Cambridge Mass., 2001.
2 Schlögl, R. In *Handbook of Heterogeneous Catalysis*; Wiley-VCH Verlag GmbH & Co. KGaA: 2008.
3 Eady, R. R. *Chem. Rev.* 1996, 96, 3013-3030.
4 Burgess, B. K.; Lowe, D. J. *Chem. Rev.* 1996, 96, 2983-3011.
5 Chatt, J.; Dilworth, J. R.; Richards, R. L. *Chem. Rev.* 1978, 78, 589-625.
6 Hidai, M.; Mizobe, Y. *Chem. Rev.* 1995, 95, 1115-1133.
7 Yandulov, D. V.; Schrock, R. R. *Science* 2003, 301, 76-78.
8 Schrock, R. R. *Acc. Chem. Res.* 2005, 38, 955-962.
9 Arashiba, K.; Miyake, Y.; Nishibayashi, Y. *Nature Chem.* 2011, 3, 120-125.
10 Saouma, C. T.; Peters, J. C. *Coord. Chem. Rev.* 2011, 255, 920-937.
11 Hendrich, M. P.; Gunderson, W.; Behan, R. K.; Green, M. T.; Mehn, M. P.; Betley, T. A.; Lu, C. C.; Peters, J. C. *Proc. Natl. Acad. Sci. U.S.A.* 2006, 103, 17107-17112.
12 Brown, S. D.; Peters, J. C. *J. Am. Chem. Soc.* 2005, 127, 1913-1923.
13 Lee, Y.; Mankad, N. P.; Peters, J. C. *Nat Chem* 2010, 2, 558-565.
14 Smith, J. M.; Lachicotte, R. J.; Pittard, K. A.; Cundari, T. R.; Lukat-Rodgers, G.; Rodgers, K. R.; Holland, P. L. *J. Am. Chem. Soc.* 2001, 123, 9222-9223.
15 Gilbertson, J. D.; Szymczak, N. K.; Tyler, D. R. *J. Am. Chem. Soc.* 2005, 127, 10184-10185.
16 Field, L. D.; Li, H. L.; Magill, A. M. *Inorg. Chem.* 2008, 48, 5-7.
17 Hoffman, B. M.; Dean, D. R.; Seefeldt, L. C. *Acc. Chem. Res.* 2009, 42, 609-619.
18 Peters, J. C.; Mehn, M. P. In *Activation of Small Molecules*; Wiley-VCH Verlag GmbH & Co. KGaA: 2006, p 81-119.
19 Rodriguez, M. M.; Bill, E.; Brennessel, W. W.; Holland, P. L. *Science* 2011, 334, 780-783.
20 Yuki, M.; Tanaka, H.; Sasaki, K.; Miyake, Y.; Yoshizawa, K.; Nishibayashi, Y. *Nature Comm.* 2012, 3, 1254-1254.
21 Moret, M.-E.; Peters, J. C. *Angew. Chem. Int. Ed.* 2011, 50, 2063-2067.
22 Moret, M.-E.; Peters, J. C. *J. Am. Chem. Soc.* 2011, 133, 18118-18121.
23 Anderson, J. S.; Moret, M.-E.; Peters, J. C. *J. Am. Chem. Soc.* 2013, 135, 534-537.
24 Anderson, J. S.; Rittle, J.; Peters, J. C.; *Nature,* 2013, In Press.
25 Betley, T. A.; Peters, J. C. *J. Am. Chem. Soc.* 2003, 125, 10782-10783.
26 Gilbert-Wilson, R.; Field, L. D.; Colbran, S. B.; Bhadbhade, M. M. *Inorg. Chem.* 2013, 52, 3043-3053.
27 Kameo, H; Hashimoto, Y.; Nakazawa, H. *Organometallics* 2012, 31, 3155-3162
28 Tolman, C. A. *Chem. Rev.* 1977, 77, 313-348.
29 Bontemps, S.; Gornitzka, H.; Bouhadir, G.; Miqueu, K.; Bourissou, D. *Angew. Chem. Int. Ed.* 2006, 45, 1611-1614.
30 Suess, D. L. M.; Peters, J. C. *J. Am. Chem. Soc.* 2013, 135, 4938-4941.
31 Suess, D. L. M.; Peters, J. C. *J. Am. Chem. Soc.* 2013.
32 Bontemps, S.; Bouhadir, G.; Dyer, P. W.; Miqueu, K.; Bourissou, D. *Inorg. Chem.* 2007, 46, 5149-5151.
33 S. E. Creutz, J. C. Peters, *J. Am. Chem. Soc.* 2013, 136, 1105-1115.
34 Chrystiuk, E.; Williams, A. *J. Am. Chem. Soc.* 1987, 109, 3040-3046.
35 Beale, R. N. *J. Chem. Soc.* 1954, 4494-4499.
36 Murata, M.; Buchwald, S. L. *Tetrahedron* 2004, 60, 7397-7403.
37 Brookhart, M.; Grant, B.; Volpe, A. F. *Organometallics* 1992, 11, 3920-3922.
38 Kabsch, W. *J. Appl. Cryst.* 1993, 26, 795.
39 Sheldrick, G. M. *Acta Cryst.* 1990, A46, 467.
40 Sheldrick, G. M. *Acta Cryst.* 2004, A64, 112.
41 Müller, P. *Crystallography Reviews* 2009, 15, 57.
42 Weatherburn, M. W. *Anal. Chem.* 1967, 39, 971-974.

EXAMPLE 5

Comparison of Molecular Co and Fe Complexes in the Catalytic Conversion of N$_2$ to NH$_3$ Abstract The synthesis of a series of tris(phosphino)borane-ligated Co complexes is reported. The reactivity of these species with proton and electron sources in the presence of N$_2$ at −78° C. is described, and notably [(TPB)Co(N$_2$)][Na(12-crown-4)$_2$] (TPB=[o-($^i$Pr$_2$P)C$_6$H4]$_3$B) is found to mediate the formation of 2.4 equivalents of NH$_3$/Co under these conditions.

It is well understood that the ability of a molecular system to activate bound dinitrogen (N$_2$) relates to the propensity of that system to mediate functionalization of the N$_2$ moiety. This principle is evidenced, for example, in the early reports that Mo(0) and W(0) N$_2$ complexes ($v_{(N-N)}$ 2025-1910 cm$^{-1}$) generate NH$_3$ and N$_2$H$_4$ upon treatment with acid,[1] whereas for instance HCo(N$_2$)(PPh$_3$)$_3$ (one of the earliest reported transition metal dinitrogen complexes,[2] $v_{(N-N)}$ 2088 cm$^{-1}$) only quantitatively releases N$_2$ upon treatment with acid, with no evidence for N$_2$ functionalization.[1d,3] Furthermore, this cobalt complex can be reductively deprotonated to generate more activated Co—N$_2$ complexes, such as [(PPh$_3$)$_3$ Co(N$_2$)][Li(Et$_2$O)$_3$] ($v_{(N-N)}$ 1900 cm$^{-1}$), which upon treatment with acid do produce some NH$_3$ and N$_2$H$_4$ (in this case 0.21 and 0.22 equivalents respectively).[3] With this principle in mind extensive efforts have been made to study the activation and functionalization of N$_2$ bound to metal centers of varying electronic properties.[4] Indeed in some extreme cases systems have been shown to activate bound N$_2$ to the extent that the N—N bond is fully cleaved.[5,6] Furthermore, in many cases it is has been shown that treatment of strongly activated $N_2$ complexes with acid or $H_2$ leads to some reduced nitrogen products.[1,3,6] However, this guiding principle alone has been insufficient to lead to many synthetic species capable of catalytic conversion of $N_2$ to $NH_3$. In this regard it is prudent to study the few systems known to catalyze this reaction with an emphasis on identifying important properties aside from their degree of bound $N_2$ activation.[7-9] Understanding these principles may lead to the design of better synthetic catalysts as well as providing clues as to how nitrogenase enzymes might operate.

For instance, it has recently been discovered that a tris (phosphino)borane-ligated Fe complex is capable of catalyzing the conversion of $N_2$ to $NH_3$ at $-78°$ C.[8] It has been further postulated that the success of this system in activating $N_2$ stoichiometrically and mediating its catalytic conversion to $NH_3$ may arise from important geometric variability at the metal center provided by a highly flexible Fe—B interaction.[10,11] Such geometric variability is proposed to allow a single Fe center to access different coordination environments, alternately stabilizing π-acidic or π-basic nitrogenous moieties that may be sampled along a $N_2$ fixation pathway.[6] Consistent with this hypothesis, the isostructural ($P_3X$)-ligated Fe systems have been studied and found to have a drastic dependence of activity on the identity of the X atom: with the least flexible X=Si system furnishing divergently low $NH_3$ yields, whereas the more flexible X=C or B systems afford moderate yields of $NH_3$.[8,9] However, the X=Si precursor also displays weaker $N_2$ activation than the X=C or B species (vide infra), allowing for an alternate hypothesis whereby the importance of the M-X interaction is to modulate the π-basicity of the metal center.

In an attempt to differentiate these hypotheses, we sought to explore the activity of a species displaying comparably high metal-ligand flexibility but weak $N_2$ activation. Our previous studies have shown that tris(phosphino)borane-ligated Co complexes possess a flexible Co—B interaction.[12] In addition, they only weakly activate $N_2$ and were therefore excellent candidates as a model platform for this study. For comparison with the isostructural (TPB)Fe series whose $N_2$ fixation activity we have described,[8] we decided to target an analogous redox series of $N_2$ complexes with Co supported by the TPB ligand.

The (TPB)Co($N_2$) complex (Scheme 1, 1) provided a logical entry point to the desired redox series. The cyclic voltammagram of 1 in THF displays a broad feature corresponding to an oxidation process at 0.2 V vs. Fc/Fc$^+$ and a quasi-reversible reduction wave at $-2.0$ V vs. Fc/Fc$^+$. Prompted by this result, we explored the one electron chemical reduction and oxidation of 1. Treatment of 1 with 1 equivalent of $NaC_{10}H_8$ followed by 2 equivalents of 12-crown-4 generates diamagnetic [Na(12-crown-4)$_2$)] [(TPB)Co($N_2$)] as red crystals (Scheme 1, 2).

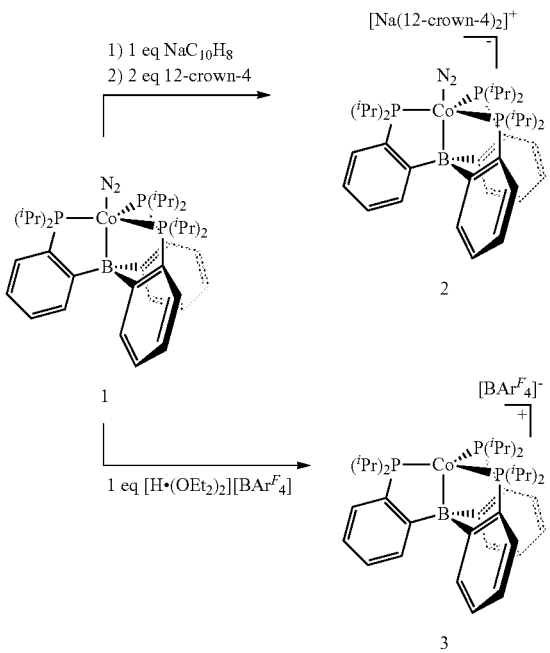

Scheme 1. Oxidation and Reduction of (TPB)Co($N_2$)

The $v_{(N-N)}$ stretch of 2 is lower in energy than that of 1, 1978 and 2089 cm$^{-1}$ respectively, and the solid state structure of 2 displays contracted Co—N, Co—B, and Co—P distances compared to 1, consistent with increased backbonding to each of these atoms. The one-electron oxidation of 1 can be achieved by addition of 1 equivalent of [H. (OEt$_2$)$_2$][BAr$^F_4$] at low temperature followed by warming, which generates red-purple [(TPB)Co][BAr$^F_4$] (Scheme 1, 3, BAr$^F_4$=tetrakis(3,5-bistrifluoromethlyphenyl)borate). SQUID magnetometry measurements indicate that 3 adopts a high spin (S=1) state in the solid state with no evidence for spin crossover. The structure of 3 confirms that [(TPB)Co] [BAr$^F_4$] does not bind $N_2$ in the solid state. The lack of dinitrogen binding at room temperature for 3 is consistent with the behavior of the isostructural Fe complex, [(TPB) Fe][BAr$^F_4$].[14]

An assessment of the degree of Co—B bond flexibility of the (TPB)Co scaffold can be made by comparing the metal-boron interatomic distances of the halide species (TPB)CoBr and the $N_2$ anion 2, an analogous comparison can be made for the isostructural (TPB)Fe complexes. In the (TPB)Fe series, the Fe—B distance decreases upon reduction and $N_2$ coordination from 2.458(5) Å in (TPB)FeBr to 2.293(3) Å in [Na(12-crown-4)$_2$)][(TPB)Fe($N_2$)] ($\Delta_{M-B}$=0.165 Å).[11] In the (TPB)Co series, the Co—B distance also decreases upon reduction and $N_2$ coordination from 2.4629(8) Å in (TPB) CoBr$^{12}$ to 2.301(3) Å in 2 ($\Delta_{M-B}$=0.162 Å). This evidence suggests that the (TPB)Co platform exhibits a similar degree of axial ligand flexibility to that observed for the (TPB)Fe system. Furthermore, the $N_2$ ligand of 2 is less activated, as evidenced by vibrational spectroscopy, than the analogous (TPB)Fe, (CP$_3$)Fe, or (SiP$_3$)Fe complexes whose relative $N_2$ fixation activity we have described (FIG. 1, SiP$_3$=[o-($^i$Pr$_2$P) $C_6H_4$]$_3$Si, CP$_3$=[o-($^i$Pr$_2$P)$C_6H_4$]$_3$C). This is as expected for the generally less π-basic metal center, attributable to the less spatially diffuse d-orbitals of Co.

Figure 83:
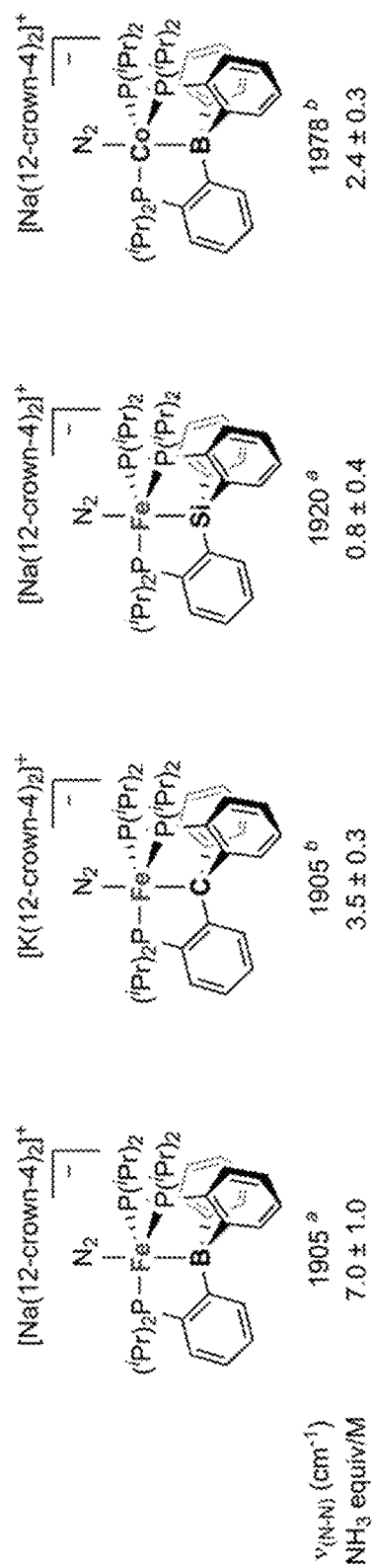
FIG. 83. Catalytic competence and vibrational spectroscopy data for select (P$_3$X)M(N$_2$)$^-$ complexes. Data for M=Fe, X=B is from refs. 8 and 11; data for M=Fe, X=C is from ref. 9; data for M=Fe, X=Si is from ref.s 9 and 13; and data for M=Co, X=B is from this work. $^a$IR of a KBr pellet $^b$IR of a thin film from evaporation of solvent.
Figure 84:
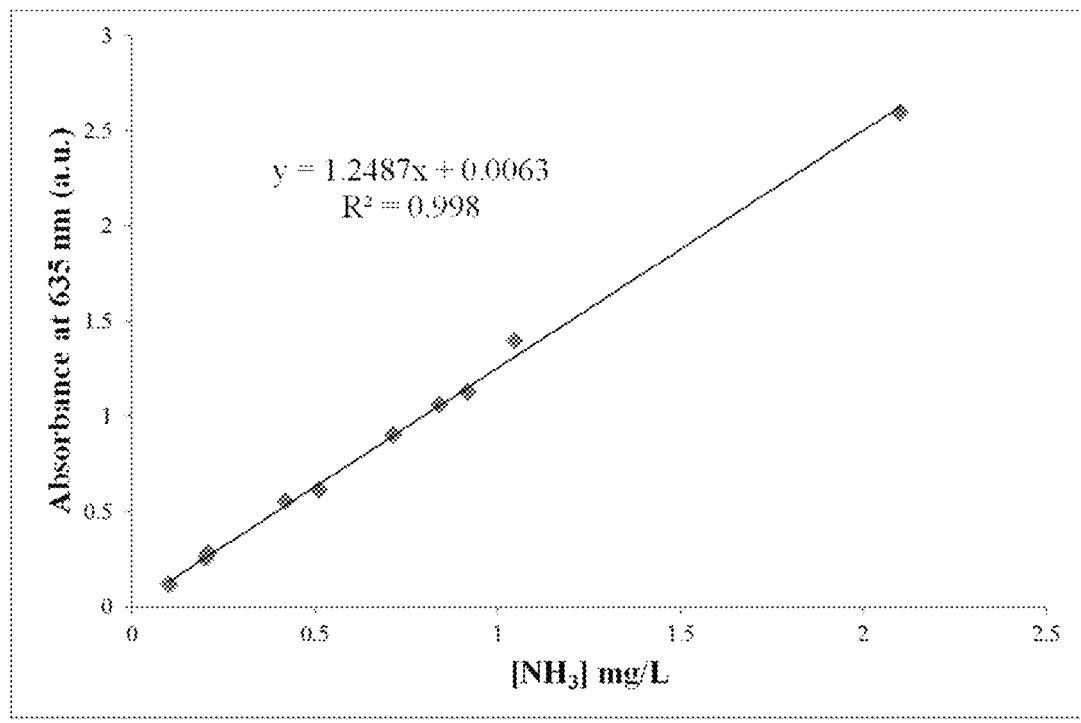
FIG. 84. Calibration curve for NH$_3$ quantification by indophenol method.
Figure 85:
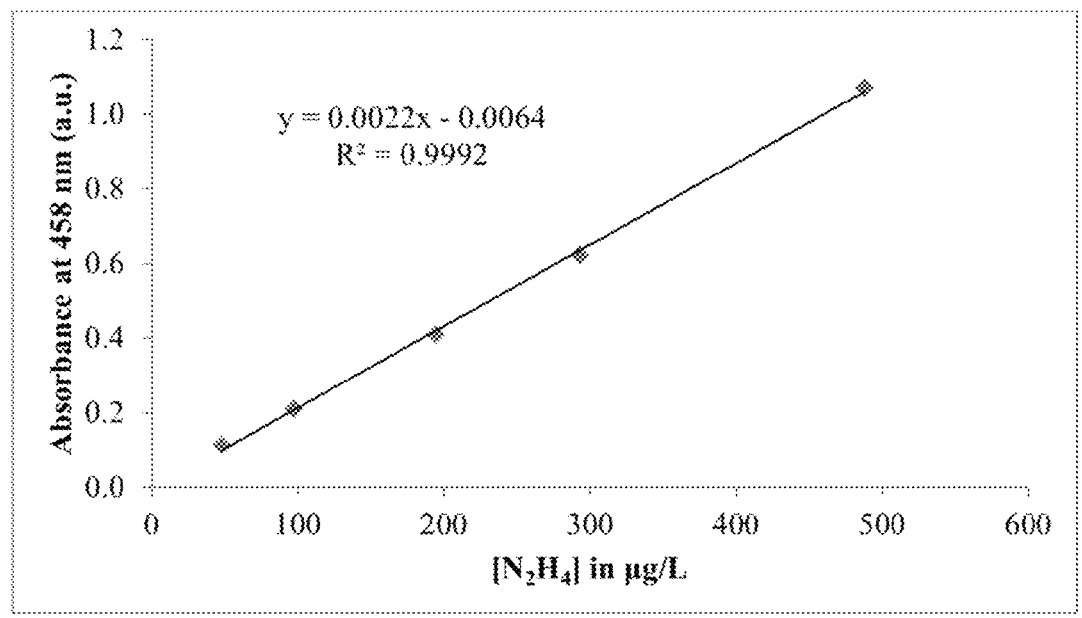
FIG. 85. Calibration curve for UV-vis quantification of hydrazine.
Figure 86:
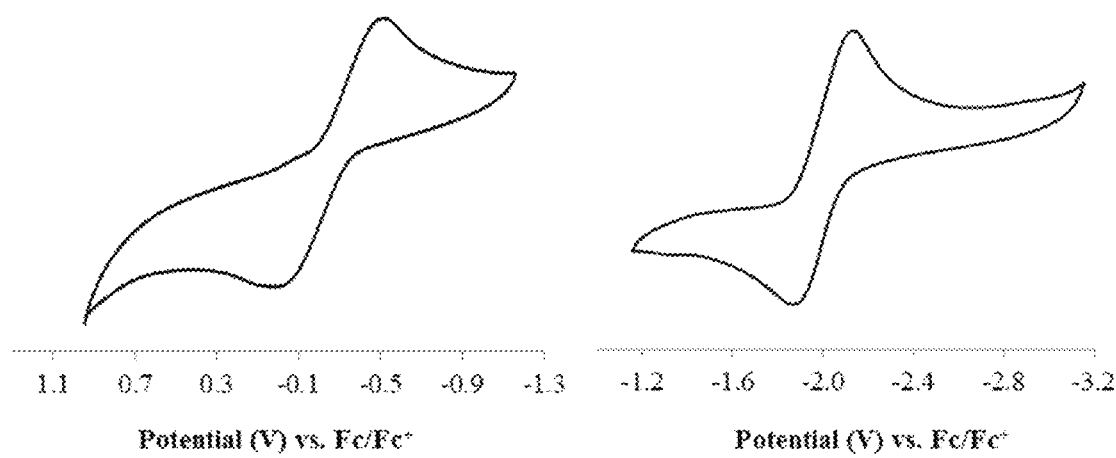
FIG. 86. Cyclic voltammagram of (TPB)Co(N$_2$) (1) scanning oxidatively (left) and reductively (right) at 100 mV/sec in THF with 0.1 M TBAPF$_6$ electrolyte.
Figure 87:
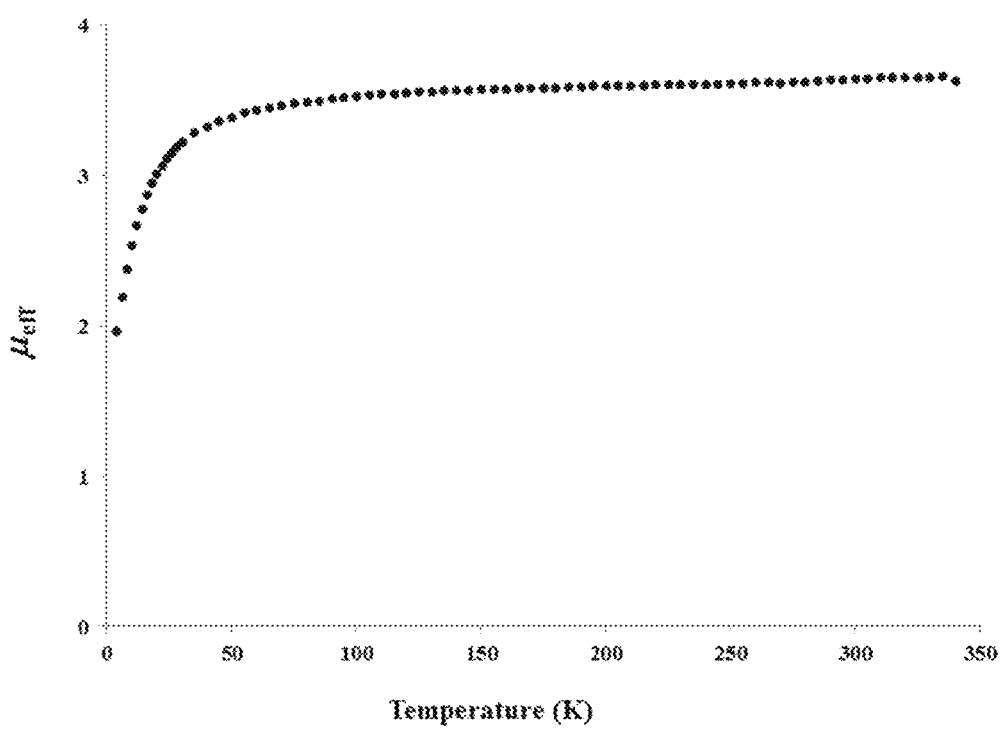
FIG. 87. Temperature dependence of the magnetic susceptibility of [(TPB)Co][BAr$^F_4$] (3) as measured by SQUID magnetometry.

The reactivity of these (TPB)Co complexes with sources of protons and electrons in the presence of $N_2$ was investigated. In analogy to the [Na(12-crown-4)$_2$][(TPB)Fe(N$_2$)] complex, treatment of a suspension of 2 in Et$_2$O at −78° C. with excess [H.(OEt$_2$)$_2$][BAr$^F_4$] followed by excess potassium graphite (KC$_8$) under an atmosphere of N$_2$ leads to the formation of 2.4±0.3 equivalents of NH$_3$ (120% per Co, average of 6 iterations, Equation 1). No hydrazine is observed. It is worth noting that each of the 6 experimental iterations under the standard conditions provided yields of ≥2.1 equivalents of NH$_3$ per Co and the most productive iteration yielded 2.8 equivalents of NH$_3$ per Co. These nominally superstoichiometric yields are consistent with modest catalytic N$_2$ conversion by a subpopulation of Co complexes. Notably, no ammonia is formed when either 2, [H.(OEt$_2$)$_2$][BAr$^F_4$], or KC$_8$ is omitted from the standard conditions, indicating that all three components are necessary for NH$_3$ production. These results, combined with our previous studies of N$_2$ fixation by (P$_3$X)M complexes, demonstrate that the degree of N$_2$ activation by the (SiP$_3$)Fe catalytic precursor is not solely responsible for the divergently low N$_2$ conversion activity of that system (FIG. 83). Indeed, [Na(12-crown-4)$_2$] [(SiP$_3$)Fe(N$_2$)] shows a higher degree of N$_2$ activation than 2, yet 2 demonstrates higher N$_2$ conversion activity.

TABLE 35

Ammonia Generation by Co Complexes Under the Standard Reaction Conditions

| Entry | Co complex | NH$_3$ equiv/Co |
| --- | --- | --- |
| A | [(TPB)Co(N$_2$)][Na(12-crown-4)$_2$]$^a$ (2) | 2.4 ± 0.3 |
| B | (TPB)Co(N$_2$) (1) | 0.8 ± 0.3 |
| C | [(TPB)Co][BAr$^F_4$] (3) | 1.6 ± 0.2 |
| D | (TPB)CoBr | 0.7 ± 0.4 |
| E | (SiP$_3$)Co(N$_2$) | <0.1 |
| F | [(NArP$_3$)CoCl][BPh$_4$] | <0.1 |
| G | (DPB)Co(N$_2$) | 0.3 ± 0.1 |
| H | (PBP)Co(N$_2$) | 0.4 ± 0.2 |
| I | Co(PPh$_3$)$_2$I$_2$ | 0.4 ± 0.1 |
| J | CoCp2 | 0.1 ± 0.1 |
| K | Co$_2$(CO)$_8$ | <0.1 |

$^a$Average of 6 iterations.
All other yields are reported as an average of 3 iterations.

Scheme 2

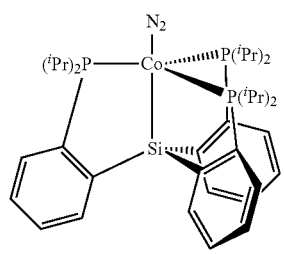

E

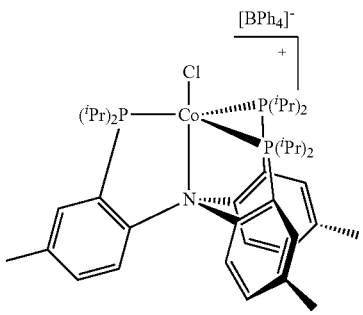

F

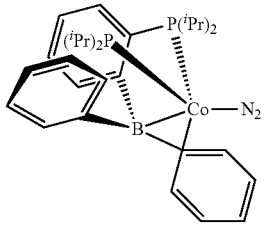

G

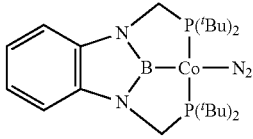

H

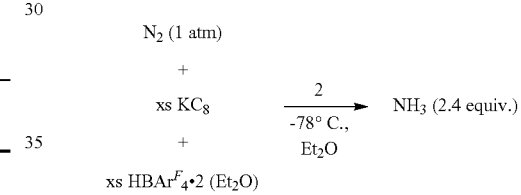

(1)

Interestingly, though anionic 2 and cationic 3 both generated substantial NH$_3$ under the standard conditions, submitting neutral 1 to these conditions provided attenuated yields of NH$_3$, comparable to the yields obtained with (TPB)CoBr (Table 35, A-D). The effect of varying the X atom in the (P$_3$X) scaffold complexes of Co was also investigated. In this context, the known X=Si complex[15] (Table 35, E) and a previously unreported X=N Co complex[16] (Table 35, F) were subjected to the standard reaction conditions. Of the (P$_3$X)Co complexes screened, only (TPB)-ligated Co complexes generated ≥0.5 equivalents of NH$_3$ per metal center, underscoring again the importance of the nature of the M-X interaction in facilitating N$_2$ fixation by complexes of this type. To further explore the generality of the observed reactivity for Co complexes, additional Co precursors were submitted to the standard reaction conditions. The precursors examined consisted of a bis(phosphino)borane-ligated Co—N$_2$ complex[17] (Table 35, G), a bis(phosphino)boryl Co—N$_2$ complex[18] (H), as well as various simple Co complexes (I-K). Again none of the precursors screened provided ≥0.5 equivalents of NH$_3$ per metal center.

To conclude, we have described a series of tris(phosphine) borane-ligated Co complexes and demonstrated the ability of a molecular Co-dinitrogen complex to facilitate the conversion of N$_2$ to NH$_3$ at −78° C. in the presence of proton and electron sources (2.4 equivalents of NH$_3$ generated per Co center on average). Importantly, the propensity of the (P$_3$X)M complexes we have studied to perform productive nitrogen fixation appears not to depend solely on the ability of the precursor complex to activate bound N$_2$. This observation provides further support for the hypothesis that the ability of these complexes to mediate the conversion of N$_2$ to NH$_3$ arises from important geometric variability at the metal center provided by a flexible M-X interaction. This report also represents the first example of superstoichiometric N$_2$ to NH$_3$ conversion by a Co-dinitrogen complex.

REFERENCES (1) (a) Chatt, J.; Pearman, A. J.; Richards, R. L. *Nature* 1975, 253, 39-40. (b) Chatt, J.; Dilworth, J. R.; Richards, R. L. *Chem. Rev.* 1978, 78, 589-625. (c) Chatt, J.; Pearman, A. J.; Richards, R. L. *J. Chem. Soc. Dalton Trans.* 1977, 1852. (d) Hidai, M.; Takahashi, T.; Yokotake, I.; Uchida, Y. *Chem. Lett.* 1980, 645-646. (e) Nishihara, H.; Mori, T.; Saito, T.; Sasaki, Y. *Chem. Lett.* 1980, 667-668.

(2) (a) Yamamoto, A.; Kitazume, S.; Pu, L. S.; Ikeda, S. *Chem. Commun.* 1967, 79-80. (b) Sacco, A.; Rossi, M. *Chem. Commun.* 1967, 316. (c) Misono, A.; Uchida, Y.; Hidai, M.; Araki, M. *Chem. Commun.* 1968, 1044.

(3) Yamamoto, A.; Miura, Y.; Ito, T.; Chen, H.; Iri, K.; Ozawa, F.; Miki, K.; Sei, T.; Tanaka, N.; Kasai, N. *Organometallics* 1983, 2, 1429-1436.

(4) (a) Bowman, A. C.; Milsmann, C.; Atienza, C. C. H.; Lobkovsky, E.; Wieghardt, K.; Chirik, P. J. *J. Am. Chem. Soc.* 2010, 132, 1676-1684. (b) Chirik, P. J. *Dalton Trans.* 2007, 16-25. (c) Crossland, J. L.; Tyler, D. R. *Coord. Chem. Rev.* 2010, 254, 1883-1894. (d) Ding, K.; Brennessel, W. W.; Holland, P. L. *J. Am. Chem. Soc.* 2009, 131, 10804-10805. (e) Duchateau, R.; Gambarotta, S.; Beydoun, N.; Bensimon, C. *J. Am. Chem. Soc.* 1991, 113, 8986-8988. (f) Hanna, T. E.; Lobkovsky, E.; Chirik, P. J. *Organometallics* 2009, 28, 4079-4088. (g) Manriquez, J. M.; Bercaw, J. E. *J. Am. Chem. Soc.* 1974, 6229-6230. (h) Nikiforov, G. B.; Vidyaratne, I.; Gambarotta, S.; Korobkov, I. *Angew. Chem. Int. Ed. Engl.* 2009, 48, 7415-7419. (i) Pickett, C. J.; Talarmin, J. *Nature* 1985, 317, 652-653. (j) Pool, J. A.; Lobkovsky, E.; Chirik, P. J. *Nature* 2004, 427, 527-530. (k) Pun, D.; Lobkovsky, E.; Chirik, P. J. *J. Am. Chem. Soc.* 2008, 130, 6047-6054. (l) Vidyaratne, I.; Crewdson, P.; Lefebvre, E.; Gambarotta, S. *Inorg. Chem.* 2007, 46, 8836-8842. (m) Yandulov, D. V; Schrock, R. R.; Rheingold, A. L.; Ceccarelli, C.; Davis, W. M. *Inorg. Chem.* 2003, 42, 796-813.

(5) (a) Clentsmith, G. K. B.; Bates, V. M. E.; Hitchcock, P. B.; Cloke, F. G. N. *J. Am. Chem. Soc.* 1999, 121, 10444-10445. (b) Gambarotta, S.; Scott, J. *Angew. Chem. Int. Ed. Engl.* 2004, 43, 5298-5308. (c) Hebden, T. J.; Schrock, R. R.; Takase, M. K.; Müller, P. *Chem. Commun.* 2012, 48, 1851-1853. (d) Keane, A. J.; Yonke, B. L.; Hirotsu, M.; Zavalij, P. Y.; Sita, L. R. *J. Am. Chem. Soc.* 2014, 136, 9906-9909. (e) Rodriguez, M. M.; Bill, E.; Brennessel, W. W.; Holland, P. L. *Science* 2011, 334, 780-783.

(6) For a recent review see: Jia, H.-P.; Quadrelli, E. A. *Chem. Soc. Rev.* 2014, 43, 547-564.

(7) (a) Yandulov, D. V.; Schrock, R. R. *Science* 2003, 301, 76. (b) Schrock, R. R. *Angew. Chem. Int. Ed. Engl.* 2008, 47, 5512-5522. (c) Arashiba, K.; Miyake, Y.; Nishibayashi, Y. *Nat. Chem.* 2010, 3, 120. (d) Kuriyama, S.; Arashiba, K.; Nakaji ma, K.; Tanaka, H.; Kamaru, N.; Yoshizawa, K.; Nishibayashi, Y. *J. Am. Chem. Soc.* 2014, DOI: 10.1021/ja5044243.

(8) Anderson, J. S.; Rittle, J.; Peters, J. C. *Nature* 2013, 501, 84.

(9) Creutz, S. E.; Peters, J. C. *J. Am. Chem. Soc.* 2014, 136, 1105.

(10) Moret, M.-E.; Peters, J. C. *J. Am. Chem. Soc,* 2011, 133, 18118.

(11) Moret, M.-E.; Peters, J. C. *Angew. Chem. Int. Ed.* 2011, 50, 2063.

(12) Suess, D. L. M.; Tsay, C.; Peters, J. C. *J. Am. Chem. Soc.* 2012, 134, 14158.

(13) Lee, Y.; Mankad, N. P.; Peters, J. C. *Nat. Chem.* 2010, 2, 558.

(14) Anderson, J. S.; Moret, M.-E.; Peters, J. C. *J. Am. Chem. Soc.* 2013, 135, 534.

(15) Whited, M. T.; Mankad, N. P.; Lee, Y.; Oblad, P. F.; Peters, J. C. *Inorg. Chem.* 2009, 48, 2507.

(16) Co complex synthesized analogously to the Fe complex reported in: MacBeth, C. E.; Harkins, S. B.; Peters, J. C. *Can. J. Chem.* 2005, 83, 332.

(17) Co complex synthesized analogously to the Fe complex reported in: Suess, D. L. M.; Peters, J. C. *J. Am. Chem. Soc.* 2013, 135, 4938

(18) Lin, T.-P.; Peters, J. C. *J. Am. Chem. Soc.* 2013, 135, 15310.

General Considerations:

All manipulations were carried out using standard Schlenk or glovebox techniques under an N$_2$ atmosphere. Solvents were deoxygenated and dried by thoroughly sparging with N$_2$ followed by passage through an activated alumina column in a solvent purification system by SG Water, USA LLC. Nonhalogenated solvents were tested with sodium benzophenone ketyl in tetrahydrofuran in order to confirm the absence of oxygen and water. Deuterated solvents were purchased from Cambridge Isotope Laboratories, Inc., degassed, and dried over activated 3-Å molecular sieves prior to use.

[H.OEt$_2$][BAr$^F_4$],[1] KC$_8$,[2] (TPB)Co(N$_2$),[3] (TPB)CoBr,[3] (SiP$_3$)Co(N$_2$),[4] NArP$_3$,[5] (PBP)Co(N$_2$),[6] DPB,[7] and Co(PPh$_3$)$_2$I$_2$[8] were prepared according to literature procedures. All other reagents were purchased from commercial vendors and used without further purification unless otherwise stated. Et$_2$O for NH$_3$ generation reactions was stirred over Na/K (≥2 hours) and filtered before use.

Physical Methods:

Elemental analyses were performed by Midwest Microlab, LLC (Indianapolis, Ind.). $^1$H and $^{13}$C chemical shifts are reported in ppm relative to tetramethylsilane, using $^1$H and $^{13}$C resonances from residual solvent as internal standards. $^{31}$P chemical shifts are reported in ppm relative to 85% aqueous H$_3$PO$_4$. Solution phase magnetic measurements were performed by the method of Evans.[9] IR measurements were obtained as thin films formed by evaporation of solutions using a Bruker Alpha Platinum ATR spectrometer with OPUS software. Optical spectroscopy measurements were collected with a Cary 50 UV-vis spectrophotometer using a 1-cm two-window quartz cell. Electrochemical measurements were carried out in a glovebox under an N$_2$ atmosphere in a one compartment cell using a CH Instruments 600B electrochemical analyzer. A glassy carbon electrode was used as the working electrode and platinum wire was used as the auxiliary electrode. The reference electrode was Ag/AgCl in THF. The ferrocene couple (Fc$^+$/Fc) was used as an internal reference. THF solutions of electrolyte (0.3 M tetra-n-butylammonium hexafluorophosphate, TBAPF$_6$) and analyte were also prepared under an inert atmosphere.

X-ray Crystallography:

X-ray diffraction studies were carried out at the Caltech Division of Chemistry and Chemical Engineering X-ray Crystallography Facility on a Bruker three-circle SMART diffractometer with a SMART 1K CCD detector. Data was collected at 100K using Mo Kα radiation (λ=0.71073 Å). Structures were solved by direct or Patterson methods using SHELXS and refined against F2 on all data by full-matrix least squares with SHELXL-97.20 All non-hydrogen atoms were refined anisotropically. All hydrogen atoms were placed at geometrically calculated positions and refined using a riding model. The isotropic displacement parameters of all hydrogen atoms were fixed at 1.2 (1.5 for methyl groups) times the Ueq of the atoms to which they are bonded.

Notes Specific to Individual Structures:

The 12-crown-4 fragments are disordered for [Na(12-crown-4)$_2$][(TPB)Co(N$_2$)]. One 12-crown-4 (with O atoms labeled O5-O8 and O50-O80) is fully disordered over two unique positions. The other 12-crown-4 (O atoms labeled O1-O4) shows a disorder in the methyl carbons but not the oxygen atoms. In all cases, the positions of the carbons could be located in the difference map and refined anisotropically and the hydrogen atoms were placed at geometrically calculated positions as usual. The oxygen atom in one of the solvent THF molecules (O10 and O100) is disordered over two positions. The other THF molecule (with O9) shows large thermal ellipsoids, potentially indicating an unresolved disorder of this moiety. A diethylether molecule was located on an inversion center and is therefore disordered about this symmetry element. The occupancies of all disordered fragments were freely refined and the bond lengths and angles were restrained to be the same for the disordered fragments. Hydrogen atoms were not included on any of the solvent molecules for these reasons.

(DPB)Co(N$_2$) crystallizes with two monometallic (DPB)Co(N$_2$) complexes and one half of a bimetallic [(DPB)Co(N$_2$)]$_2$ complex in each asymmetric unit. This was also observed for the isostructural complex (DPB)Ni(N$_2$).[10] For the bimetallic fragment, one of the isopropyl substituents on P1 is disordered in which the methine carbon is disordered over two positions (C7A and C7B) and one of the methyl carbons is disordered over two positions (C8A and C8B). The occupancies of the disordered fragments were freely refined and the bond lengths and angles were restrained to be the same for the disordered fragments. As such, hydrogen atoms were not included on this isopropyl substituent.

The fluorine substituents on C143, C144, C152, and C168 in [(TPB)Co][BAr$_4^F$] are disorded by rotation about the C—C bonds to varying extents and were refined as two-part positional disorders in each case. The occupancies of the disordered fragments were freely refined and the bond lengths and angles were restrained to be the same for the disordered fragments.

[Na(12-crown-4)$_2$][(TPB)Co(N$_2$)] (2): To a −78° C. solution of (TPB)CoBr (70.5 mg, 0.0967 mmol) in THF (2 mL) was added a freshly prepared solution of NaC$_{10}$H$_8$ (23.5 mg C$_{10}$H$_8$, 0.222 mmol) in THF (3 mL). The solution was brought to RT and allowed to stir for six hours. Addition of 12-crown-4 (51.1 mg, 0.290 mmol) and removal of solvent in vacuo provided a dark red solid. Et$_2$O was added and subsequently removed in vacuo. The residue was suspended in C$_6$H$_6$ and filtered and the solids were washed with C$_6$H$_6$ (2×2 mL) and pentane (2×2 mL) to furnish a red solid (68.8 mg, 0.0660 mmol, 68%). Single crystals were grown by vapor diffusion of pentane onto a THF solution of the title compound that had been layered with Et$_2$O. NMR peaks are somewhat broadened likely owing to the presence of a small amount of (TPB)Co(N$_2$). $^1$H NMR (400 MHz, THF-d$_8$) δ 7.41 (3H), 6.94 (3H), 6.66 (3H), 6.44 (3H), 3.64 (32H), 2.29 (br), 1.37 (6H), 1.20 (6H), 0.93 (6H), −0.26 (6H). $^{11}$B NMR (128 MHz, THF-d$_8$) δ 9.32. $^{31}$P NMR (162 MHz, THF-d$_8$) δ 62.03. IR (thin film, cm$^{-1}$): 1978 (N$_2$). Anal. Calcd. for C$_{52}$H$_{86}$BCoN$_2$NaO$_8$P$_3$: C, 59.32; H, 8.23; N, 2.66. Found: C, 59.05; H, 7.99; N, 2.47.

[(TPB)Co][BAr$^F_4$] (3): To a −78° C. solution of (TPB)Co(N$_2$) (91.5 mg, 0.135 mmol) in Et$_2$O (2 mL) was added solid [H(OEt$_2$)$_2$][BAr$^F_4$] (134.0 mg, 0.132 mmol). The reaction was brought to RT and vented to allow for the escape of H$_2$. The purple-brown solution was stirred for 1 hr. The solution was layered with pentane (5 mL) and stored at −35° C. to furnish red-purple single crystals of the title compound (162.9 mg, 0.0952 mmol, 82%) which were washed with pentane (3×2 mL). $^1$H NMR (400 MHz, C$_6$D$_6$) δ 26.25, 23.80, 8.64, 8.44 ([BAr$^F_4$]), 7.88 ([BAr$^F_4$]), 6.33, −2.16, −3.68. UV-Vis (Et$_2$O, nm {L·cm$^{-1}$·mol$^{-1}$}): 585 {1500}, 760 {532}. Anal. Calcd. for C$_{68}$H$_{66}$B$_2$CoF$_{24}$P$_3$: C, 53.99; H, 4.40. Found: C, 53.94; H, 4.51.

(DPB)Co(N$_2$): A solution of DPB (0.8483 g, 1.79 mmol) and CoCl$_2$ (0.2316 g, 1.78 mmol) in THF (ca. 80 mL) was stirred at RT until all of the solids dissolved, leaving a deep blue solution. Solvent was removed in vacuo and rated in Et$_2$O for 15 min. Solvent was removed in vacuo and the blue residue was dissolved in benzene (80 mL). Freshly prepared 1% sodium mercury amalgam (0.0864 g Na, 3.76 mmol) was added to the dark blue solution and stirred vigorously for 24 hours. The resulting dark red-orange solution was decanted and filtered through celite. Lyophilization of the decanted benzene solution leaves a fine dark brown powder. This powder was dissolved in minimal Et$_2$O and cooled in a freezer to −30° C. affording red-orange crystals of (2). (0.850 g, 1.51 mmol, 84.8%) Solution magnetic moment (Evans method, RT, C$_6$D$_6$): 1.8 μ$_B$. IR (thin film, cm$^{-1}$): 2098 (N$_2$). $^1$H NMR (C$_6$D$_6$, 300 MHz, 23° C.): δ 17.79, 14.75, 4.05, 2.40, −2.72, −4.04; UV-Vis (toluene, nm {M$^{-1}$ cm$^{-1}$}): 288 {9350}. Elemental analysis shows low values for N consistent with a labile N$_2$ ligand Calcd. for C$_{52}$H$_{86}$BCoN$_2$NaO$_8$P$_3$: C, 64.19; H, 7.36; N, 4.99. Found: C, 64.52; H, 7.57; N, 4.13.

[(NArP$_3$)CoCl][BPh$_4$]: THF (5 mL) was added to a solid mixture of NArP$_3$ (58 mg, 91.2 mmol), CoCl$_2$ (12 mg, 92.4 mmol) and NaBPh$_4$ (31 mg, 90.6 mmol). The reaction was stirred for 4 hours at room temperature during which the color evolved from yellow to green to purple. The solvent was removed in vacuo and the residue was taken in dichloromethane. The suspension was filtered over a plug of Celite and the filtrate was dried yielding a purple powder (86 mg, 82.1 mmol, 90%). Single crystals were grown by slow evaporation of a saturated solution of [(NArP$_3$)CoCl][BPh$_4$] in diethyl ether/dichloromethane (1:2 v:v). $^1$H NMR (CD$_2$Cl$_2$, 300 MHz, 23° C.): δ 177.77, 37.50, 23.78, 13.48, 12.96, 7.37, 7.08, 6.92, 4.41, 1.50, −3.60, −9.81; UV-Vis (THF, nm {L·cm$^{-1}$·mol$^{-1}$}): 564 {452}, 760 {532}; μ$_{eff}$ (CD$_2$Cl$_2$, Evans method, 23° C.): 3.97 μ$_B$. Anal. Calcd. for C$_{63}$H$_{80}$BClCoNP$_3$: C, 72.10; H, 7.68; N, 1.33. Found: C, 71.97; H, 7.76; N, 1.30.

Ammonia Quantification: A Schlenk tube was charged with HCl (3 mL of a 2.0 M solution in Et$_2$O, 6 mmol). Reaction mixtures were vacuum transferred into this collection flask. Residual solid in the reaction vessel was treated with a solution of [Na][O-t-Bu] (40 mg, 0.4 mmol) in 1,2-dimethoxyethane (1 mL) and sealed. The resulting suspension was allowed to stir for 10 min before all volatiles were again vacuum transferred into the collection flask.

After completion of the vacuum transfer, the flask was sealed and warmed to room temperature. Solvent was removed in vacuo, and the remaining residue was dissolved in $H_2O$ (1 mL). An aliquot of this solution (20 μL) was then analyzed for the presence of $NH_3$ (present as $[NH_4][Cl]$) by the indophenol method.[11] Quantification was performed with UV-vis spectroscopy by analyzing absorbance at 635 nm.

Standard $NH_3$ Generation Reaction Procedure with [(TPB)Co($N_2$)][Na(12-crown-4)$_2$] (2): [(TPB)Co($N_2$)][Na(12-crown-4)$_2$] (2.2 mg, 0.002 mmol) was suspended in $Et_2O$ (0.5 mL) in a 20 mL scintillation vial equipped with a stir bar. This suspension was cooled to −78° C. in a cold well inside of a $N_2$ glovebox. A solution of $[H.(OEt_2)_2][BAr^F_4]$ (95 mg, 0.094 mmol) in $Et_2O$ (1.5 mL) similarly cooled to −78° C. was added to this suspension in one portion with stirring. Residual acid was dissolved in cold $Et_2O$ (0.25 mL) and added subsequently. This mixture was allowed to stir 5 minutes at −78° C., before being transferred to a precooled Schlenk tube equipped with a stir bar. The original reaction vial was washed with cold $Et_2O$ (0.25 mL) which was added subsequently to the Schlenk tube. $KC_8$ (16 mg, 0.119 mmol) was suspended in cold $Et_2O$ (0.75 mL) and added to the reaction mixture over the course of 1 minute. The Schlenk tube was then sealed, and the reaction was allowed to stir for 40 min at −78° C. before being warmed to room temperature and stirred for 15 min.

TABLE 36

UV-vis quantification results for standard $NH_3$ generation experiments with [(TPB)Co($N_2$)][Na(12-crown-4)$_2$] (2)

| Iteration | Absorbance (635 nm) | Eq. $NH_3$/Co | % Yield Based on $H^+$ |
|---|---|---|---|
| A | 0.225 | 2.3 | 16 |
| B | 0.187 | 2.1 | 14 |
| C | 0.199 | 2.2 | 14 |
| D | 0.240 | 2.5 | 18 |
| E | 0.255 | 2.8 | 19 |
| F | 0.197 | 2.2 | 14 |
| Average | 0.217 ± 0.027 | 2.4 ± 0.3 | 16 ± 2 |

Hydrazine was not detected in the catalytic runs using a standard UV-Vis quantification method.[12]

Standard $NH_3$ Generation Reaction Procedure with (TPB)Co($N_2$) (1):

The procedure was identical to that of the standard $NH_3$ generation reaction protocol with the changes noted. The precursor used was (TPB)Co($N_2$) (1.3 mg, 0.002 mmol).

TABLE 37

UV-vis quantification results for standard $NH_3$ generation experiments with (TPB)Co($N_2$) (1)

| Iteration | Absorbance (635 nm) | Eq. $NH_3$/Co | % Yield Based on $H^+$ |
|---|---|---|---|
| A | 0.064 | 0.7 | 4 |
| B | 0.058 | 0.6 | 4 |
| C | 0.107 | 1.2 | 8 |
| Average | 0.076 ± 0.027 | 0.8 ± 0.3 | 5 ± 2 |

Standard $NH_3$ Generation Reaction Procedure with [(TPB)Co][BAr$^F_4$] (3):

The procedure was identical to that of the standard $NH_3$ generation reaction protocol with the changes noted. The precursor used was [(TPB)Co($N_2$)][BAr$^F_4$] (2.3 mg, 0.002 mmol).

TABLE 38

UV-vis quantification results for standard $NH_3$ generation experiments with [(TPB)Co][BAr$^F_4$] (3)

| Iteration | Absorbance (635 nm) | Eq. $NH_3$/Co | % Yield Based on $H^+$ |
|---|---|---|---|
| A | 0.092 | 1.4 | 6 |
| B | 0.122 | 1.8 | 9 |
| C[1] | 0.091 | 1.5 | 6 |
| Average | 0.107 ± 0.021 | 1.6 ± 0.2 | 7 ± 1 |

[1]Used 2.0 mg (0.001 mmol) of catalyst; omitted from average absorbance

Standard $NH_3$ Generation Reaction Procedure with (TPB)CoBr:

The procedure was identical to that of the standard $NH_3$ generation reaction protocol with the changes noted. The precursor used was (TPB)CoBr (1.6 mg, 0.002 mmol).

TABLE 39

UV-vis quantification results for standard $NH_3$ generation experiments with (TPB)CoBr

| Iteration | Absorbance (635 nm) | Eq. $NH_3$/Co | % Yield Based on $H^+$ |
|---|---|---|---|
| A | 0.035 | 0.3 | 2 |
| B | 0.101 | 1.0 | 7 |
| C[1] | 0.088 | 0.7 | 6 |
| Average | 0.068 ± 0.047 | 0.7 ± 0.4 | 5 ± 3 |

[1]Used 2.0 mg (0.003 mmol) of catalyst; omitted from average absorbance

Standard $NH_3$ Generation Reaction Procedure with (SiP$_3$)Co($N_2$):

The procedure was identical to that of the standard $NH_3$ generation reaction protocol with the changes noted. The precursor used was (SiP$_3$)Co($N_2$) (1.5 mg, 0.002 mmol).

TABLE 40

UV-vis quantification results for standard $NH_3$ generation experiments with (SiP$_3$)Co($N_2$)

| Iteration | Absorbance (635 nm) | Eq. $NH_3$/Co | % Yield Based on $H^+$ |
|---|---|---|---|
| A | <0.005 | <0.1 | — |
| B | <0.005 | <0.1 | — |
| C | <0.005 | <0.1 | — |
| Average | — | <0.1 | — |

Standard $NH_3$ Generation Reaction Procedure with [(NArP$_3$)CoCl][BPh$_4$]:

The procedure was identical to that of the standard $NH_3$ generation reaction protocol with the changes noted. The precursor used was [(NArP$_3$)CoCl][BPh$_4$] (1.9 mg, 0.002 mmol).

TABLE 41

UV-vis quantification results for standard $NH_3$ generation experiments with [(NArP$_3$)CoCl][BPh$_4$]

| Iteration | Absorbance (635 nm) | Eq. $NH_3$/Co | % Yield Based on $H^+$ |
|---|---|---|---|
| A | <0.005 | <0.1 | — |
| B | <0.005 | <0.1 | — |
| C | <0.005 | <0.1 | — |
| Average | — | <0.1 | — |

Standard $NH_3$ Generation Reaction Procedure with (DPB)Co($N_2$):

The procedure was identical to that of the standard $NH_3$ generation reaction protocol with the changes noted. The precursor used was (DPB)Co($N_2$) (1.4 mg, 0.002 mmol).

TABLE 42

UV-vis quantification results for standard NH₃ generation experiments with (DPB)Co(N₂)

| Iteration | Absorbance (635 nm) | Eq. NH₃/Co | % Yield Based on H⁺ |
|---|---|---|---|
| A | 0.033 | 0.24 | 2 |
| B | 0.036 | 0.28 | 2 |
| C[1] | 0.032 | 0.38 | 2 |
| Average | 0.035 ± 0.002 | 0.3 ± 0.1 | 2 ± 0.2 |

[1] Used 0.9 mg (0.0016 mmol) of catalyst; omitted from average absorbance

Standard NH₃ Generation Reaction Procedure with (PBP)Co(N₂):

The procedure was identical to that of the standard NH₃ generation reaction protocol with the changes noted. The precursor used was (PBP)Co(N₂) (1.1 mg, 0.002 mmol).

TABLE 43

UV-vis quantification results for standard NH₃ generation experiments with (PBP)Co(N₂)

| Iteration | Absorbance (635 nm) | Eq. NH₃/Co | % Yield Based on H⁺ |
|---|---|---|---|
| A | 0.021 | 0.15 | 1 |
| B | 0.03 | 0.29 | 2 |
| C | 0.057 | 0.62 | 4 |
| Average | 0.036 ± 0.019 | 0.4 ± 0.2 | 2 ± 1 |

Standard NH₃ Generation Reaction Procedure with Co(PPh₃)₂I₂:

The procedure was identical to that of the standard NH₃ generation reaction protocol with the changes noted. The precursor used was Co(PPh₃)₂I₂ (1.8 mg, 0.002 mmol).

TABLE 44

UV-vis quantification results for standard NH₃ generation experiments with Co(PPh₃)₂I₂

| Iteration | Absorbance (635 nm) | Eq. NH₃/Co | % Yield Based on H⁺ |
|---|---|---|---|
| A[1] | 0.036 | 0.3 | 2 |
| B | 0.036 | 0.3 | 2 |
| C | 0.046 | 0.4 | 3 |
| Average | 0.041 ± 0.007 | 0.4 ± 0.1 | 2 ± 0.4 |

[1] Used 2.0 mg (0.0024 mmol) of catalyst; omitted from average absorbance

Standard NH₃ Generation Reaction Procedure with CoCp₂:

The procedure was identical to that of the standard NH₃ generation reaction protocol with the changes noted. The precursor used was CoCp₂ (0.6 mg, 0.003 mmol).

TABLE 45

UV-vis quantification results for standard NH₃ generation experiments with CoCp₂

| Iteration | Absorbance (635 nm) | Eq. NH₃/Co | % Yield Based on H⁺ |
|---|---|---|---|
| A | 0.020 | 0.09 | 1 |
| B | 0.008 | 0.02 | 0 |
| C | 0.033 | 0.20 | 2 |
| Average | 0.020 ± 0.013 | 0.1 ± 0.1 | 1 ± 1 |

Standard NH₃ Generation Reaction Procedure with Co₂(CO)₈:

The procedure was identical to that of the standard NH₃ generation reaction protocol with the changes noted. The precursor used was Co₂(CO)₈ (0.4 mg, 0.001 mmol, 0.002 mmol Co) sampled as a 100 µL aliquot of a stock solution (2.0 mg Co₂(CO)₈ in 0.5 mL Et₂O).

TABLE 46

UV-vis quantification results for standard NH₃ generation experiments with Co₂(CO)₈

| Iteration | Absorbance (635 nm) | Eq. NH₃/Co | % Yield Based on H⁺ |
|---|---|---|---|
| A | <0.005 | <0.1 | — |
| B | <0.005 | <0.1 | — |
| C | <0.005 | <0.1 | — |
| Average | — | <0.1 | — |

TABLE 47

Crystal data and structure refinement for [Na(12-crown-4)₂][(TPB)Co(N₂)] (2) and [(TPB)Co][BAr$^F_4$] (3)

| | 2 | 3 |
|---|---|---|
| Identification code | 2 | 3 |
| Empirical formula | C₆₂H₈₆BCoN₂NaO₁₀.₅P₃ | C₆₈H₆₆B₂CoF₂₄P₃ |
| Formula weight | 1212.97 | 1512.67 |
| Temperature/K | 100 (2) | 100 (2) |
| Crystal system | monoclinic | orthorhombic |
| Space group | P2₁/n | Pbca |
| a/Å | 10.8142 (5) | 26.3920 (15) |
| b/Å | 27.5046 (13) | 19.7049 (13) |
| c/Å | 22.3660 (10) | 26.4995 (19) |
| α/° | 90 | 90 |
| β/° | 91.141 (2) | 90 |
| γ/° | 90 | 90 |
| Volume/Å³ | 6651.2 (5) | 13781.1 (16) |
| Z | 4 | 8 |
| ρ$_{calc}$ g/cm³ | 1.211 | 1.458 |
| µ/mm⁻¹ | 0.391 | 0.424 |
| F(000) | 2576 | 6176 |
| Crystal size/mm³ | 0.38 × 0.30 × 0.25 | 0.35 × 0.32 × 0.24 |
| Radiation | MoKα (λ = 0.71073) | MoKα (λ = 0.71073) |

TABLE 47-continued

Crystal data and structure refinement for [Na(12-crown-4)$_2$][(TPB)Co(N$_2$)] (2) and [(TPB)Co][BAr$^F_4$] (3)

| | | |
|---|---|---|
| 2Θ range for data collection/° | 3.94 to 86.26 | 3.72 to 64.06 |
| Index ranges | −20 ≤ h ≤ 20, −52 ≤ k ≤ 52, −43 ≤ l ≤ 43 | −39 ≤ h ≤ 39, −23 ≤ k ≤ 29, −39 ≤ l ≤ 39 |
| Reflections collected | 451328 | 377520 |
| Independent reflections | 49547 [R$_{int}$ = 0.0632, R$_{sigma}$ = 0.1797] | 23962 [R$_{int}$ = 0.0539, R$_{sigma}$ = 0.0255] |
| Data/restraints/parameters | 49547/1385/952 | 23962/1174/1007 |
| Goodness-of-fit on F$^2$ | 1.091 | 1.052 |
| Final R indexes [I>=2σ (I)] | R$_1$ = 0.0629, wR$_2$ = 0.1600 | R$_1$ = 0.0459, wR$_2$ = 0.1084 |
| Final R indexes [all data] | R$_1$ = 0.0999, wR$_2$ = 0.1797 | R$_1$ = 0.0720, wR$_2$ = 0.1241 |
| Largest diff. peak/hole/e Å$^{-3}$ | 1.78/−0.83 | 1.27/−1.34 |

TABLE 48

Crystal data and structure refinement for [(NArP$_3$)CoCl][BPh$_4$] and (DPB)Co(N$_2$)

| | | |
|---|---|---|
| Identification code | [(NArP$_3$)CoCl][BPh$_4$] | D(PB)Co(N$_2$) |
| Empirical formula | C63H80BClCoNP3 | C$_{30}$H$_{38.67}$BCoN$_{1.67}$P$_2$ |
| Formula weight | 1049.38 | 554.31 |
| Temperature/K | 100 | 100 (2) |
| Crystal system | triclinic | triclinic |
| Space group | P-1 | P-1 |
| a/Å | 10.9491 (7) | 10.7517 (7) |
| b/Å | 14.9096 (10) | 18.0184 (12) |
| c/Å | 17.8512 (11) | 24.6119 (15) |
| α/° | 83.935 (3) | 69.741 (5) |
| β/° | 79.063 (3) | 81.149 (4) |
| γ/° | 89.303 (3) | 74.584 (3) |
| Volume/Å$^3$ | 2845.1 (3) | 4302.0 (5) |
| Z | 2 | 6 |
| ρ$_{calc}$ g/cm$^3$ | 1.225 | 1.284 |
| μ/mm$^{-1}$ | 0.472 | 0.731 |
| F(000) | 1118 | 1754 |
| Crystal size/mm$^3$ | 0.06 × 0.04 × 0.02 | 0.27 × 0.17 × 0.08 |
| Radiation | MoKα (λ = 0.71073) | MoKα (λ = 0.71073) |
| 2Θ range for data collection/° | 2.746 to 59.26 | 3.48 to 66.26 |
| Index ranges | −15 ≤ h ≤ 15, −20 ≤ k ≤ 20, −24 ≤ l ≤ 24 | −16 ≤ h ≤ 16, −26 ≤ k ≤ 26, −37 ≤ l ≤ 37 |
| Reflections collected | 103727 | 206469 |
| Independent reflections | 15990 [Rint = 0.0972, Rsigma = 0.0851] | 29807 [R$_{int}$ = 0.1027, R$_{sigma}$ = 0.1334] |
| Data/restraints/parameters | 15990/0/646 | 29807/949/1005 |
| Goodness-of-fit on F$^2$ | 1 | 0.976 |
| Final R indexes [I>=2σ (I)] | R1 = 0.0457, wR2 = 0.0837 | R$_1$ = 0.0546, wR$_2$ = 0.1381 |
| Final R indexes [all data] | R1 = 0.0986, wR2 = 0.0978 | R$_1$ = 0.1214, wR$_2$ = 0.1552 |
| Largest diff. peak/hole/e Å$^{-3}$ | 0.53/−0.53 | 0.91/−0.75 |

ADDITIONAL REFERENCES (1) Brookhart, M.; Grant, B.; Volpe Jr., A. F. *Organometallics* 1992, 11, 3920-3922.
(2) Wietz, I. S.; Rabinovitz, M. J. *J. Chem. Soc., Perkin Trans.* 1993, 1, 117.
(3) Suess, D. L. M.; Tsay, C.; Peters, J. C. *J. Am. Chem. Soc.,* 2012, 134, 14158.
(4) Whited, M. T.; Mankad, N. P.; Lee, Y.; Oblad, P. F.; Peters, J. C. *Inorg. Chem.,* 2009, 48, 2507.
(5) MacBeth, C. E.; Harkins, S. B.; Peters, J. C. *Can. J. Chem.,* 2005, 83, 332.
(6) Lin, T.-P.; Peters, J. C. *J. Am. Chem. Soc.,* 2013, 135, 15310.
(7) Bontemps, S.; Gornitzka, H.; Bouhadir, G.; Miqueu, K.; Bourissou, D. *Angew. Chem. Int. Ed.* 2006, 45, 1611-1614.
(8) Cotton, F. A.; Faut, O. D.; Goodgame, D. M. L.; Holm, R. H. *J. Am. Chem. Soc.,* 1961, 83, 1780.
(9) Evans, D. F. *J. Chem. Soc.,* 1959, 2003.
(10) Harman, W. H.; Lin, T.-P.; Peters, J. C. *Angew. Chem. Int. Ed. Engl.* 2014, 53, 1081-1086.
(11) Weatherburn, M. W. *Anal. Chem.* 1967, 39, 971.
(12) Watt, G. W.; Chrisp, J. D. *Anal. Chem.* 1952, 24, 2006.

STATEMENTS REGARDING INCORPORATION BY REFERENCE AND VARIATIONS

All references cited throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

When a group of substituents is disclosed herein, it is understood that all individual members of that group and all subgroups, including any isomers, enantiomers, and diastereomers of the group members, are disclosed separately. When a Markush group or other grouping is used herein, all individual members of the group and all combinations and subcombinations possible of the group are intended to be individually included in the disclosure. When a compound is described herein such that a particular isomer, enantiomer or diastereomer of the compound is not specified, for example, in a formula or in a chemical name, that description is intended to include each isomers and enantiomer of the compound described individual or in any combination. Additionally, unless otherwise specified, all isotopic variants of compounds disclosed herein are intended to be encompassed by the disclosure. For example, it will be understood that any one or more hydrogens in a molecule disclosed can be replaced with deuterium or tritium. Isotopic variants of a molecule are generally useful as standards in assays for the molecule and in chemical and biological research related to the molecule or its use. Methods for making such isotopic variants are known in the art. Specific names of compounds are intended to be exemplary, as it is known that one of ordinary skill in the art can name the same compounds differently.

It must be noted that as used herein and in the appended claims, the singular forms "a", "an", and "the" include plural reference unless the context clearly dictates otherwise. Thus, for example, reference to "a cell" includes a plurality of such cells and equivalents thereof known to those skilled in the art, and so forth. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and In an embodiment is interchangeable with the expression "as in any one of claims XX-YY."

Unless defined otherwise, all technical and scientific terms used herein have the same meanings as commonly understood by one of ordinary skill in the art to which this invention belongs. Although any methods and materials similar or equivalent to those described herein can be used in the practice or testing of the present invention, the preferred methods and materials are now described. Nothing herein is to be construed as an admission that the invention is not entitled to antedate such disclosure by virtue of prior invention.

Every formulation or combination of components described or exemplified herein can be used to practice the invention, unless otherwise stated.

Whenever a range is given in the specification, for example, a temperature range, a time range, or a composition or concentration range, all intermediate ranges and subranges, as well as all individual values included in the ranges given are intended to be included in the disclosure. As used herein, ranges specifically include the values provided as endpoint values of the range. For example, a range of 1 to 100 specifically includes the end point values of 1 and 100. It will be understood that any subranges or individual values in a range or subrange that are included in the description herein can be excluded from the claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

We claim:

1. A catalytic process for reduction of molecular nitrogen ($N_2$) to generate a reduction product, said process comprising the steps of:
   contacting a transition metal catalyst with a source of protons and a source of electrons in the presence of said molecular nitrogen, thereby generating said reduction product;
   wherein said transition metal catalyst comprises a metal complex comprising a transition metal atom selected from the group consisting of Fe and Co, and a phosphine ligand (L) having the formula (FX1A), (FX1B) or (FX1C):

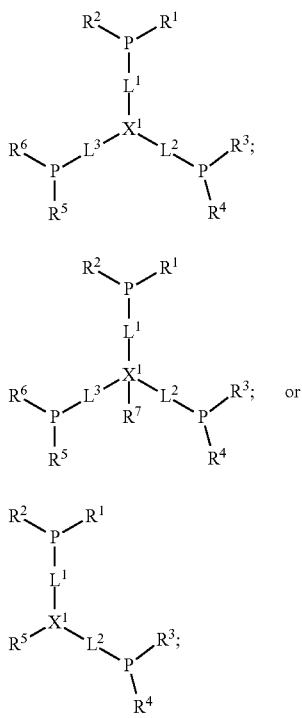

(FX1A)
(FX1B)
(FX1C)

wherein:

$X^1$ is B, C, Si or P;

each of $L^1$, $L^2$ and $L^3$ is independently a substituted or unsubstituted $C_1$-$C_{10}$ alkylene, $C_3$-$C_{10}$ cycloalkylene, $C_5$-$C_{10}$ arylene, or $C_5$-$C_{10}$ heteroarylene;

each of $R^1$, $R^2$, $R^3$, $R^4$, $R^5$, $R^6$ and $R^7$ is independently hydrogen or a substituted or unsubstituted $C_1$-$C_8$ alkyl, $C_3$-$C_8$ cycloalkyl, $C_5$-$C_8$ aryl, $C_5$-$C_8$ heteroaryl, $C_1$-$C_{18}$ acyl, $C_2$-$C_8$ alkenyl, $C_2$-$C_8$ alkynyl, or —P(OR$^8$)$_2$, wherein each $R^8$ is independently hydrogen, $C_1$-$C_8$ alkyl, $C_3$-$C_8$ cycloalkyl, $C_5$-$C_8$ aryl or $C_5$-$C_8$ heteroaryl.

2. The catalytic process of claim 1, wherein said metal complex further comprises $N_2$ and has the formula (FX2A), (FX2B) or (FX2C):

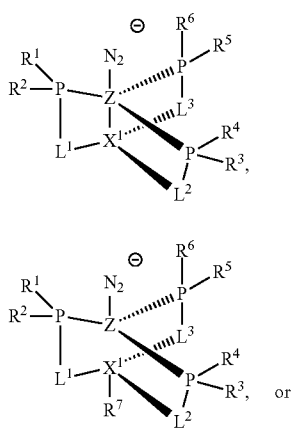

(FX2A)
(FX2B)

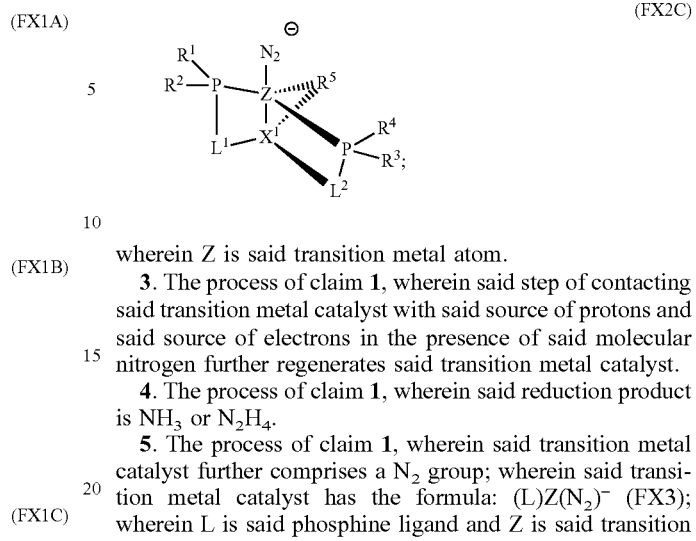

(FX2C)

wherein Z is said transition metal atom.

3. The process of claim 1, wherein said step of contacting said transition metal catalyst with said source of protons and said source of electrons in the presence of said molecular nitrogen further regenerates said transition metal catalyst.

4. The process of claim 1, wherein said reduction product is $NH_3$ or $N_2H_4$.

5. The process of claim 1, wherein said transition metal catalyst further comprises a $N_2$ group; wherein said transition metal catalyst has the formula: (L)Z(N$_2$)$^-$ (FX3); wherein L is said phosphine ligand and Z is said transition metal atom.

6. The process of claim 5 further comprising the step of protonating said transition metal catalyst so as to generate a hydrogenated metal-$N_2$ complex; wherein protonating occurs via contacting said transition metal catalyst with an acid.

7. The process of claim 6, wherein said hydrogenated metal-$N_2$ complex has the formula (FX4), (FX5A) or (FX5B):

$$(L)Z(N_xH_y) \text{ (FX4), } (L)Z(NH_2) \text{ (FX5A) or } (L)Z(NH_3)^+ \text{(FX5B)};$$

wherein x is 1 or 2; y is 1, 2, 3, 4 or 5; L is said phosphine ligand and Z is said transition metal atom.

8. The process of claim 6, further comprising reductive protonation of said hydrogenated metal-$N_2$ complex, thereby generating said reduction product and regenerating said transition metal catalyst.

9. The process of claim 1 further comprising the step of:
providing a transition metal catalyst precursor comprising a precursor transition metal complex comprising said transition metal atom and said phosphine ligand (L); and
contacting said transition metal catalyst precursor with molecular nitrogen in the presence of an acid and a reductant, thereby generating said transition metal catalyst comprising a $N_2$ adduct of said transition metal catalyst precursor;
wherein said transition metal catalyst precursor has the formula:

$$(L)Z^+ \text{(FX6)};$$

wherein L is said phosphine ligand and Z is said transition metal atom.

10. The process of claim 9, wherein said transition metal catalyst is generated via reduction of said transition metal catalyst precursor wherein said reducing agent is Na, Na/Hg or KC$_8$.

11. The process of claim 1, wherein said transition metal catalyst is a mononuclear metal complex, wherein said transition metal atom is Fe and characterized by an oxidation state of Fe(−1), Fe(0), Fe(I), Fe(II), Fe(III), or Fe(IV).

12. The process of claim 1, wherein said phosphine ligand is a tripodal trisphosphine ligand having a boron, carbon, silicon or phosphorous axial donor atom.

13. The process of claim 1, wherein said phosphine ligand has an aryl backbone comprising at least one of $L^1$, $L^2$ and $L^3$ independently comprising $C_5$-$C_{10}$ arylene or $C_5$-$C_{10}$ heteroarylene or wherein said phosphine ligand comprises one or more cyclohexylamine ring systems.

14. The process of claim 1, wherein said ligand of said transition metal catalyst has the formula (FX7A), (FX7B) or (FX7C):

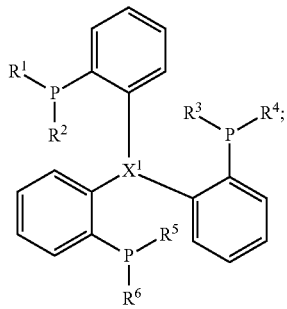

(FX7A)

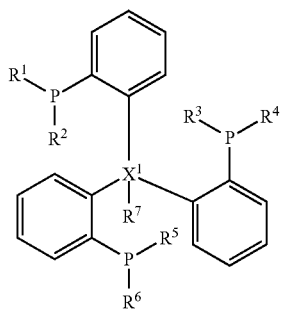

(FX7B)

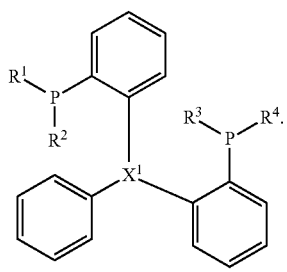

(FX7C)

15. The process of claim 14, wherein said metal complex further comprises $N_2$ and has the formula (FX8A), (FX8B) or (FX8C):

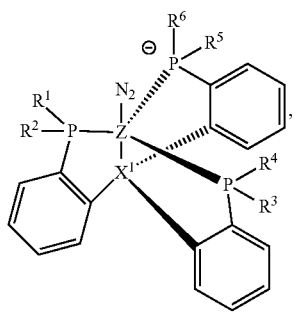

(FX8A)

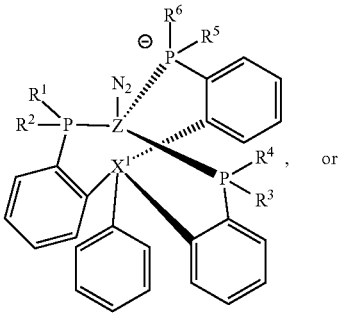

(FX8B)

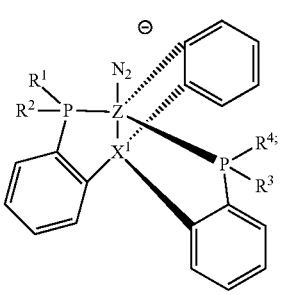

(FX8C)

wherein Z is said transition metal atom.

16. The process of claim 1, wherein said ligand of said transition metal catalyst has the formula (FX9A), (FX9B) or (FX9C):

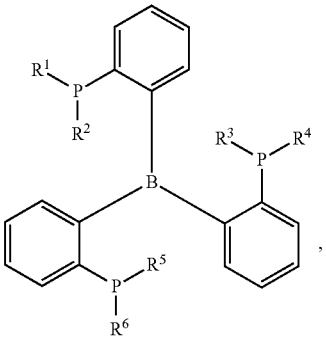

(FX9A)

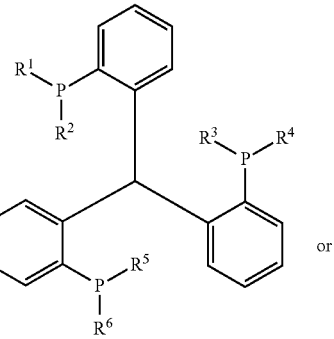

(FX9B)

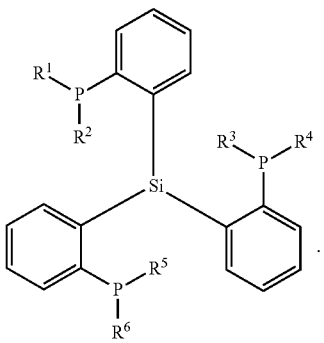
(FX9C)
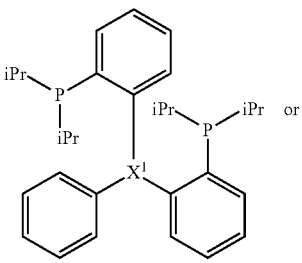
(FX9D)
17. The process of claim 1, wherein said ligand of said transition metal catalyst has formula (FX10A), (FX10B) or (FX10C):
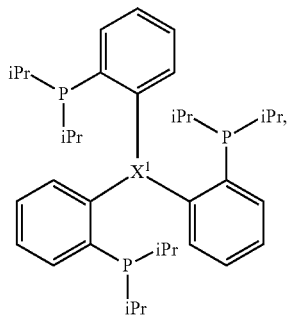
(FX9A)
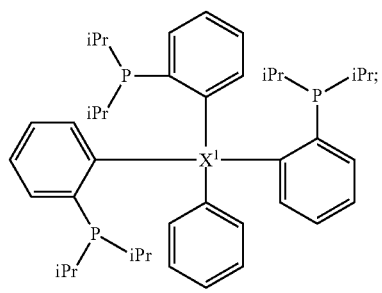
(FX9E)
wherein iPr is isopropyl, Ph is phenyl and Cy is cyclohexyl.
18. The process of claim 1, wherein said ligand of said transition metal catalyst has formula (FX10A), (FX10B), (FX10C) or (FX10D):
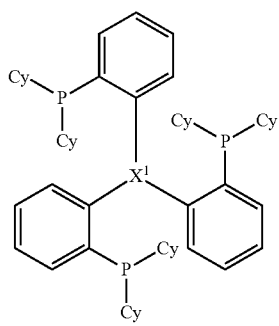
(FX9B)
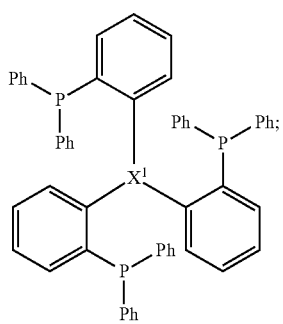
(FX9C)
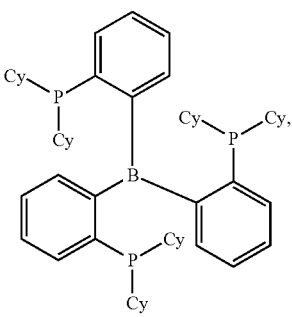
(FX10A)
(FX10B)

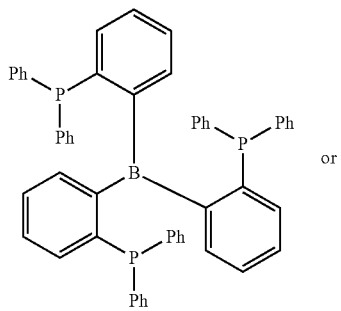
(FX10C)

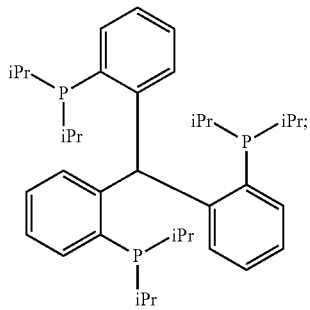
(FX10D)

wherein iPr is isopropyl, Ph is phenyl and Cy is cyclohexyl.

19. The process of claim 1, wherein said transition metal catalyst has the formula [(TP$^R$B)Fe(N$_2$)]$^-$, [(CP$^R_3$)Fe(N$_2$)]$^-$, [(SiP$^R_3$)Fe(N$_2$)]$^-$, [(TP$^R$B)Co(N$_2$)]$^-$, [(CP$^R_3$)Co(N$_2$)]$^-$, or [(SiP$^R_3$)Co(N$_2$)]$^-$, wherein TP$^R$B is a tris(phosphinoaryl)borane ligand, CP$^R_3$ is a tris(phosphinoaryl)alkyl ligand and SiP$^R_3$ is tris(phosphinoaryl)silyl ligand.

20. The process of claim 1, wherein at least one of said molecular nitrogen said transition metal catalyst, said source of protons and said source of electrons are provided in a solution comprising one or more solvents, wherein the concentration of said molecular nitrogen in said solution is selected from the range of 1×10$^{-4}$ M to 1 M wherein the concentration of said transition metal catalyst in said solution is selected from the range of 0.01 mM to 10 mM.

21. The process of claim 1, wherein said source of protons is one or more acids selected from the group consisting of: HBAr$^F_4$ (hydro tetrakis[(3,5-trifluoromethyl)phenyl]borate), HOTf (triflic acid), HX, HBF$_4$, ArNH$_3$+X and a combination of these; wherein X is a halogen.

22. The process of claim 21, wherein the concentration of said one or more acids is selected from the range of 0.01-5 M.

23. The process of claim 1, wherein said source of electrons is one or more reductants selected from the group consisting of Na, K/Hg, KC$_8$, Na/Hg, NaBH$_4^-$, Mg, Zn and any combination of these.

24. The process of claim 23, wherein the concentration of said one or more reductants is selected from the range of 0.1-100 M.

25. The process of claim 20, wherein said transition metal catalyst is a homogeneous catalyst, wherein said transition metal catalyst, said source of protons, said source of electrons and said molecular nitrogen are provided in contact with each other in said solution.

26. The process of claim 20, wherein said transition metal catalyst is a heterogeneous catalyst, where said transition metal, said source of protons and said source of electrons and said molecular nitrogen are provided in said solution and provided in contact with said transition metal catalyst provided in the solid phase.

27. A catalyst formulation for reduction of molecular nitrogen (N$_2$) to generate a reduction product, said formulation comprising:
a transition metal catalyst comprising a metal complex comprising a transition metal atom selected from the group consisting of Fe and Co, and a phosphine ligand (L);
a source of protons comprising one or more acids; and
a source of electrons comprising one or more reductants; and
a phosphine ligand (L) having the formula (FX1A), (FX1B) or (FX1C):

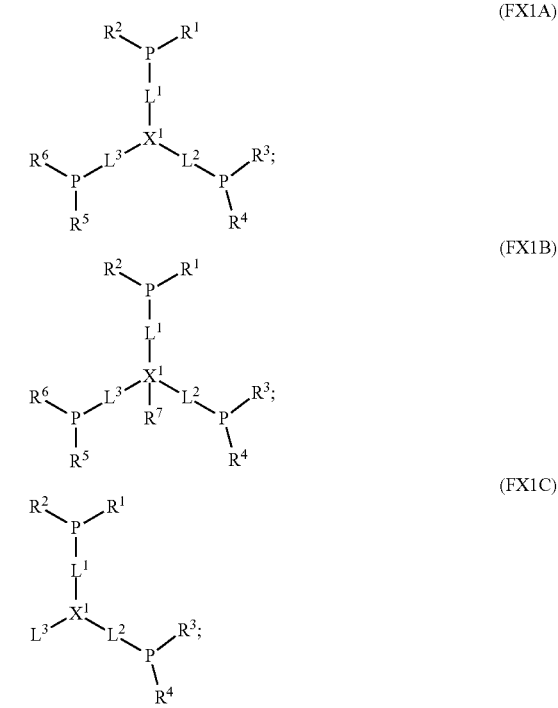

wherein:
X$^1$ is B, C, Si or P;
each of L$^1$, L$^2$ and L$^3$ is independently a substituted or unsubstituted C$_1$-C$_{10}$ alkylene, C$_3$-C$_{10}$ cycloalkylene, C$_5$-C$_{10}$ arylene, or C$_5$-C$_{10}$ heteroarylene;
each of R$^1$, R$^2$, R$^3$, R$^4$, R$^5$, R$^6$ and R$^7$ is independently hydrogen or a substituted or unsubstituted C$_1$-C$_8$ alkyl, C$_3$-C$_8$ cycloalkyl, C$_5$-C$_8$ aryl, C$_5$-C$_8$ heteroaryl, C$_1$-C$_{18}$ acyl, C$_2$-C$_8$ alkenyl, C$_2$-C$_8$ alkynyl, or —P(OR$^8$)$_2$, wherein each R$^8$ is independently hydrogen, C$_1$-C$_8$ alkyl, C$_3$-C$_8$ cycloalkyl, C$_5$-C$_8$ aryl or C$_5$-C$_8$ heteroaryl.

* * * * *